US006667810B1

(12) United States Patent
Jeyachandran et al.

(10) Patent No.: US 6,667,810 B1
(45) Date of Patent: Dec. 23, 2003

(54) APPARATUS AND METHOD FOR CHANGING, ADDING AND DELETING A JOB, AND A STORAGE MEDIUM FOR SUCH A PROGRAM

(75) Inventors: Suresh Jeyachandran, Yokohama (JP); Shouichi Ibaraki, Tokyo (JP); Masayuki Takayama, Kashiwa (JP); Aruna Rohra Suda, Yokohama (JP); Masanori Wakai, Tokyo (JP); Shuichi Mikame, Tokyo (JP); Kenichi Fujii, Yokohama (JP); Naoko Ueda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/170,653

(22) Filed: Oct. 14, 1998

(30) Foreign Application Priority Data

| Oct. 14, 1997 | (JP) | ................................... 9-280742 |
| Oct. 14, 1997 | (JP) | ................................... 9-280743 |
| Oct. 14, 1997 | (JP) | ................................... 9-280744 |
| Oct. 14, 1997 | (JP) | ................................... 9-280746 |
| Oct. 14, 1997 | (JP) | ................................... 9-280747 |
| Oct. 14, 1997 | (JP) | ................................... 9-280748 |
| Oct. 14, 1997 | (JP) | ................................... 9-280751 |
| Oct. 27, 1997 | (JP) | ................................... 9-294205 |
| Oct. 28, 1997 | (JP) | ................................... 9-295523 |

(51) Int. Cl.$^7$ ................................................ G06K 15/00
(52) U.S. Cl. ......................................... 358/1.14; 358/1.15
(58) Field of Search ............................. 358/400, 404, 358/405, 406, 426.12, 434, 435, 436, 438, 439, 1.14, 1.15, 1.16, 1.18

(56) References Cited

U.S. PATENT DOCUMENTS 6,126,265 A * 10/2000 Childers ...................... 347/23

FOREIGN PATENT DOCUMENTS

JP    11-134126    * 5/1999    .......... G06F/13/00

OTHER PUBLICATIONS

U.S. patent application Ser. No. 08/999,140, filed Dec. 29, 1997, pending.

(List continued on next page.)

Primary Examiner—Jerome Grant, II
(74) Attorney, Agent, or Firm—Fitzpatrick, Cella, Harper & Scinto

(57) ABSTRACT

A job is selected from a job list, and is either copied or is extracted from a job storage unit. The job, or the copy, is transmitted to a designated destination. A transmission job or a printing job is stored in conjunction with a corresponding execution time in the job storage unit, so that a job can be selected from the job list and the execution time for the selected job can be changed. Further, the jobs stored in the print queue are displayed as a list, and a selected job is moved from the print queue to the job storage unit, so that the printing of the job in the print queue can be performed. In addition, the histories of jobs that were executed are displayed as a list, so that a specific job can be selected and re-executed. Furthermore, a process that is performed is managed for the user who instructed the process. When logout is instructed, management data are examined in order to determine whether there is an unprocessed job that was previously instructed by the user. If an unprocessed job is found, the user is notified. If the operator is a manager, a menu is displayed so that all the jobs in the print queue can be deleted. When jobs are deleted, the owners of the individual jobs are notified. Furthermore, a job that is to be published is selected from the job list and a publication time limit is set. Then, the selected job, accompanied by its publication time limit, is added to the published information list. The publication time limits for all the jobs included in the list are examined, and the jobs for which the publication time limits have not yet expired are displayed. As a result, the published information can be read or printed by another apparatus.

34 Claims, 162 Drawing Sheets

OTHER PUBLICATIONS

U.S. patent application Ser. No. 08/999,143, filed Dec. 29, 1997, allowed.

U.S. patent application Ser. No. 09/178,896, filed Oct. 27, 1998, pending.

* cited by examiner

FIG. 28

| [SERVER INPUT INFORMATION] | |
|---|---|
| KINDS OF INPUT | PROCESS |
| (REQUEST)<br><br>    PRINT JOB<br>    SEND JOB<br>    RECEIVE JOB<br>    CANCEL ALL JOBS<br>    SEND NOTIFICATION<br>    RECEIVE NOTIFICATION<br>    CANCEL / PAUSE / RESTART<br>(RECEIVE) | PRINT JOB<br>SEND JOB<br>ADD JOB TO DB<br>CANCEL ALL JOBS<br>SEND NOTIFICATION<br>RECEIVE NOTIFICATION<br>SET JOB TO EACH ACTION |
| PREVIEW<br>SEARCH<br>DELETE<br>RESCHEDULE<br>HELP<br>OPENING SCREEN<br>MAIN MENU<br>LOGIN<br>LOGOUT<br>GOTO OTHER DEVICE<br>GOTO DESKTOP | DISPLAY CORRESPONDING NEW HTML PAGE |

FIG. 31

| [ JOB INFORMATION ] | |
|---|---|
| ACTION TYPE<br>    PRINT<br>    SEND<br>    HOLD<br>JOB OBJECT FILE<br>    PRINT FILE<br>    SEND FILE<br>    HOLD FILE<br>NOTIFICATION<br>    YES / NO<br>TIME<br>    START TIME<br>    AVAILABLE PERIOD | PRINT OBJECT FILE<br>SEND OBJECT FILE<br>CANCEL OBJECT JOB<br><br><br><br><br><br><br><br><br>EXECUTION / MEMORY PERIOD |

FIG. 135

JOB     Action     Type

Object     Content

Format

Size

Addition

Source

Object Count

To

From

By

Condition

Owner

Status

Created Time

Parent Job

APPARATUS AND METHOD FOR CHANGING, ADDING AND DELETING A JOB, AND A STORAGE MEDIUM FOR SUCH A PROGRAM

BACKGROUND OF THE INVENTION

1. Field of the Invention

The present invention relates to an information processing apparatus and method for changing, adding and deleting a job, such as the transmission or the printing of information, and a storage medium on which such a program is stored.

2. Related Background Art

Conventionally, printing is performed by a host information processing apparatus, for example, transmitting a print job to a printer. In this case, the host apparatus transmits a job that it can not execute to an apparatus that can execute that job. However, if a transmission source apparatus and a destination apparatus can both execute the same job, and if it is desired that the same job be executed by both these apparatuses, the transmission source apparatus must create two jobs: one job to be transmitted and another job to be executed by the source apparatus.

Conventionally, the transmission of information is performed in response to a user issuing a transmission instruction for a transmission to be effected at a desired transmission time. Transmission of information is also performed at a transmission time that is designated in advance. However, once the transmission setup is completed, the setup can not be changed. In addition, another transmission process can not be set up for information for which the transmission has been set up.

For the printing of information, conventionally, print information is transmitted toga print queue, and information stored in the print queue is then printed. However, the print setup for specific information in the print queue can not be changed. When printing is to be performed at a desired time, a print instruction must be issued for that time in order for the printing to be executed.

A conventional information processing apparatus stores the history of processes that have been performed, and refers to this history as needed. However, the history is not referred to more often than the confirmation of an activity and the re-entry of a command are performed.

A conventional information processing apparatus, a printer, for example, executes printing when a user operates a computer and issues a print instruction to the printer. When the printing is completed, the issues a print end notification to the apparatus that instructed the printing.

Even in a system in which a print end notification is issued, however, a user may forget that an instruction has not yet been executed, or even whether the instruction has been completed. In this case, the user may terminate the processing without being aware that there is a process that has not yet been performed. Furthermore, when a user moves away from the computer through which the print instruction was issued, the user will not be aware of the statuses of the apparatus and of the process, and will not be able to control the execution of the process.

Conventionally, in an environment wherein a plurality of users employ the same resources by using the same apparatus or employ the same resources across a network, an authority greater that given to a common user is provided for the manager of the information processing apparatus in order to provide management control for resources employed by a plurality of users. Therefore, for the management of an apparatus, the manager can perform various functions that the common users can not.

Further, a conventional computer identifies a user during the logging-in process, or provides a password to be used when a user desires to access a file in order to permit the limited reading of stored information. However, as specific information stored in specific apparatuses can not be published, such information can not be read by another apparatus. In particular, it is impossible for such information to be freely read during a specified period of time, and the material can not be referred to after the time period has expired.

SUMMARY OF THE INVENTION

It is, therefore, one objective of the present invention to provide an apparatus and a method for enabling object information to be processed, to be maintained or to be deleted, as desired, when the information is transmitted.

It is another objective of the present invention to provide an apparatus and a method for changing an information transmission setup, such as a transmission time, that has previously been designated.

It is an additional objective of the present invention to provide an apparatus and a method for setting a time for the printing of information, and for changing a print setup that has previously been designated.

It is a further objective of the present invention to provide an apparatus and a method with which it is easy to change object information for a process that was previously performed to object information for another process.

It is still another objective of the present invention to provide an apparatus and a method for detecting, at a predetermined time, the presence of a process that has been instructed by a user and that has not yet been performed.

It is a still additional objective of the present invention to provide an apparatus and a method for publishing specific information stored in a specific apparatus so that another user can read it.

To achieve the above objectives, according to one aspect of the present invention, an information processing apparatus comprises:

transmission means for transmitting object information that is to be processed;

object information storage means for storing the object information that is to be processed;

display means for displaying as a list the object information that is stored in the object information storage means;

object information selection means for selecting object information from the list of object information;

destination designation means for designating a transmission destination for the object information that is to be processed;

transmission method selection means for selecting a first transmission method or a second transmission method; and control means for, when the first transmission method is selected by the transmission method selection means, permitting the transmission means to copy from the object information storage means the object information selected by the object information selection means, and, when the second transmission method is selected by the transmission method selection means, for permitting the transmission means to extract, from the object information storage means, the object information that is selected by the object information selection means, and to transmit the object information to the transmission destination that is designated by the transmission designation destination means.

According to one more aspect of the present invention, an information processing method comprises:

a display step of displaying, as a list, object information that is stored in an object information storage unit for storing the object information that is to be processed;

an object information selection step of selecting object information from the list of object information;

a destination designation step of designating a transmission destination for the object information that is to be processed;

a transmission method selection step of selecting a first transmission method or a second transmission method; and a transmission step of, when the first transmission method is selected at the transmission method selection step, copying from the object information storage unit the object information selected at the object information selection step, and of, when the second transmission method is selected at the transmission method selection step, extracting from the object information storage unit the object information that is selected at the object information selection step, and transmitting the object information to the transmission destination that is designated at the transmission designation destination step.

According to another aspect of the present invention, provided is a storage medium on which is stored a program, which comprises:

a display step of displaying, as a list, object information that is stored in an object information storage unit for storing the object information that is to be processed;

an object information selection step of selecting object information from the list of object information;

a destination designation step of designating a transmission destination for the object information that is to be processed;

a transmission method selection step of selecting a first transmission method or a second transmission method; and a transmission step of, when the first transmission method is selected at the transmission method selection step, copying from the object information storage unit the object information selected at the object information selection step, and of, when the second transmission method is selected at the transmission method selection step, extracting from the object information storage unit the object information that is selected at the object information selection step, and transmitting the object information to the transmission destination that is designated at the transmission designation destination step.

According to an additional aspect of the present invention, an information processing apparatus comprises:

transmission means for transmitting object information that is to be processed;

object information storage means for storing the object information in conjunction with a corresponding execution time and a corresponding transmission destination;

display means for displaying as a list object information that is stored in the object information storage means;

object information selection means for selecting object information from the object information list;

change means for changing a setup that is stored in the object information storage means in conjunction with the object information selected by the object information selection means; and control means for permitting the transmission means to transmit the object information, which is stored in the object information storage means, to the transmission destination and at the execution time that are stored in the object information storage means in conjunction with the object information.

According to a further aspect of the present invention, an information processing method comprises:

a display step of displaying as a list object information that is stored in an object information storage unit for storing the object information in conjunction with a corresponding execution time and a corresponding transmission destination;

an object information selection step of selecting object information from the object information list;

a change step of changing a setup that is stored in the object information storage unit in conjunction with the object information selected at the object information selection step; and a transmission step of transmitting the object information, which is stored in the object information storage unit, to the transmission destination and at the execution time that are stored in the object information storage unit in conjunction with the object information.

According to one further aspect of the present invention, provided is a storage medium on which is stored a program, which comprises:

a display step of displaying as a list object information that is stored in an object information storage unit for storing the object information in conjunction with a corresponding execution time and a corresponding transmission destination;

an object information selection step of selecting object information from the object information list;

a change step of changing a setup that is stored in the object information storage unit in conjunction with the object information selected at the object information selection step; and a transmission step of transmitting the object information, which is stored in the object information storage unit, to the transmission destination and at the execution time that are stored in the object information storage unit in conjunction with the object information.

According to yet one more aspect of the present invention, an information processing apparatus comprises:

print queue storage means for storing object information to be printed;

printing means for printing the object information stored in the print queue storage means;

object information storage means for storing object information in conjunction with time information specifying a printing time for the object information;

transfer means for transferring the object information from the object information storage means to the print queue storage means in accordance with the time information that is stored in the object information storage means in conjunction with the object information;

display means for displaying as a list the object information that is stored in the print queue storage means;

object information selection means for selecting object information from the object information list; and moving means for moving, from the print queue storage means to the object information storage means, the object information that is selected by the object information selection means.

According to yet another aspect of the present invention, an information processing method comprises:

a printing step of printing object information that is stored in a print queue for storing object information to be printed;

an object information storage step for storing object information;

a transfer step of transferring the object information, which is stored in an object information storage unit in conjunction with time information specifying a printing time for the object information, to the print queue in accordance with the time information that is stored in conjunction with the object information;

a display step of displaying as a list the object information that is stored in the print queue;

an object information selection step of selecting object information from the object information list; and a moving step of moving, from the print queue to the object information storage unit, the object information that is selected at the object information selection step.

According to yet an additional aspect of the present invention, provided is a storage medium on which is stored a program, which comprises:

a printing step of printing object information that is stored in a print queue for storing object information to be printed;

an object information storage step for storing object information;

a transfer step of transferring the object information, which is stored in an object information storage unit in conjunction with time information specifying a printing time for the object information, to the print queue in accordance with the time information that is stored in conjunction with the object information;

a display step of displaying as a list the object information that is stored in the print queue;

an object information selection step of selecting object information from the object information list; and a moving step of moving, from the print queue to the object information storage unit, the object information that is selected at the object information selection step.

According to yet a further aspect of the present invention, an information processing apparatus comprises:

printing means for printing object information that is to be processed;

object information storage means for storing the object information in conjunction with a corresponding execution time;

display means for displaying as a list object information that is stored in the object information storage means;

object information selection means for selecting object information from the object information list;

change means for changing the execution time that is stored in the object information storage means in conjunction with the object information selected by the object information selection means; and control means for permitting the printing means to print the object information stored in the object information storage means at the execution time that is stored therein in conjunction with the object information.

According to yet one further aspect of the present invention, an information processing method comprises:

a printing step of printing object information that is to be processed;

a display step of displaying as a list object information that is stored in an object information storage unit for storing the object information in conjunction with a corresponding execution time;

an object information selection step of selecting object information from the object information list;

a change step of changing the execution time that is stored in the object information storage unit in conjunction with the object information selected at the object information selection step; and a control step of performing the printing step so that the object information stored in the object information storage unit is printed at the execution time that is stored therein in conjunction with the object information.

According to still one more aspect of the present invention, provided is a storage medium on which is stored a program, which comprises:

a printing step of printing object information that is to be processed;

a display step of displaying as a list object information that is stored in an object information storage unit for storing the object information in conjunction with a corresponding execution time;

an object information selection step of selecting object information from the object information list;

a change step of changing the execution time that is stored in the object information storage unit in conjunction with the object information selected at the object information selection step; and a control step of performing the printing step so that the object information stored in the object information storage unit is printed at the execution time that is stored therein in conjunction with the object information.

According to still another aspect of the present invention, an information processing apparatus comprises:

execution means for performing a process;

history storage means for storing, as a process history, the type of process that is performed and object information;

list display means for displaying as a list process histories that are stored in the history storage means;

history selection means for selecting a process history from the list; and re-execution control means for permitting the execution means to again execute a process related to the history selected by the history selection means.

According to still an additional aspect of the present invention, an information processing method comprises:

an execution step of performing a process;

a history storage step of storing the type of process that is performed and object information as a process history in a history storage unit;

a list display step of displaying as a list process histories that are stored in the history storage unit;

a history selection step of selecting a process history from the list; and a re-execution step of again executing a process related to the history selected at the history selection step.

According to still a further aspect of the present invention, provided is a storage medium on which is stored a program, which comprises:

an execution step of performing a process;

a history storage step of storing the type of process that is performed and object information as a process history in a history storage unit;

a list display step of displaying as a list process histories that are stored in the history storage unit;

a history selection step of selecting a process history from the list; and a re-execution step of again executing a process related to the history selected at the history selection step.

According to still one further aspect of the present invention, an information processing apparatus comprises:

history storage means for storing the type of process that is performed and object information;

list display means for displaying as a list process histories that are stored in the history storage means;

deletion instruction means for selecting a history from the list and for issuing an instruction to delete the history from the history storage means;

determination means for determining whether object information that is related to the history instructed by the deletion instruction means is stored in the history storage means in conjunction with the name of another user whose name differs from that of the user who issued the instruction; and deletion means for, when the object information is stored in conjunction with the name of the other user, deleting from the history storage means a portion that is related to the user who issued the instruction to delete the history, and for, when the object information is not stored in conjunction with the name of the other user, deleting from the history storage means the object information that is related to the history for which deletion is instructed.

According to again one more aspect of the present invention, an information processing method comprises:

a history storage step of storing in a history storage unit the type of process that is performed and object information;

a list display step of displaying as a list process histories that are stored in the history storage unit;

a deletion instruction step of selecting a history from the list and of issuing an instruction to delete the history from the history storage unit;

a determination step of determining whether object information that is related to the history instructed at the deletion instruction step is stored in the history storage unit in conjunction with the name of another user whose name differs from that of the user who issued the instruction; and a deletion step of, when the object information is stored in conjunction with the name of the other user, deleting from the history storage unit a portion that is related to the user who issued the instruction to delete the history, and of, when the object information is not stored in conjunction with the name of the other user, deleting from the history storage unit the object information that is related to the history for which deletion is instructed.

According to again another aspect of the present invention, provided is a storage medium on which is stored a program, which comprises:

a history storage step of storing in a history storage unit the type of process that is performed and object information;

a list display step of displaying as a list process histories that are stored in the history storage unit;

a deletion instruction step of, selecting a history from the list and of issuing an instruction to delete the history from the history storage unit;

a determination step of determining whether object information that is related to the history instructed at the deletion instruction step is stored in the history storage unit in conjunction with the name of another user whose name differs from that of the user who issued the instruction; and a deletion step of, when the object information is stored in conjunction with the name of the other user, deleting from the history storage unit a portion that is related to the user who issued the instruction to delete the history, and of, when the object information is not stored in conjunction with the name of the other user, deleting from the history storage unit the object information that is related to the history for which deletion is instructed.

According to again an additional aspect of the present invention, an information processing apparatus comprises:

management means for managing a process to be completed in correspondence with a user who has entered an instruction for the process;

instruction means for issuing a predetermined instruction;

determination means for referring to the management means to determine whether the performance of a process that has previously been instructed by the user continues not to have been performed; and notification means for, when the determination means determines that there is a process that has not yet been performed, transmitting to the user a notification to that effect.

According to again a further aspect of the present invention, an information processing apparatus comprises:

acceptance means for accepting an inquiry from an external apparatus concerning the status of an apparatus currently employed by a user; and execution means for performing a process that corresponds to the inquiry accepted by the acceptance means.

According to again one further aspect of the present invention, an information processing method comprises:

a management step of managing a process to be completed in correspondence with a user who has entered an instruction for the process;

an instruction step of issuing a predetermined instruction;

a determination step of referring to data managed at the management step to determine whether the performance of a process that has previously been instructed by the user continues not to have been performed; and a notification step of, when the determination means determines that there is a process that has not yet been performed, transmitting to the user a notification to that effect.

According also to one more aspect of the present invention, an information processing method comprises:

an acceptance step of accepting an inquiry from an external apparatus concerning the status of a method currently employed by a user; and an execution step of performing a process that corresponds to the inquiry accepted at the acceptance step.

According also to another aspect of the present invention, provided is a storage medium on which is stored a program, which comprises:

a management step of managing a process to be completed in correspondence with a user who has entered an instruction for the process;

an instruction step of issuing a predetermined instruction;

a determination step of referring to data managed at the management step to determine whether the performance of a process that has previously been instructed by the user continues not to have been performed; and a notification step of, when the determination means determines that there is a process that has not yet been performed, transmitting to the user a notification to that effect.

According also to an additional aspect of the present invention, provided is a storage medium on which is stored a program, which comprises:

an acceptance step of accepting an inquiry from an external apparatus concerning the status of a method currently employed by a user; and an execution step of performing a process that corresponds to the inquiry accepted at the acceptance step.

According also to a further aspect of the present invention, an information processing apparatus comprises:

input means for entering a password at the log-in;

identification means for identifying an operator based on the password that is input; and control means for, when the operator is a common user who is permitted to log in, permitting the user to log in and displaying a menu screen for a common user, and for, when the operator is a manager, permitting the manager to log in and displaying a menu screen for the manager.

According also to one further aspect of the present invention, an information processing apparatus comprises:

identification means for ascertaining whether an operator is a manager;

permission means for permitting the operator to instruct the deletion of all printing instructions stored in a print queue; and deletion means for, upon receipt of the instruction, deleting all of the printing instructions in the print queue.

According also to yet one more aspect of the present invention, an information processing apparatus comprises:

identification means for ascertaining whether an operator is a manager;

permission means for permitting the operator to setup a general time limit for a process instruction; and management means for managing the process instruction based on the setup.

According also to yet another aspect of the present invention, an information processing apparatus comprises:

proxy device setup means for setting up as a proxy device a different device having a voice modem; and communication control means for performing voice communication by telephone using the device that is set up by the proxy device setup means.

According also to yet an additional aspect of the present invention, an information processing method comprises:

an input step of entering a password at the log-in;

an identification step of identifying an operator based on the password that is input; and a control step of, when the operator is a common user who is permitted to log in, permitting the user to log in and displaying a menu screen for a common user, and of, when the operator is a manager, permitting the manager to log in and displaying a menu screen for the manager.

According also to yet a further aspect of the present invention, an information processing method comprises:

an identification step of ascertaining whether an operator is a manager;

a permission step of permitting the operator to instruct the deletion of all printing instructions stored in a print queue; and a deletion step of, upon receipt of the instruction, deleting all of the printing instructions in the print queue.

According also to yet one further aspect of the present invention, an information processing method comprises:

an identification step of ascertaining whether an operator is a manager;

a permission step of permitting the operator to setup a general time limit for a process instruction; and a management step of managing the process instruction based on the setup.

According to one more aspect of the present invention, an information processing method comprises:

a proxy device setup step of setting up as a proxy device a different device having a voice modem; and a communication control step of performing voice communication by telephone using the device that is set up at the proxy device setup step.

According to another aspect of the present invention, provided is a storage medium on which is stored a program, which comprises:

an input step of entering a password at the log-in;

an identification step of identifying an operator based on the password that is input; and a control step of, when the operator is a common user who is permitted to log in, permitting the user to log in and displaying a menu screen for a common user, and of, when the operator is a manager, permitting the manager to log in and displaying a menu screen for the manager.

According to an additional aspect of the present invention, provided is a storage medium on which is stored a program, which comprises:

an identification step of ascertaining whether an operator is a manager;

a permission step of permitting the operator to instruct the deletion of all printing instructions stored in a print queue; and a deletion step of, upon receipt of the instruction, deleting all of the printing instructions in the print queue.

According to a further aspect of the present invention, provided is a storage medium on which is stored a program, which comprises:

an identification step of ascertaining whether an operator is a manager;

a permission step of permitting the operator to setup a general time limit for a process instruction; and a management step of managing the process instruction based on the setup.

According to one further aspect of the present invention, provided is a storage medium on which is stored a program, which comprises:

a proxy device setup step of setting up as a proxy device a different device having a voice modem; and a communication control step of performing voice communication by telephone using the device that is set up at the proxy device setup step.

According to yet one more aspect of the present invention, an information processing apparatus comprises:

object information storage means for storing object information to be processed;

object information list display means for displaying as a list object information stored in the object information storage means;

object information selection means for selecting object information that is to be published;

setup means for setting a publication time limit; and published information registration means for registering as published information, in conjunction with the publication time limit that is set by the setup means, the object information in the published information storage means that is selected by the selection means.

According to yet another aspect of the present invention, an information processing method comprises:

an object information list display step of displaying as a list object information stored in an object information storage unit for storing the object information to be processed;

an object information selection step of selecting object information that is to be published;

a setup step of setting a publication time limit; and a published information registration step of registering as published information, in conjunction with the publication time limit that is set at the setup step, the object information in the published information storage unit that is selected at the selection step.

According to yet an additional aspect of the present invention, provided is a storage medium on which is stored a program, which comprises:

an object information list display step of displaying as a list object information stored in an object information storage unit for storing the object information to be processed;

an object information selection step of selecting object information that is to be published;

a setup step of setting a publication time limit; and a published information registration step of registering as published information, in conjunction with the publication time limit that is set at the setup step, the object information in the published information storage unit that is selected at the selection step.

According to yet a further aspect of the present invention, an information processing apparatus comprises:

published information storage means for storing information to be published in conjunction with a publication time limit;

determination means for determining whether the publication time limit has expired for the information stored in the published information storage means;

publication list display means for displaying as a list information for which the determination means has determined that the publication time limit has not yet expired;

information selection means for selecting information from the list displayed by the publication list display means; and output means for outputting the contents of information that is selected by the selection means.

According to yet one further aspect of the present invention, an information processing method comprises:

a determination step of determining whether the publication time limit has expired for information stored in a published information storage unit for storing the information to be published in conjunction with a publication time limit;

a publication list display step of displaying as a list information for which it has been determined at the determination step that the publication time limit has not yet expired;

an information selection step of selecting information from the list displayed at the publication list display step; and an output step of outputting the contents of information that is selected at the information selection step.

According to still one more aspect of the present invention, provided is a storage medium on which is stored a program, which comprises:

a determination step of determining whether the publication time limit has expired for information stored in a published information storage unit for storing the information to be published in conjunction with a publication time limit;

a publication list display step of displaying as a list information for which it has been determined at the determination step that the publication time limit has not yet expired;

an information selection step of selecting information from the list displayed at the publication list display step; and an output step of outputting the contents of information that is selected at the information selection step.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 9 is a flowchart showing the order of activation when power is switched on;

FIG. 28 is a diagram showing the relationship between input information for a server and corresponding processes;

FIG. 31 is a diagram showing the relationship between the job types that are handled by the daemon and corresponding processes;

FIG. 120 is a diagram showing an example correction menu;

FIG. 121 is a diagram showing an example main menu;

FIG. 122 is a diagram showing an example menu for designating a position whereat a job to be printed is located;

FIG. 123 is a diagram showing an example menu for selecting a job to be printed;

FIG. 124 is a diagram showing an example menu for designating a position whereat a job to be transmitted is located;

FIG. 125 is a diagram showing an example menu for selecting a job to be transmitted;

FIG. 126 is a diagram showing an example command setup screen;

FIG. 127 is a diagram showing an example menu for designating a device whereat a Job to be changed is located;

FIG. 128 is a diagram showing an example screen for selecting a Job for which a schedule is to be changed;

FIG. 129 is a diagram showing an example desktop main menu;

FIG. 130 is a diagram showing an example setup screen for obtaining a file;

FIG. 131 is a diagram showing an example desktop file list;

Figure 132:
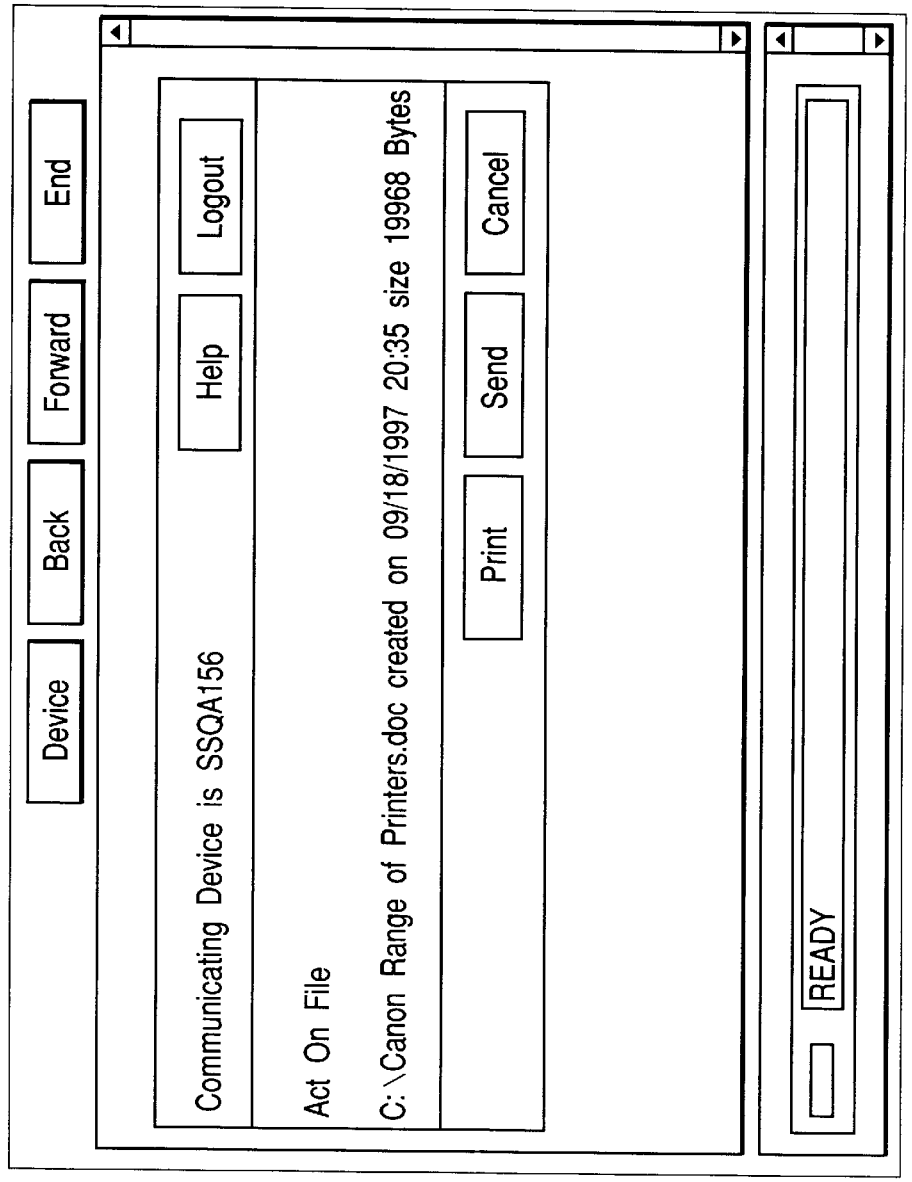
Figure 133:
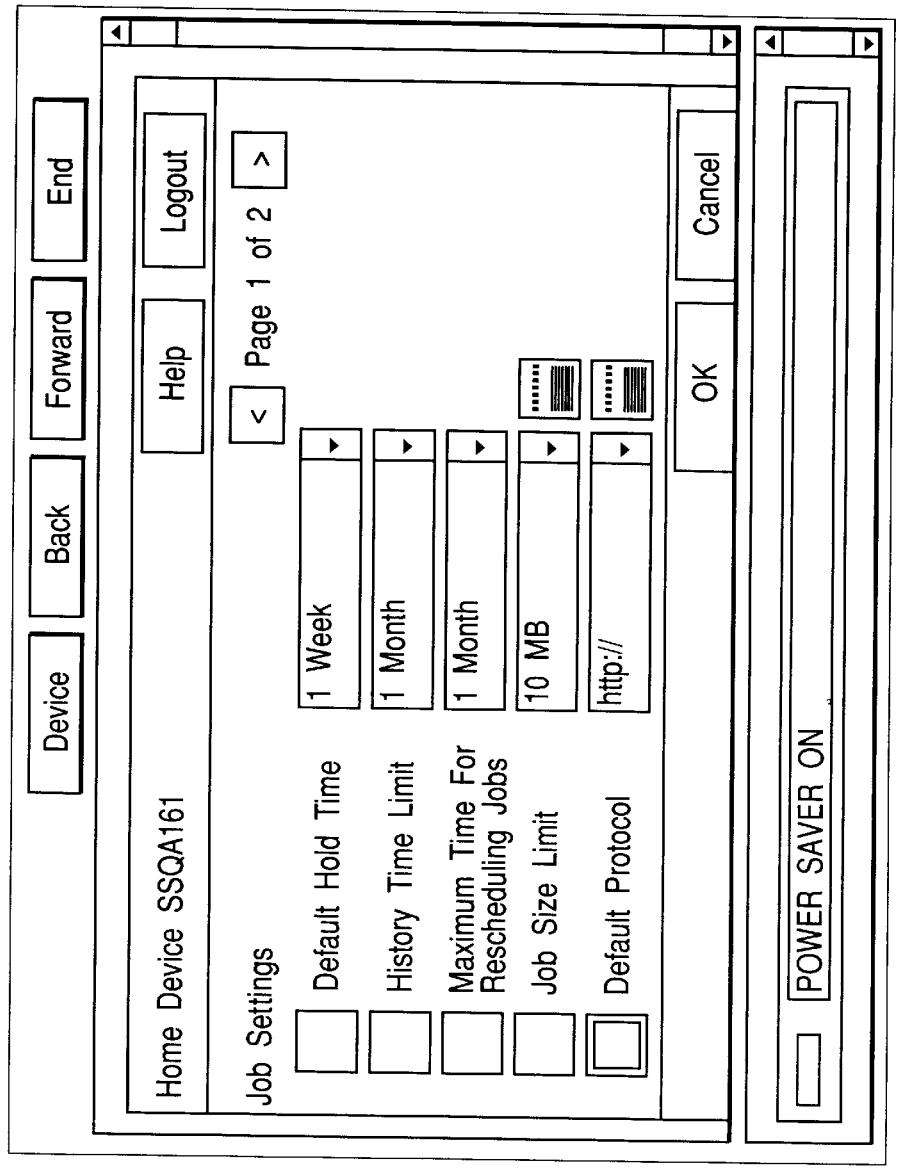
Figure 134:
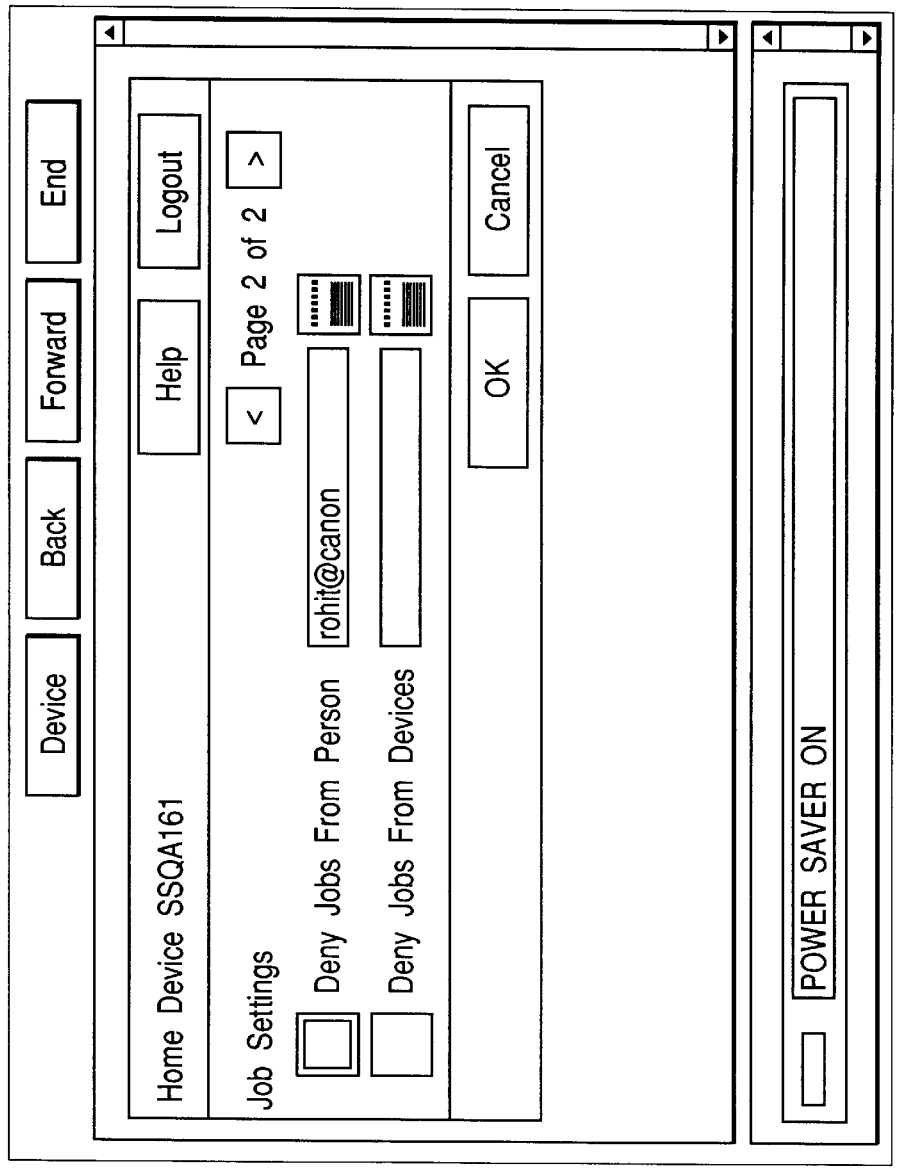
Figure 136:
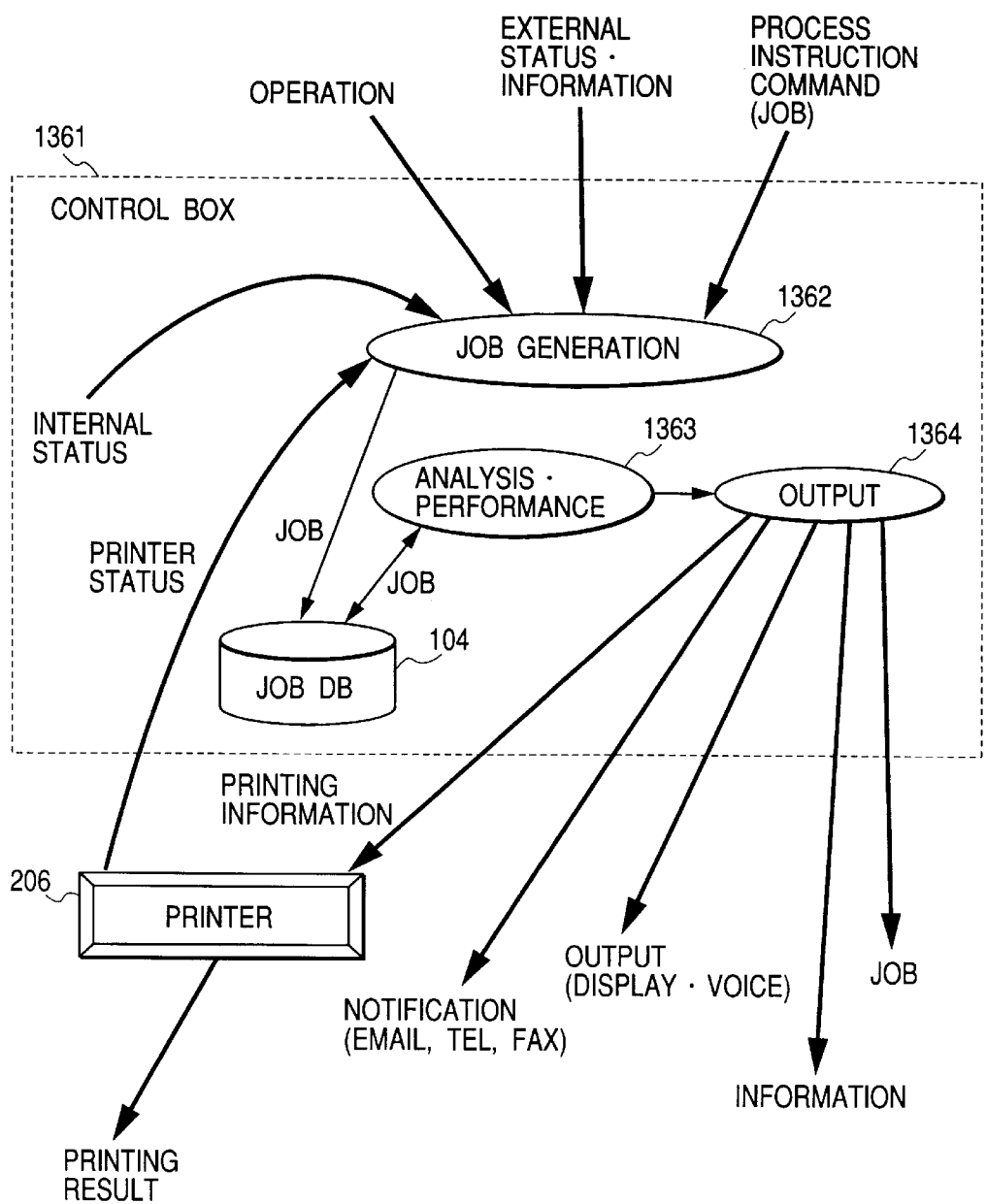
Figure 137:
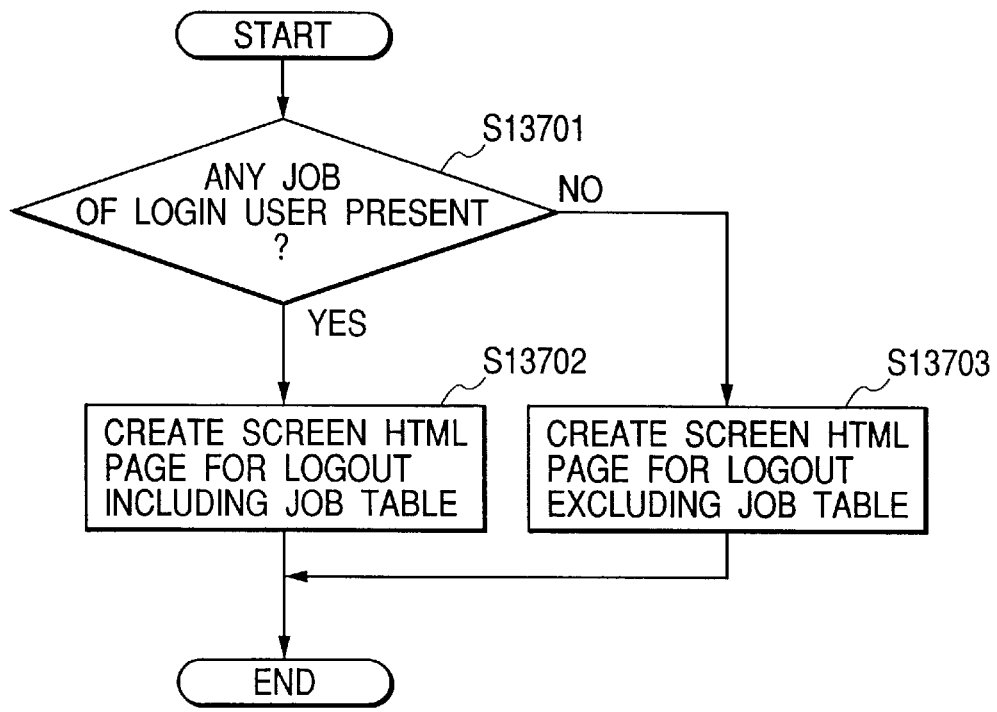
Figure 138:
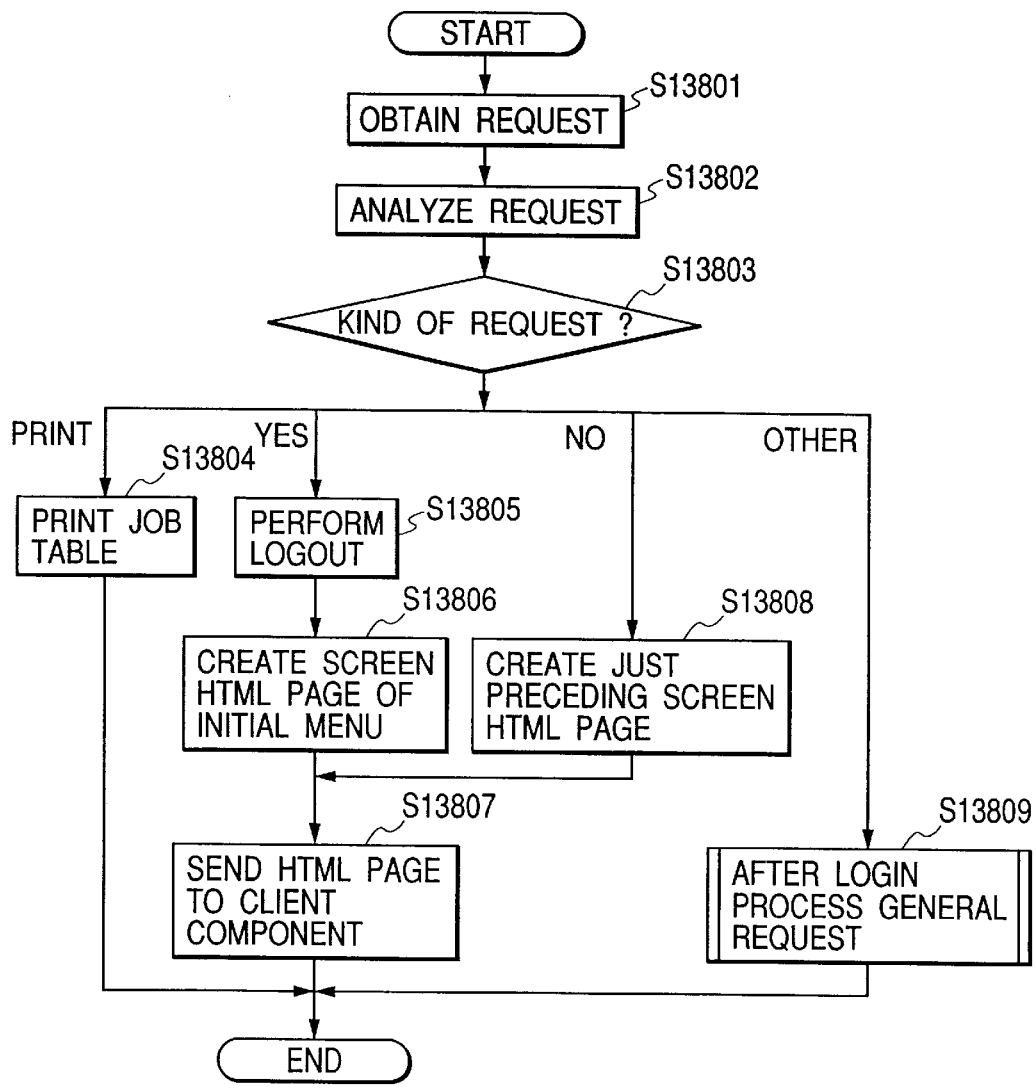
Figure 139:
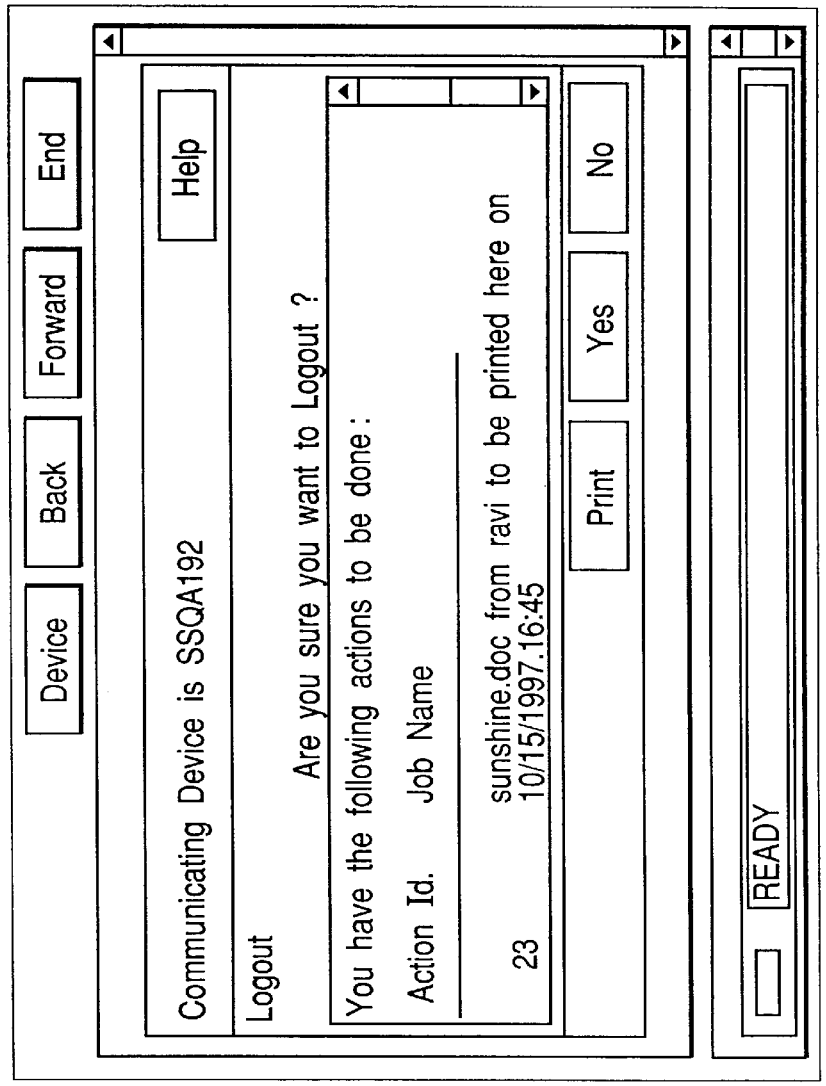
Figure 140:
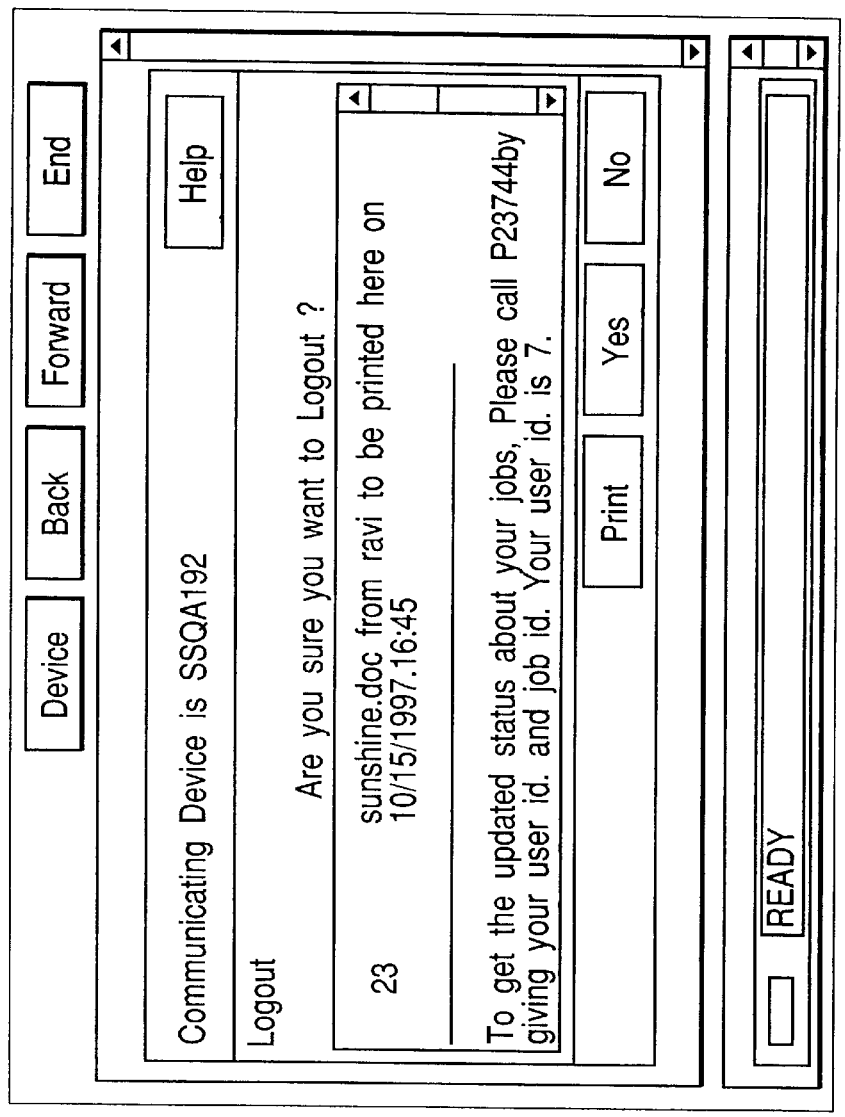
Figure 141:
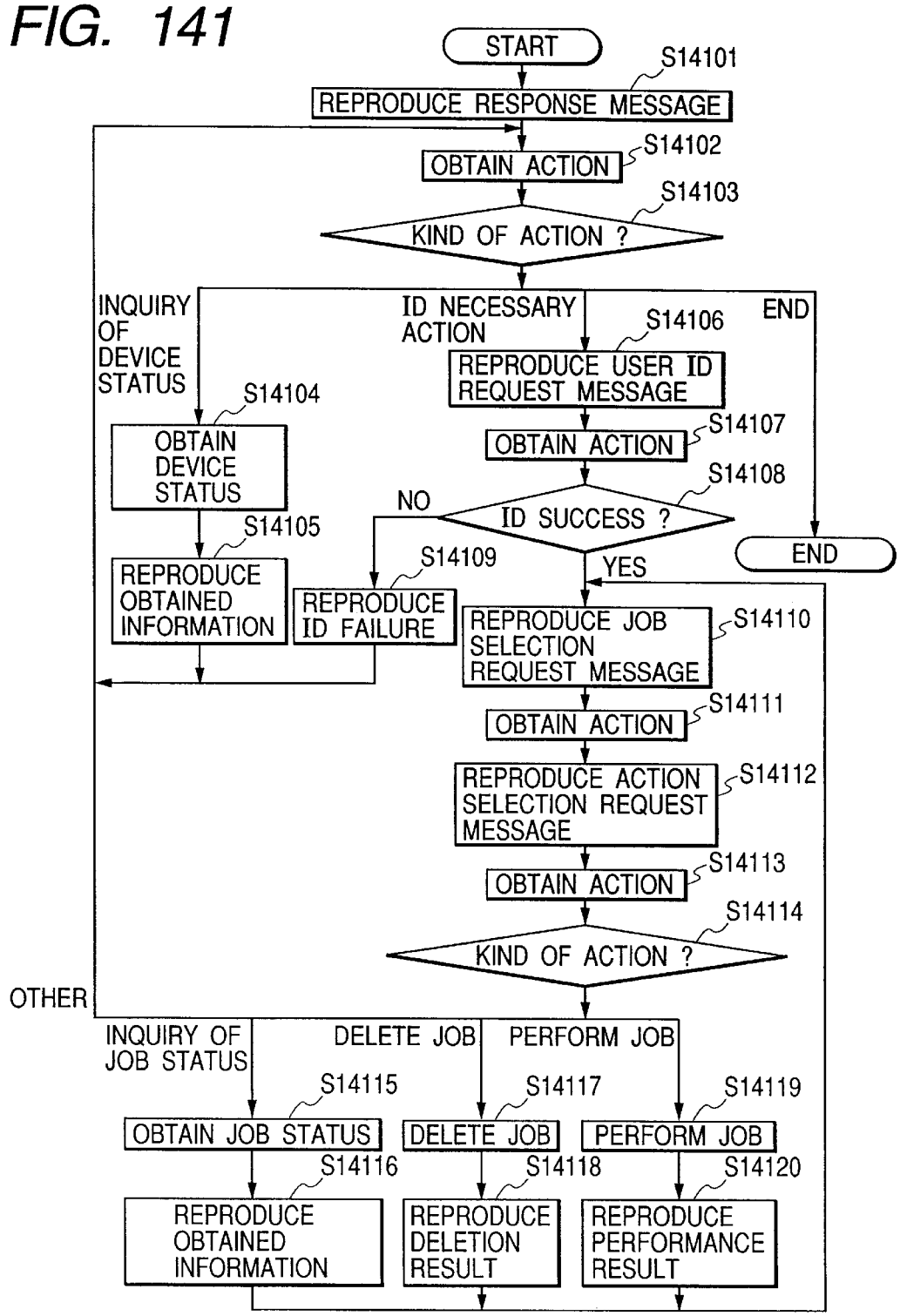
Figure 142A:
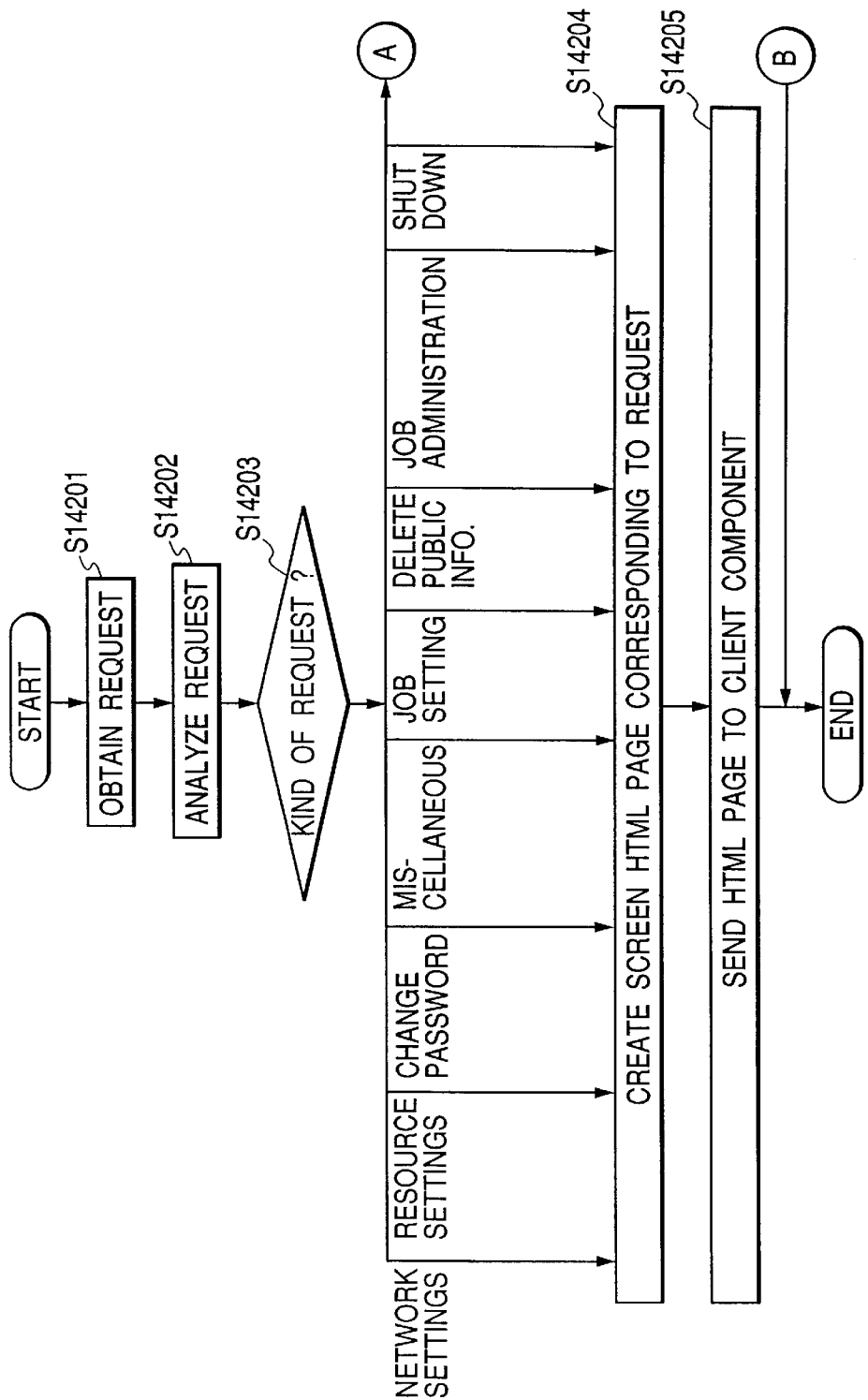
Figure 142B:
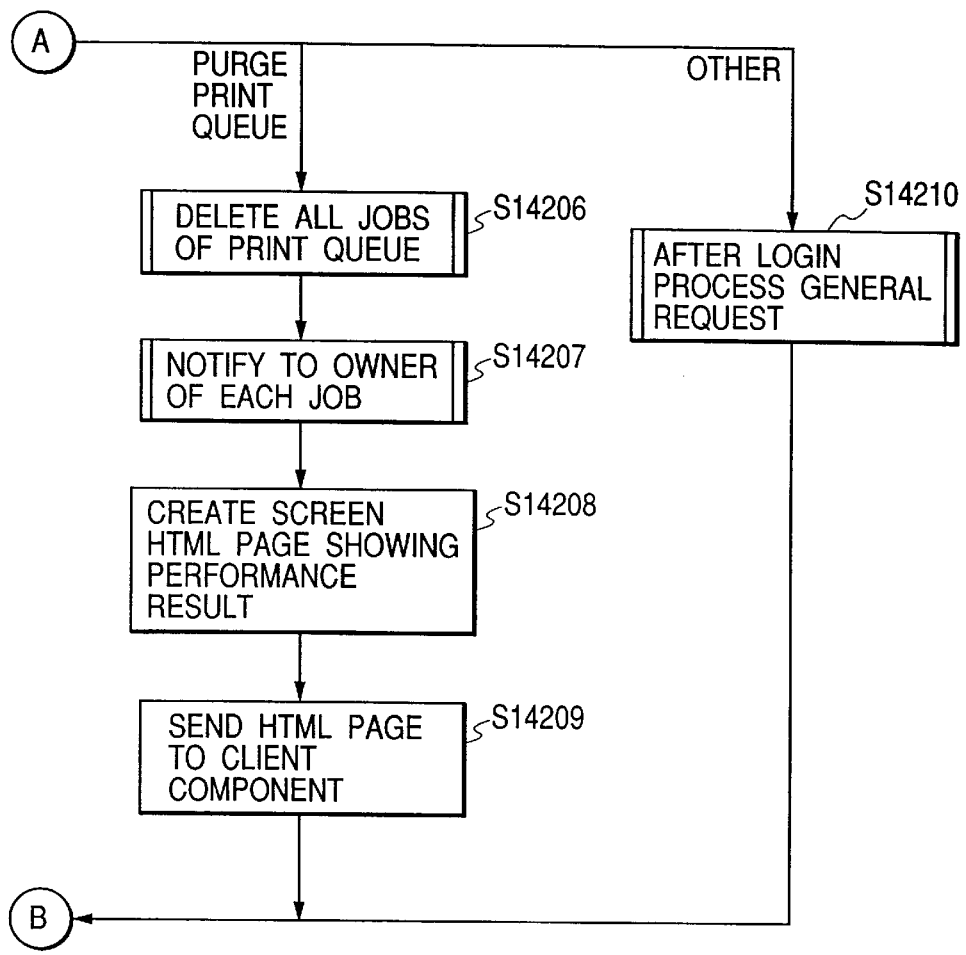
Figure 143:
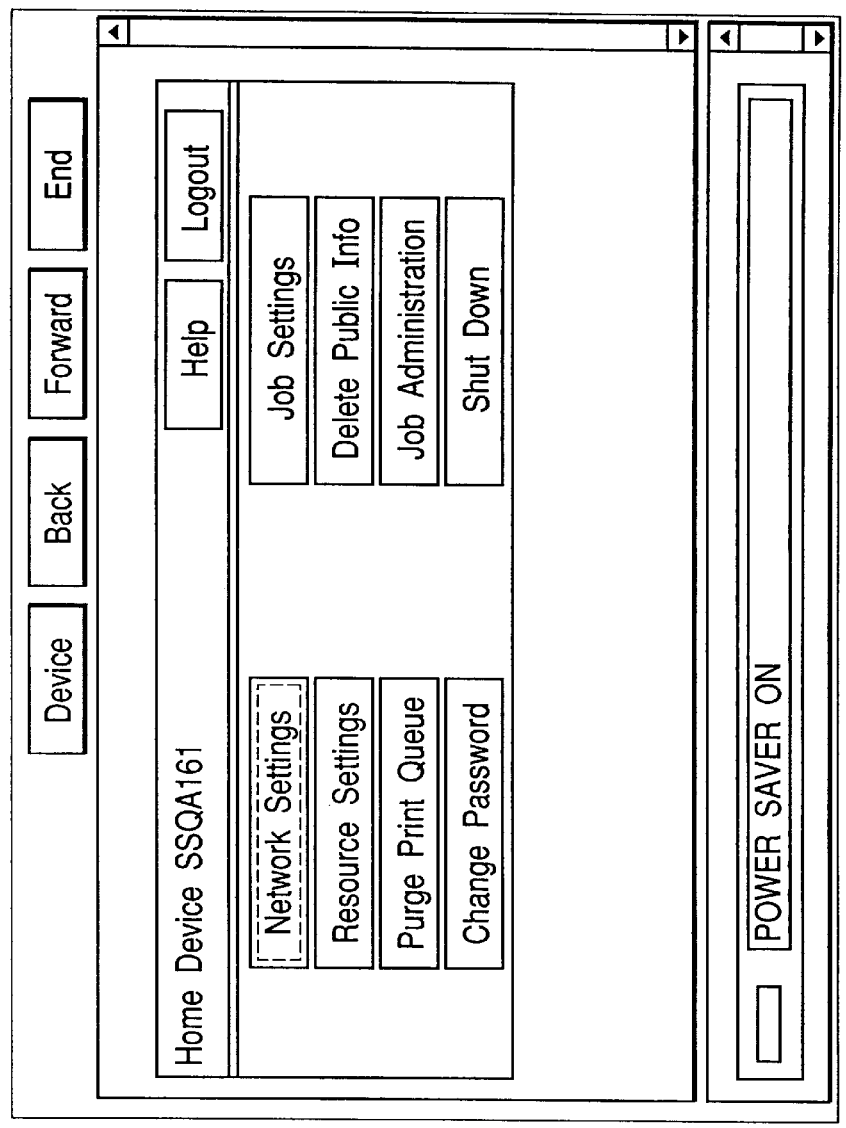
Figure 144:
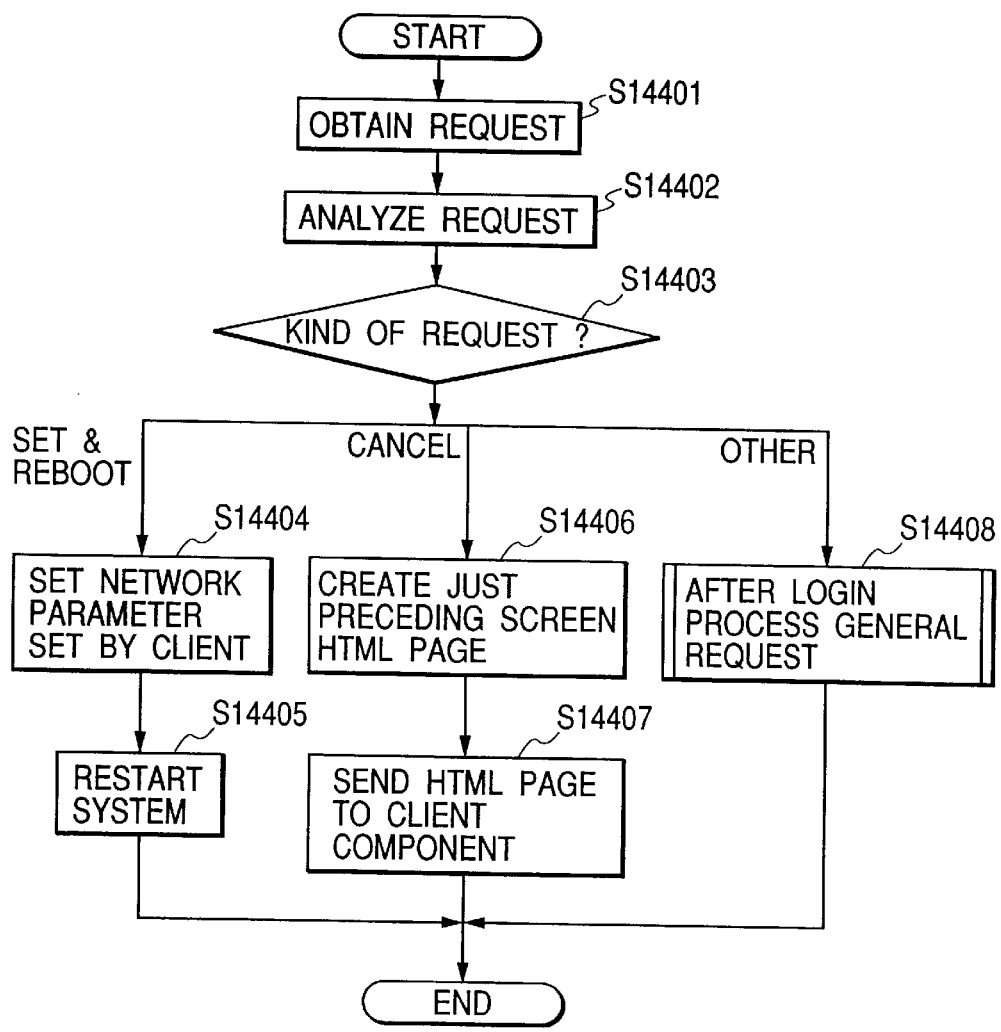
Figure 145:
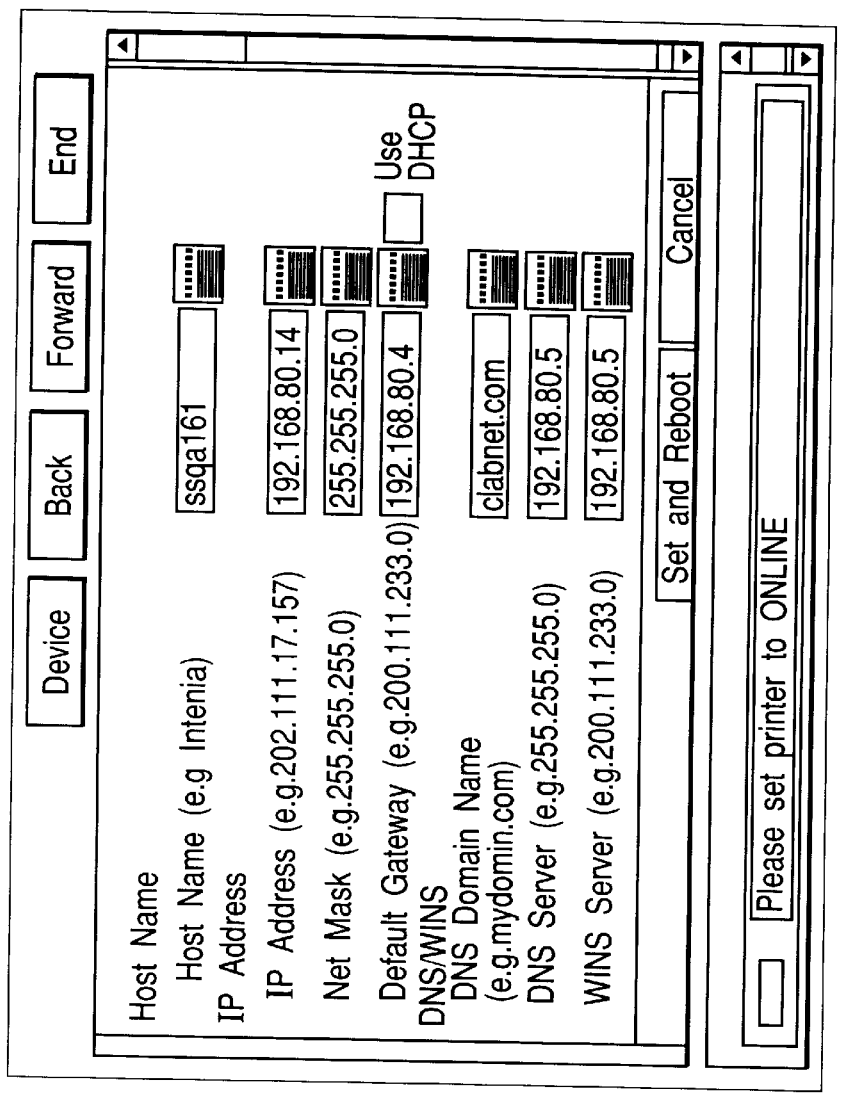
Figure 146:
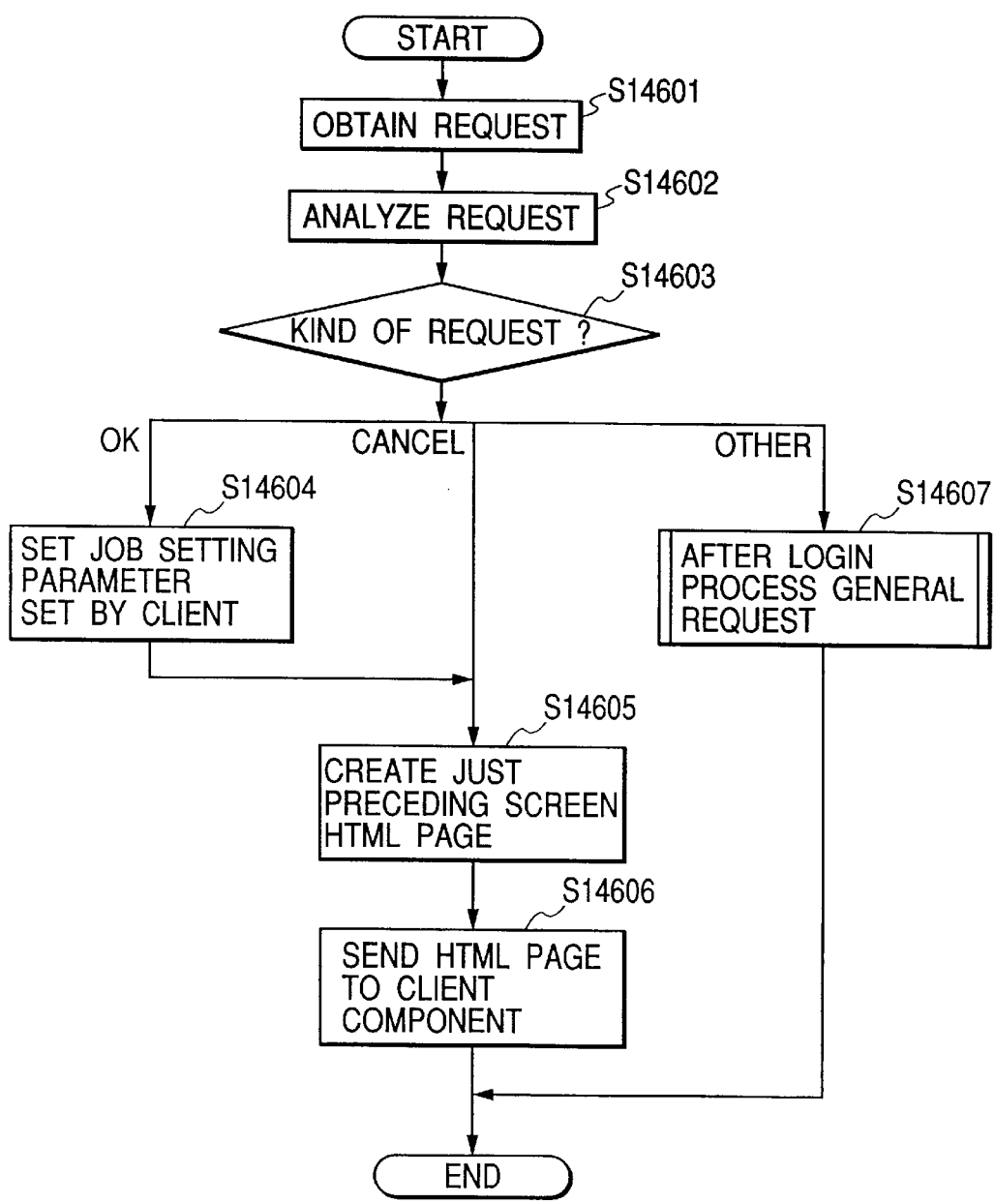
Figure 147:
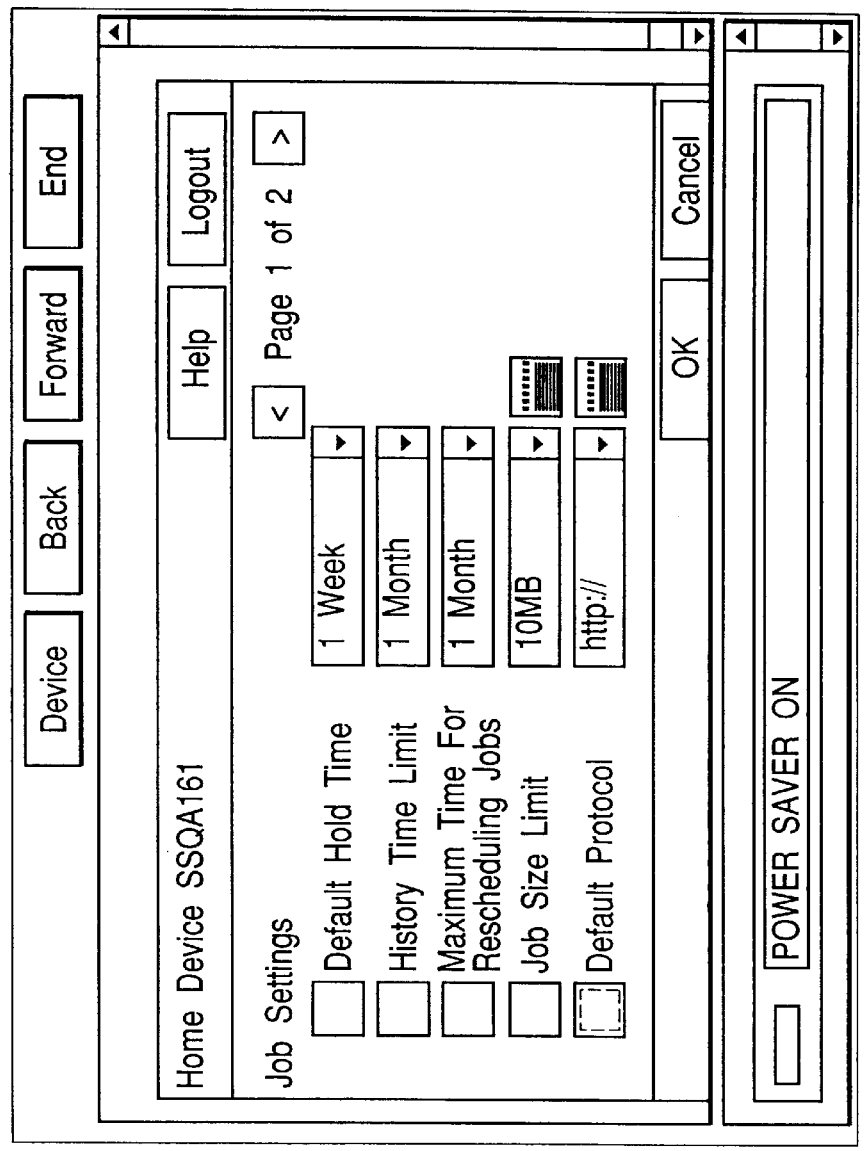
Figure 148:
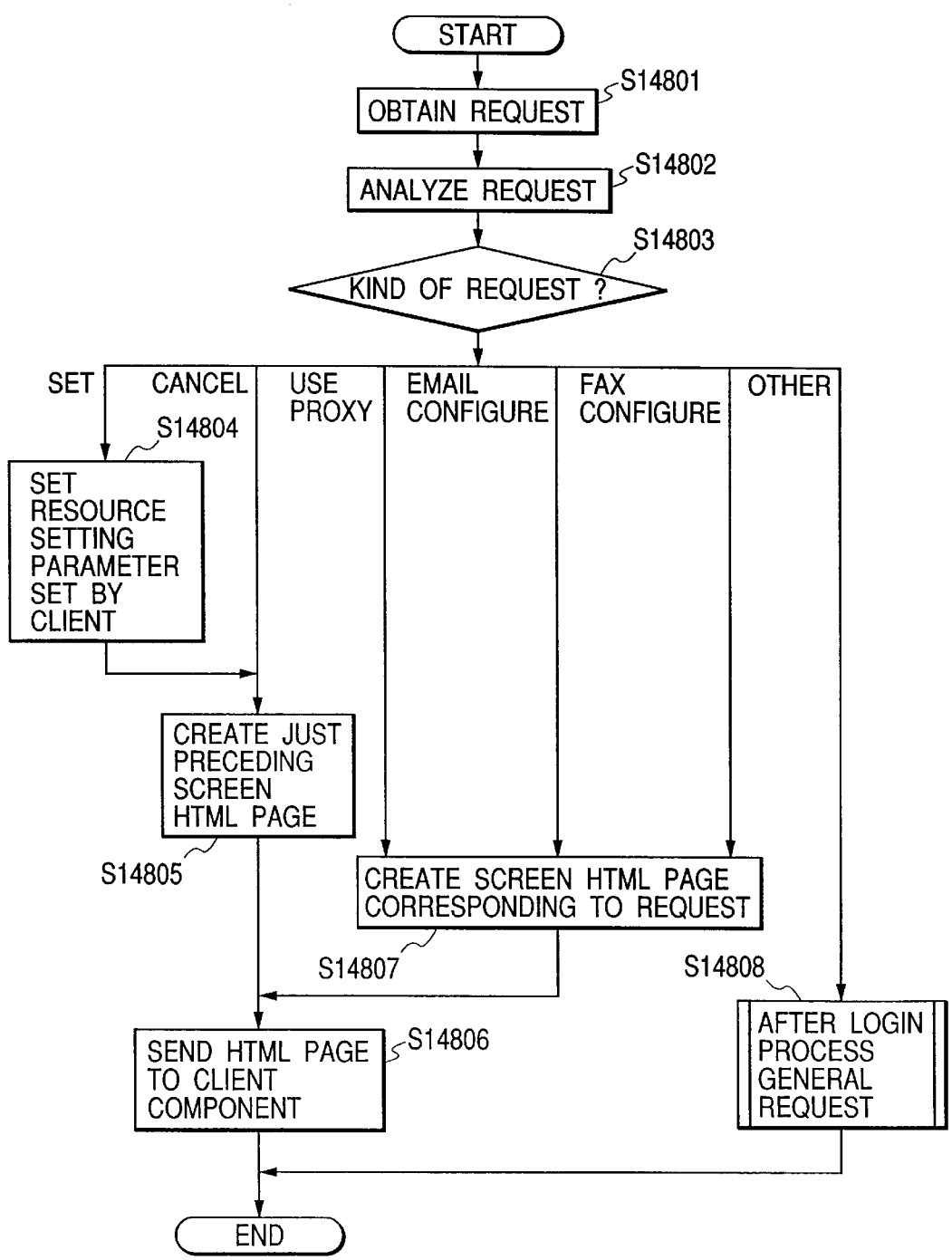
Figure 149:
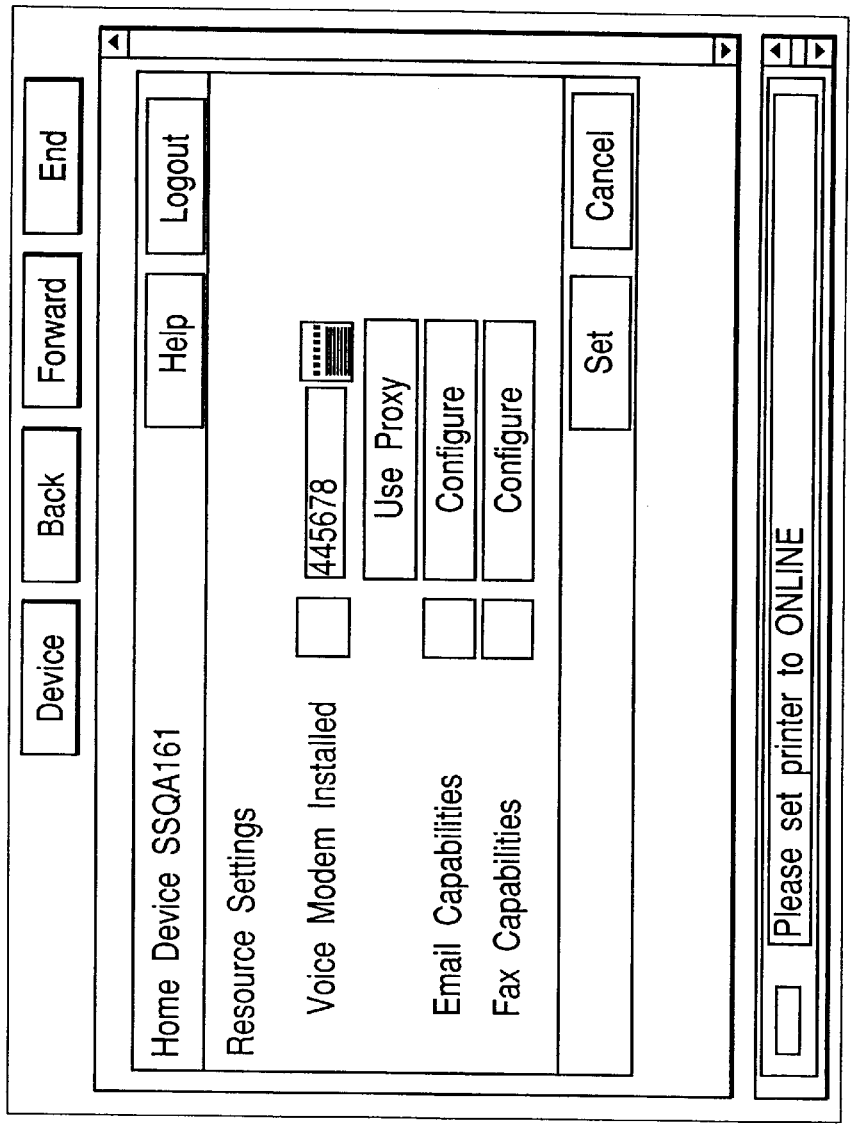
Figure 150:
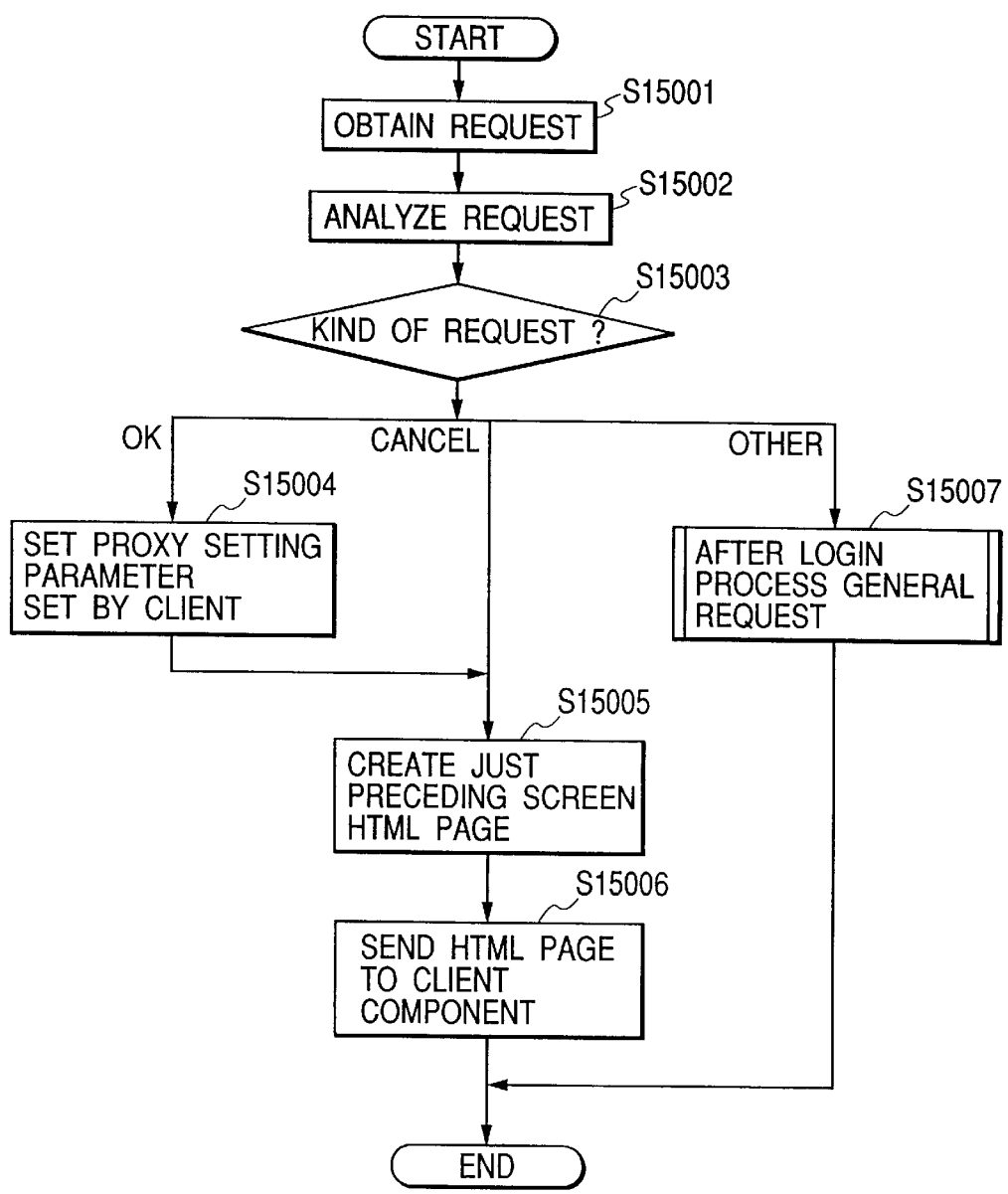
Figure 151:
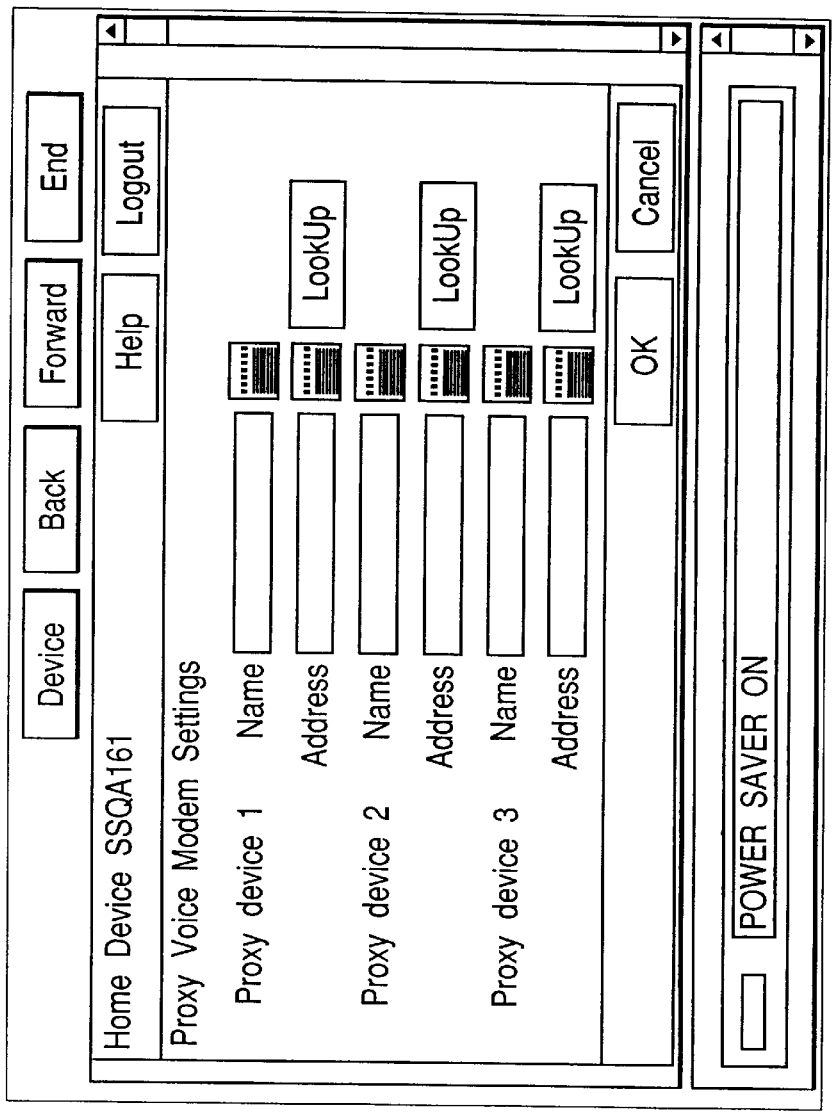
Figure 152:
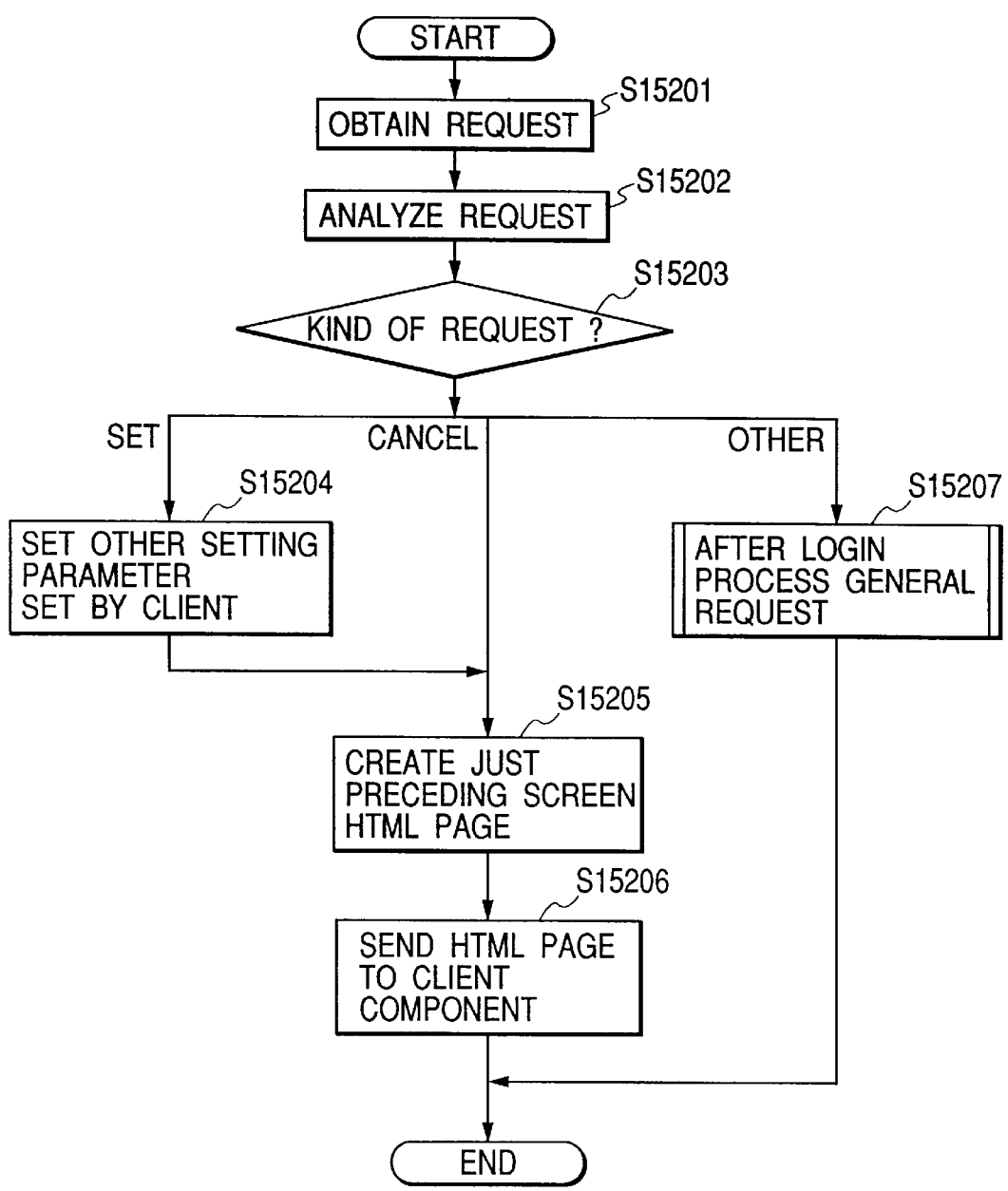
Figure 153:
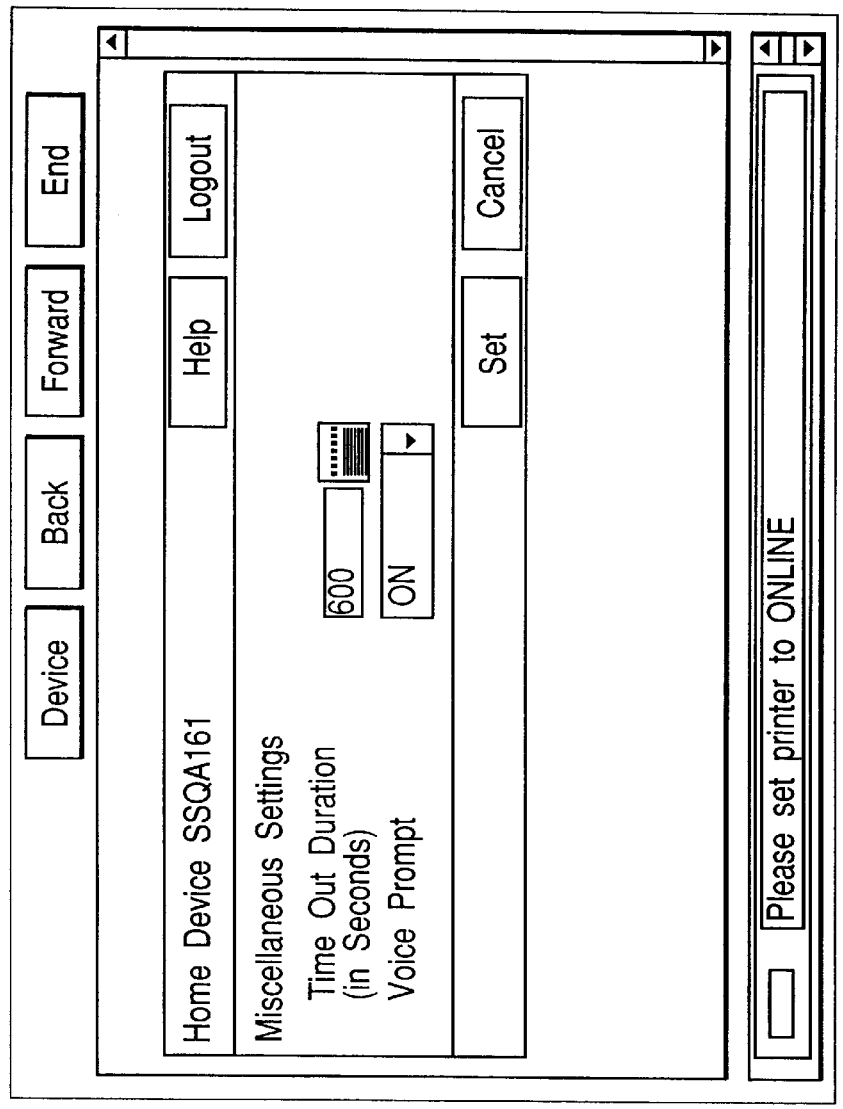
Figure 154:
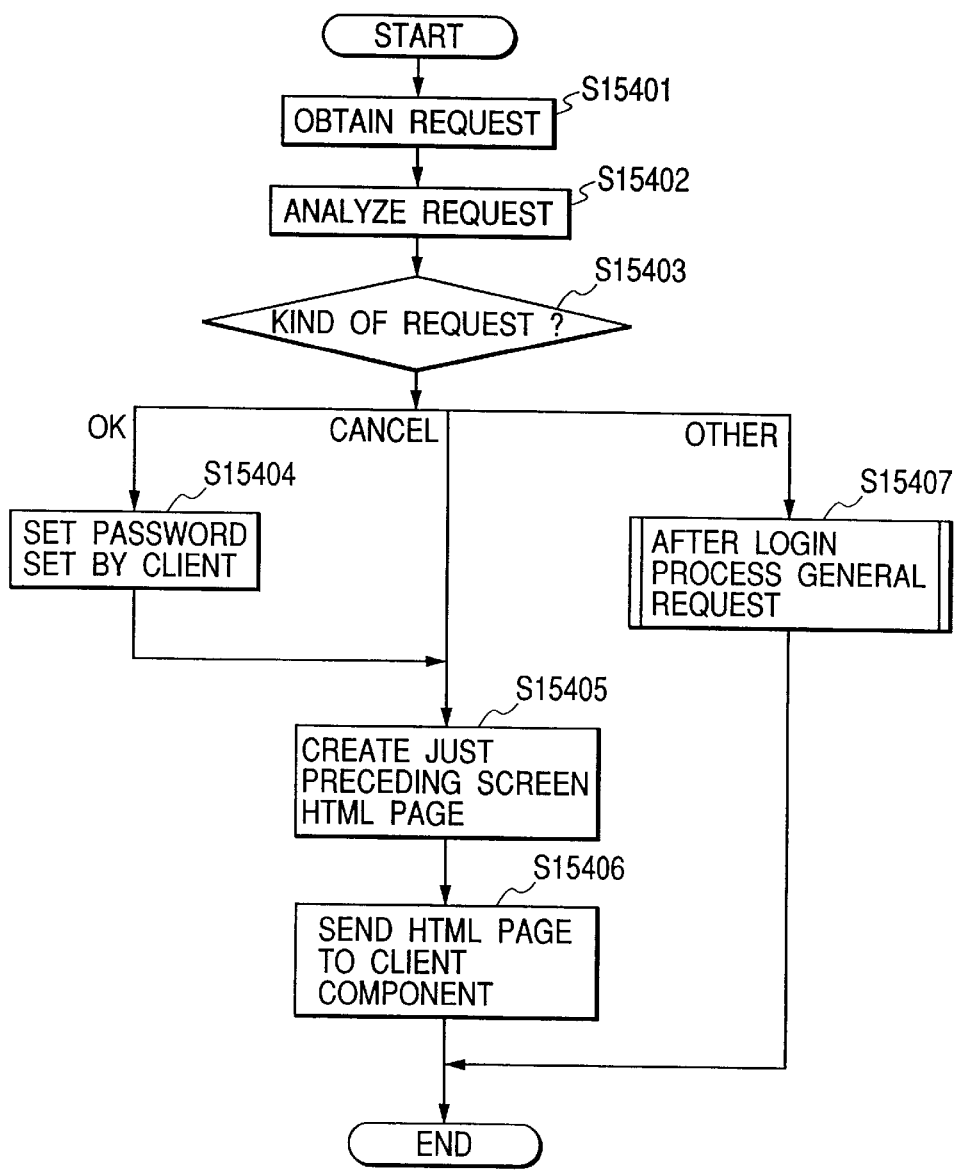
Figure 155:
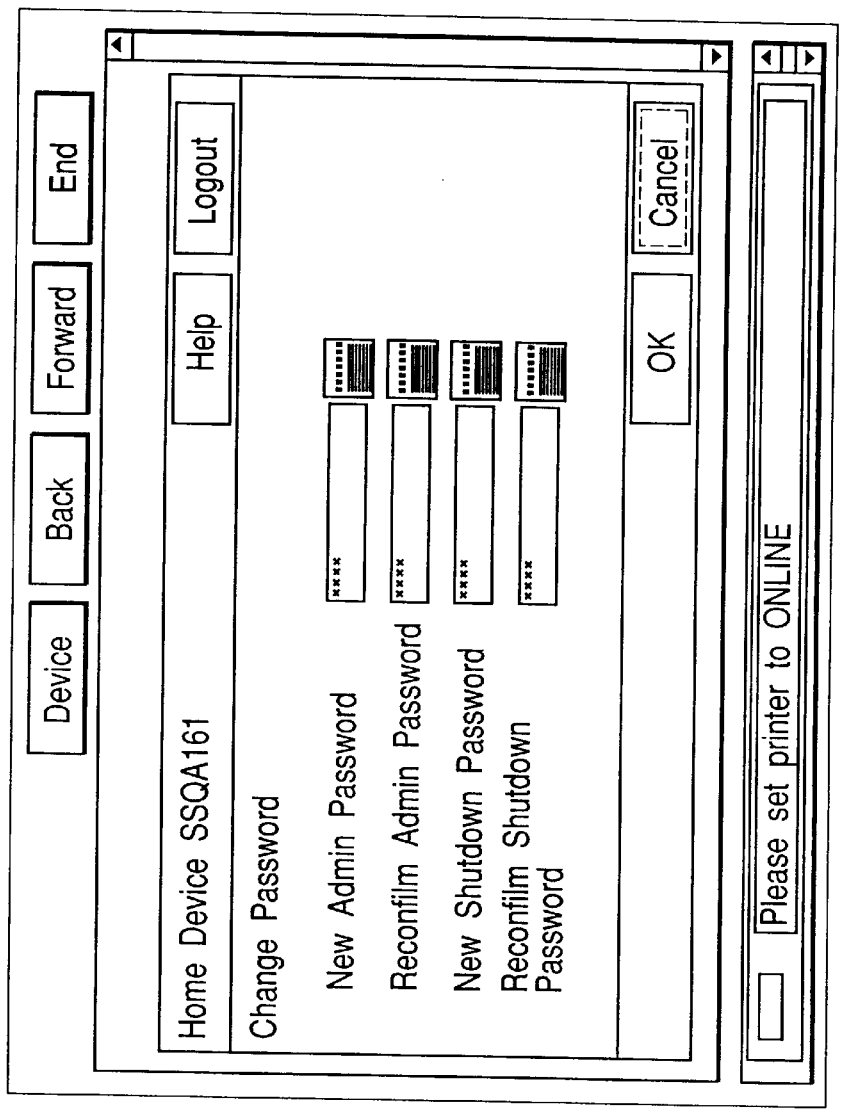
Figure 156:
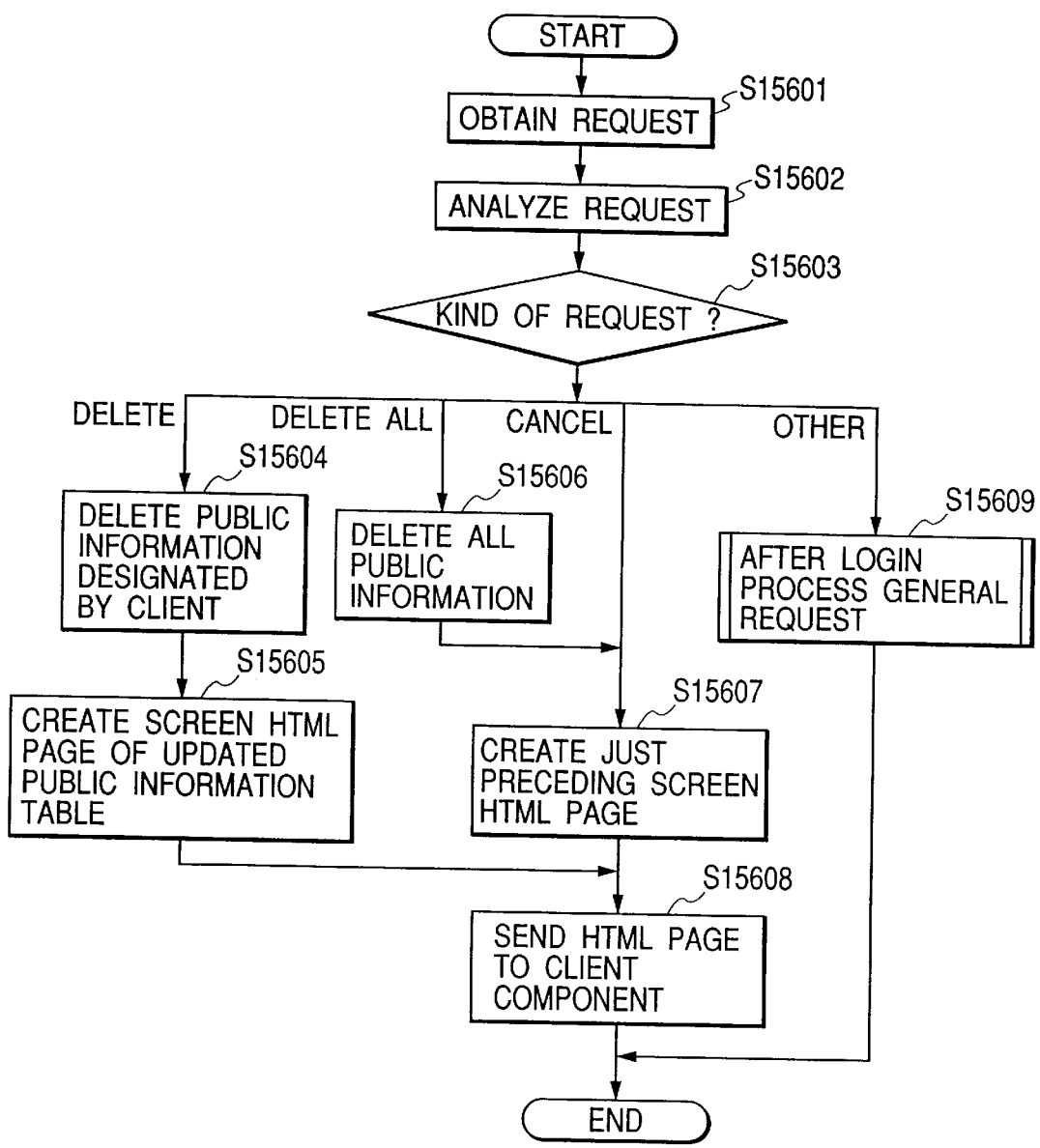
Figure 157:
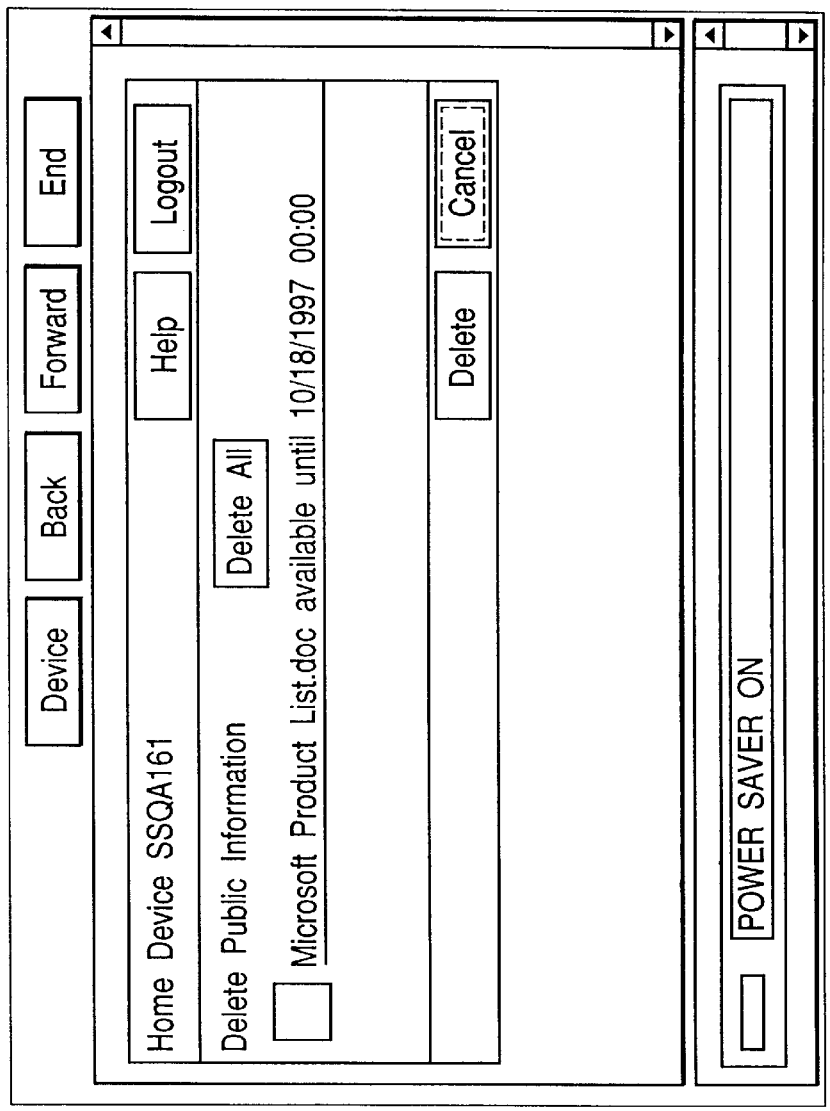
Figure 158:
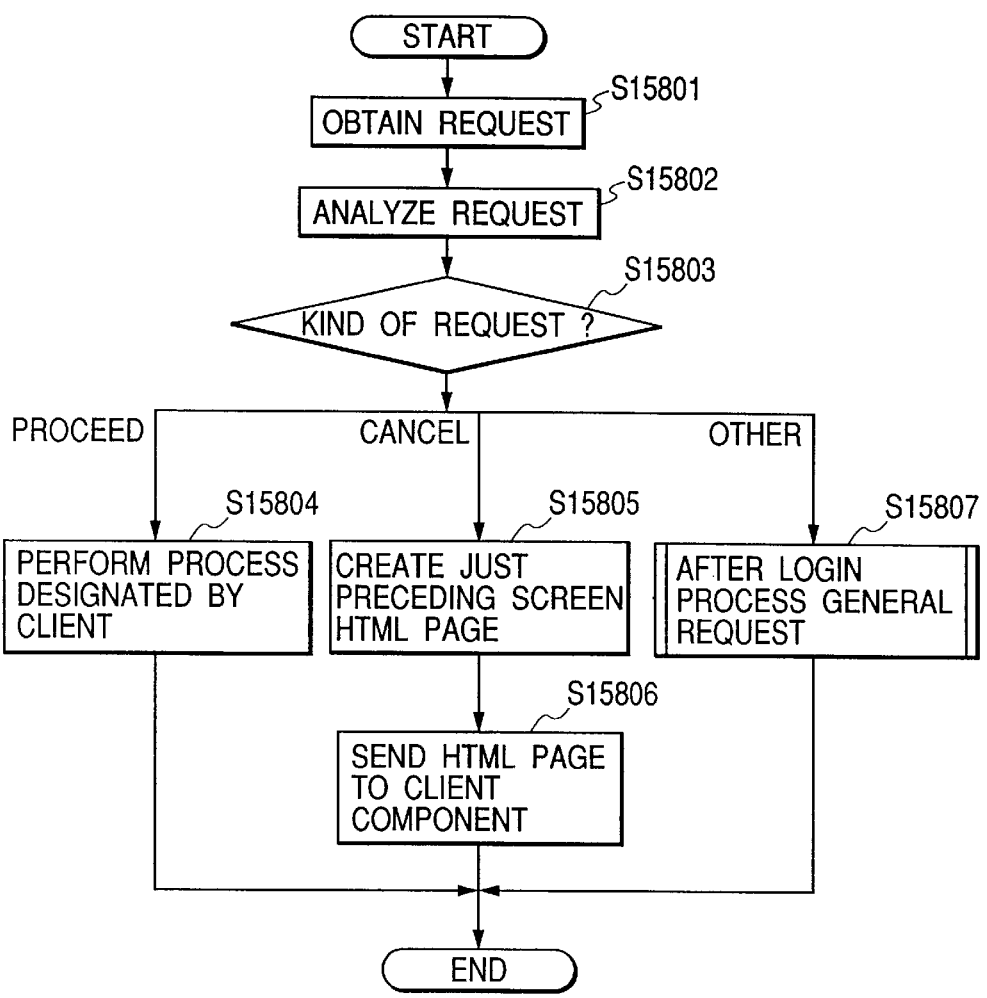
Figure 159:
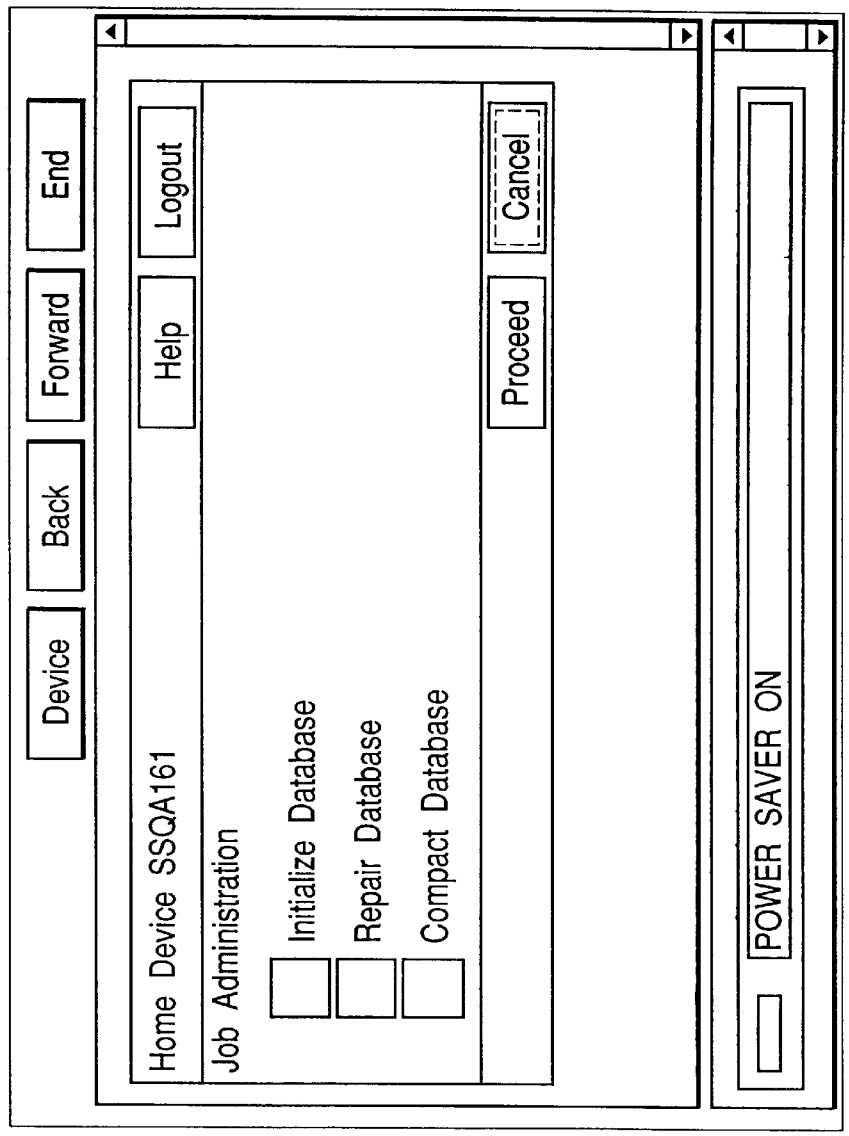
Figure 160:
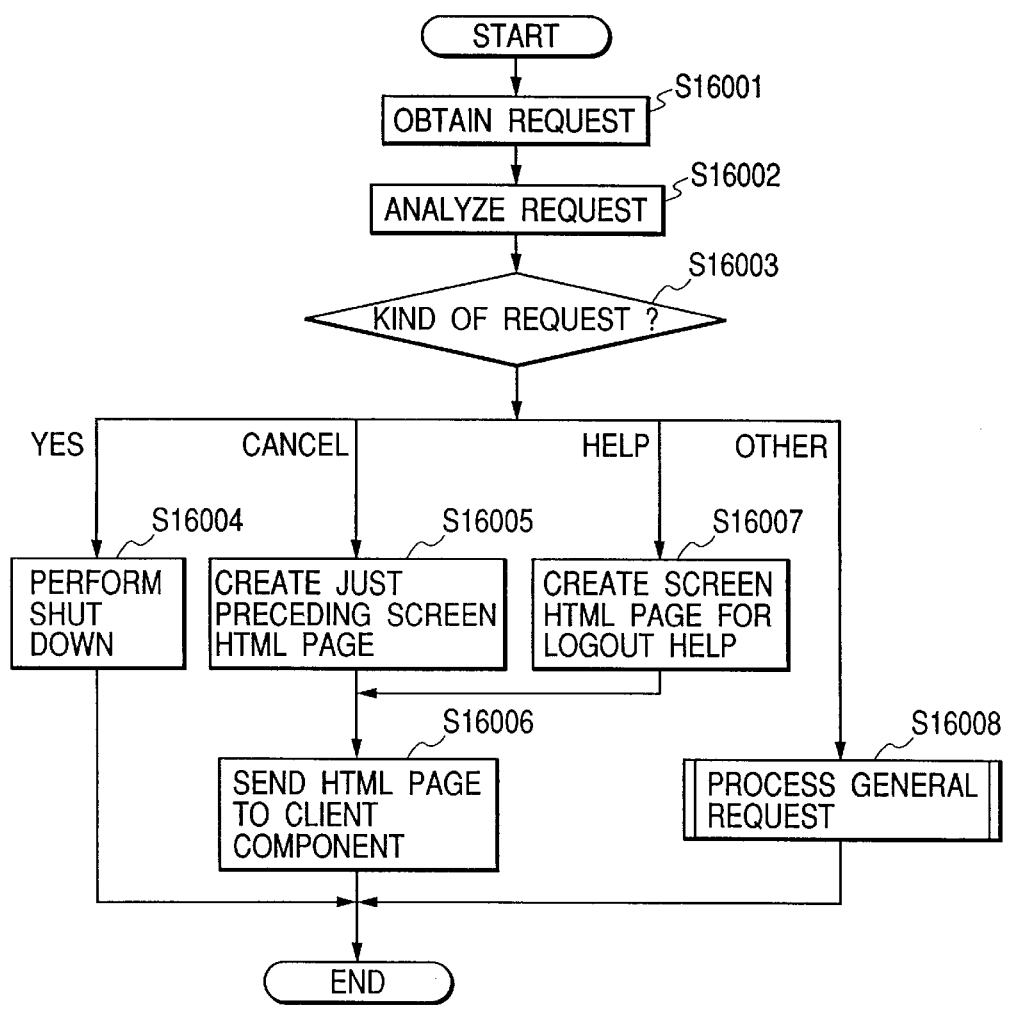

FIG. 132 is a diagram showing an example screen for selecting the processing to be performed for an obtained file;

FIG. 133 is a diagram showing a setup screen for establishing limitations for a job;

FIG. 134 is a diagram showing a setup screen for setting a rejection for a job;

FIG. 135 is a diagram for explaining the structure of a job;

FIG. 136 is a diagram showing the functional arrangement of the embodiment;

FIG. 137 is a flowchart showing the Logout screen creation processing;

FIG. 138 is a flowchart showing the Logout screen processing;

FIG. 139 is a diagram showing the Logout screen;

FIG. 140 is a diagram showing the logout screen;

FIG. 141 is a flowchart showing the call response processing;

FIGS. 142A and 142B are flowcharts showing the main screen processing for a manager;

FIG. 143 is a diagram showing an example manager main screen;

FIG. 144 is a flowchart showing the network setup screen processing;

FIG. 145 is a diagram showing an example network setup screen;

FIG. 146 is a flowchart showing the job setup screen processing;

FIG. 147 is a diagram showing an example job setup screen;

FIG. 148 is a flowchart showing the resource setup screen processing;

FIG. 149 is a diagram showing an example resource setup screen;

FIG. 150 is a flowchart showing the modem proxy setup screen processing;

FIG. 151 is a diagram showing an example modem proxy setup screen;

FIG. 152 is a flowchart showing the other setup screen processing;

FIG. 153 is a diagram showing an example other setup screen;

FIG. 154 is a flowchart showing the password setup screen processing;

FIG. 155 is a diagram showing an example password setup screen;

FIG. 156 is a flowchart showing the public information deletion screen processing;

FIG. 157 is a diagram showing an example public information deletion screen;

FIG. 158 is a flowchart showing the job database management screen processing;

FIG. 159 is a diagram showing an example database management screen;

FIG. 160 is a flowchart showing the shutdown screen processing; and

Figure 161:
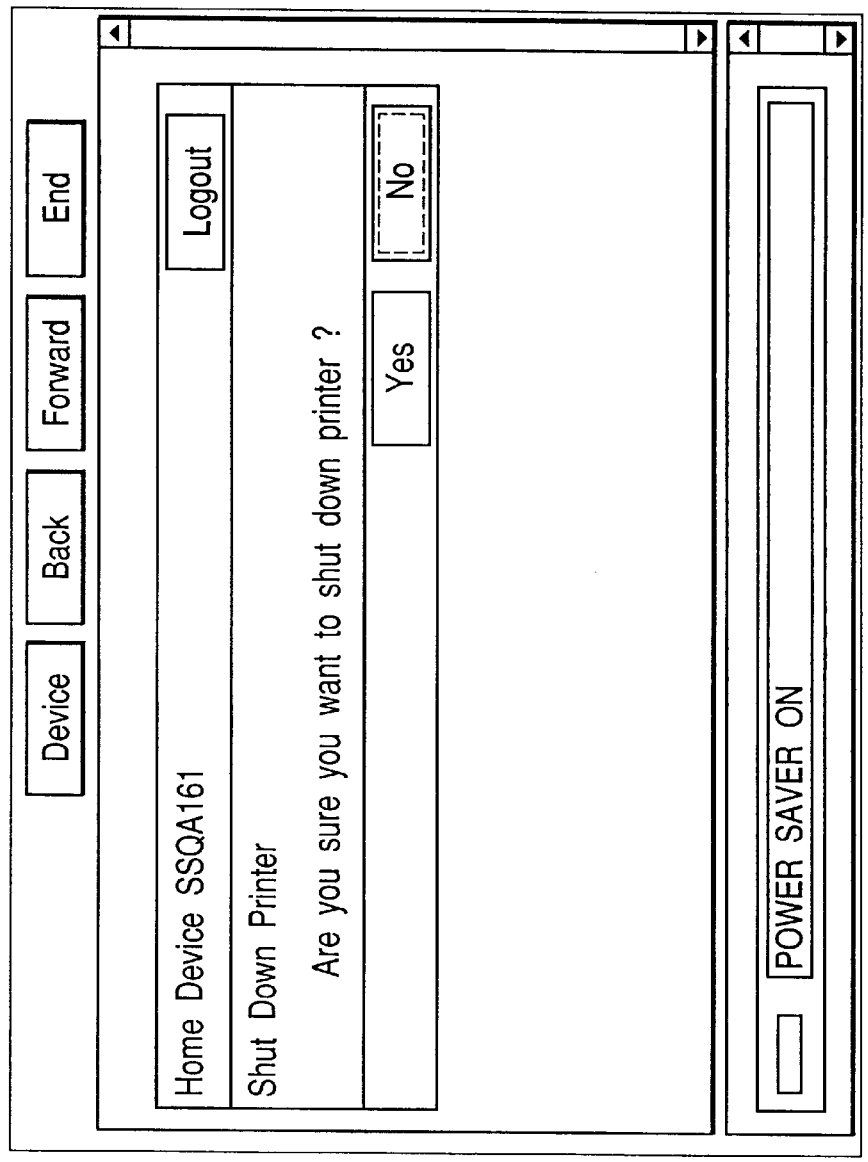

FIG. 161 is a diagram showing an example shutdown screen.

DETAILED DESCRIPTION OF THE PREFERRED EMBODIMENTS

The preferred embodiment of the present invention will now be described in detail while referring to the accompanying drawings.

Figure 1:
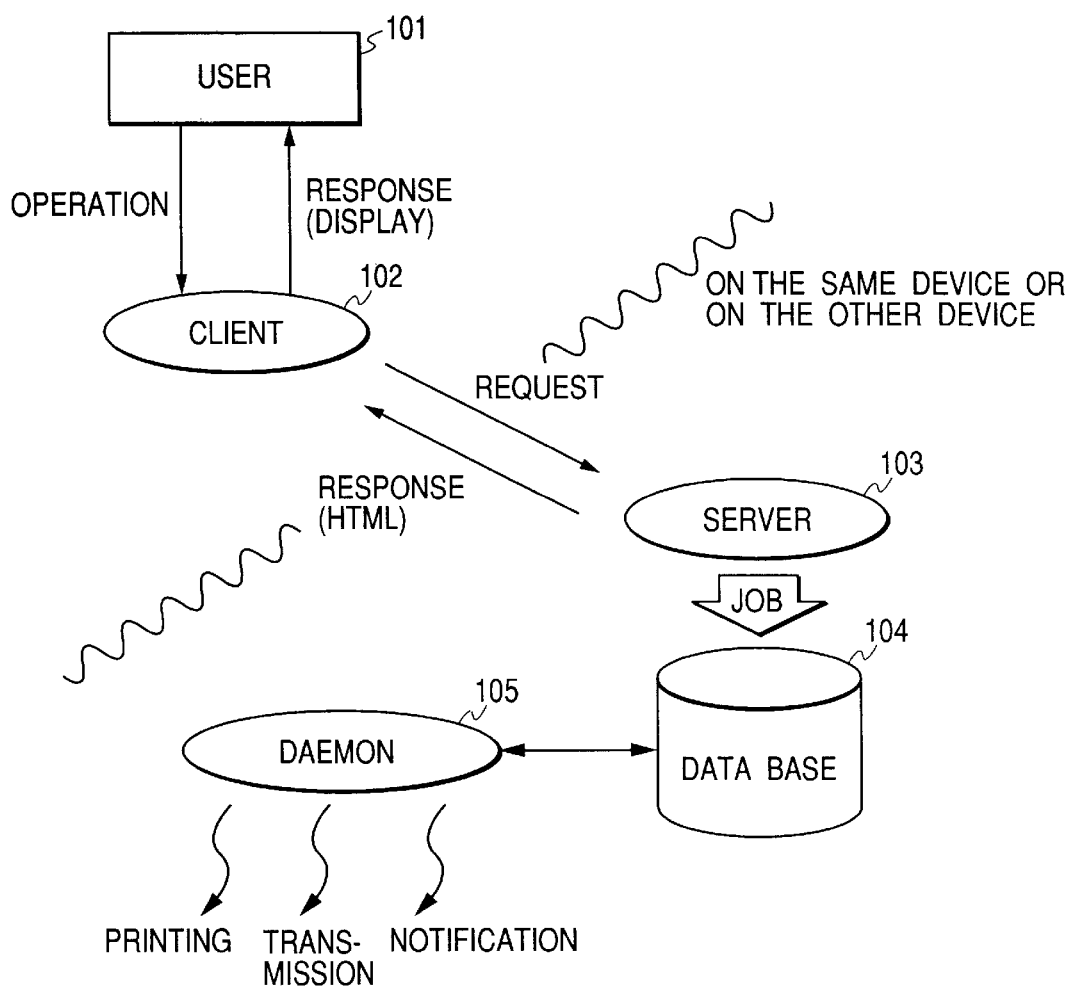
FIG. 1 is a diagram illustrating the functional arrangement of one embodiment of the present invention.

FIG. 1 is a diagram showing the functional arrangement of the embodiment. A client component 102 and a server 103 may be present in the same device, or may be in different devices connected across a network, etc.

When a user 101 specifically operates the client component 102, the client component 102 transmits to the server 103 a request that corresponds to the operation. The server 103 interprets the received request, and adds or deletes a job to or from a database 104, or acquires data from the database 104. As a result, a response is prepared in HTML (Hyper Text Markup Language), as needed, and is transmitted to the client component 102. The client component 102 displays the received HTML data and allows the user 101 to perform additional device manipulations.

A daemon module 105 monitors the job stored in the database 104, and performs the processing (printing, transmission or notification) that corresponds to the job for which the execution condition is satisfied.

Figure 2:
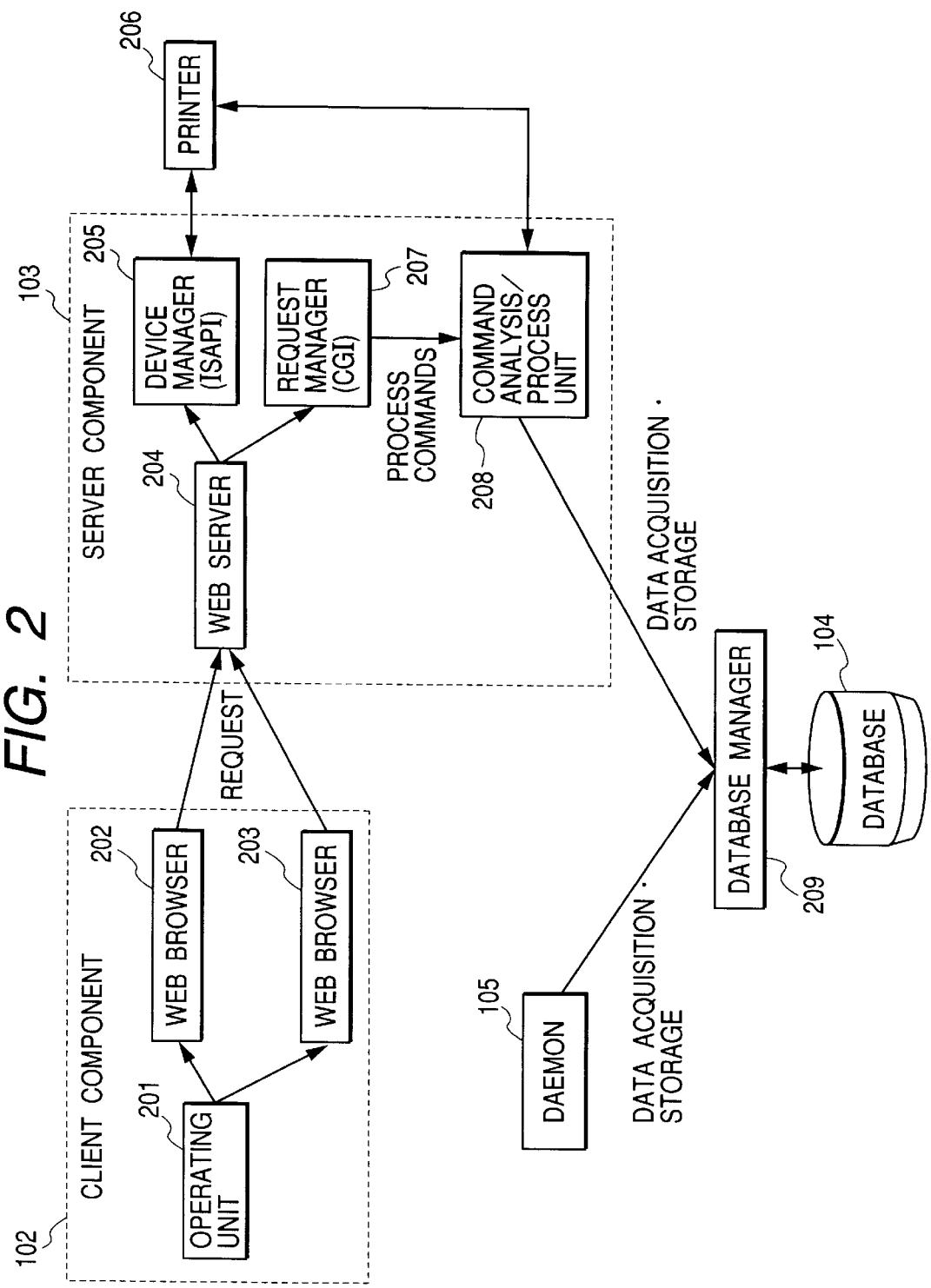
FIG. 2 is a detailed diagram illustrating the functional arrangement of the embodiment.

FIG. 2 is a detailed diagram showing the functional arrangement of the embodiment.

The client component 102 is constituted by an operating unit 201 and two Web browsers 202 and 203. The user manipulates the operating unit 201, and an instruction for starting the processing is converted into a request by the Web browser 202, while an instruction for displaying the status of a device (printer 206) is converted into a request by the Web browser 203. These requests are transmitted to the server component 103.

The server component 103 is constituted by a Web server 204, a device manager 205, a request manager 207, and a command analysis/process unit 208. A request originating at the client component 102 is received by the Web server 204, which in turn transmits the request to the device manager 205 or to the request manager 207.

In accordance with the request, the device manager 205 either acquires the status of the printer 206 or exercises control of the printer 206. The request manager 207 converts the request into a process command, and transmits it to the command analysis/process unit 208.

The command analysis/process unit 208 performs the processing corresponding to the process command, and accesses the database 104 via a database manager 209 to add or to update a job.

The daemon module 105 accesses the database 104 via the database manager 209 at a constant time interval, and determines whether there is a job for which the execution condition is satisfied. If there is such a job, the daemon module 105 executes a corresponding process.

Figure 3:
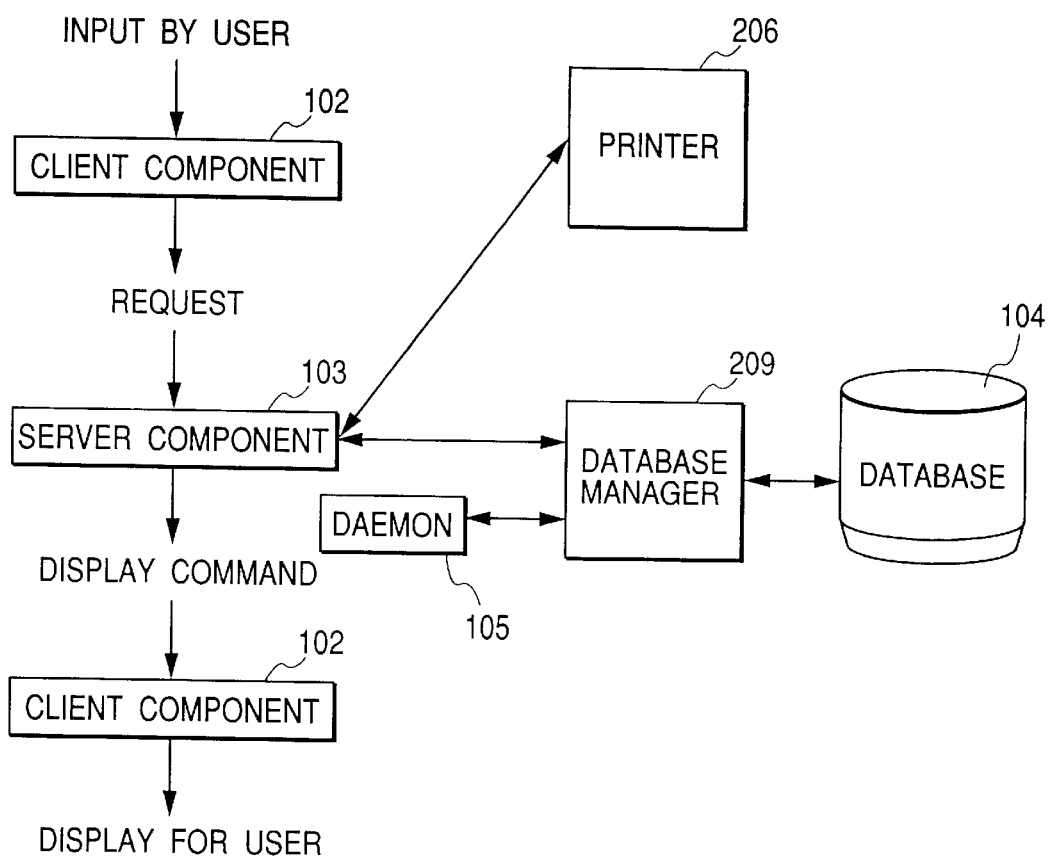
FIG. 3 is a diagram showing the transmission of information in accordance with the manipulation of input devices performed by a user.

FIG. 3 is a diagram showing the transmission of information in accordance with the operations performed by a user.

The client component 102 receives as input information the data produced by the operations performed by the user, and generates a request and transmits it to the server component 103.

The server component 103 interprets the received request, and communicates with the database 104 via the database manager 209 to add or to update a job, or to acquire data. In addition, the server component 103 communicates with the printer 206 to obtain the status of the printer 209. As a result, the server component 103 generates, as needed, a corresponding display command (an HTML page) and transmits it to the client component 102.

The client component 102 displays the received display command (an HTML page) for the user, and allows the user to perform a new operation.

Jobs stored in the database 104 are monitored by the daemon module 105 via the database manager 209, and a job for which the execution condition is satisfied is printed or transmitted, or brought to the attention of the user.

Figure 4:
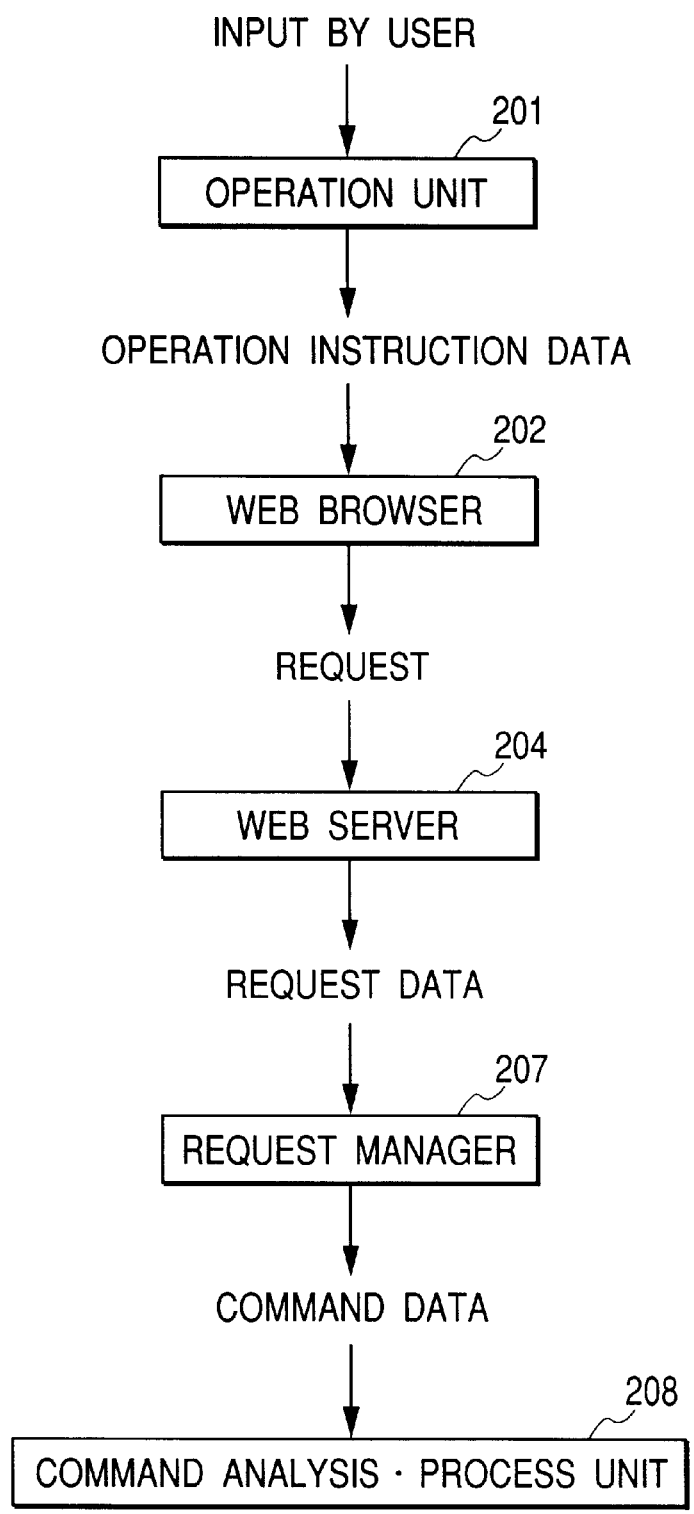
FIG. 4 is a detailed diagram showing the sequence of the processing performed until a command entered by a user is executed.

FIG. 4 is a detailed diagram showing the sequence of the processing performed until a command corresponding to the user's entry is executed.

The manipulation of data input devices by the user is converted into corresponding operation instruction data by the operating unit 201. For example, the manipulation by the user of a keyboard or of a mouse is converted into corresponding key code or into information, such as mouse movement information, that can be handled by an information processing apparatus.

The operating instruction data converted by the operating unit 201 are converted into a corresponding request by the Web browser 202, and the request is transmitted to the Web server 204. When, for example, one of the buttons on a screen is selected, a request "selection of a specific button" is prepared.

The Web server 204 transmits the received request to the request manager 207, which thereafter converts the request into a corresponding process command and transmits it to the command analysis/process unit 208. When, for example, the user chooses a button to instruct printing, a request "selection of a print button" is converted into a print command "execution of a process corresponding to the print button", and printing is performed.

Figure 5:
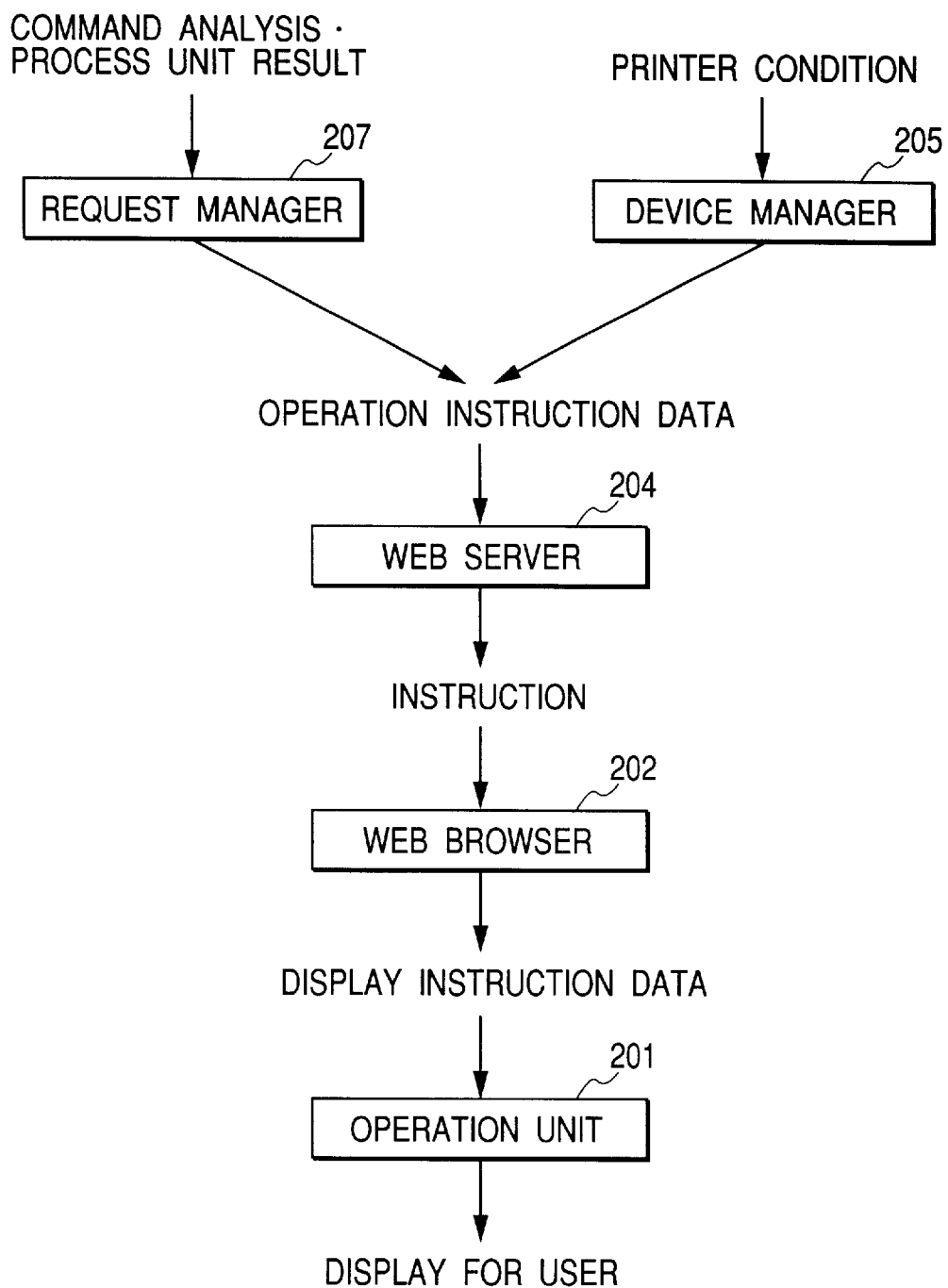
FIG. 5 is a diagram showing the sequence of the processing performed to display for a user the processing results and a status change.

FIG. 5 is a diagram showing the sequence of the processing performed until the results of the processing and the change in the status of the printer 206 are displayed for a user.

The request manager 207 receives the process result from the command analysis/process unit 208, and transmits corresponding operating instruction data to the Web server 204. Similarly, the device manager 205 detects the change of the status of the printer 206 and transmits corresponding operating instruction data to the Web server 204. To display, for example, a new operating screen as the processing result, the contents to be displayed are converted into HTML data for the new operating screen. Also, to display a new screen for the status of the printer 206, the contents to be displayed are converted into HTML data for the screen.

The Web server 204 transmits the received operating screen data to the Web browsers 202 and 203. The Web browser 202 provides the data for a user by displaying the data on a display operating unit, such as a touch panel. The Web browser 203 displays the status of the printer 206.

Figure 6:
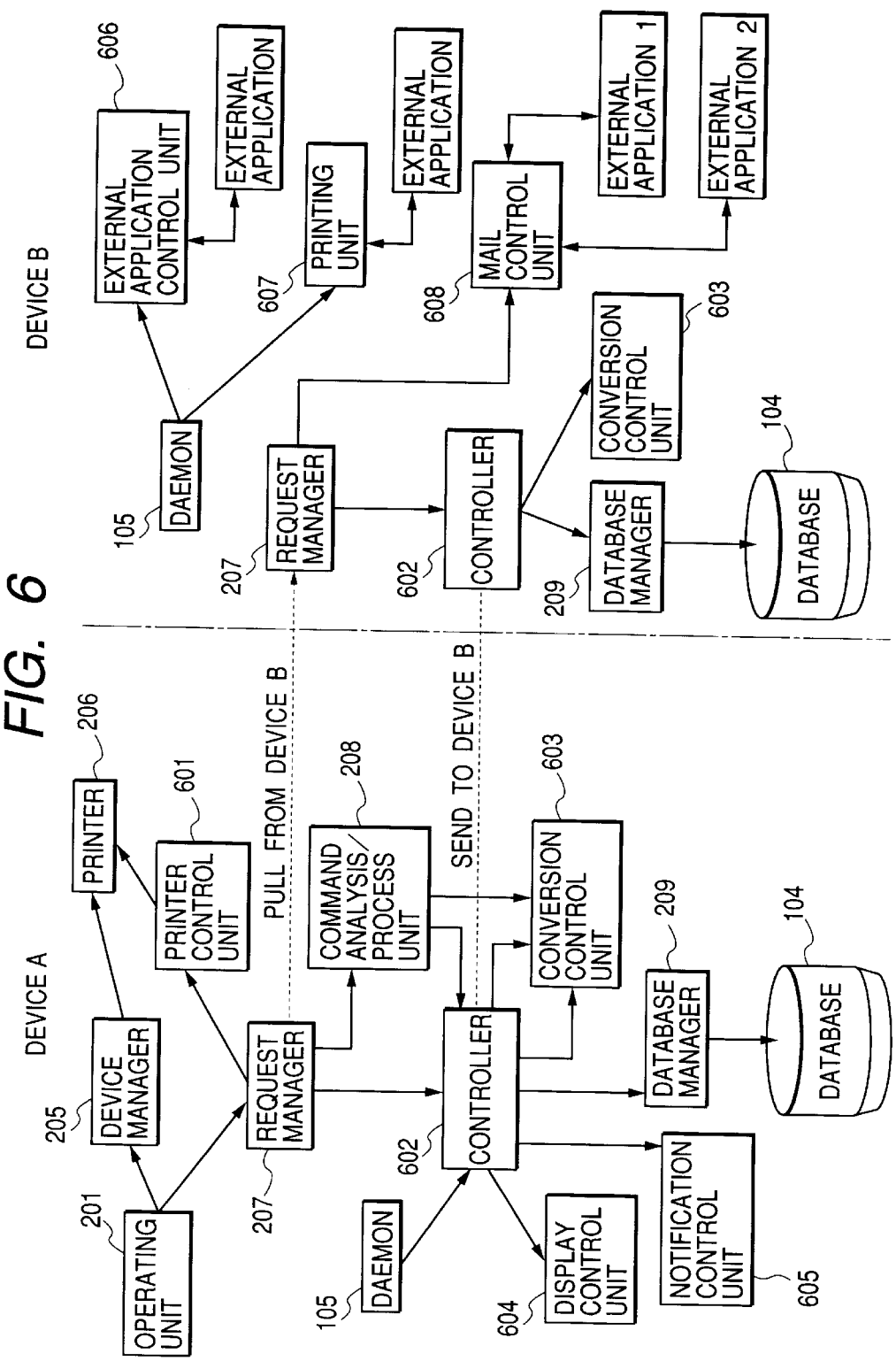
FIG. 6 is a diagram illustrating the functional relationship existing among a plurality of devices.

FIG. 6 is a diagram showing the functional relationship among a plurality of devices (device A and device B in this embodiment). In this embodiment, device A is a printer, and device B is a desktop personal computer for managing both a user's mail and a schedule. The devices A and B each include a client component 102, a server component 103 and a daemon module 105. It should be noted, however, that the user is located on the same side as is the device A, and the client component 102 of the device B is not shown.

When the user manipulates the device A, the operating unit 201 acquires as input information the information input by the user's manipulation of the device, and transmits it as a request to the device manager 205 and the request manager 207 in the server component 103.

The device manager 205 responds to the user's request by acquiring the status of the printer 206. In accordance with the type of the request, the request manager 207 permits a printer control unit 601 to control the printer 206, or permits the command analysis/process unit 208 to analyze more detailed information and to perform a corresponding process.

As a result, the information form is changed by a conversion control unit 603, as needed, or various processes are performed by a controller 602. When it is determined that management of the job is required, the addition of a job or the updating of a job is performed for the database 104. When it is determined that the display of data is required, the data are displayed by a display control unit 604. When it is determined that the issuance of a data notification is required, the data notification is issued by a notification control unit 605.

The daemon module 105 periodically monitors the database 104. When there is a job for which the execution condition is satisfied, the daemon module 105 executes the corresponding processing.

When it is determined that the processing has not been completed by the device A, a request is issued to the device B, and the request manager 207 of the device B performs the corresponding process. To print a file at the device B, for example, a printing unit 607 employs a corresponding application, and for accessing mail, a mail control unit 608 employs a corresponding application. For other operations, such referencing schedule information, a corresponding application is employed.

In addition, a job stored in the database 104 of the device B can also be accessed.

Figure 7:
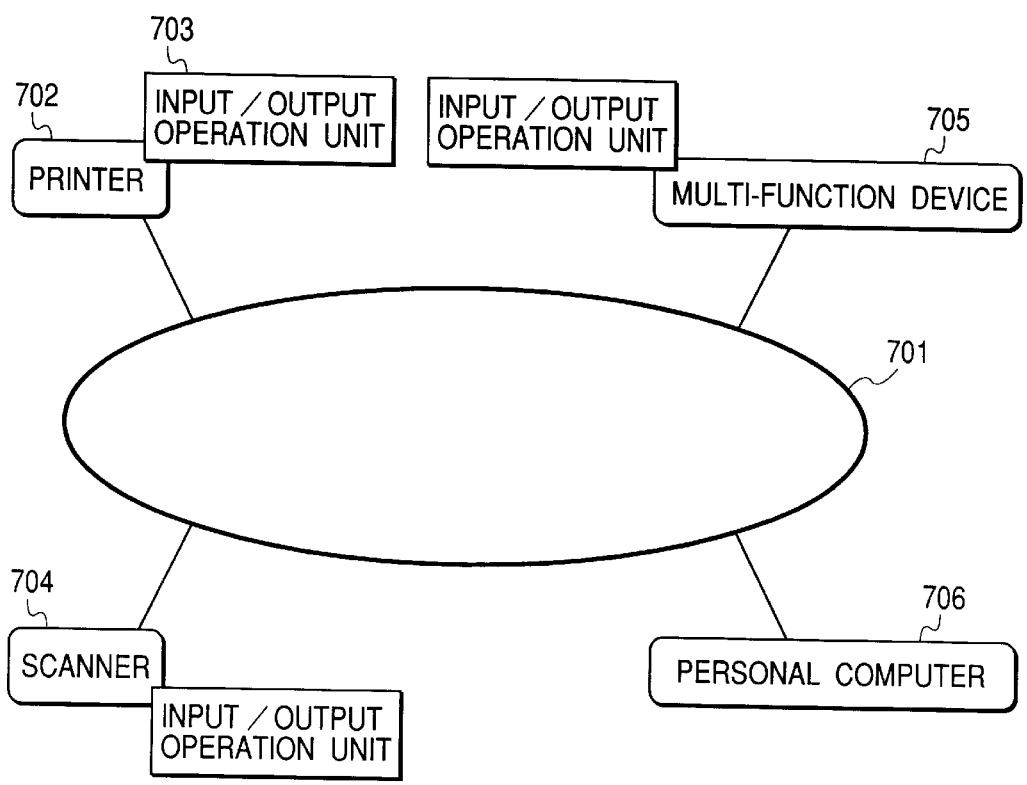
FIG. 7 is a diagram illustrating a system configuration according to the embodiment.

FIG. 7 is a diagram showing the configuration of a system according to this embodiment.

In FIG. 7, various apparatuses are connected to a network 701, and data are exchanged across the network 701. A printer 702, which includes an input/output operation unit 703, prints data received across the network 701. The input/output operating unit 703 provides various displays for a user, and accepts instructions from the user. A scanner 704 and a multi-function apparatus 705 also include such an input/output operating unit. The scanner 704 optically reads data printed on paper, etc., and the multi-function apparatus 705 functions as the printer 702 and as the scanner 704. A personal computer 706 creates documents and images, and manages for the user such personal data as mail and a schedule.

FIG. 136 is a diagram showing the functional arrangement for the embodiment.

Features of this arrangement are that a process instruction command (job) is employed as one process unit, and that a job generation unit 1362, an analysis/performance unit 1363 and an output unit 1364 are operated at adequate timings.

A detailed explanation will now be given for a job. FIG. 135 is a diagram for explaining the structure of a job.

A job includes a process (Action), a process performance condition (Condition), a process performance instructor=owner (Owner), a current process status (Status), and information concerning a process creation time (Created Time) and the job that triggered the creation (Parent Job). With the job, the previously performed process can be refereed to and the performance of a new process can be instructed.

The above process performance conditions (Condition) are When To Do (initiation when a designated time has been reached), After Time (initiation after a designated time has elapsed), Before Time (initiation before a designated time has elapsed), On Action (initiation upon the performance of a designated process), Object (initiation at the time for a designated object), From (initiation at the time for a designated process source), By (initiation when a designated method is employed for a process), Device Status (initiation when the status of a device attains a designated value), and Result Status (initiation in accordance with the process results obtained).

The values for the Device Status are OK, Toner low, Staples low, Unknown, Printing, No toner cart, Printer open, Paper jam, Hardware failure, Tray failure, Paper deck open, and Stapler low.

The values for the Result Status are Success, Fail, and Hold job accessed.

The Owner represents the issuer of process execution instructions, i.e., the owner of the processes, and includes User Device ID, User ID, Password, and User Type. The types of users are Sender, Receiver, Other, Receiver to be, and Don't care.

The values for the process status (Status) are Done (execution terminated), To Do (execution scheduled), Don't care (invalid), Cancel (deleted), Active (in progress), Spooling (spooling in progress), Failed (execution failure) and Ignored (execution ignored).

The Action includes the types of processes that were performed or are to be performed (Type), the object to be processed (Object), Object Count (the number of copies of the object), To (process destination), From (process source), By (process method), and all other process associated information.

The types of processes (Type) are None, Get, Send, Delete, Scan, Extract data, Print, File, Set instruction, Hold, Extend hold, Pause printing, Change priority, Receive, Convert, Notify, and Operate.

As the Object, there are Action and Object. To (process destination) and From (process source) include the Sender or the Receiver, as a Person, and a Device. By (process method) includes Popup window, Voice message, E-mail, Fax, Phone, and Pager.

The Object includes the substance of an object (Content), management information such as the data format (Format) and the size (Size) of the object, additional information (Addition) concerning the object, such as a comment, and source information (Source) for the object. For a file having a print format, the original MS-Word file is employed as source information.

The data formats (Format) of the object are Text, Html, Rtf, Bmp, Tiff, Pcx, Jpeg, G3, G4, Pc15, and MS-Word.

Referring again to FIG. 136, the job generation unit 1362, the analysis/performance unit 1363 and the output unit 1364 are installed in a control box 1361, which is connected to a conventional printer 206. The printer 206, as in the prior art, receives external print information, performs the printing process in accordance with an instruction, and outputs the print results.

First, an explanation will be given for the time that an instruction is entered by a user. When the user enters a specified instruction via an operating unit 101, the job generation unit 1362 generates a job corresponding to the instruction, and adds the job to the database 104.

The job added to the database 104 is monitored by the analysis/performance unit 1363, and whether the execution condition has been satisfied is sequentially examined. If there is a job for which the execution condition has been satisfied, a corresponding process is performed, and the database 104 is updated using the job that reflects the execution result.

When, for example, the user instructs the printing of specific data at a designated time, the job generation unit 1362 generates as a job the contents of the operation input by the user, and adds the job to the database 104.

At this time, if the database 104 includes a job "analyze the contents of an operation entered by a user and re-register this job", which designates a process to be performed when the operation input by the user takes place, the analysis/performance unit 1363 for detecting the presence of an unanalyzed job in the database 104 analyzes the contents of the operation entered by the user, determines a corresponding process to be performed and generates it as a job, and adds the job to the database 104.

In this case, the printing process is added as a job to the database 104. Also, the job that represents the contents of the operation input by the user is regarded as having already been analyzed and updated, and the above mentioned job for analyzing the user's operation is re-registered.

When the time designated by the user is reached, the job for the printing process is performed, and print information 107 is generated and transmitted to the printer 206. When new job print results are obtained, the job "reflect the print results in this job" is added to the database 104. The printer 206, as in the prior art, performs the instructed, and outputs the print results. In addition, after the printing has been completed, the print results are obtained as the printer status from the printer 206, and are reflected in the job.

When in this embodiment the paper or the toner has run out, or an error has occurred at the printer 206, job generation unit 1362 obtains the change in the printer status for the printer 206, and generates a corresponding job and adds it to the database 104. When it is ascertained from the printer status for the printer 206 that the toner has run out, the occurrence of the change in the printer status is created as a job and is added to the database 104.

At this time, if the database 104 includes the job "issue an order request when toner has run out, and re-register this job", which designates a process to be performed upon the occurrence of a change in the status, an order request is issued and the job is re-registered. As a result, each time a like condition occurs, this process is performed.

The process performed for the change in the status of the printer 206 is also performed for changes in the internal statuses of the other sections.

As an example, there is one case where the backlight for a liquid crystal display panel 801, which will be described later, is powered off. When the database 104 includes the job "perform initialization process when the backlight is powered off, and reregister this job", which designates a process to be performed upon the occurrence of the change in the status, the initialization process is performed and the job is re-registered. As a result, the periodical initialization process that is required for stably activating a product can be performed in consonance with a timing that is satisfactory under the circumstances.

When the job generation unit 1362 is notified of a change in the external status, it generates a corresponding job and adds it to the database 104.

When, for example, an error has occurred in an external printer connected across a network, the occurrence of the change in the external status is generated as a job and is added to the database 104. At this time, if the database 104 includes the job "transmit a job transmission instruction when an error has occurred in an external printer, and re-register this job", which designates a process to be performed upon the occurrence of a change in the external status, a job transmission instruction is transmitted by the output unit 1364 to the printer at which the error occurred, and this job is re-registered in the database 104. As a result, each time a like condition occurs, the same process is performed.

When a process instruction (job) is received from an external device, the job generation unit 1362 generates a corresponding job and adds it to the database 104.

For example, upon receiving a job transmission instruction, the reception of the job transmission instruction is generated as a job and is added to the database 104.

At this time, if the database 104 includes the job "add a received job and re-register it", which designates a process to be performed upon receiving the job, the job transmission instruction is added and the job is re-registered.

Sequentially, when the execution condition of the job transmission instruction is matched, a transmission process corresponding to the job is performed and the job is transmitted.

Next, an explanation will be given for a case wherein a job transmission instruction other than the above, i.e., a print information transmission instruction, is received.

To print information stored in another information output apparatus, the corresponding print information must be extracted from the above print information. Transmission of the print information by the pertinent apparatus is one method that is employed. With this method, however, a printing function for the information is required by an information requesting apparatus. In this embodiment, an explanation will be given for another method for the transmission of print information that corresponds to the information stored in a specific apparatus.

When a print information transmission instruction 106 is received from a specific device, the receipt of the job is generated as a job and added to the database 104. Then, when the execution condition of the job is matched, a print information transmission process that corresponds to the job is performed. In the print information transmission process, print information is prepared from the requested information and is transmitted as instructed.

In the information output apparatus that has received the print information, the job generation unit 1362 generates as a job the acquisition of print information, and adds it to the database 104.

At this time, as is described above, since when the print information transmission instruction was issued the job "execute a printing process upon receiving from a transmission source print information for a print information transmission instruction" was added to the database 104, with the assumption that print information had been received, the printing process is performed, and the received print information is transmitted to the printer 206, which then initiates the printing and outputs the printing results.

In addition to the above described process instruction, there are instructions for notification and for output. These process instructions may be externally received or may be stored in the database 104 in advance.

For example, when the execution condition of the notification instruction is matched, the notification process is performed using E-mail, a telephone, or a facsimile machine. When the execution condition of the output instruction is matched, the output process is performed, and a display is provided or a voice is released.

Figure 8:
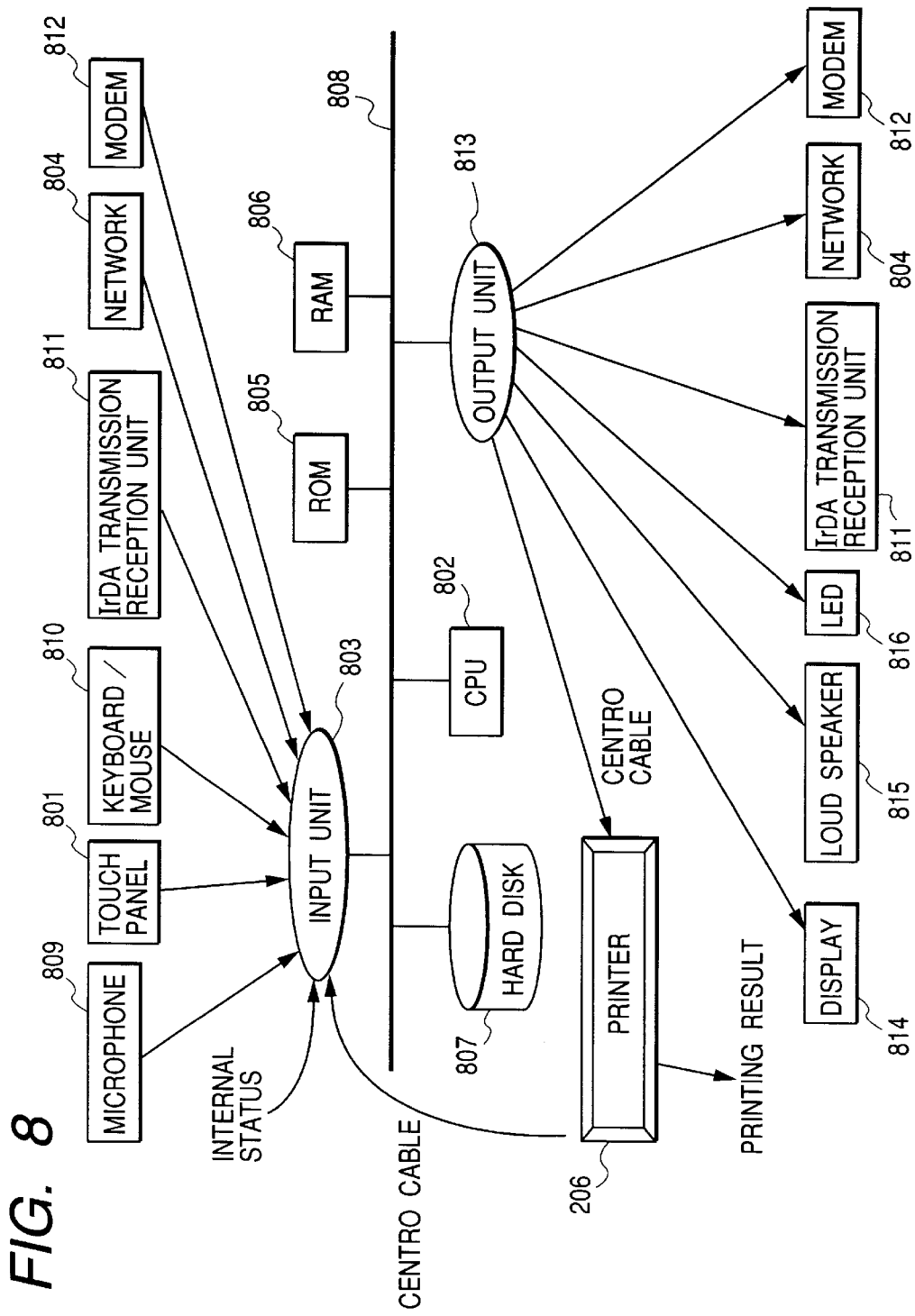
FIG. 8 is a diagram illustrating the essential hardware arrangement according to the embodiment.

FIG. 8 is a diagram showing the essential hardware arrangement according to the embodiment. Switches, a fan, etc., are not shown.

An information output apparatus according to the embodiment of the present invention includes input devices, such as a microphone 809, a touch panel 801, a keyboard/mouse 810, an IrDA transmission/reception unit 811, a network 804 and a modem 812, and acquires information through an input unit 803.

The touch panel 801 is used to display for the user the printer status and a menu screen. And when the user touches the display screen, a menu item can be selected and characters can be entered using a keyboard that is displayed. A common display and a common keyboard may be used instead of the touch panel 801.

The status of the printer 206 is also obtained via a centrocable from the input unit 803. Besides the status of the printer 206, the internal status is detected and obtained by an internal sensor or a monitor.

The processing results are output by an output unit 813 to certain output devices, such as the printer 206, a display 814, a loudspeaker 815, an LED 816, the IRDA transmission/ reception unit 811, the network 804, and the modem 812. When the printing process is performed, for example, the print information is transmitted via the centrocable to the printer 206. The printer 206 performs the printing in accordance with the received print information, and outputs the printing results. It should be noted that the input unit 803 and the output unit 813 are not necessarily physically separate components.

A CPU 802 executes various programs, including the processing which will be described later while referring to the flowcharts, and controls the individual sections connected by a system bus 808. Further, by executing corresponding programs, the CPU 802 provides the functions for the job generation unit 1362, the analysis/performance unit 1363, and the output unit 1364 that are described above.

A ROM 805 is used to store fixed data and programs. A RAM 806 is used to temporarily store data and programs. A hard disk drive (HDD) 807 is used for the above described database 104 as permanent storage for programs and data. The system bus 808 is employed as a medium for the connection of the above individual sections and for the exchange of data, address signals and control signals by the sections.

The programs, including the processing which will be described later while referring to the flowcharts, may be stored in the ROM 805, or may be loaded from the HDD 807 into the RAM 806, as needed, before the initiation of the processing or during the performance of the processing. An external storage device, such as an MO drive, may be employed instead of the HDD 807.

With the above described arrangement, the job generation unit 1362 generates a job that corresponds to the input information and adds it to the database 104 on the hard disk 807; the analysis/performance unit 1363 obtains a job from the database 104 and performs a corresponding process; and the output unit 1364 outputs the processing results.

Figure 9:
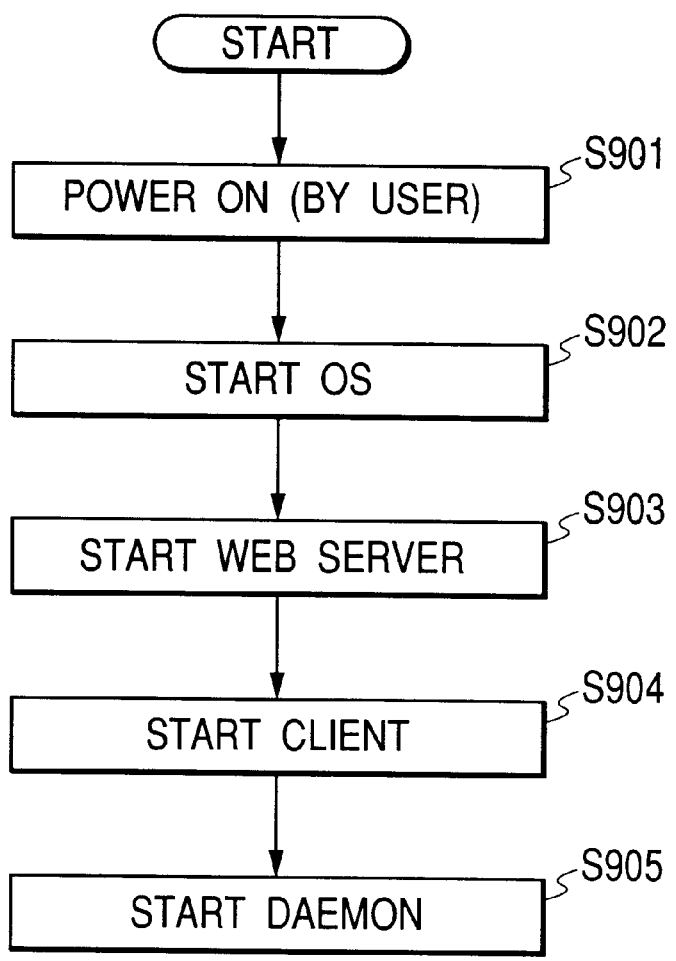

FIG. 9 is a flowchart showing an activation order when a user powers on a machine. When at step S901 the user turns on the power, at step S902 the OS is activated, and at step S903 the Web server 103 is activated. Then, at step S904 the client component 102 is activated, and finally at step S905 the daemon module 105 is activated.

Figure 10:
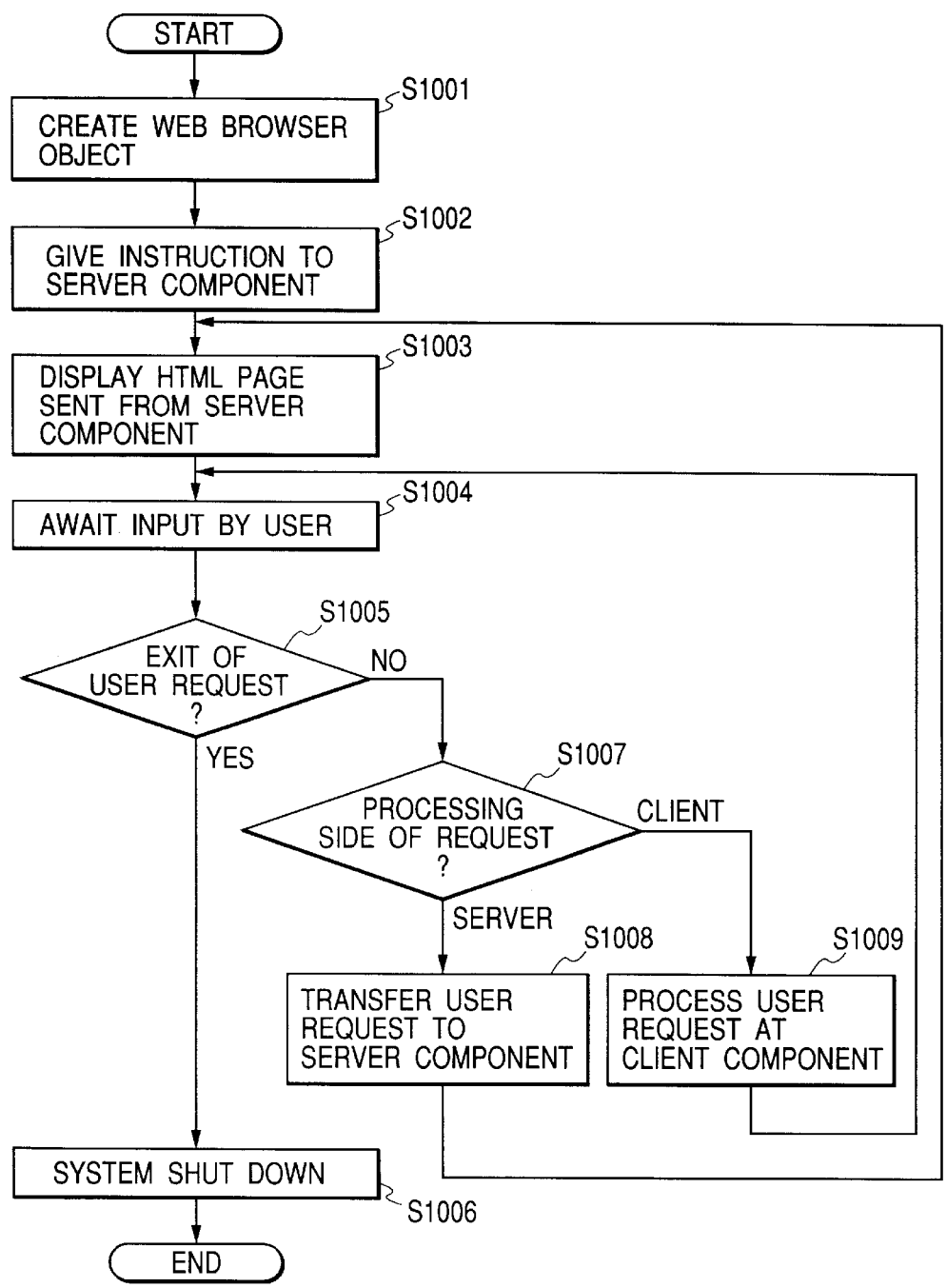
FIG. 10 is a flowchart showing the processing performed by a client component.

FIG. 10 is a flowchart showing the processing performed by the client component 102.

When the client component 102 is activated, at step S1001 a Web browser object is created, and at step S1002, a request to prepare an HTML page is issued to the server component 103. The page at this time is an opening screen. At step S1003 the HTML page transmitted by the server 103 as a response is displayed, and at step S1004 input by the user is waited for. Then, a process corresponding to the user's input is performed. When at step S1005 a request from the user is "exit", at step S1006 the system is shut down, and the processing is thereafter terminated. When at step S1007 the request from the user should be processed by the client component 102, at step S1009 this process is handled and input by the user is again waited for. When the process should be performed by the server 103, at step S1008 a process request is issued to the server component 103, and an HTML page prepared as a consequence of the request is received and displayed. Then, input by the user is again waited for.

Figure 11:
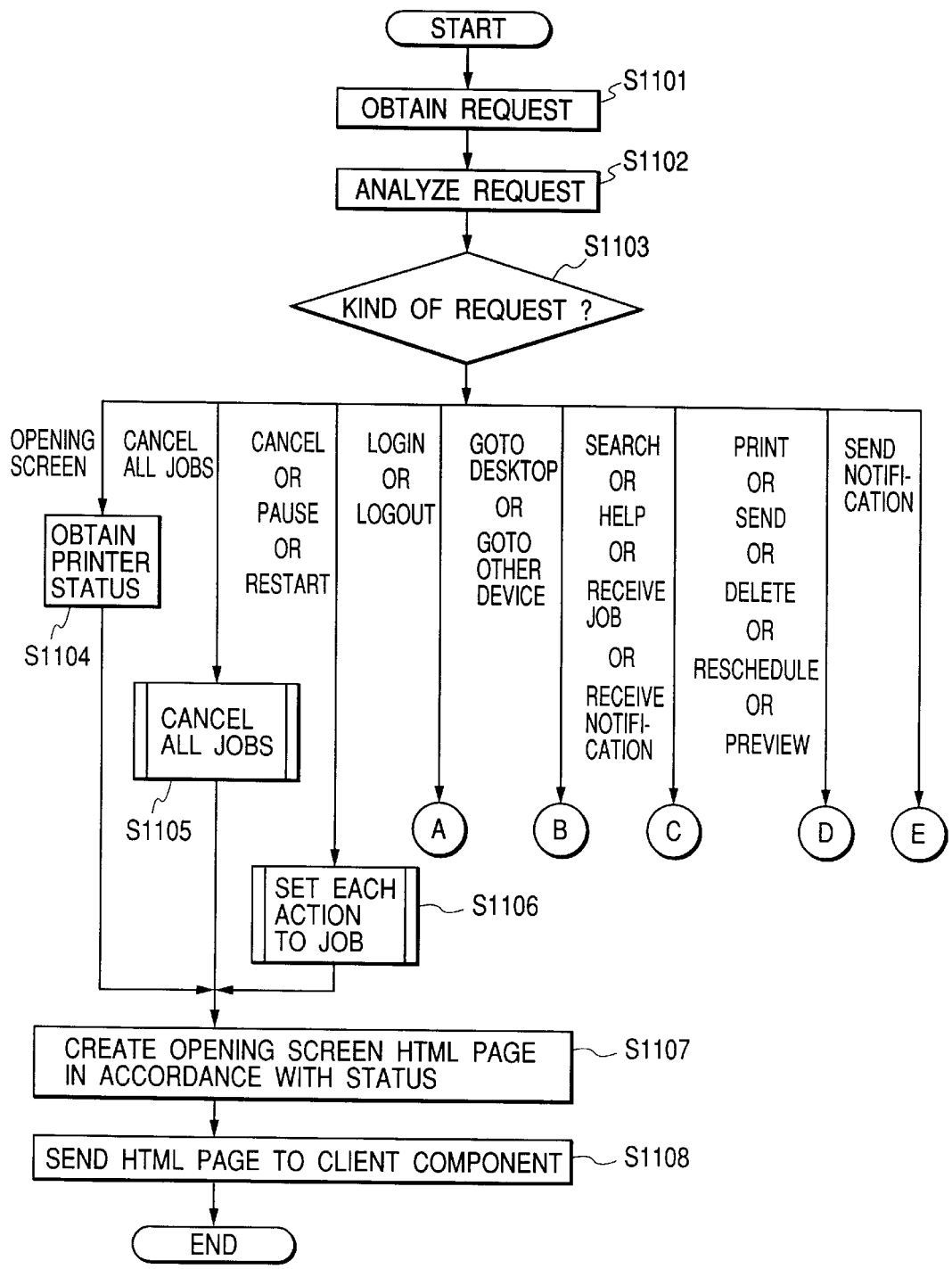
FIG. 11 is a flowchart showing the processing performed by a server component upon receiving a request from a client.

FIG. 11 is a flowchart showing the processing performed by the server component 103 upon receiving a request from the client component 102.

Figure 12:
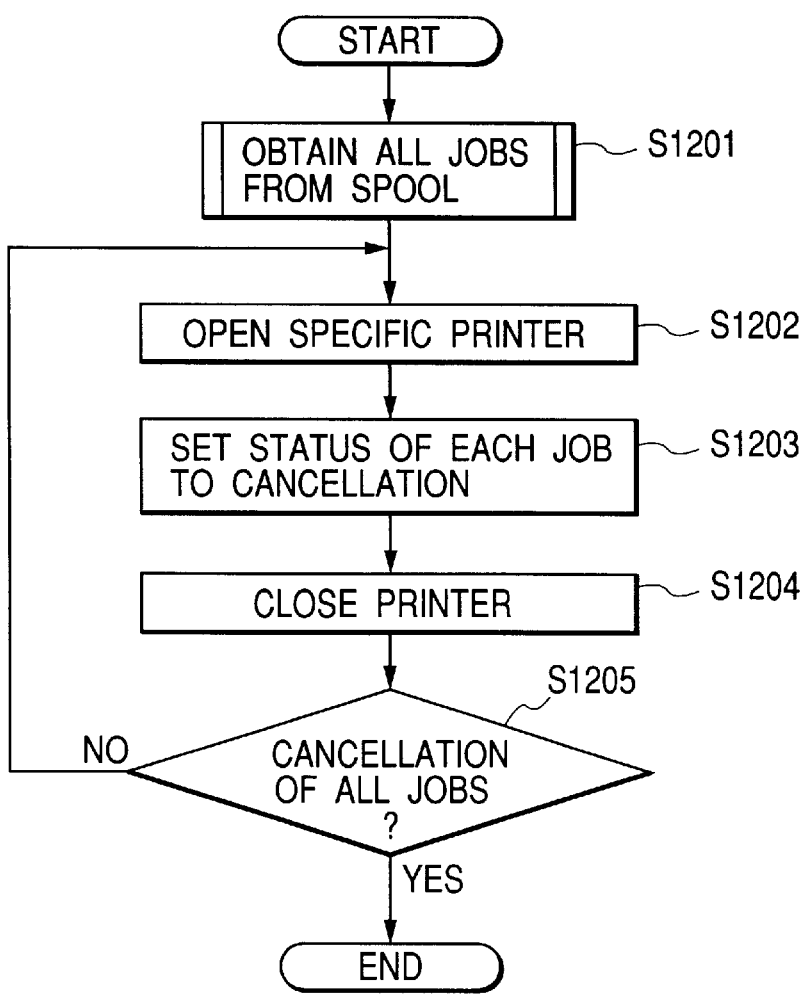
FIG. 12 is a flowchart showing the CancelAllPrinterjobs processing.

The server component 103 receives a request from the client component 102 at step S1101, and analyzes this request at steps S1102 to S1103 and performs a corresponding process. As for a request for the display of an Opening-Screen page, at step S1104 the printer status is obtained. As for a Cancel All Jobs request, at step S1105 the CancelAllPrinterJobs( ) function, which will be described later while referring to FIG. 12, is called, and all the jobs are canceled. As for the Cancel/Pause/Restart request, at step S1106 the SetPrinterJobsStatus( ) function is called, and a designated status is set for the job.

For all these requests, at step S1107 a corresponding HTML page is finally prepared, and at step S1108 the HTML page is transmitted to the client component 102. The processing is thereafter terminated.

The processing performed for the request "login" or "logout" will be described later while referring to FIG. 15, and the processing performed for the request "GotoOtherDevice" or "GotoDesktop" will be described later while referring to FIG. 16. Further, the processing performed for the request "Search", "Help" or "Receive Job/Receive Notification" will be described later while referring to FIG. 17, and the processing performed for the request "Print", "Send", "Delete", "Reschedule" or "Preview" will be described later while referring to FIG. 22.

FIG. 12 is a flowchart showing the CancelAllPrinterjobs processing. The prototype is DWORD CancelAllPrinterjobs( ).

Figure 13:
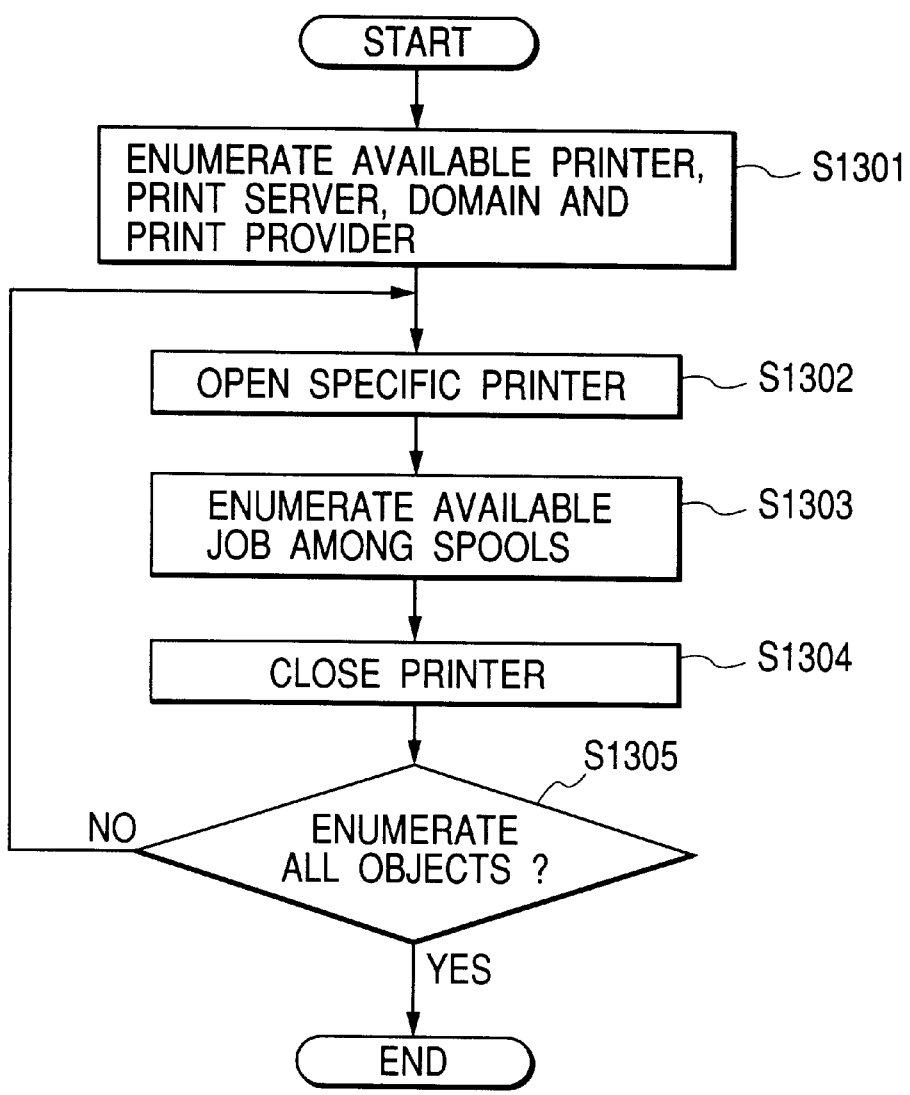
FIG. 13 is a flowchart showing the GetAllPrinterjobs processing.

First, at step S1201 the GetAllPrinterJobs function, which will be described later while referring to FIG. 13, is called, and jobs are obtained from the spool. At step S1202 a specific printer is opened, and at step S1203 the statuses of the individual jobs that are to be canceled are set to "Cancel". Then, at step S1204 the printer is closed. This process is repeated until the statuses of all the jobs have been set to "Cancel".

FIG. 13 is a flowchart showing the GetAllPrinterjobs processing. The prototype is Int GetAllPrinterjobs(pInfo).

First, at step S1301 the EnumPrintero function is employed to list a printer, a print server, a domain and a print provider that are available. At step S1302 one of the listed objects is opened, and at step S1303 a job available in the spool is listed by using the EnumJob( ) function. At step S1304 the printer is closed. This process is performed for all the objects.

Figure 14:
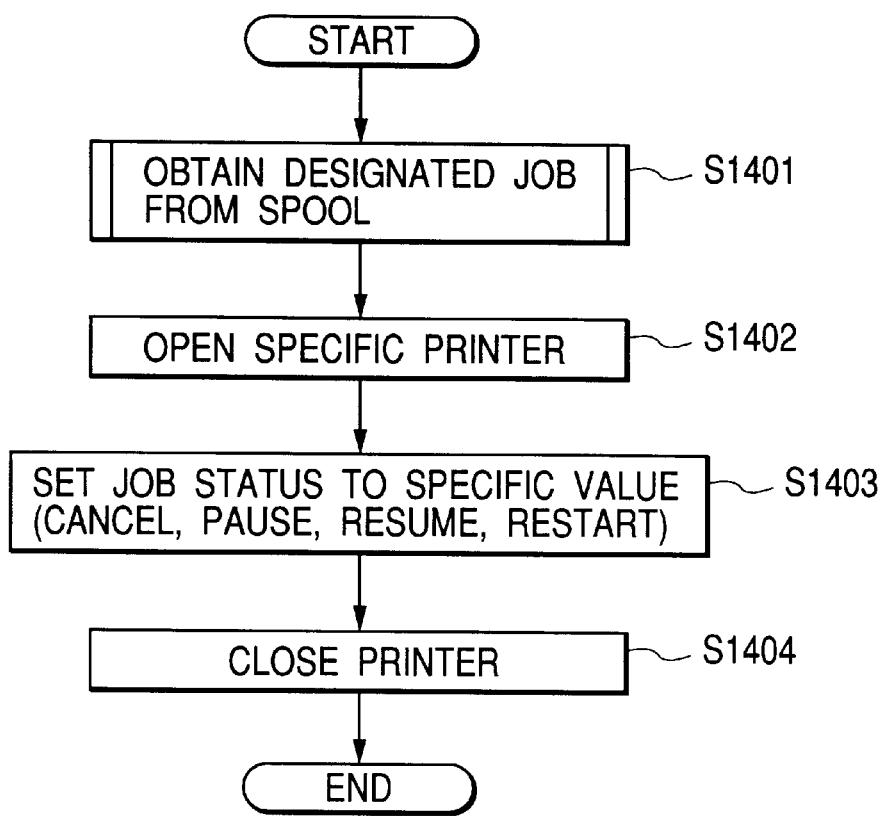
FIG. 14 is a flowchart showing the SetPrinterJobStatus processing.

FIG. 14 is a flowchart showing the SetPrinterJobStatus processing. The prototype is Int SetPrinterJobStatus (pPrinterName, JobId, Status).

First, at step S1401 the GetJob function is employed to extract a designated job from the spool. At step S1402 a specific printer whereat the job is present is opened, and at step S1403 the status of the job is set to a designated value. At step S1404 the printer is closed, and the processing is thereafter terminated.

Figure 15:
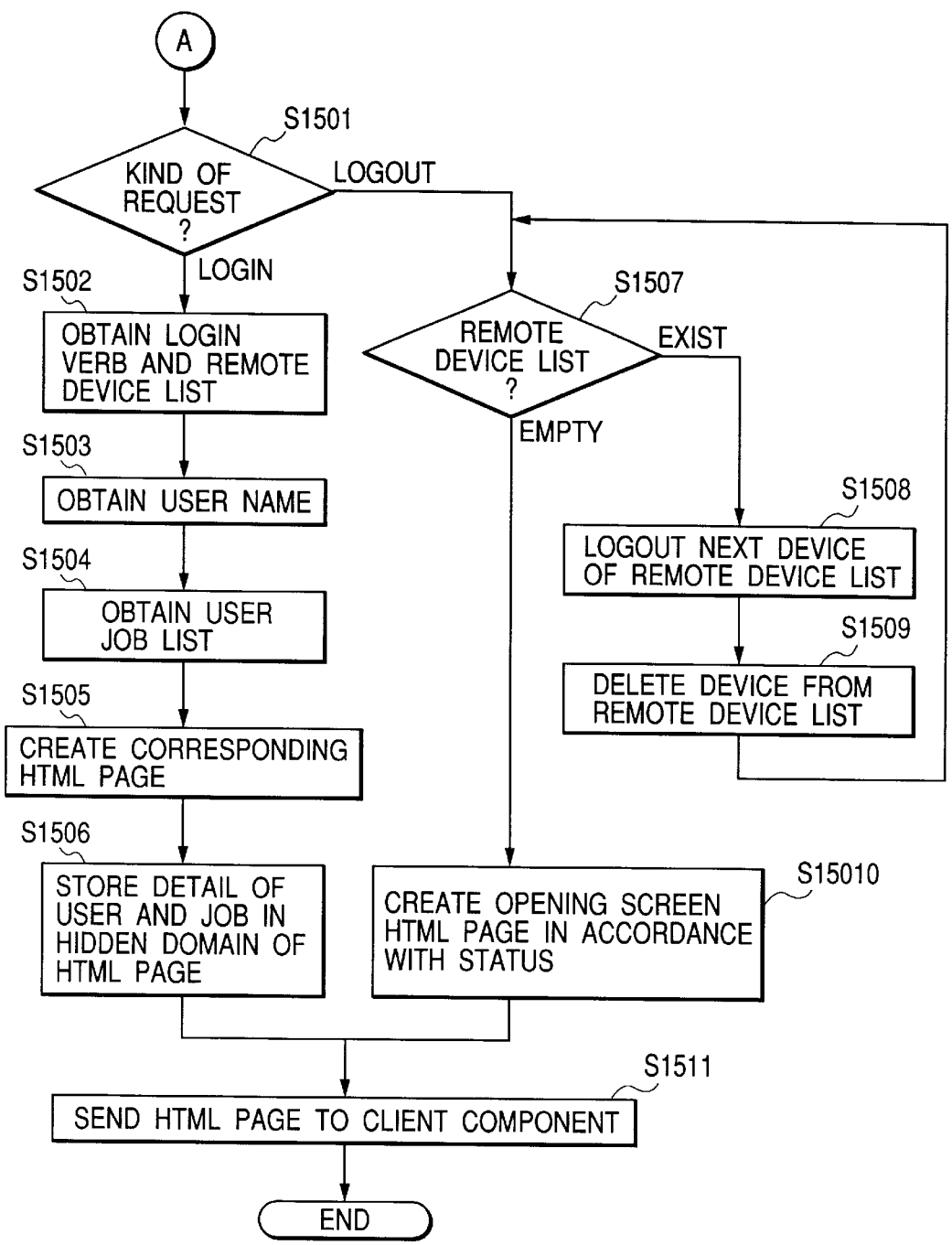
FIG. 15 is a flowchart showing the processing performed for requests "Login" and "Logout"

FIG. 15 is a flowchart showing the processing performed by the server 103 when the request from the client component 102 is "Login" or "Logout".

When at step S1501 the request is "Login", first, at step S1502 a login verb and a remote device list are obtained, and at step S1503 the name of a user is acquired. At step S1504 the GetUserId( ) function is called to obtain a job list for the user. At step S1505 a corresponding HTML page is prepared, and at step S1506 detailed information for the user and the job are stored in a hidden domain on the HTML page.

When the request from the client component 102 is "Logout", at step S1507 a check is performed to determine whether the remote device list is empty. When the list is empty, at step S1510 the OpeningScreen page is created in accordance with the existing status. When the remote device list is not empty, at step S1508 the next device is logged-in using the login verb "Disconnect", and at step S1509 the device is deleted from the remote device list. The processes at steps S1508 and S1509 are repeated until the list is emptied. That is, until all the devices in the remote device list are logged out. When the list has been emptied, the OpeningScreen page is prepared.

For both of the requests "Login" and "Logout", at step S1511 the obtained page is finally transmitted to the client component 102, and the processing is thereafter terminated.

Figure 16:
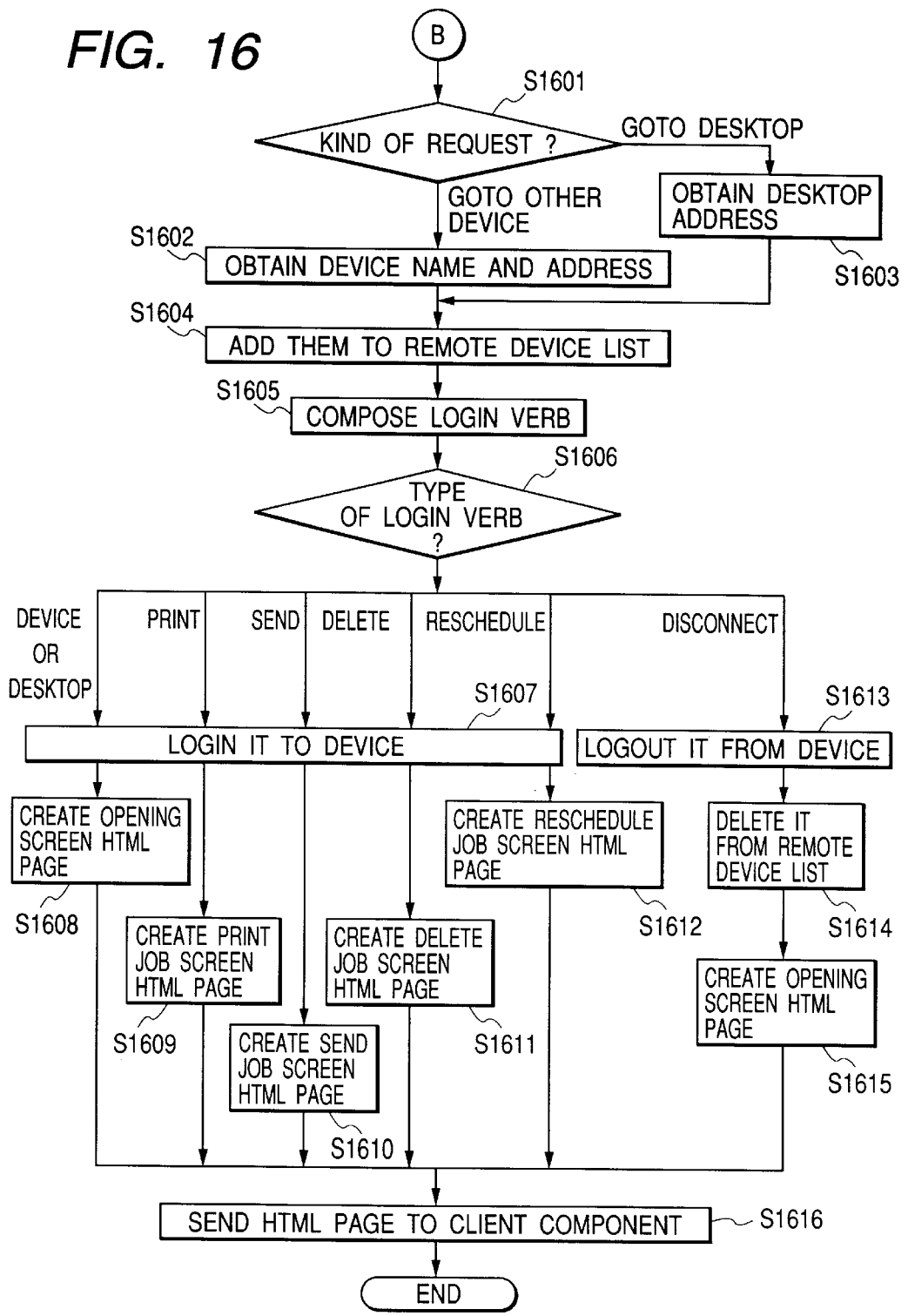
FIG. 16 is a flowchart showing. the processing performed for requests "GotoOtherDevice" and "GotoDesktop"

FIG. 16 is a flowchart performed by the server when the request from the client component 102 is "GotoOtherDevice" or "GotoDesktop".

When at step S1601 the request is "GotoOtherDevice", at step S1602 a device name and a device address are acquired. For the GotoDesktop request, at step S1603 a desktop address is acquired. Then, at step S1604 the pertinent device is added to the remote device list, and at step S1605 a login verb is composed. When at step S1606 the type of the login verb is Device or Desktop, Print, Send, Delete or Reschedule, at step S1607 the device is logged in using the corresponding login verb. When the login verb is Device or Desktop, at step S1608 the HTML page for the opening screen is prepared. When the login verb is Print, Send, Delete or Reschedule, at steps S1609, S1610, S1611 and S1612, respectively, HTML pages are prepared for the Print Job screen, the Delete Job screen, and the Reschedule Job screen. When the login verb is Disconnect, at step S1613 the processing for the device is logged out, and at step S1614 the pertinent device is deleted from the remote device list. At step S1615 the HTML page for the opening screen is prepared. And, finally, at step S1616 the HTML page is transmitted to the client component 102. The processing is thereafter terminated.

Figure 17:
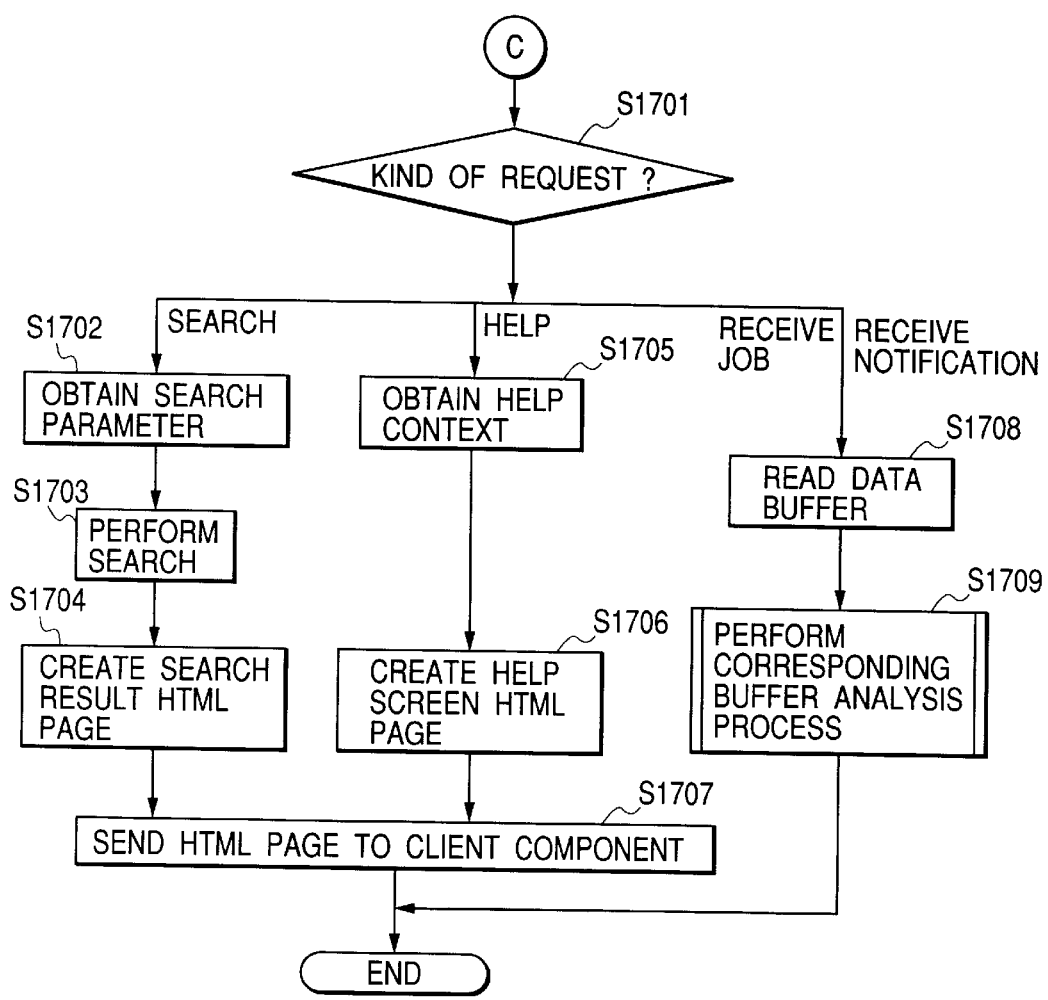
FIG. 17 is a flowchart showing the processing performed for requests "Search", "Help" and "Receive Job/Receive Notification"

FIG. 17 is a flowchart showing the processing performed by the server 103 when the request from the client component 102 is "Search", "Help" or "Receive Job/Receive Notification".

When at step S1701 the request is "Search", at step S1702 a search parameter is acquired and at step S1703 a search is performed. At step S1704 an HTML page is prepared in accordance with the search results. For the Help request, at step S1705 a help context parameter is acquired, and at step S1706 a corresponding HTML page for a help screen is prepared. Finally, for both requests, at step S1707 the HTML page that is created is transmitted to the client component 102, and the processing is thereafter terminated.

When the request type is "Receive Job/Receive Notification", at step S1708 a data buffer is read. For the Receive Job request, at step S1709 the contents of the buffer are transmitted for the IDAnalyze processing, which will be described while referring to FIG. 18. For the Receive Notification request, at step S1709 the contents of the buffer are transmitted for the IDAnalyzeNotify processing, which will be described while referring to FIG. 20. The processing is thereafter terminated.

Figure 18:
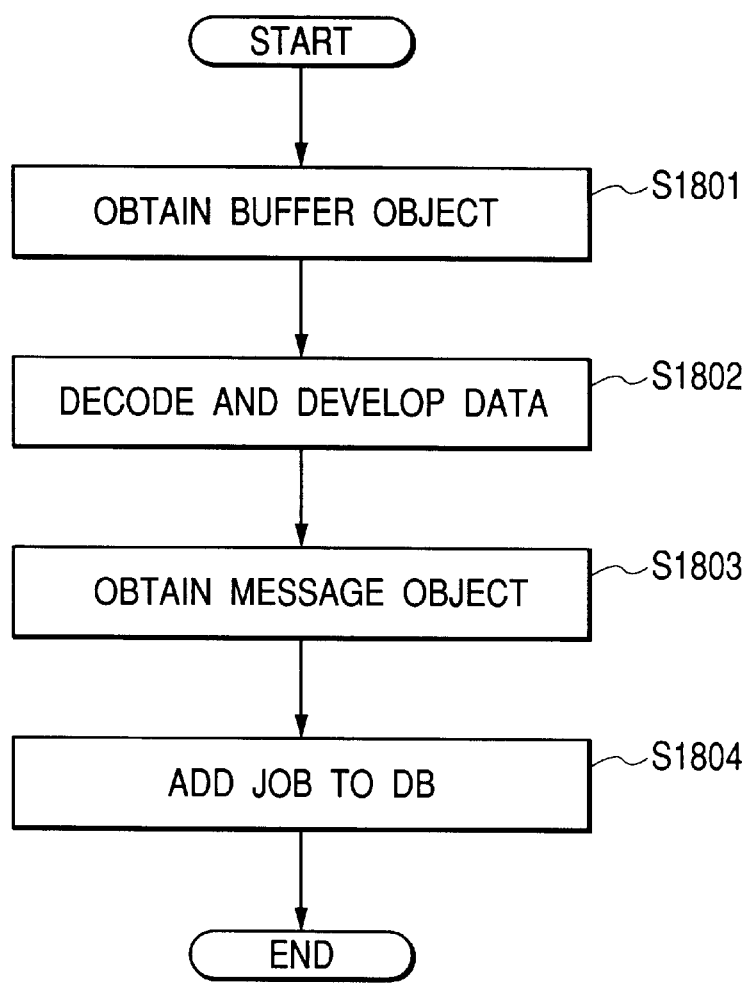
FIG. 18 is a flowchart showing the IdAnalyze processing.

FIG. 18 is a flowchart showing the IdAnalyze processing. During this processing, a job received as row data from another device is interpreted. This job is added to the database 104 and is executed by the daemon module 105.

At step S1801 the Demarshal function is called to perform the demarshal calculation, and an available buffer object is obtained. At step S1802 the UnformatData function is employed to decode and develop compressed data, and the data can be validated as units of rows. At step S1803 the Demarshal function is called again, and an available message object is obtained. Finally at step S1804 the ReceiveJob function (DUMMY), which will be described while referring to FIG. 19, is called, and the job is added to the database 104.

Figure 19:
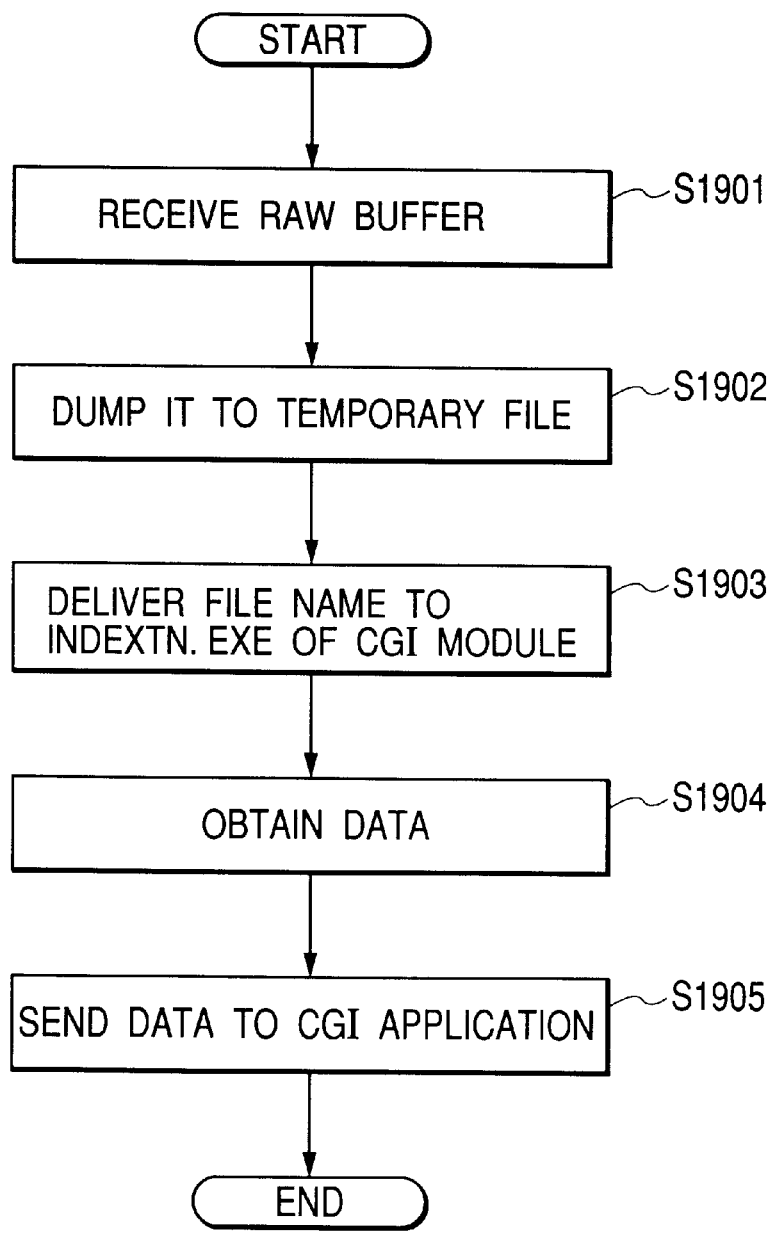
FIG. 19 is a flowchart showing the DUMMY processing.

FIG. 19 is a flowchart showing, the DUMMY processing. This module is transmitted to a CGI application, which is a dummy for an ISAPI expansion "Receive" module that receives a row buffer transmitted by SendJob.

Actually, at step S1901 the ReceiveJob function is read from the row buffer received from SendJob, and at step S1902 the buffer is dumped into a temporary file. At step S1903 the name of this file is transmitted to IDExtn.Exe of the CGI module. At step S1904 the name of the file is read and data are obtained. At step S1905 this module employs the Internet client call to send data to the CGI application.

Figure 20:
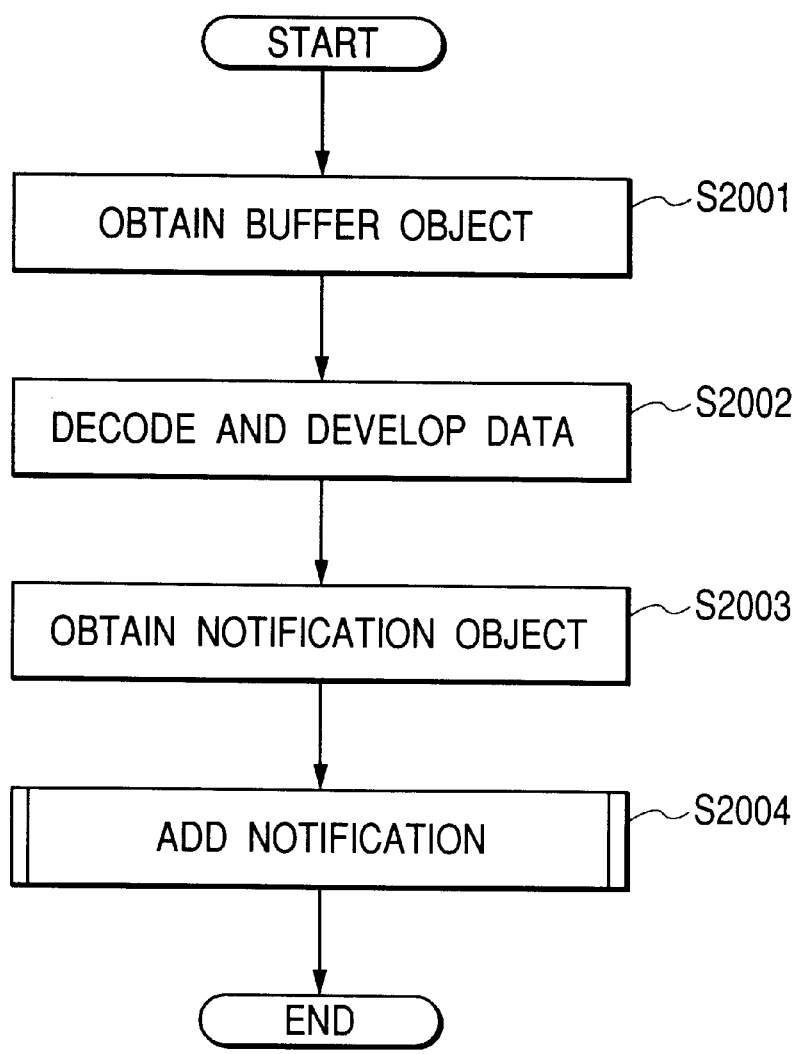
FIG. 20 is a flowchart showing the IdAnalyzeNotify processing.

FIG. 20 is a flowchart for the IdAnalyzeNotify processing. During this processing, a notification that is received as row data from another device of the same type is interpreted. The notification module is added to the processing, and the contents of the notification are performed by the daemon module 105.

Specifically, at step S2001 the Demarshal function is called, and the demarshal calculation is performed to obtain an available buffer object. Then, at step S2002 the UnformatData function is employed to decode and develop compressed data, and the available data are obtained as units of rows. At step S2003 the Demarshal function is called again, and an available message object is obtained. Finally, at step S2004 the ReceiveHttpNotification function, which will be described while referring to FIG. 21, is called and the job is added to the database 104.

Figure 21:
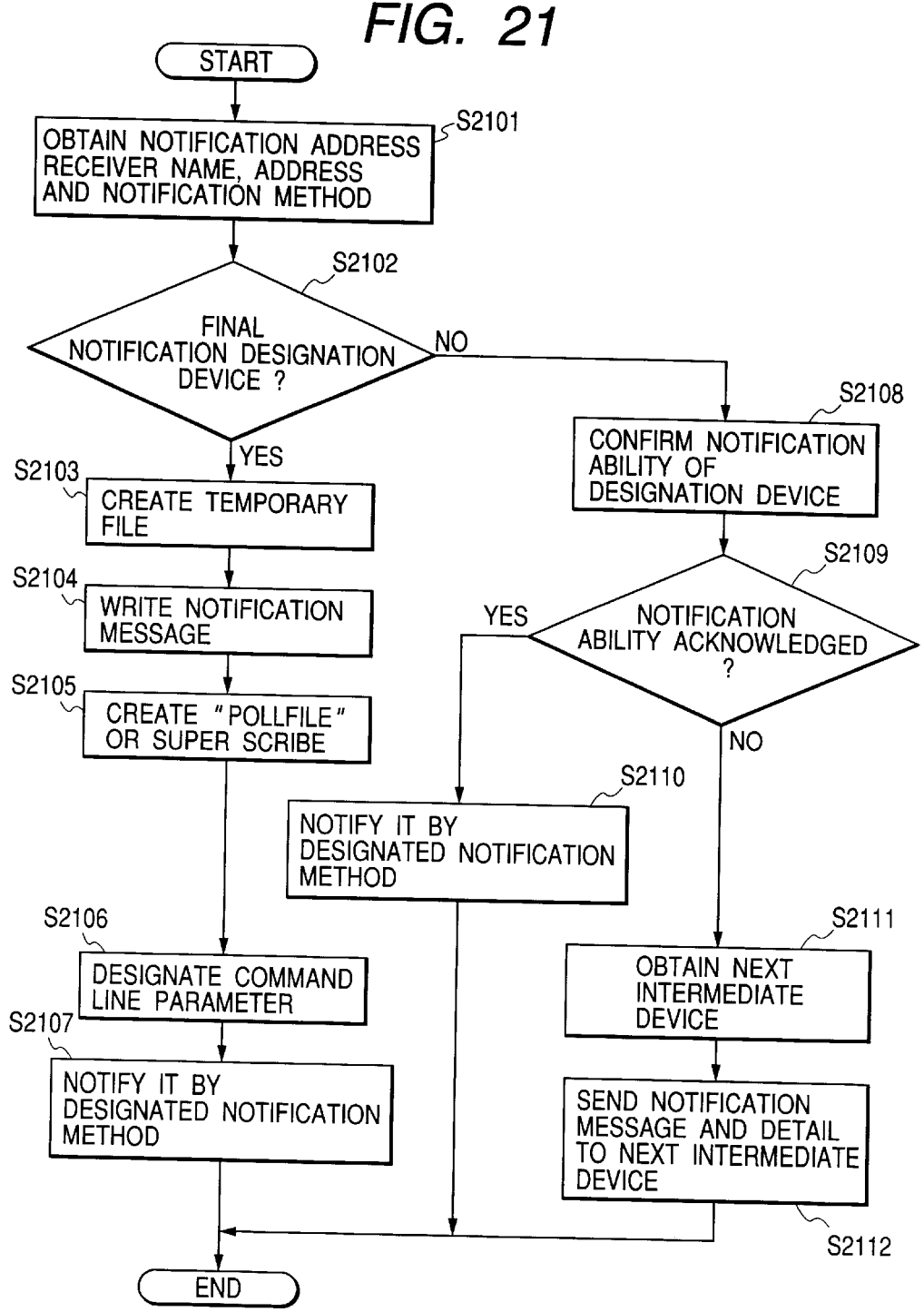
FIG. 21 is a flowchart showing the ReceiveHttpNotification processing.

FIG. 21 is a flowchart showing the ReceiveHttpNotification processing. The prototype is Void CIDAction::ReceiveHttpNotification(poNotify).

This function is one used for receiving a notification transmitted according to the HTTP protocol. Even if the device does not support a requested notification method, the notification can be transmitted to the destination device via an intermediate device.

At step S2101 the name and the address of a notification receiver, and a notification method are obtained. At step S2102 a check is performed to determine whether the device is a destination device for receiving the notification, or an intermediate device for relaying the notification to another device.

If the device is the final destination, at step S2103 a temporary file is created, and at step S2104 the notification message is written to the file. At step S2105 a fixed file "pollfile" (a file polled by the daemon module 105) in the Windows directory is created and overwritten. At step S2106 a command line parameter for a notification module (a module for displaying or creating a message) is designated in the file. And at step S2107 the parameter is transmitted by a designated notification method.

If the device is an intermediate device, at step S2108 a check is performed to determine whether the device has a function for issuing a notification. If the device can issue a notification, at step S2110 the device transmits a notification to a designated device using a designated notification method. If the intermediate device does not have a function for issuing a notification, at step S2112 a notification in accordance with HTTP protocol is transmitted to another intermediate device.

Figure 22:
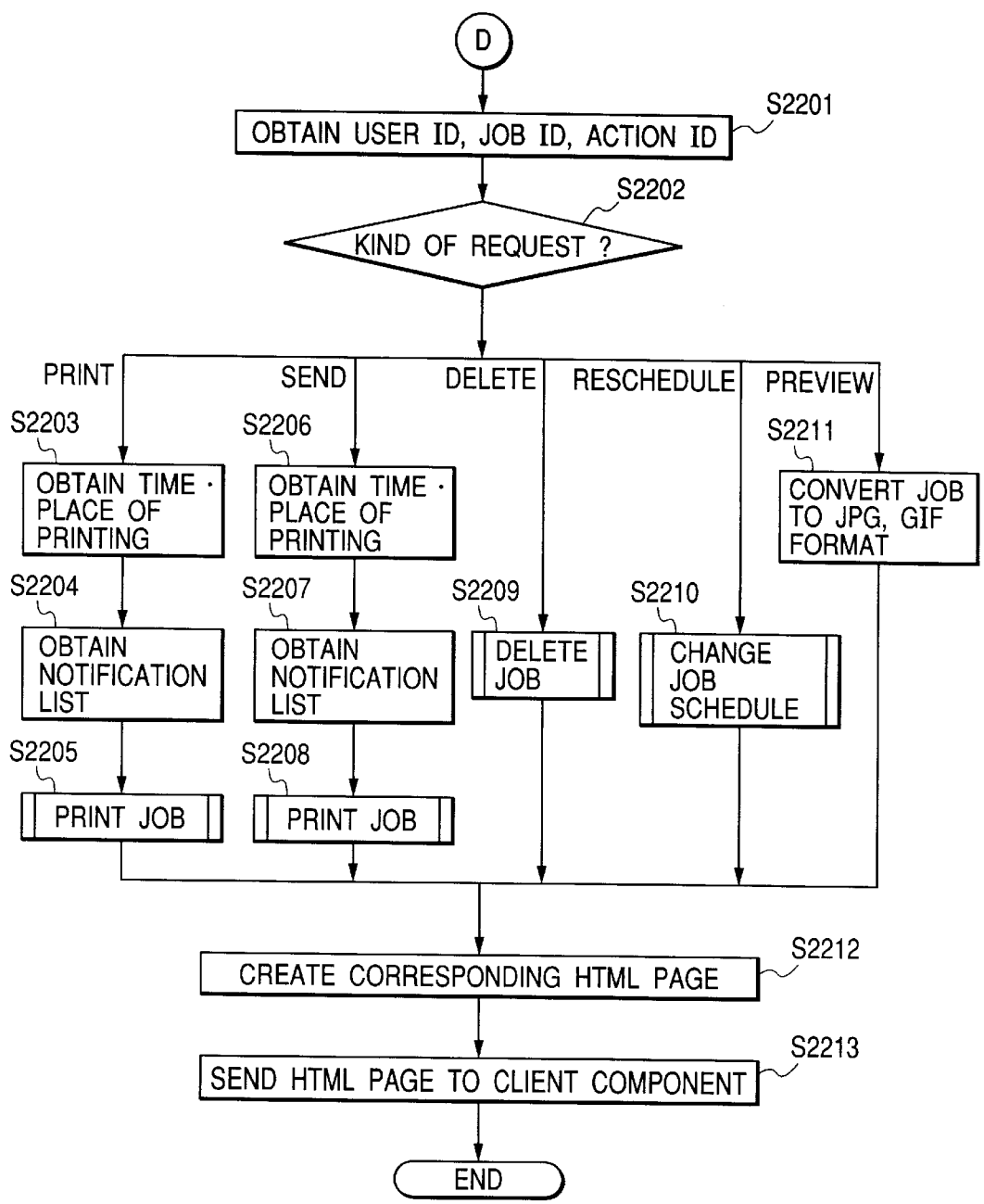
FIG. 22 is a flowchart showing the processing performed for requests "Print", "Send", "Delete", "Reschedule", and "Preview"

FIG. 22 is a flowchart showing the processing performed by the server 103 when a request from the client component 102 is "Print", "Send", "Delete", "Reschedule" or "Preview".

Upon receiving one of these five requests, first, at step S2201 the user ID, the Job ID and the Action ID are obtained.

When at step S2202 the request is "Print", at step S2203 the time and a place for printing are obtained, and at step S2204 a notification list is acquired. At step S2205 the PrintJob( ) function is called to perform printing.

For the Send request, at step S2206 the time and a place for transmission are obtained, and at step S2207 a notification list is acquired. At step S2208 the SendJob( ) function is called to perform transmission.

For the Delete request, at step S2209 the CancelAction( ) function is called to delete a job.

For the Reschedule request, at step S2210 the RescheduleAction( ) function is called to change a schedule.

For the Preview request, at step S2211 the format conversion library is employed to convert the job into a JPG or GIF format.

For all these requests, at step S2212 a corresponding HTML page is prepared, and at step S2213 the HTML page is transmitted to the client component 102. The processing is thereafter terminated.

Figure 23:
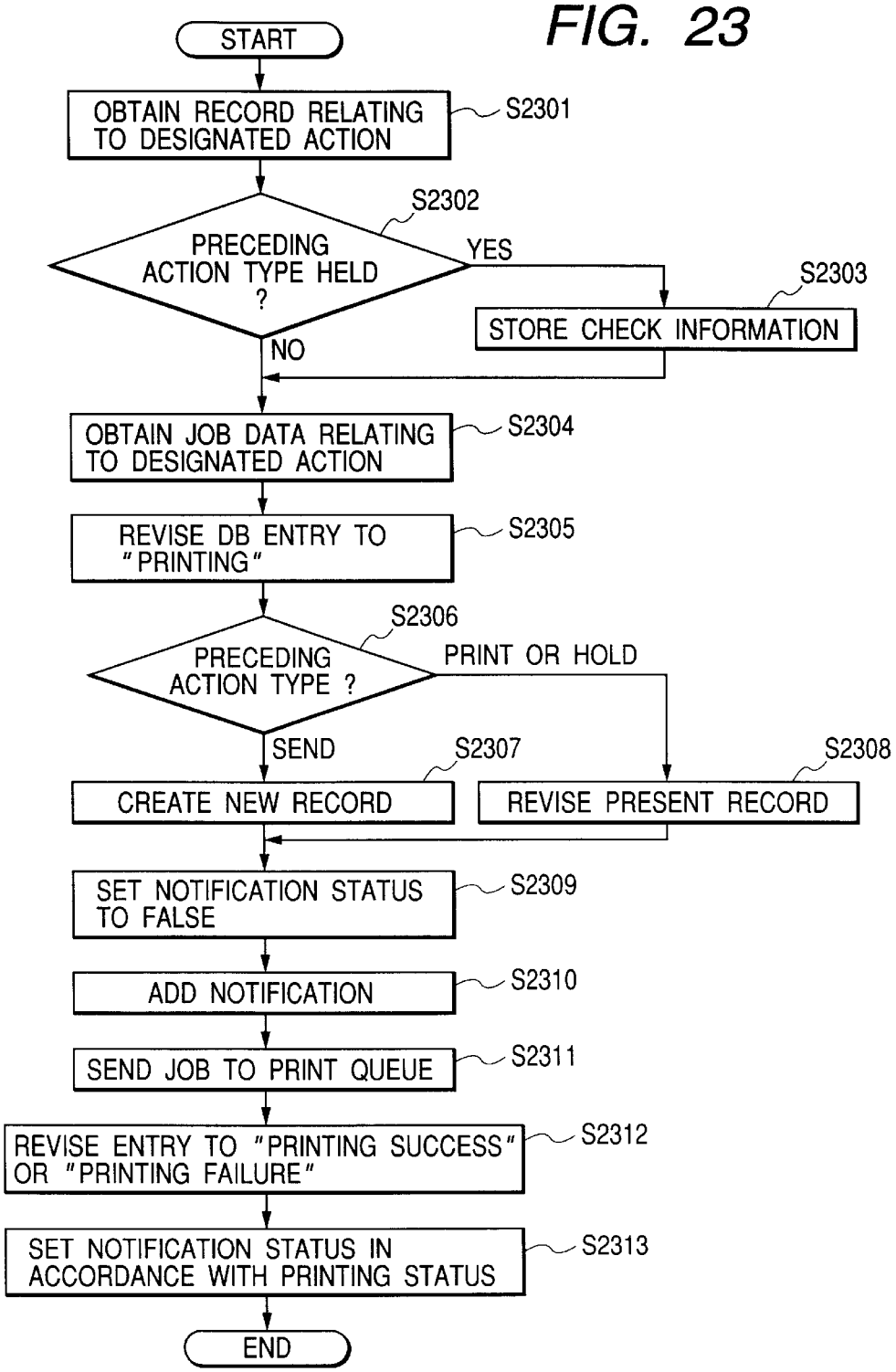
FIG. 23 is a flowchart showing the PrintJob processing.

FIG. 23 is a flowchart showing the PrintJob processing. The prototype is Void CIDAction::PrintJob(ActionId, NotifyList). Input parameters are the ID for a designated action, and a notification setup list for a user. The job is immediately printed by the device A.

When the action ID is Print/Hold, the attributes of the action (the printing time, a notification, etc.) are corrected to a current time and a new notification. When the action ID is Send, a new action is created in the database 104. This depends on whether there is another PrintAction that relates to the job that the user is holding. When the job is printed, the action status is "Done", and this action is one part of the user's history.

At step S2301 a record related to a designated action is obtained to examine the action in detail. At step S2302 a check is performed to determine whether the previous action type is "Hold", and at step S2303 the information is stored. At step S2304 job data required for this action are obtained, and at step S2305 the entry in the database 104 is revised to "Printing" because the daemon module 105 is inhibited from performing the action in this record.

At step S2307 or S2308, a new record is prepared, or the current record is revised. If at step S2306 the previous action was Print/Hold, its record is revised. If the previous action was Send, and if there is no PrintAction for its job that the user is holding, a new record is prepared. Then, the new/old action ID is returned (in accordance with the condition).

At step S2309 the notification status is unconditionally changed to False. At step S2310 the notification is added to the new action, and the user type is set to "Don't care" (i.e., neither a sender nor a recipient exists).

At step S2311 the job is transmitted to a print queue to perform printing using Spooler API Calls. At step S2312 the entry is revised to "Printing successful" or "Printing failure". At step S2313 the notification status is set in accordance with the printing status.

Figure 24:
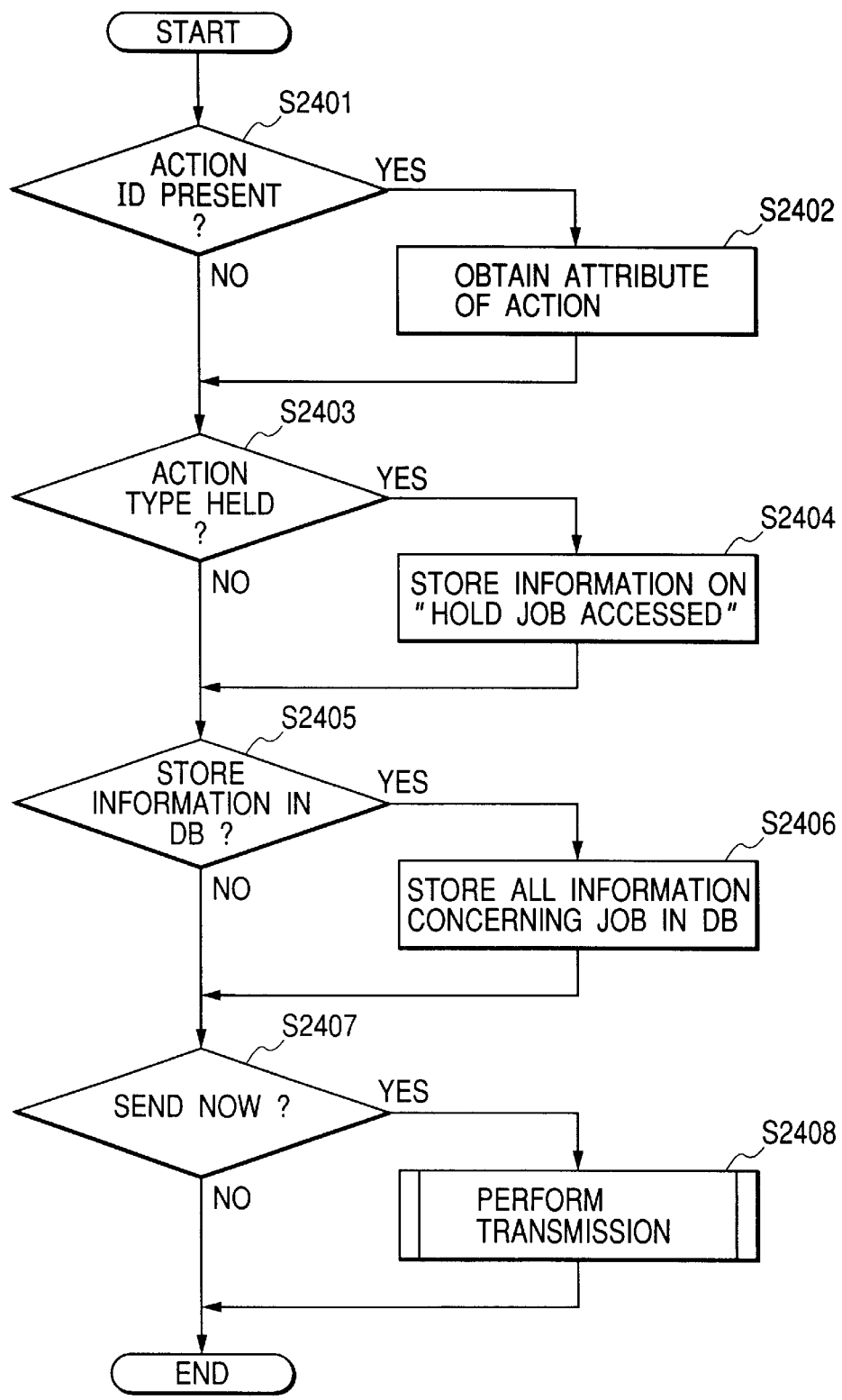
FIG. 24 is a flowchart showing the SendJob processing.

FIG. 24 is a flowchart showing the SendJob processing. The prototype is Void CIDAction::SendJob (bsendjobToDatabase, ActionId, roJobMessage).

A designated "Present" job or a new job is transmitted to a designated receiver device list. For each transmission, a copy is obtained for each device. When there are a plurality of receivers, one the copy of the job is used by them in common. Since information for all the other devices is also transmitted, a specific device can access the job. The HTML protocol is employed for the transmission of the job.

Specifically, at step S2401 a check is performed to determine whether the job is a job wherein the action ID is present, or a new job. When the action ID is present in the job, at step S2402 the attribute of the action is obtained, and at step S2403 a check is performed to determine whether the action type is Hold. When the action type is Hold Job, at step S2404 information is stored indicating that the Hold Job was accessed.

If at step S2405 storage of the information in the database 104 is designated, at step S2406 the SendJob( ) function is called, and all the information (a sender, a receiver, etc.) concerning the job is stored in the database 104. At step S2407 the time is examined to determine whether the job is to be transmitted immediately. If the job need not be transmitted immediately, the processing is terminated and the transmission by the daemon module 105 is waited for. When the job is to be transmitted immediately, at step S2408 the job is transmitted, and the processing is thereafter terminated.

Figure 25:
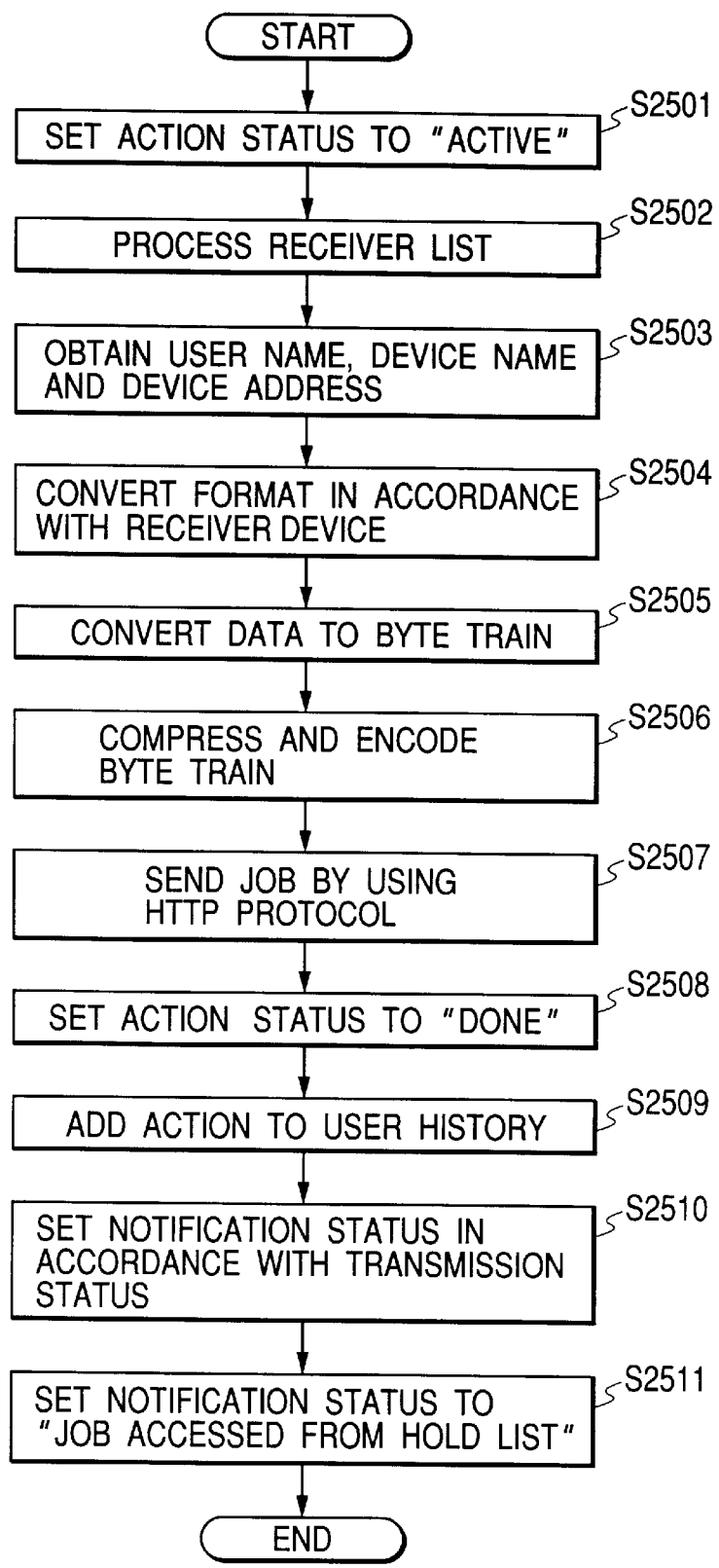
FIG. 25 is a flowchart showing the SendJob transmission processing.

FIG. 25 is a flowchart showing the transmission processing performed using the SendJob( ) function.

First, the EditAction( ) function is called to set the action status to "Active". Then, the receiver list is processed to obtain the user's name, the device name, and the URL address of the device. A format conversion is performed using an appropriate image conversion library that corresponds to the receiver device. Message data are converted into a byte string, which is then compressed and encoded. The obtained data are transmitted using the HTML protocol, and the action status is set to "Done". Furthermore, the action is included in the database 104 as one part of the user's history, and in accordance with the transmission state, the notification status is set to "Success" or "Fail". The status indicating that the job is one in the HeldList that was accessed is set (steps S2501 to S2511).

Figure 26:
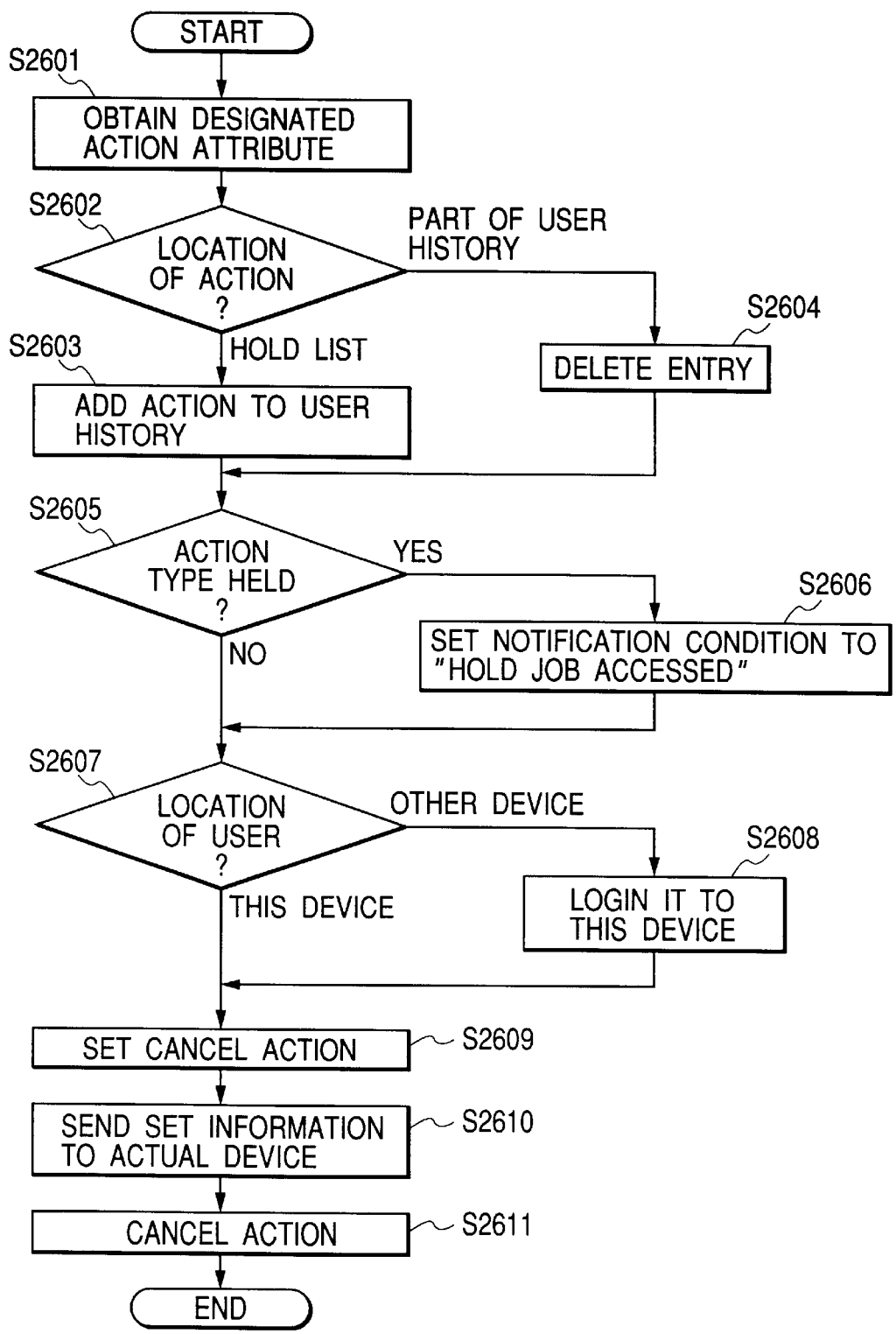
FIG. 26 is a flowchart showing the CancelJob processing.

FIG. 26 is a flowchart showing the CancelJob processing. The prototype is Void CIDAction::CancelJob(dwActionId).

This function is employed to cancel a designated action. Specifically, at step S2601 the attribute of the action is obtained, and the CancelAction( ) function is called to set the action to "Cancel". If at step S2602 the action is included in the Hold list, at step S2603 it is included as a part of the user's history. When the action is already a part of the user's history, at step S2604 the entry is deleted. When at step S2605 the action type is Hold, at step S2606 the notification condition is set to "Accessing the Hold Job". When at step S2607 the user is a receiver for this device, the processing is thereafter terminated. When the user is present for another device, at step S2608 that device is logged in. At step S2609 the details of the action to be canceled are set, and at step S2610 the SendJob( ) function is called to transmit this information to the actual device. As a result, a cancellation of the action is effected.

Figure 27:
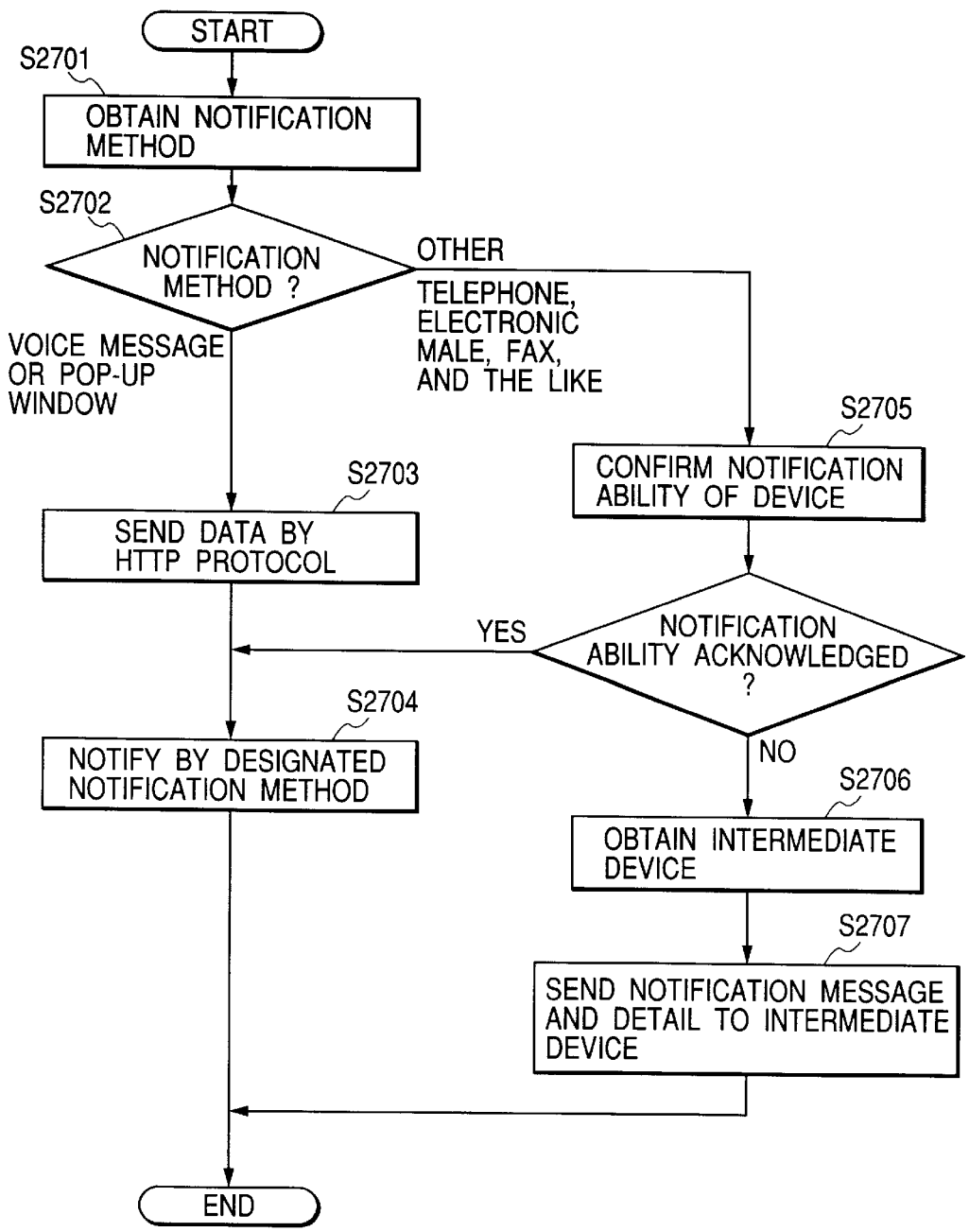
FIG. 27 is a flowchart showing the SendNotification processing.

FIG. 27 is a flowchart showing the SendNotification processing. The prototype is Void CIDAction::SendNotification(dwActionId).

This function is used to effect an actual notification. The transmission of the notification type, such as Popup, is performed using the HTTP protocol. The notification of a call or mail is performed by calling a proper module. When a method that is not supported is designated, a notification is transmitted to a designated intermediate device, which then re-transmits it. This function is employed only when the notification should be transmitted "Now". In this case, the notification status is set to "Done" to prevent the daemon module 105 from polling it.

Specifically, first, at step 82701 a notification means is examined. If at step S2702 the notification means is a popup window or a voice message, at step S2703 data are transmitted using the HTTP protocol. If the notification means is a telephone, at step S2705 a check is performed to determine whether the device possesses a notification capability. If the device possesses such a capability, at step S2704 the notification is sent using the designated method. When the device does not possess the notification capability, at step S2706 an intermediate device is obtained. The intermediate device supports a designated mechanism for issuing a notification. At step S2707 the notification message and its details are transmitted to the intermediate device using the HTTP protocol. This method can be employed for mail, for a facsimile, and for a pager.

FIG. 28 is a diagram showing the relationship between input information for the server 103 and corresponding processes.

The control unit 602 handles the processes for Print Job, Send Job, Cancel Job, and Send Notification and Receive HTTP Notification. This module is a main module for the back end of the printer 206, and performs the operations "Print a job here now", "Print a job here later", "Print a job at a different place now", "Print a job at a different place later", "Transmit a job to another device now, or later", "Change a schedule", "Cancel the action of a job", "Set a notification type (voice, popup window, telephone, E-mail or Fax)", "Receive a notification", and "Obtain or set the status for a device".

This module covers the database module 104 so that the database 104 and calls for it are transparent to a module (a GUI module or a daemon module) that employs the database 104.

Figure 29:
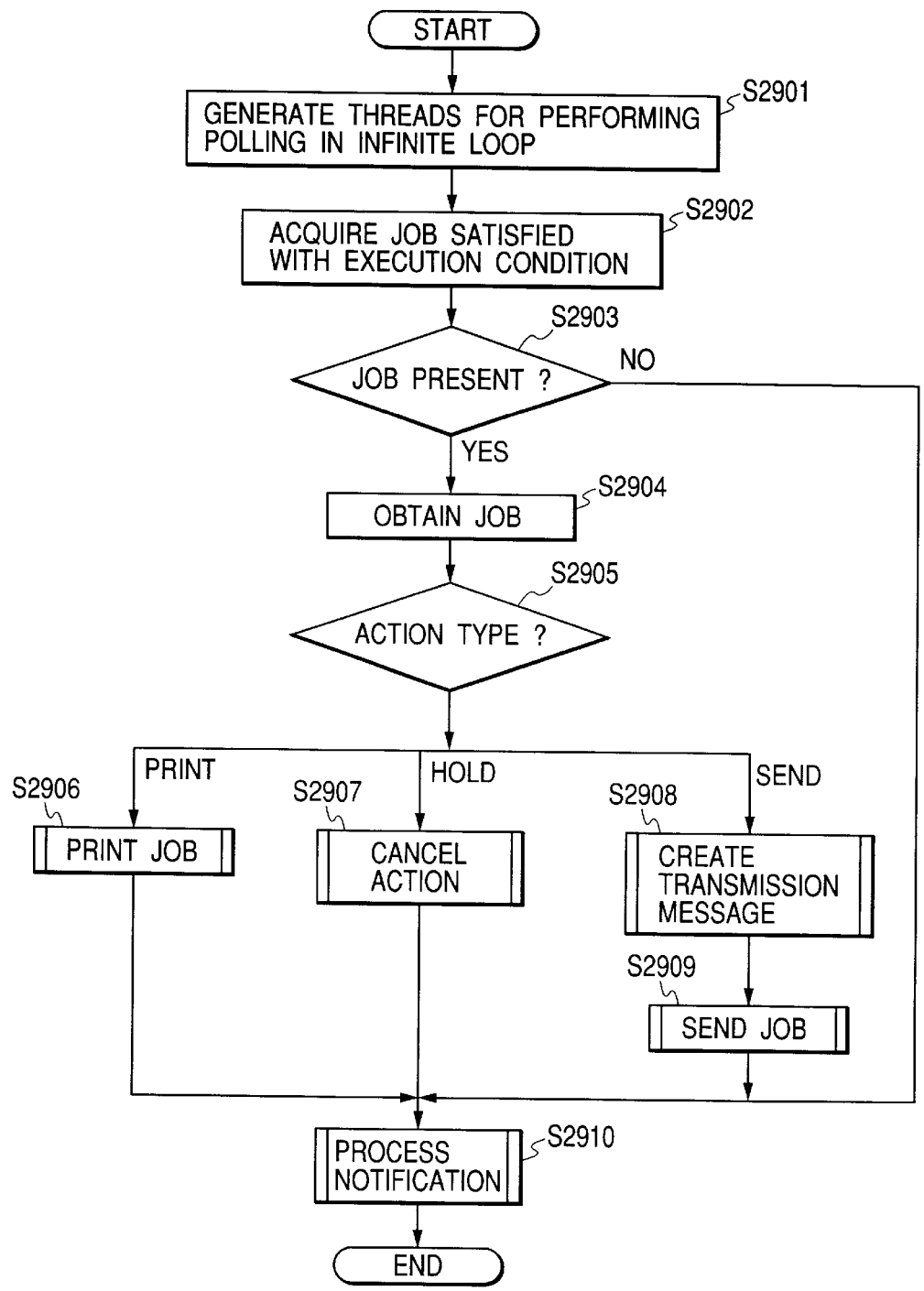
FIG. 29 is a flowchart showing the processing performed beginning with the activation of a daemon.

FIG. 29 is a flowchart showing the processing beginning with the activation of the daemon module 105.

The daemon module 105 constantly polls the database 104 and the files to perform an action or an operation has been registered for execution later. The entries for these actions are prepared in the database 104.

First, at step S2901 threads for performing polling using an infinite loop are generated, and a job to be executed "Now" is polled. When a job (action) is found in the database 104, its action type is examined (steps S2902 to S2905).

When the action type is Print, at step S2906 the PrintJob( ) function is called and printing is performed. When the action type is Send, at step S2908 the ConstructSendMessage( ) function is called and a message is prepared. Then, at step S2909 the SendJob( ) function is called and transmission of the message is performed.

When the action type is Hold, at step S2907 the CancelJob( ) function is called and the job is canceled.

At step S2910 the notification message is processed.

Figure 30:
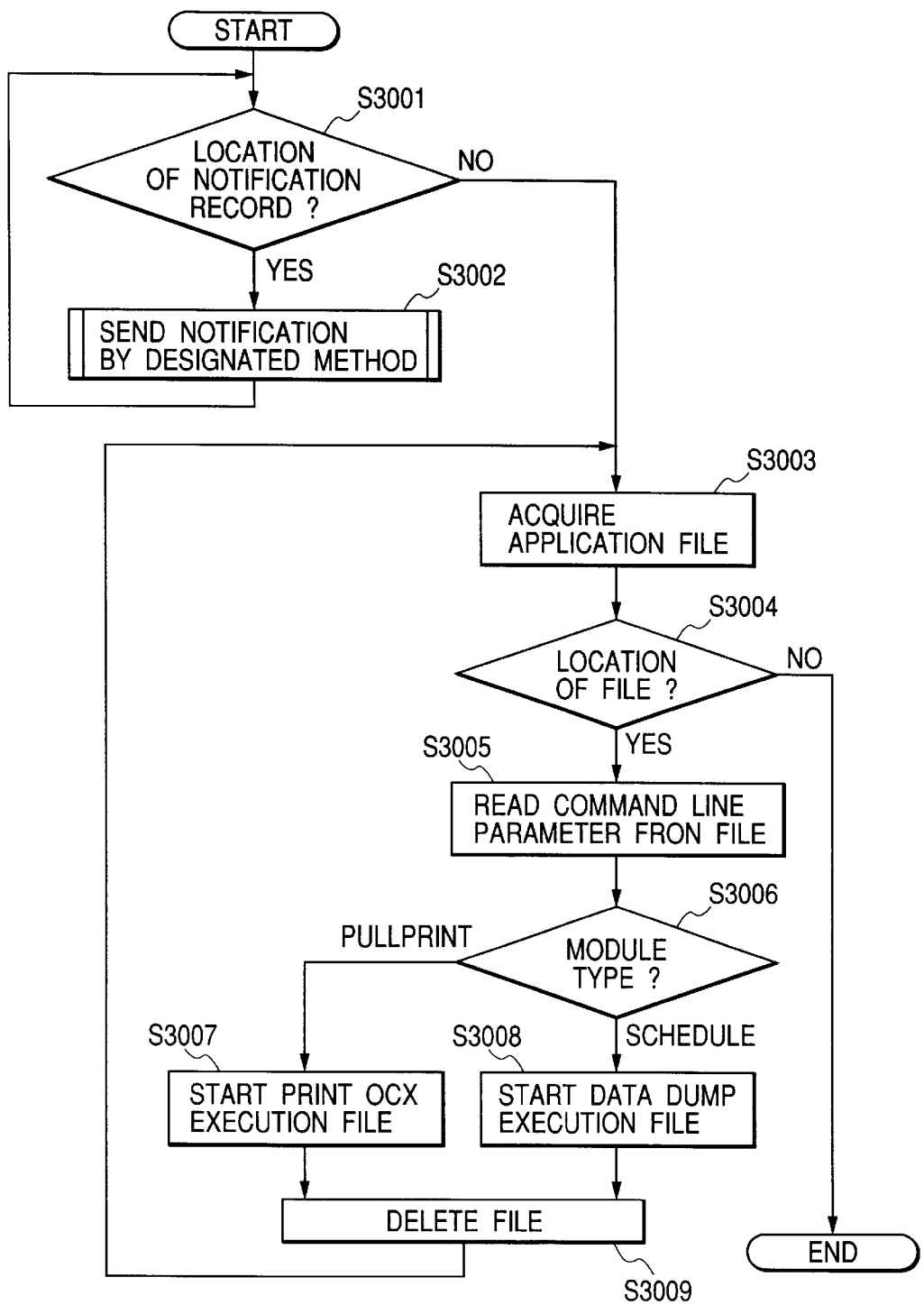
FIG. 30 is a flowchart showing the notification processing performed by a daemon module.

FIG. 30 is a flowchart showing the notification processing performed by the daemon module 105.

At step S3001 the PollNotify( ) function is called to determine whether a notification message to be issued by the device is present. If such a notification message is present, at step S3002 the SendNotification( ) function is called and the notification message is issued. If a notification message to be issued is not present, at step S3003 a check is performed to determine whether an application file is present.

When at step S3004 an application file is present, at step S3005 a command line parameter is read from the file and the file is deleted. TheShowNotify.Exe module is started through which the command line parameter is passed.

When at step S3006 the module type is PullPrint, at step S3007 the PrintOcx.Exe file is started. When the module type is Schedule, at step S3008 the DataDump.Exe is started.

FIG. 31 is a diagram showing the relationship between the job types handled by the daemon module 105 and corresponding processes.

Figure 32:
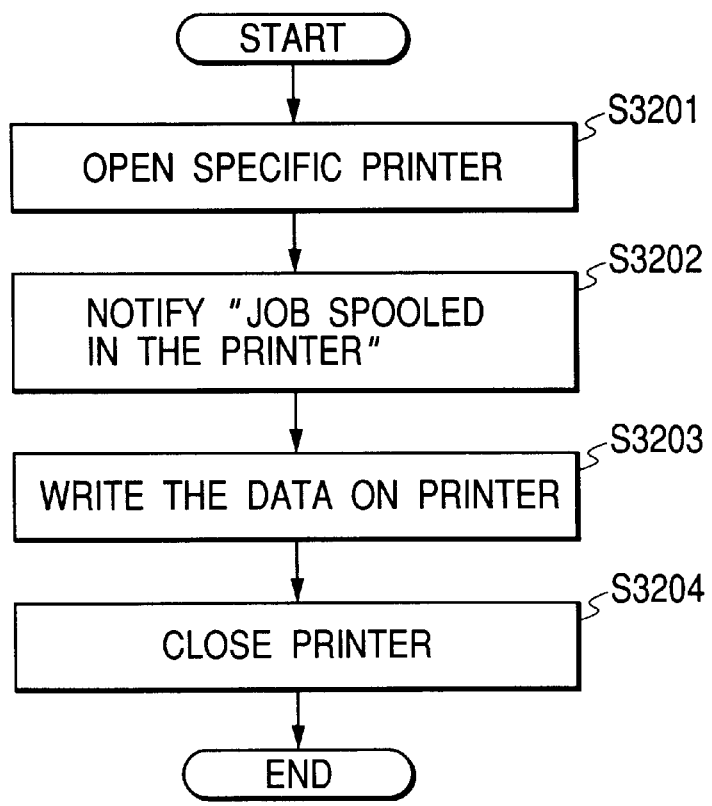
FIG. 32 is a flowchart showing the PrintPrinterJob processing.

FIG. 32 is a flowchart showing the PrintPrinterJob processing. The prototype is IntPrintPrinterJob(pPrinterName, pDocumentName, pVoid, Bufsize).

This function is used for to notify the printer that a job is spooled. Specifically, a designated printer is opened, and notification that a job is spooled is issued to the printer. Data are written to the printer, and then the printer is closed (steps S3201 to S3204).

Figure 33:
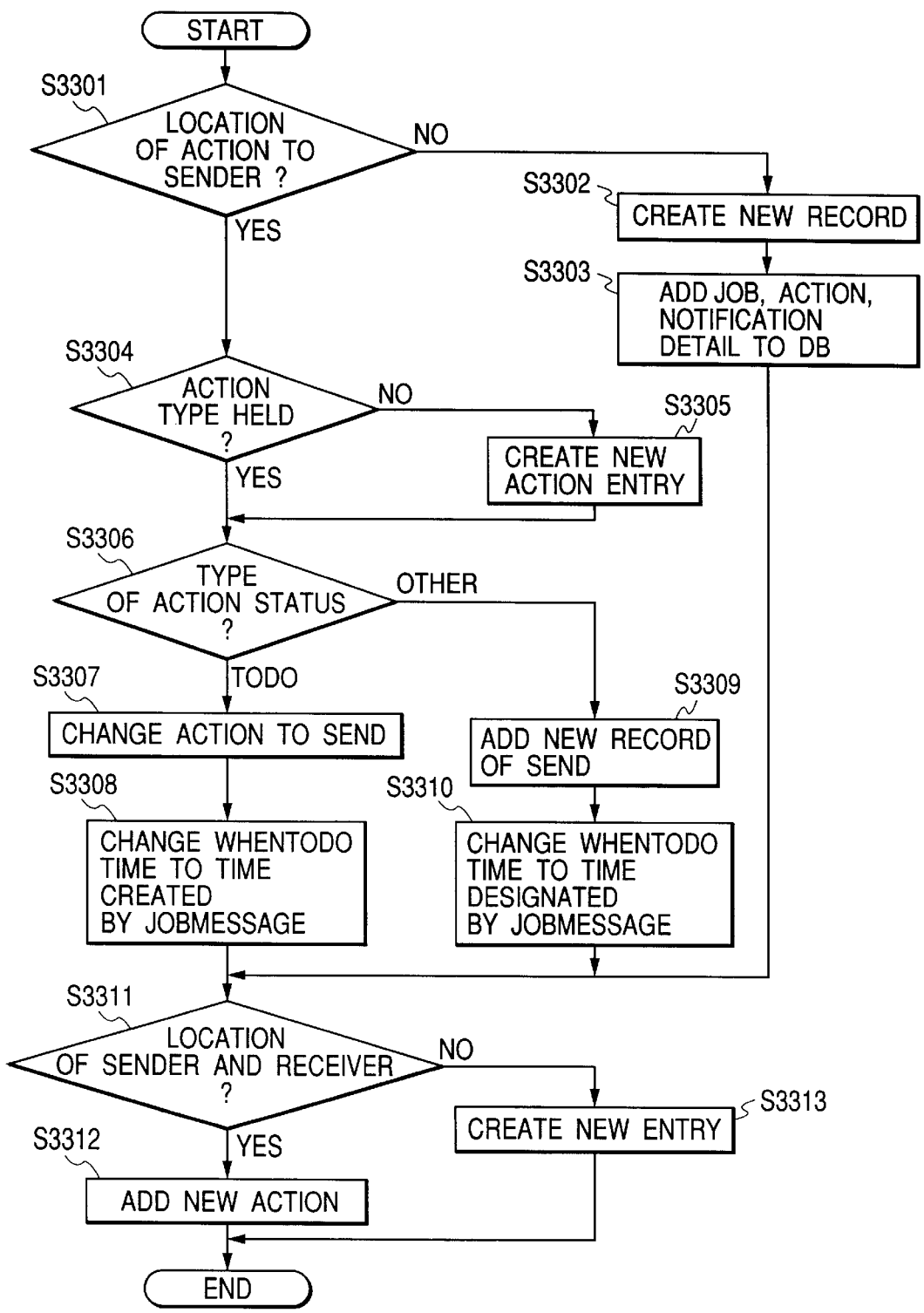
FIG. 33 is a flowchart showing the SendJob processing.

FIG. 33 is a flowchart showing the SendJob processing.

At step S3301 a check is performed to determine whether a job to be transmitted is a new one or one already present in the database 104. When the job is a new one, at step S3303 the details concerning the job are added to the database 104. At step S3311 the sender and receiver of the job are also examined. When these are present in the database 104, at step S3312 a new action is added to the user's ID, and at step S3313 new entries are added to the database 104 for data that are not present in the database 104.

As for the transmission of an already existing job, the action type of the sender is examined. When the action type is Send and the status is Todo or Active, the Whentodo time for the action is changed to a new time that is designated in the job message. When the action type is Send and the action has already been performed, a new action is added to the database 104. When the action type is not Send, the action entered for the job is created in the database 104.

In all the cases, at step S3311 a check is performed to determine whether the receiver of the job is present. When the receiver is not present in the database 104, at step S3313 a new entry is created. When the action type is Hold (S3304) and the action status is Todo (S3306), at step S3307 the action type is changed to Send, and at step S3308 the Whentodo time is changed to a new time designated in the JobMessage. When at step S3306 the action status is not Todo, at step S3309 a new record for the action type Send is created, and at step S3310 the WhenTodoTime is changed to a new time designated in the JobMessage.

Figure 34:
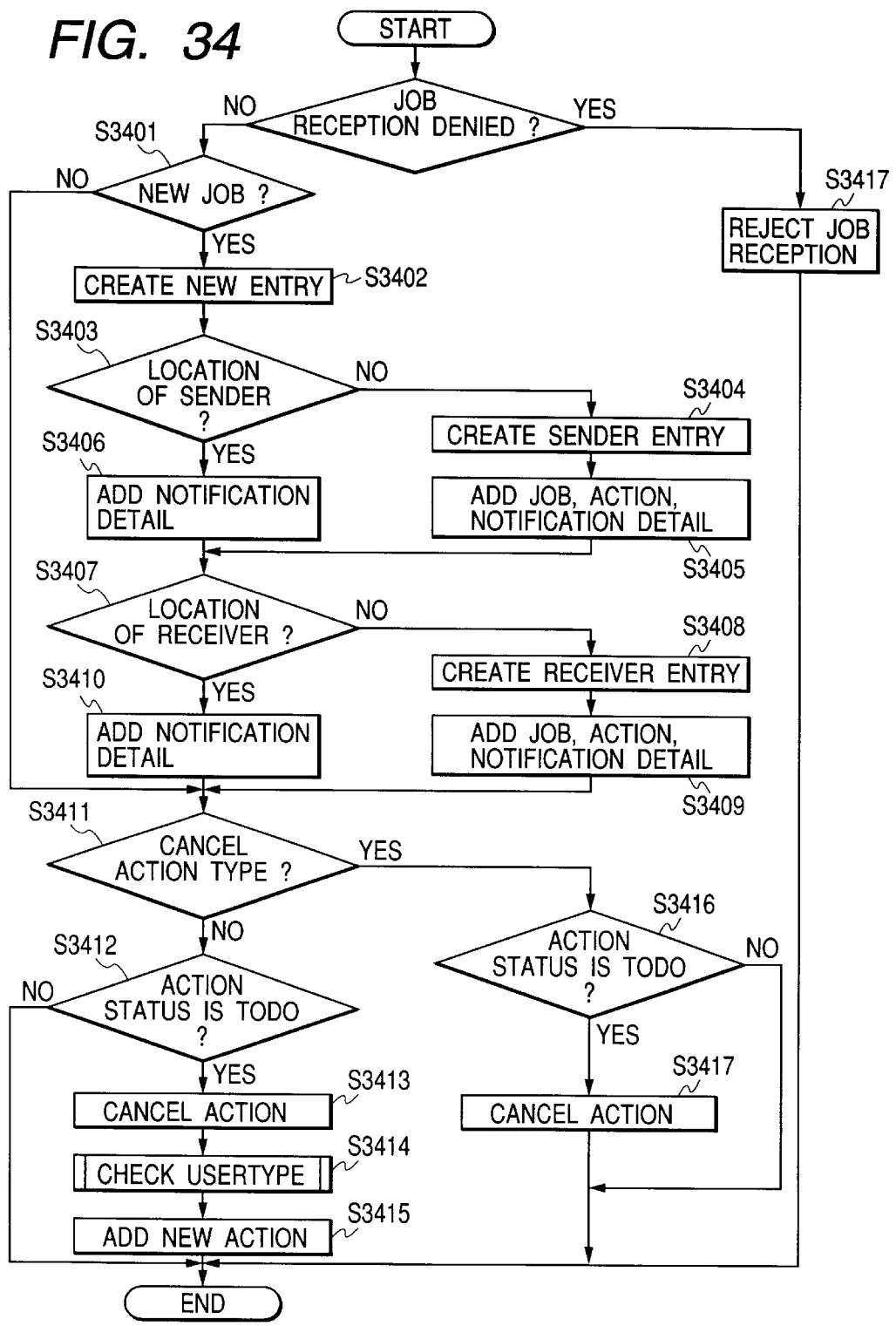
FIG. 34 is a flowchart showing the ReceiveJobData processing.

FIG. 34 is a flowchart showing the ReceivejobData processing.

First, at step S3400 the check item "Deny Jobs From Person/Device" is examined. When a job is transmitted from a transmission source set in that item, at step S3417 acceptance of the job is rejected. This item is set by a manager.

FIG. 134 is a diagram showing a setup screen for the setting up the rejection of a job. In FIG. 134, the identifier for a user from whom jobs are to be rejected is set for "Deny Jobs From Person" and a device from which jobs are to be rejected is set for "Deny Jobs From Device". Then, while referring to FIG. 77, the job is rejected as will be described later in the setup for a command.

The effective period and the types of processes to be rejected may be set. The thus determined check items are examined to determine whether or not the reception of a job from a transmission source user or device is permitted. When the reception of a job is permitted, the reception process is performed.

The job to be received is supposed to be a new one and to be a conventional job.

When a new job is received, at step S3402 a new entry is added to the details for the job. When at step S3403 no sender is present, at step S3404 the entry for a sender is added. At step S3405 the details of the action and the notifications are also added. When a sender is present, at step S3406 the details of the notification are added. If at step S3407 no receiver is present, at step S3408 a receiver is added, and at step S3409 the action performed by receiver is also added.

When a conventional job is received, a receiver for the job is checked. If a receiver is present and can perform the same action as that required for the received job, the action status of the previous job is canceled, and a new record is created. When the existing receiver can perform an action that differs from that for the receiver, a new entry is added for the receiver. The details contained in the notification may also be added. Except when the user type differs, the action status is set to Todo.

Figure 35:
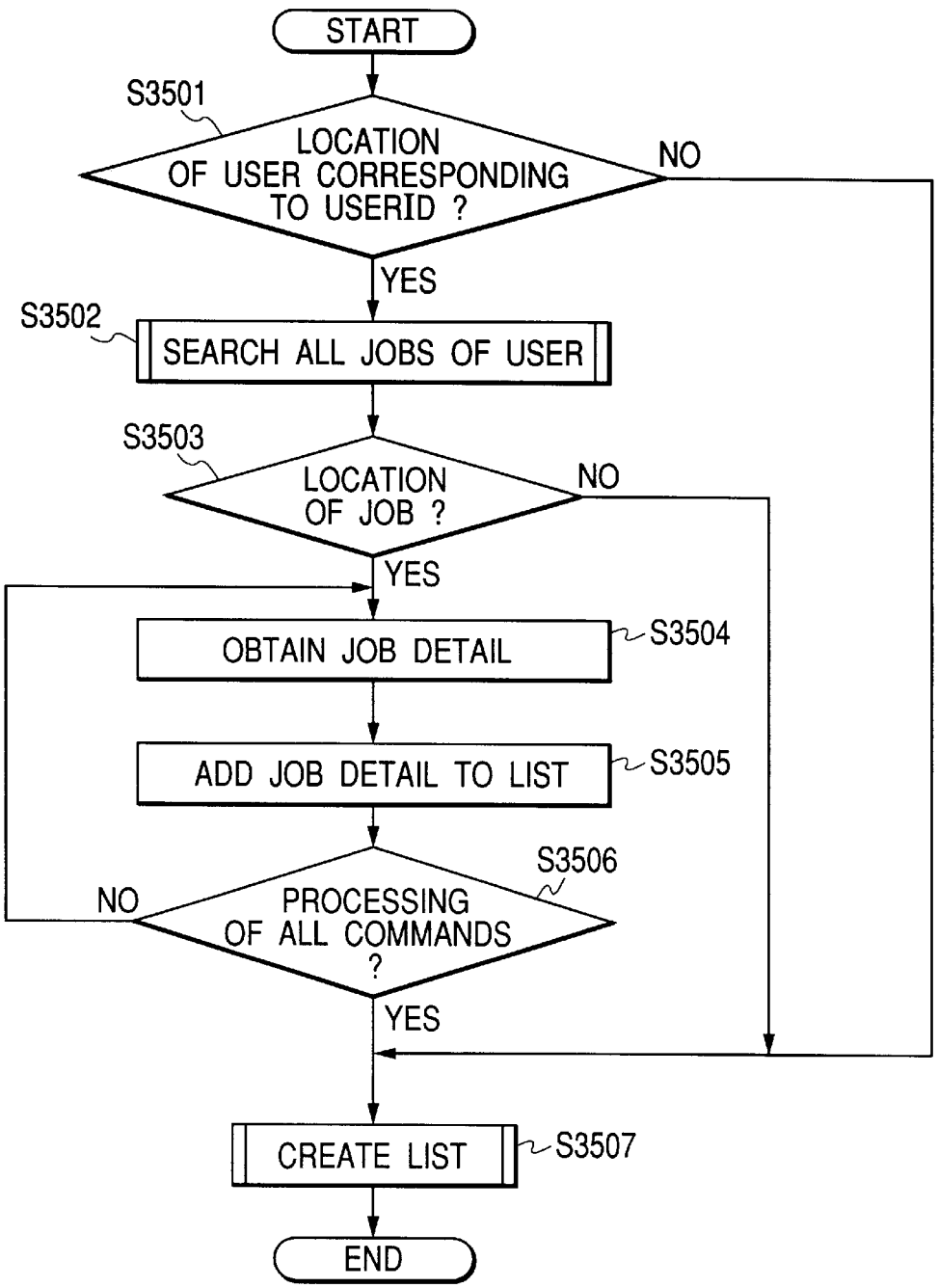
FIG. 35 is a flowchart showing the GetListOfJobAttributes processing.

FIG. 35 is a flowchart showing the GetListOfJobAttribute processing.

All the jobs for a user at a designated place are examined, and the details for all the jobs are obtained. The jobs are Heldjobs and Historyjobs. The database 104 searches for jobs for individual UserIDs, and to obtain a list, all such jobs are selected and entered in the list (steps S3501 to S3507).

Figure 36:
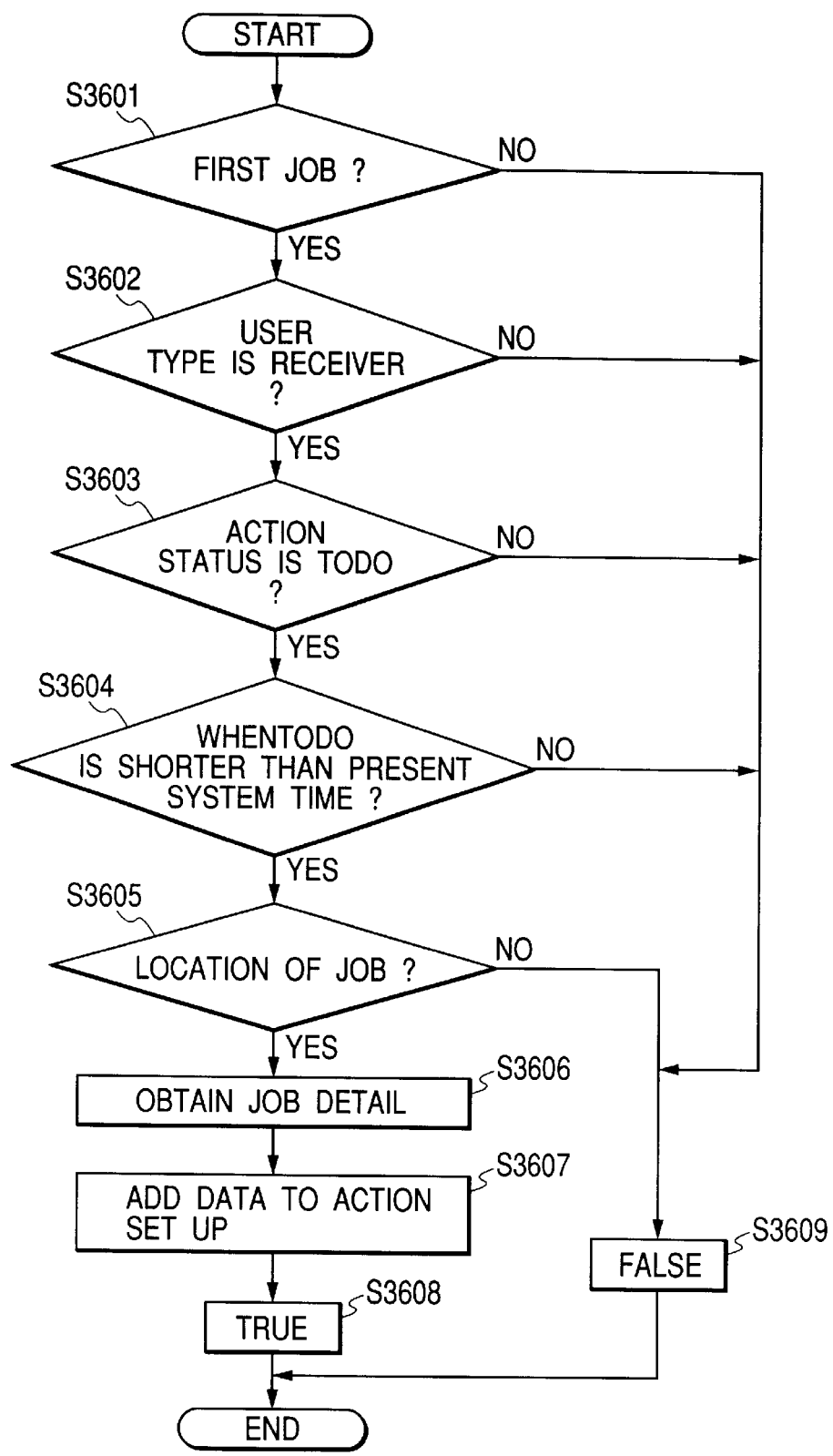
FIG. 36 is a flowchart showing the PollJob processing.

FIG. 36 is a flowchart showing the PollJob processing.

A search is performed for a job for which the user type is Receiver, the action status is Todo, and WhenTodo is shorter than the current system time (steps S3601 to S3605). When such a job is found, the details of the job are obtained and are added to the action setup, and TRUE is returned (steps S3606 to S3608). When no such job as is described above is found, FALSE is returned (step S3609).

Figure 37:
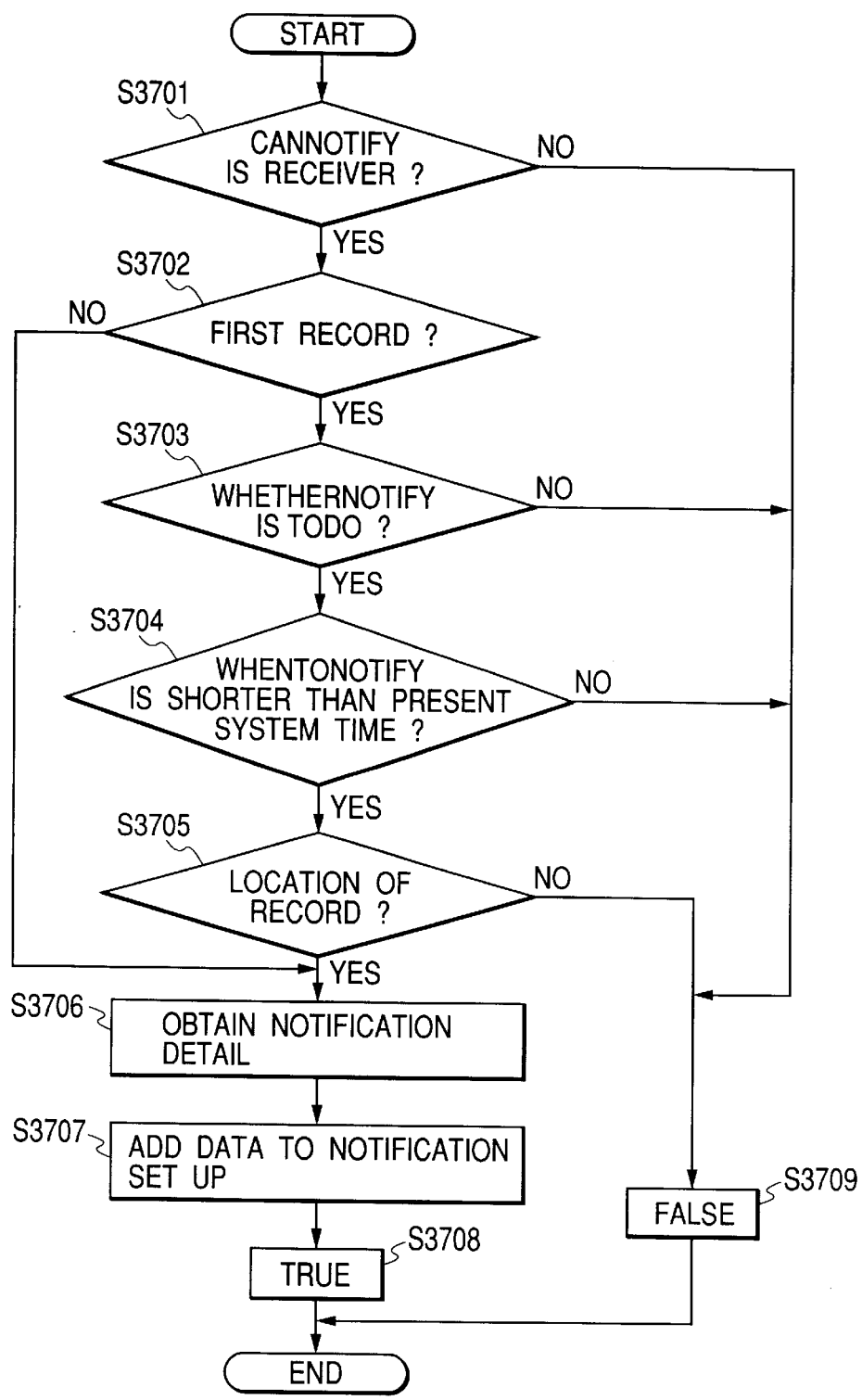
FIG. 37 is a flowchart showing the PollNotify processing.

FIG. 37 is a flowchart showing the PollNotify processing.

A search is performed for a first record for which CanNotify is Receiver, WhetherToNotify is TRUE and WhenToNotify is shorter than the current system time (steps S3701 to S3705). When such a record is found, the details of the notification are obtained and are added to the notification setup, and TRUE is returned (steps S3706 to S3708). When no such job as is described above is found, FALSE is returned (step S3709).

Figure 38:
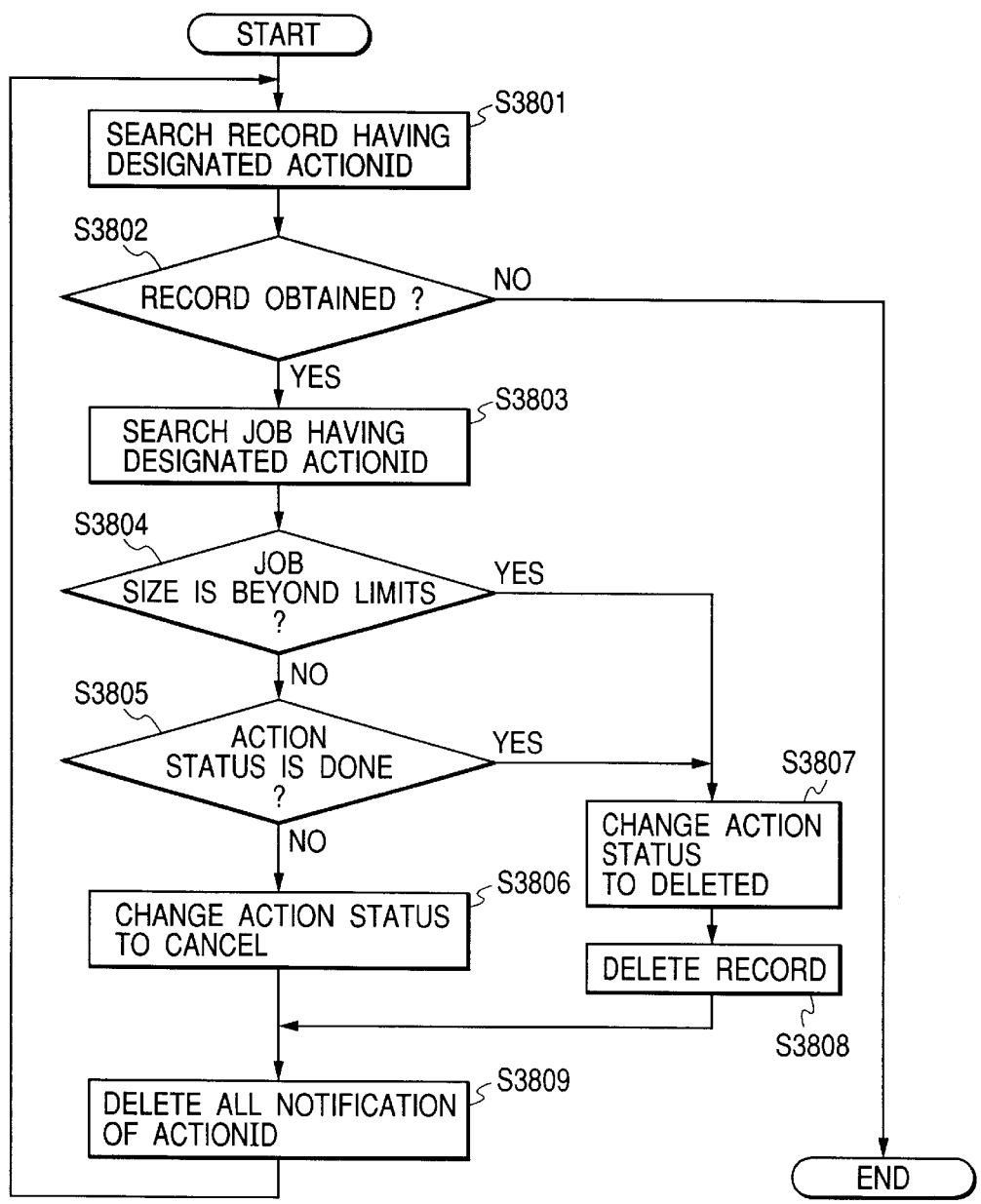
FIG. 38 is a flowchart showing the CancelAction processing.

FIG. 38 is a flowchart showing the CancelAction processing.

First, a search is made for a record having a designated action ID. When such a record is found, a search is made for a job having the same action ID, and the size of the job is obtained (steps S3801 to S3804). When the job size is smaller than the JobSizeLimit set by the manager, at step S3805 the action status is examined. When the action status is "Done", or the job size is equal to or greater than the JobSizeLimit, the action status is changed to "Deleted", and the record is deleted (steps S3807 and S3808). In the other cases, at step S3806 the action status is set to "Cancel", and at step S3809 all notifications corresponding to the action ID are deleted.

Figure 39:
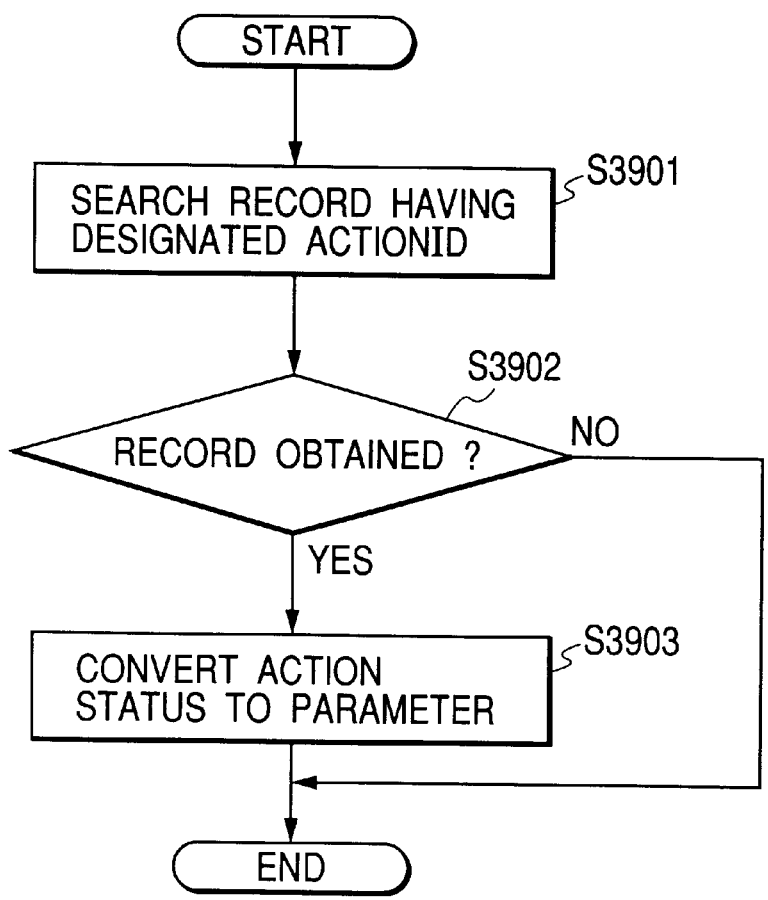
FIG. 39 is a flowchart showing the EditAction processing.

FIG. 39 is a flowchart showing the EditAction processing.

A search is performed for a record having a designated action ID. When such a record is found, the action status is converted into a received parameter (steps S3901 to S3903).

Figure 40:
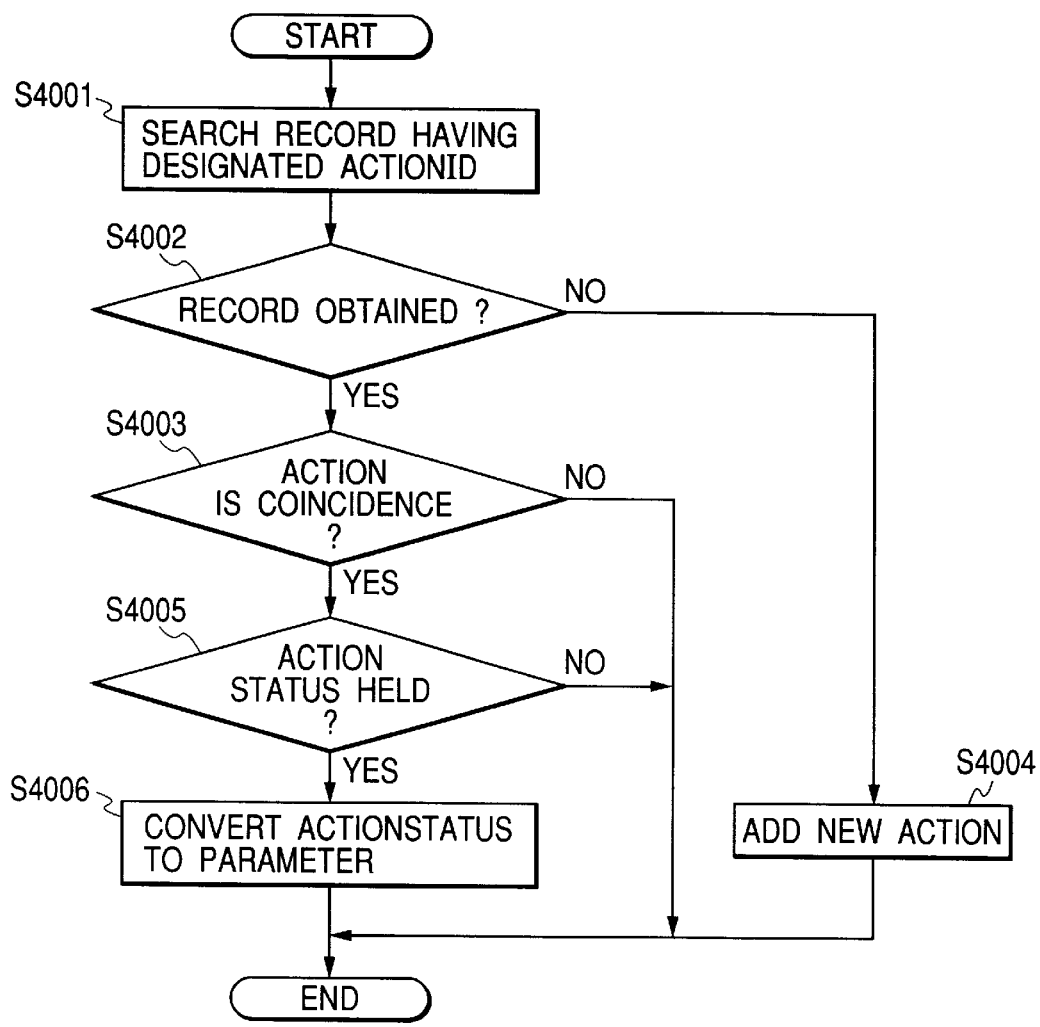
FIG. 40 is a flowchart showing the EditAction processing.

FIG. 40 is a flowchart showing the EditAction processing. The prototype differs from that explained in FIG. 39.

A search is made for a record having a designated action ID. When the action for the pertinent record matches the action designated by the action ID, and when the action status is Hold, the action status is changed to a received parameter (steps S4001 to S4006). When a pertinent record is not found, at step S4004 a new action is added.

Figure 41:
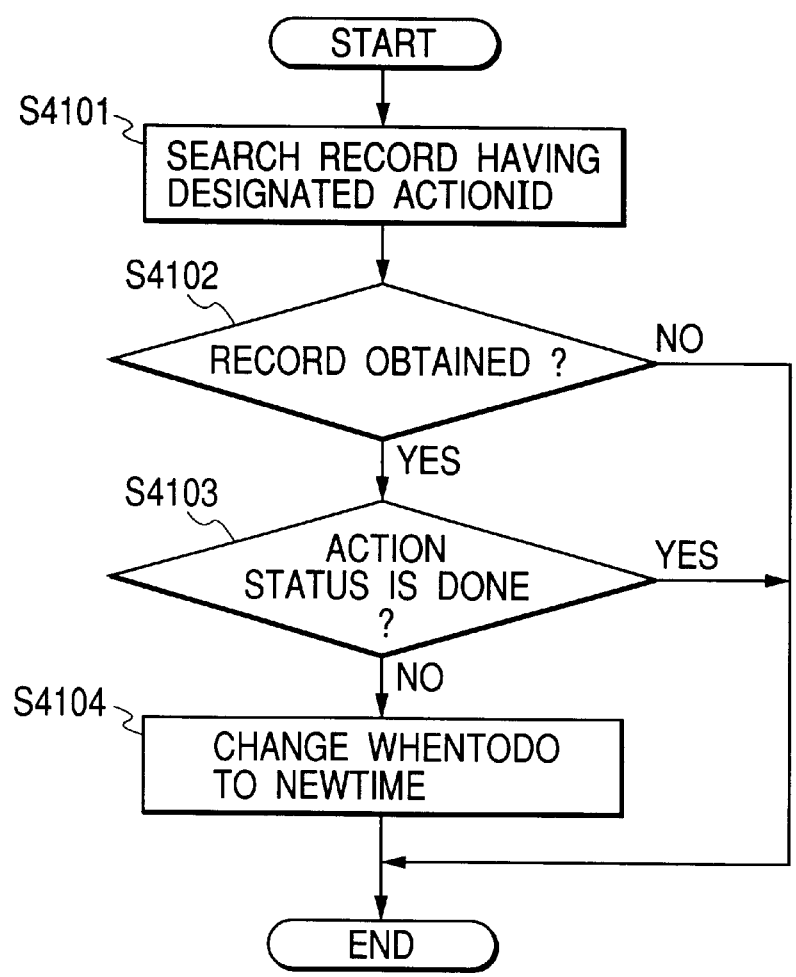
FIG. 41 is a flowchart showing the RescheduleAction processing.

FIG. 41 is a flowchart showing the RescheduleAction processing.

A search is made for a record having a designated action ID. When a pertinent record is found and the action status is not "Done", Whentodo is converted to received NewTime (steps S4101 to S4104).

Figure 42:
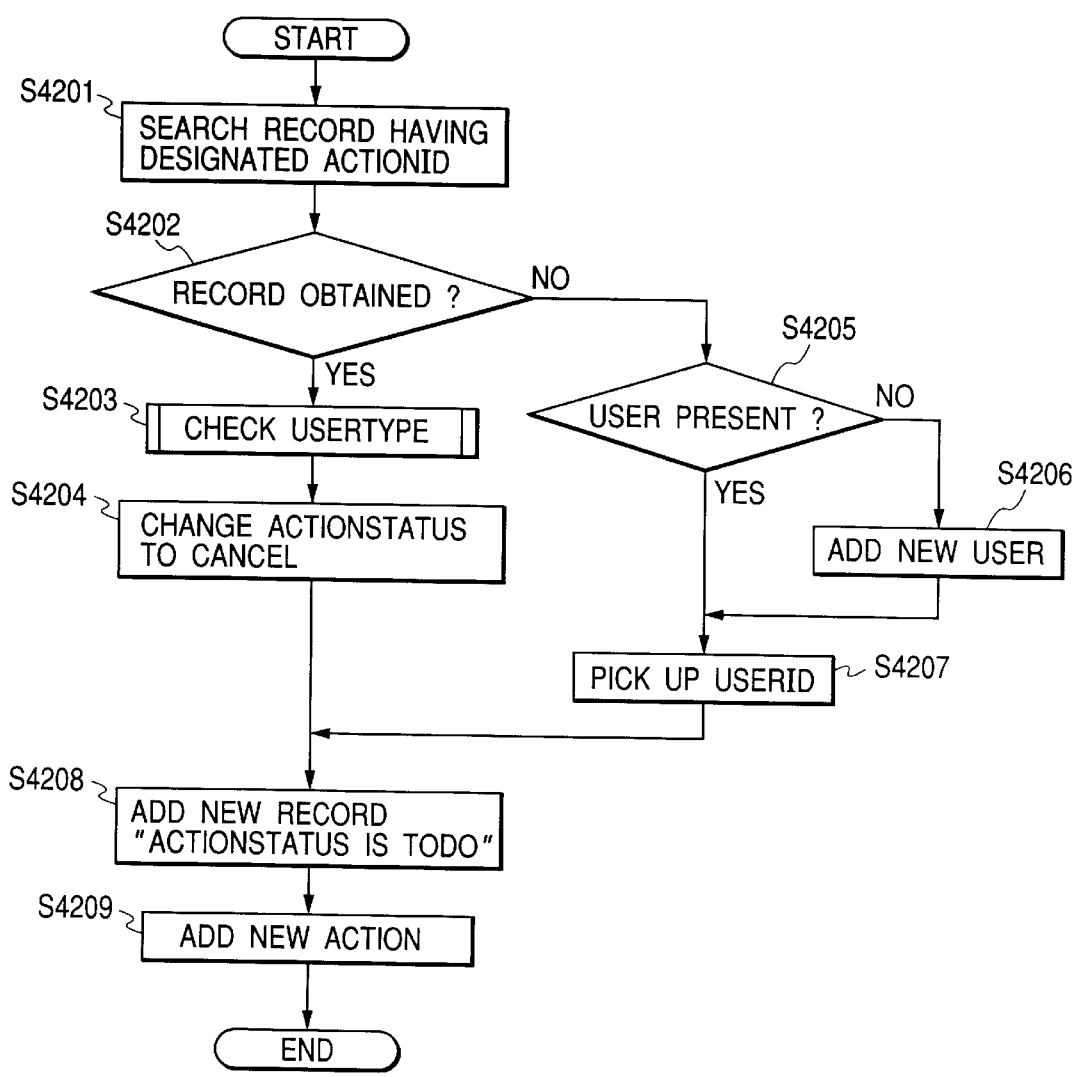
FIG. 42 is a flowchart showing the RescheduleAction processing.

FIG. 42 is a flowchart showing the RescheduleAction processing. The prototype differs from that explained in FIG. 41.

At step S4201 a search is made for a record having a designated action ID. When a pertinent record is found and the UserType matches, the action status is changed to "Cancel", and a new record for which the action status is Todo is added (steps S4201 to S4204). When no pertinent record is found, an examination is performed to determine whether a user is present. If a user is found, the UserID is obtained. If no user is found, a new user is added and its UserID is selected, and a new action that corresponds to the UserID is added (steps S4206 to S4209).

Figure 43:
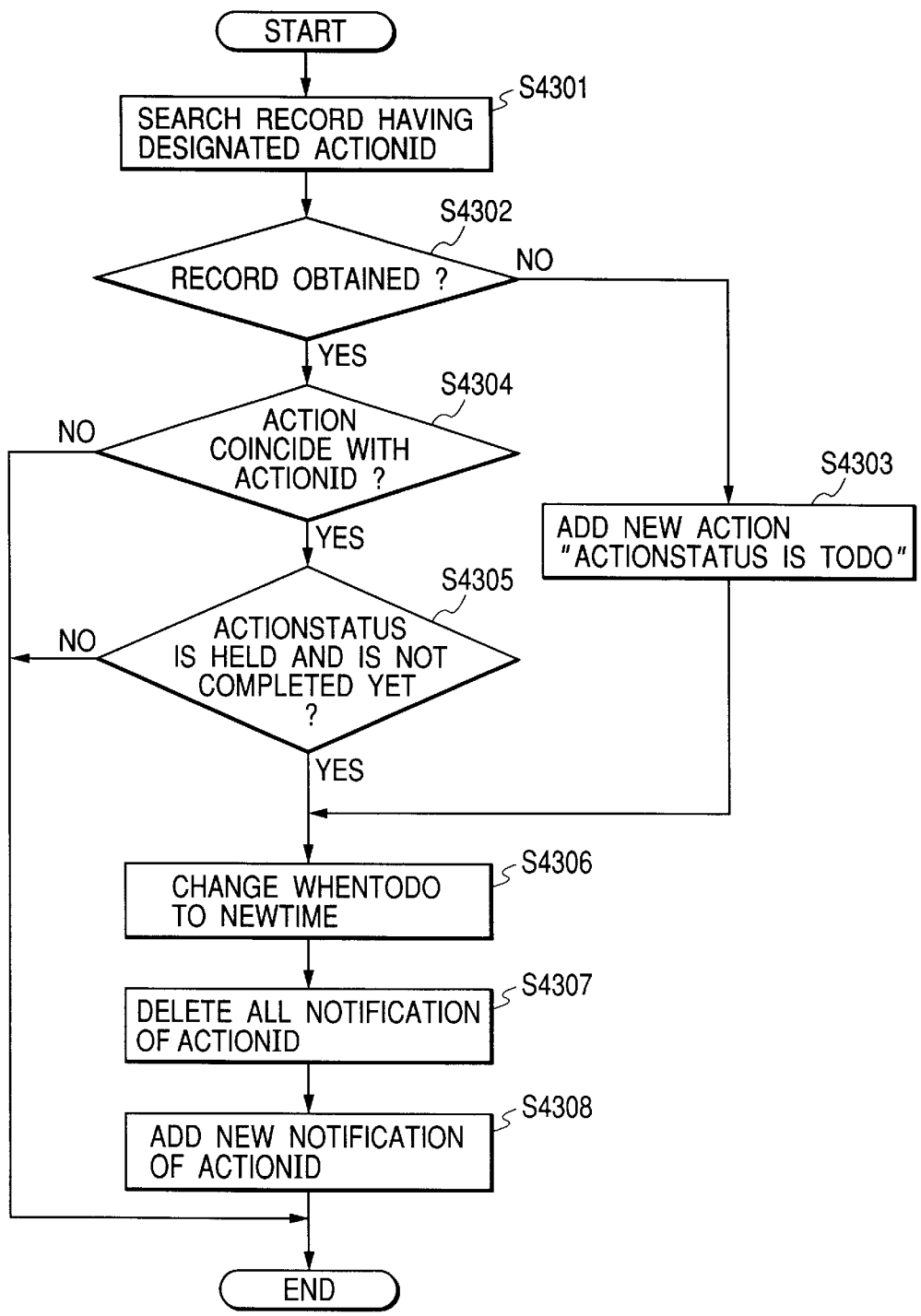
FIG. 43 is a flowchart showing the RescheduleAction processing.

FIG. 43 is a flowchart showing the RescheduleAction processing. The prototype differs from those as explained in FIGS. 41 and 42.

A search is made for a record having a designated action ID. When a pertinent record is found, the action status and the action are examined. When the action and the action ID match, and when the action status is Hold and Uncompleted, the WhenTodo time is changed to a NewTime (steps S4301 and S4302 and S4304 to S4308). When no pertinent record is found, at step S4303 a new action for which the action status is Todo is added, and the WhenTodo time is changed to a NewTime.

Figure 44:
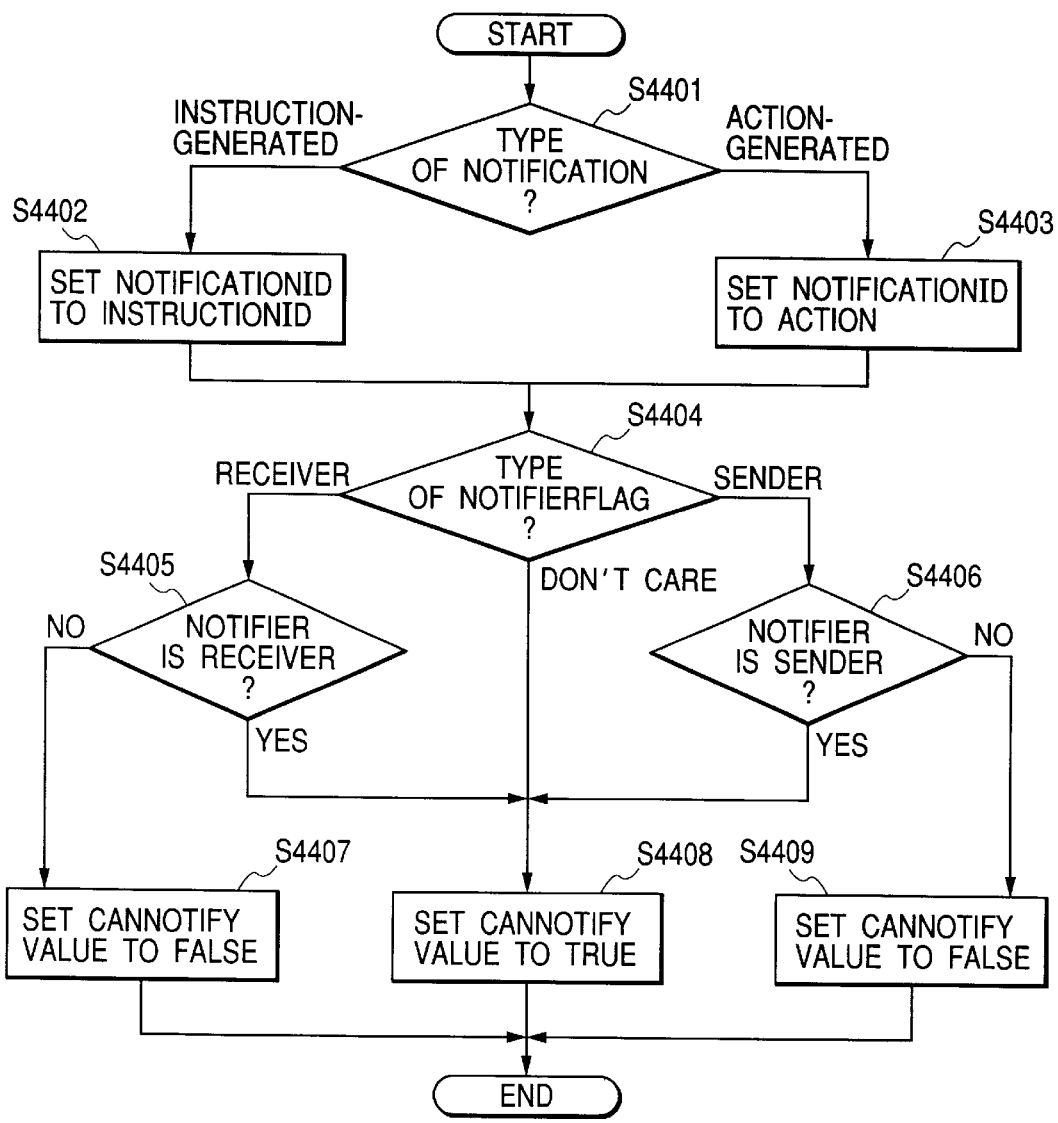
FIG. 44 is a flowchart showing the AddNotification processing.

FIG. 44 is a flowchart showing the AddNotification processing.

A new record is added to a notification, and the general information for parameters (GeneratedFromparameter) are examined to prepare a new entry concerning this information.

Figure 45:
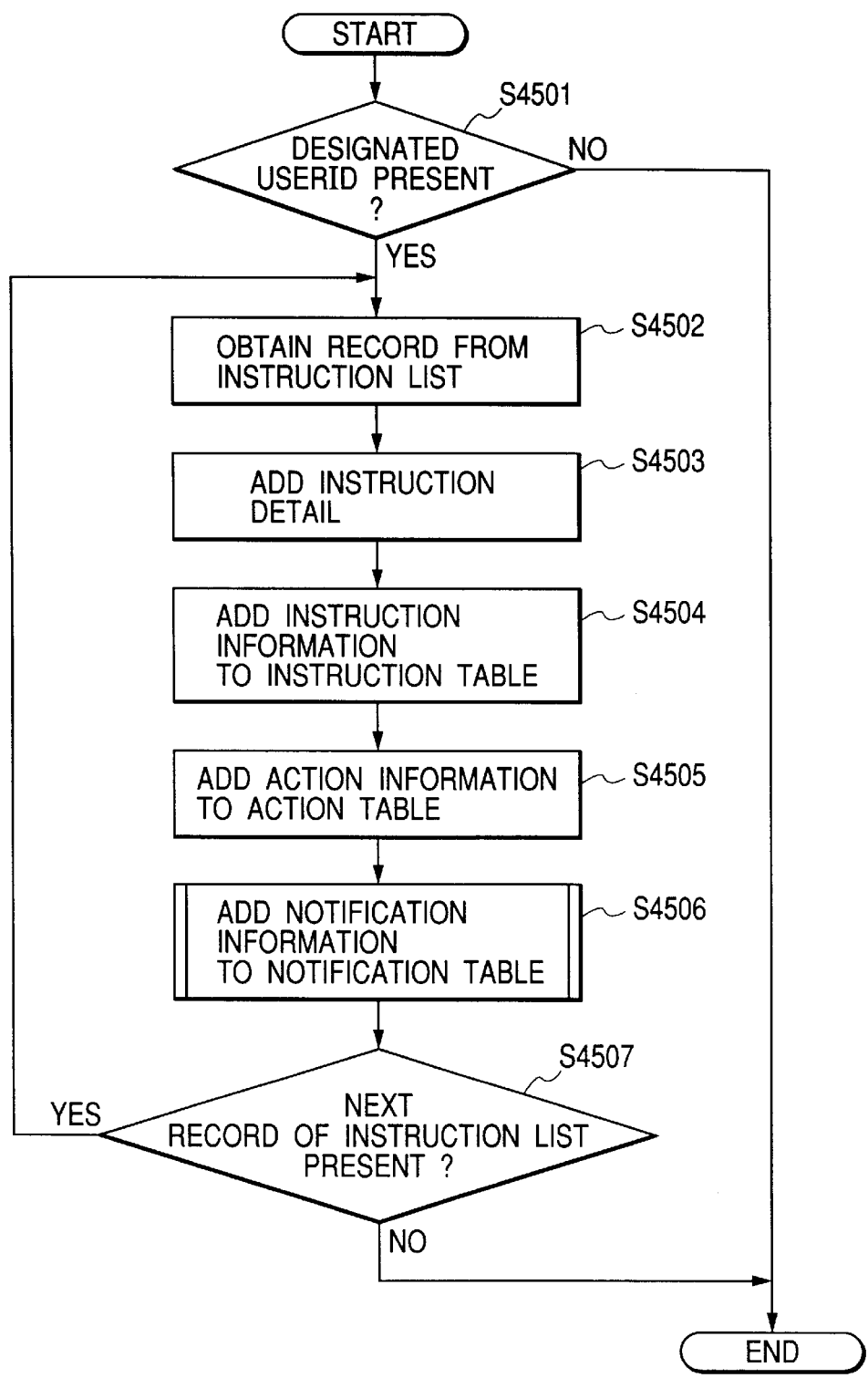
FIG. 45 is a flowchart showing the AddInstruction processing.

FIG. 45 is a flowchart showing the AddInstruction processing.

When a ReceiveJob or a SendJob is encountered, the setup for an instruction is called. First, at step S4501 a check is performed to determine whether a designated UserID is present in the database 104. When the UserID is not present, the processing is thereafter terminated. When the UserID is present, at step S4502 a record is obtained from the instruction list, and at step S4503 details for a new instruction are added to the user ID.

The instruction is added to an instruction table in the database 104. An associated action and a notification provided upon receiving the instruction are reflected in an action table and a notification table (steps S4504 and S4506).

For both the ReceiveJob and the SendJob, when instructions for generating these jobs are established, a record, which serves as a template for generating a new action and a new notification, is added to the action table and the notification table.

Figure 46:
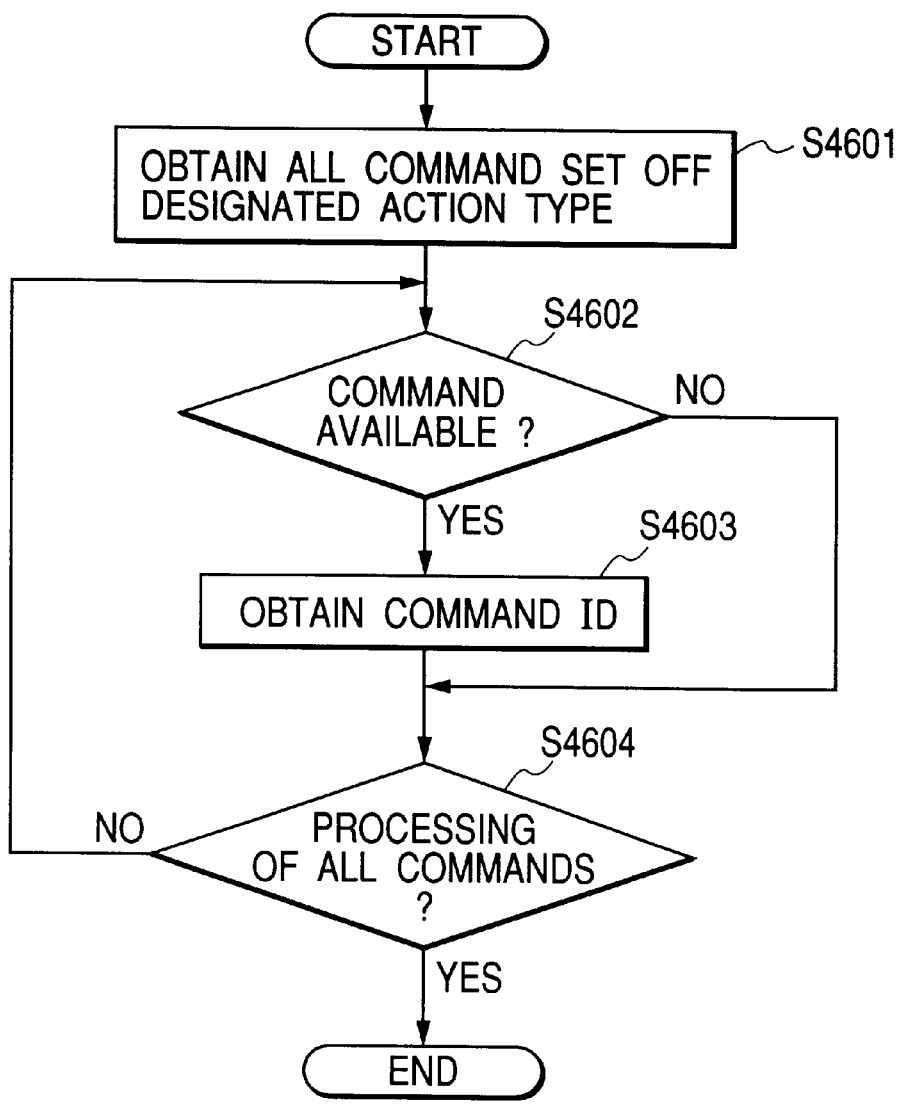
FIG. 46 is a flowchart showing the GetInstruction processing.

FIG. 46 is a flowchart showing the GetInstruction processing.

This function is called using ReceiveJobData and SendJobData. First, at step S4601 all the records in the instruction table are examined to determine whether the action type is Receive or Send, and all the instructions for the action type are obtained. At step S4602 the details (values set as instructions) contained in the JobMessage are employed to determine whether an instruction can be executed. A check function, which will be described later, is used to examine the validity of the instruction. When the instruction is valid, at step S4603 the ID for the instruction is added to the list. When at step S4604 all the instructions have been processed, a listing of the effective instruction IDs is returned.

Figure 47:
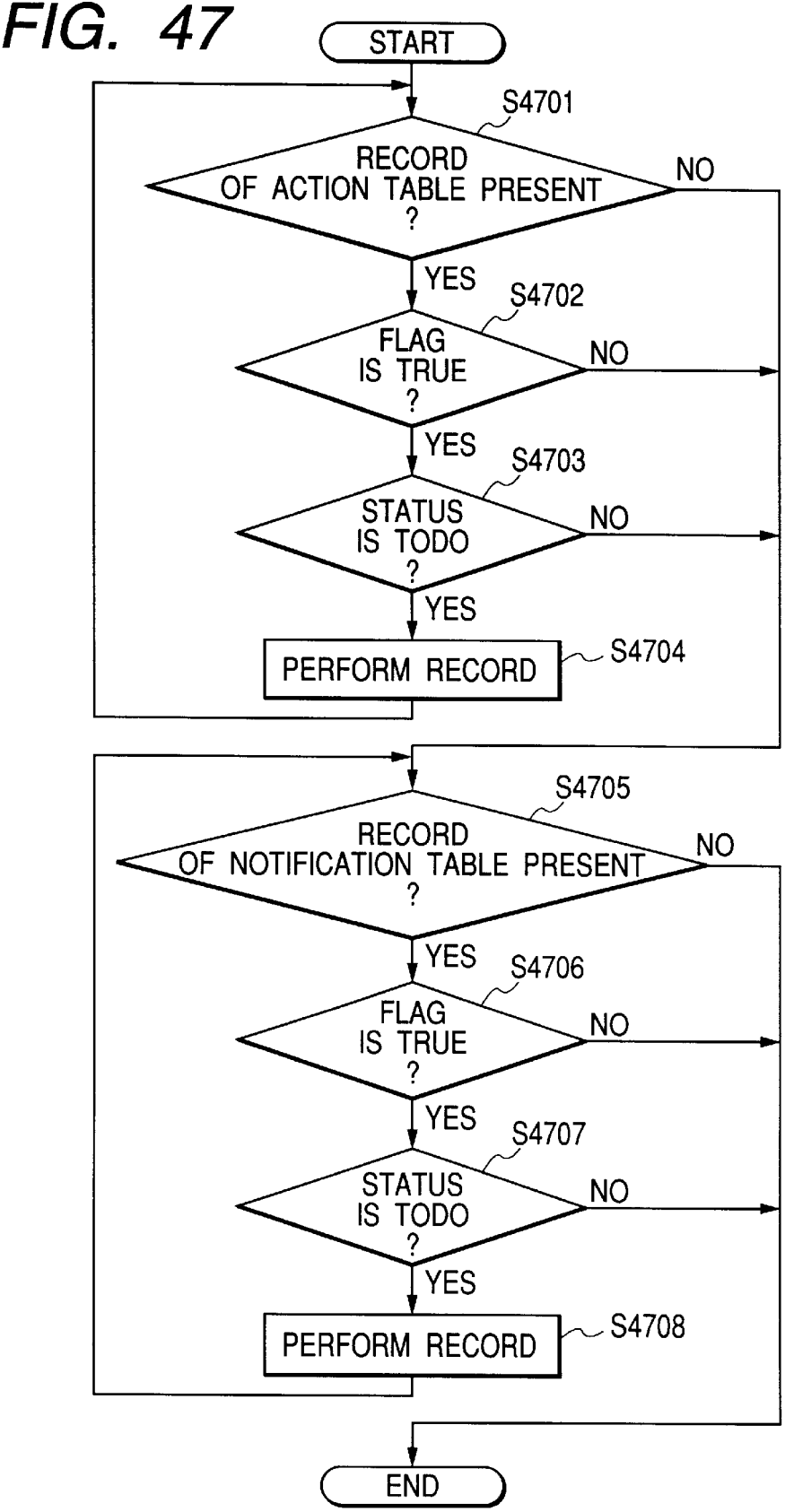
FIG. 47 is a flowchart showing the ExecutionInstruction processing.

FIG. 47 is a flowchart showing the ExecutionInstruction processing.

This function is called using ReceiveJobData and SendJobData. A search is made for records in the action table and in the notification tables. These records are used in accordance with the instructions in the instruction list, and copies of them are prepared for each table having a Todo flag (set to TRUE) (steps S4701 to S4708).

The action table is searched to find a dummy action that is set in accordance with the instruction. Based on the dummy action, a new, appropriate record is added and the action is performed.

The notification table is searched to find a dummy notification that is set in accordance with the instructions. Based on the dummy notification, a new, appropriate record is added and the notification is issued.

Figure 89:
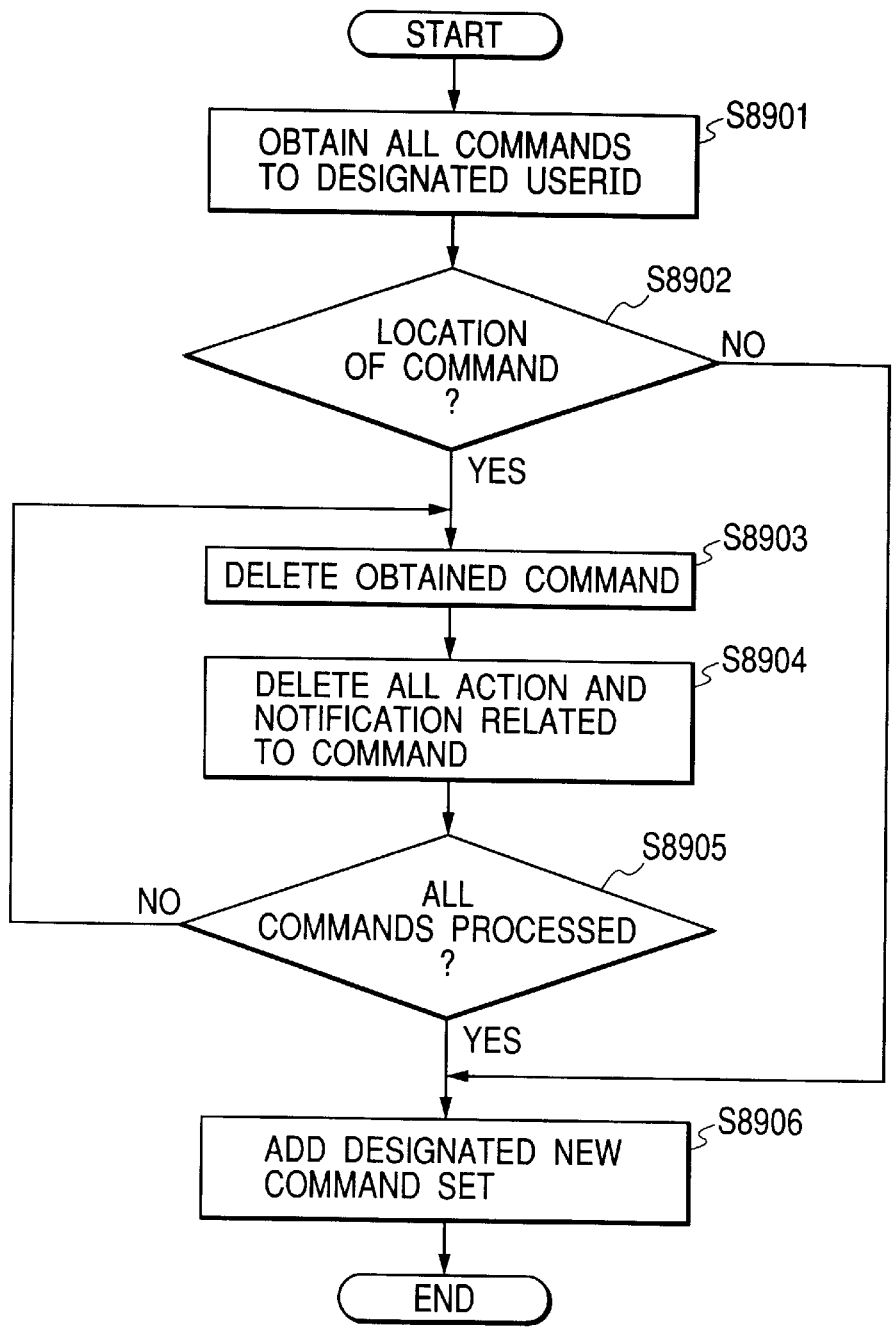
FIG. 89 is a flowchart showing the ResetInstructions processing.

FIG. 89 is a flowchart showing the ResetInstruction processing. The prototype is Void ResetInstructions (dwUserId, pInstructionList).

First, a search is made for all the commands for a designated user ID, and obtained commands and corresponding actions and notifications are deleted (steps S8901 to S8905). Then, new commands that received are entered in the command list (step S8906).

Figure 90:
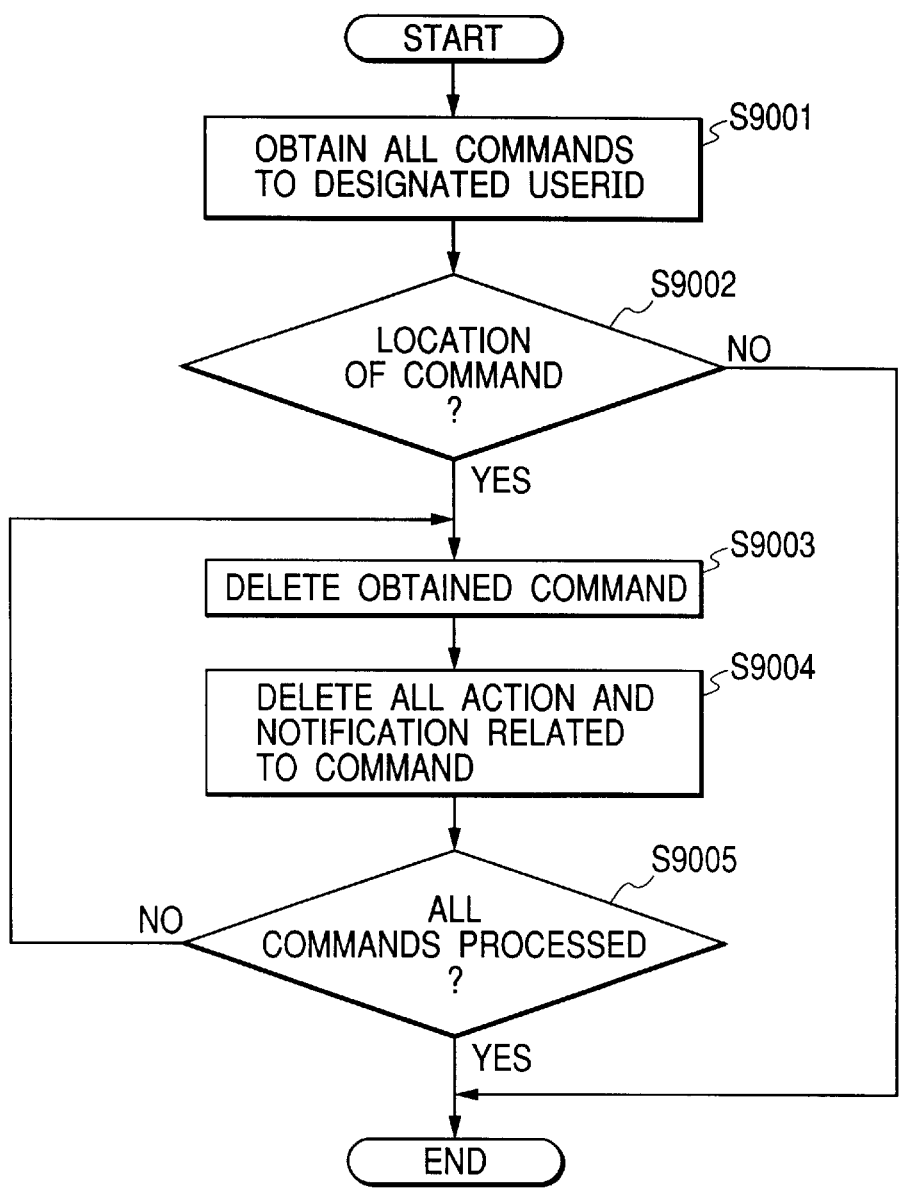
FIG. 90 is a flowchart showing the DeleteAllInstructions processing.

FIG. 90 is a flowchart showing the DeleteAllInstructions processing. The prototype is Void DeleteAllInstructions (dwUserId).

A search is made for all the commands for a designated User ID, and obtained commands and corresponding actions and notifications are deleted (steps S9001 to S9005).

Figure 91:
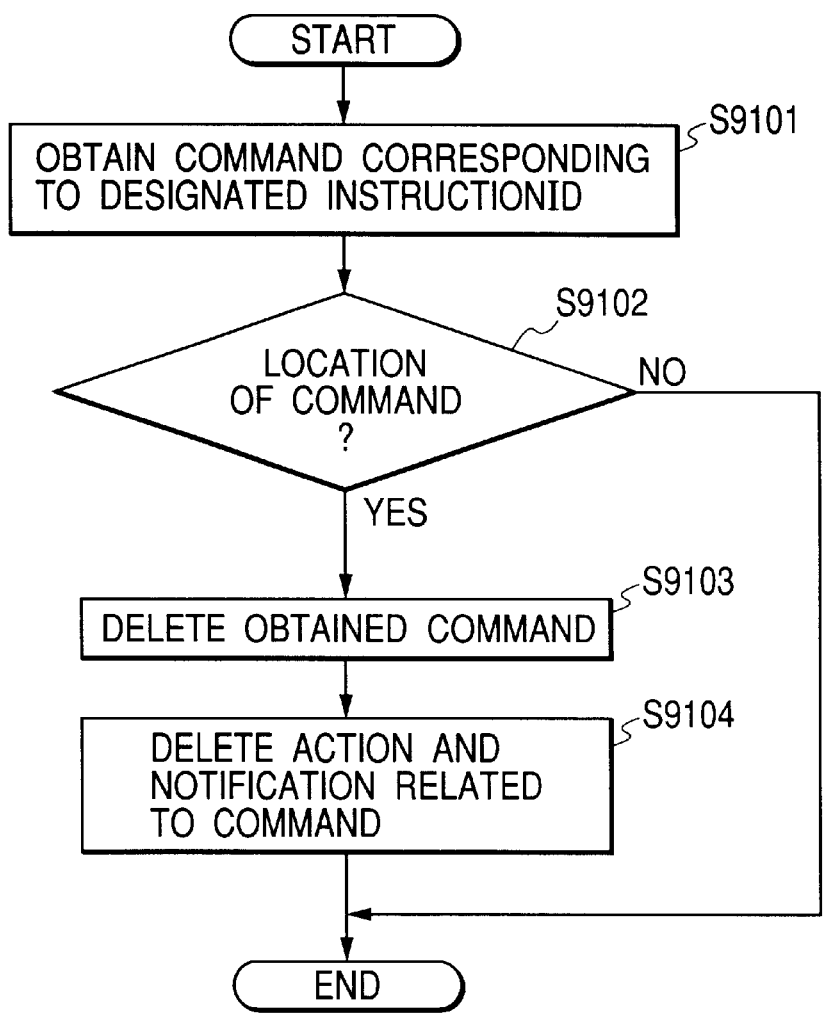
FIG. 91 is a flowchart showing the DeleteInstructions processing.

FIG. 91 is a flowchart showing the DeleteInstructions processing. The prototype is Void DeleteInstructions (dwInstructionId).

A search is made for a command for a designated instruction ID, and the obtained command and a corresponding action and a notification are deleted (steps S9101 to S9104).

Figure 92:
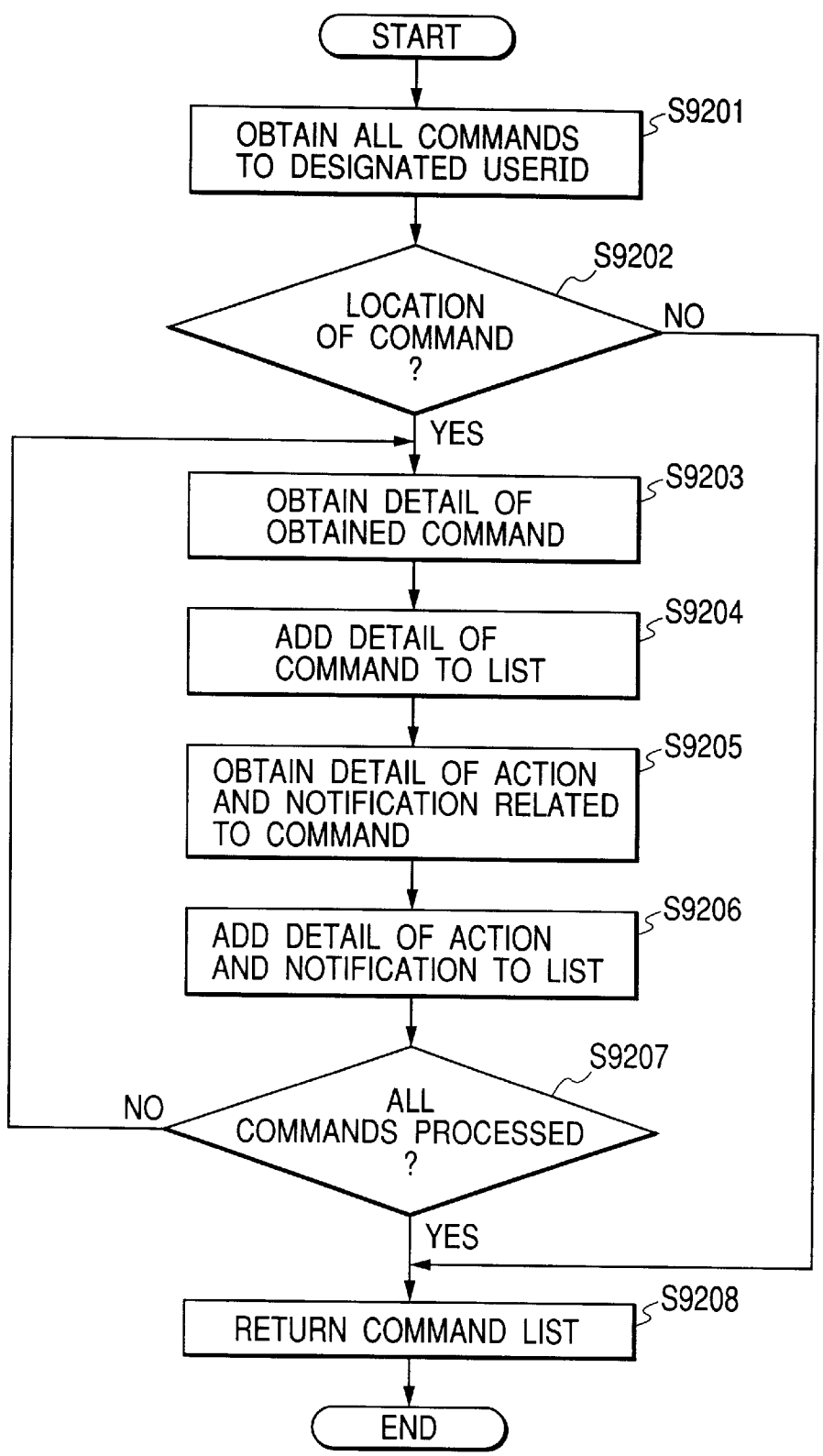
FIG. 92 is a flowchart showing the GetInstructionDetails processing.

FIG. 92 is a flowchart showing the GetInstructionDetails processing. The prototype is Void GetInstructionDetails (dwUserId).

A search is made for commands for a designated user ID, and the obtained commands and a list of the details of corresponding actions and notifications are returned (steps S9201 to S9208).

Figure 93:
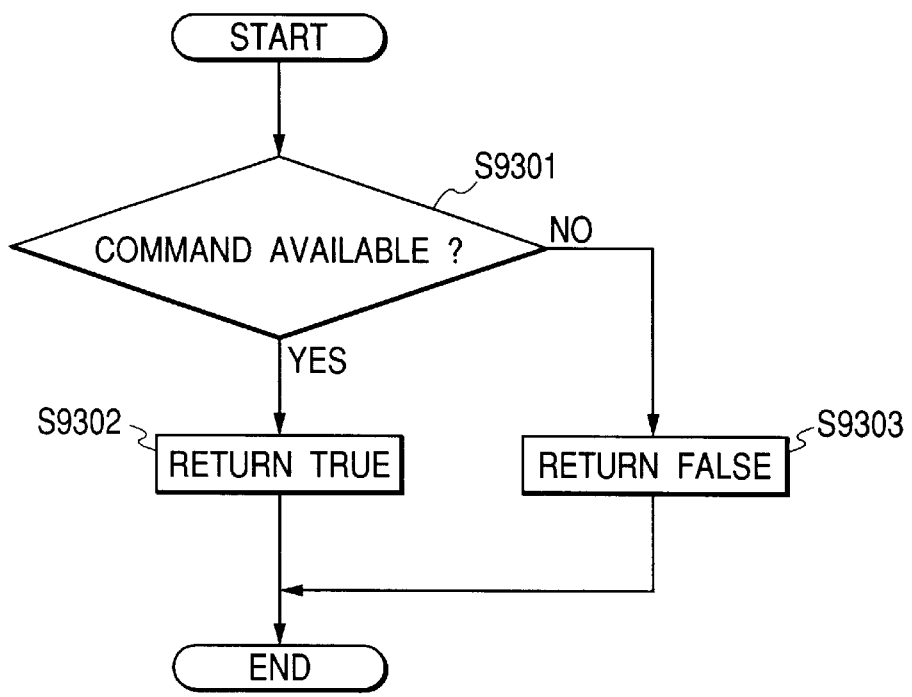
FIG. 93 is a flowchart showing the Check processing.

FIG. 93 is a flowchart showing Check processing. The prototype is Bool Check(nJobChk, JobNameConnector, nDeviceChk, DeviceConnector, nPersonChk, PersonConnector, nTimeChk, TimeConnector, nStatusChk, nStatusCode).

This function is called from inside GetInstructionIds( ). A check is performed to determine whether the command can be executed and is effective. If the command is effective, TRUE is returned. If the command is not effective, FALSE is returned (steps S9301 to S9303).

Figure 94:
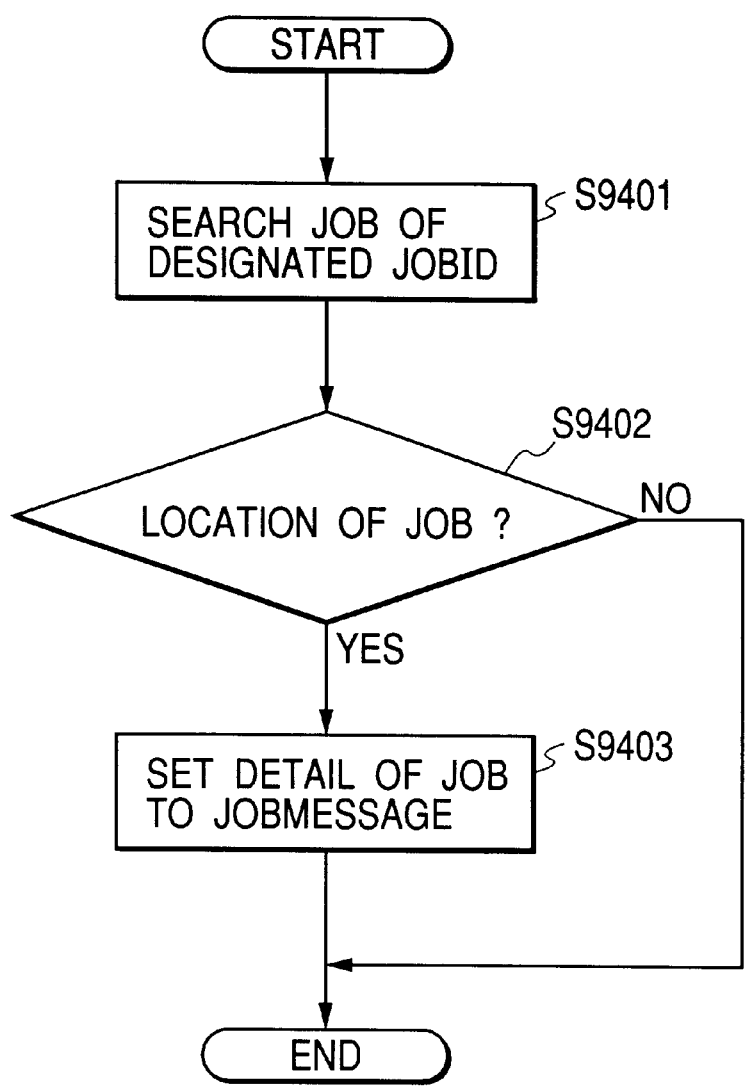
FIG. 94 is a flowchart showing. the GetJobData processing.

FIG. 94 is a flowchart showing the GetJobAttributes processing. The prototype is Void GetJobAttributes (dwJobId, poJobMessage).

A search is made for a job having a designated job ID, the details concerning the job are set in the JobMessage (steps S9401 to S9403).

Figure 95:
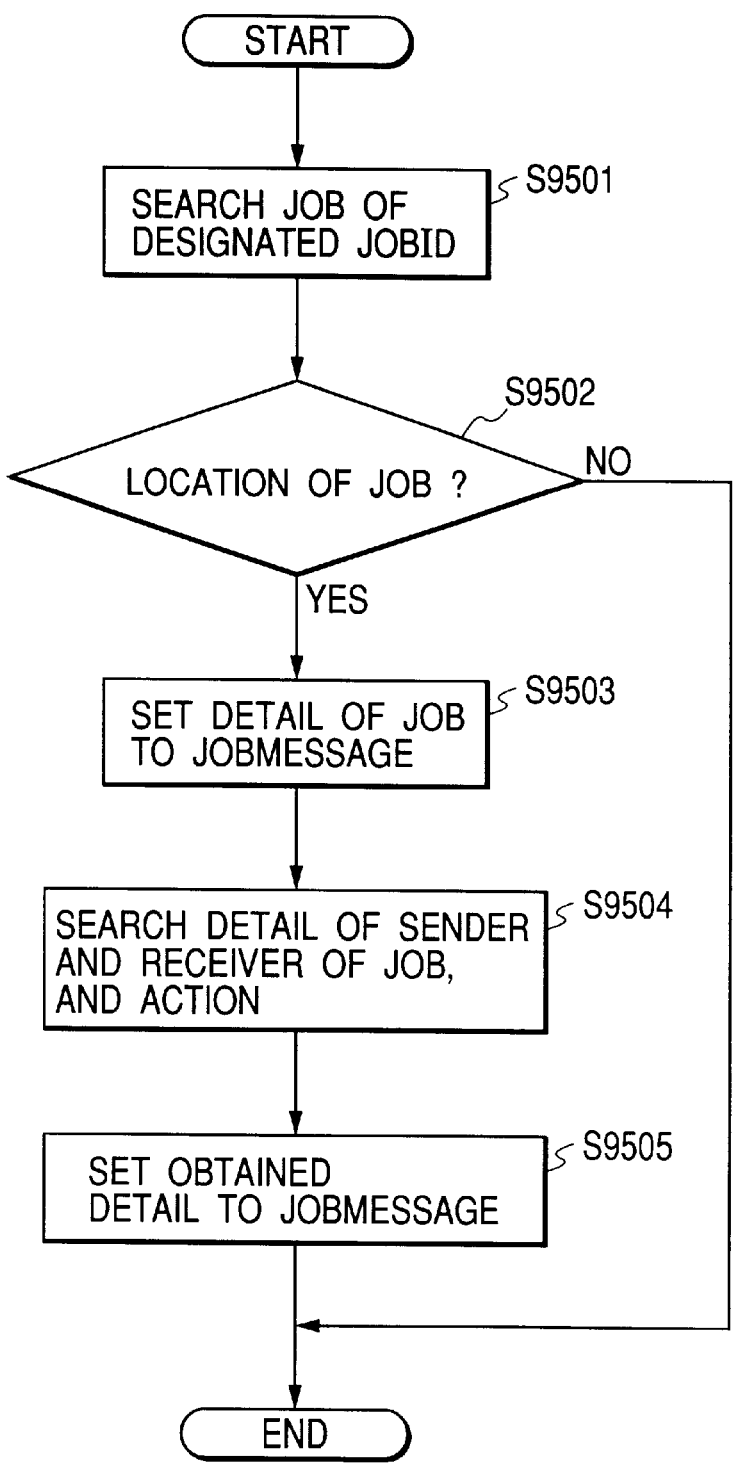
FIG. 95 is a flowchart showing the GetJobAttributes processing.

FIG. 95 is a flowchart showing the GetJobAttributes processing. The prototype is Void GetJobAttributes (dwJobId, poJobMessage).

A search is made for a job having a designated job ID, and the details concerning the job are set in the JobMessage. Further, a search is made for details concerning the sender and the receiver of the job and the details concerning the associated action, and these are set in the JobMessage (steps S9501 to S9505).

Figure 96:
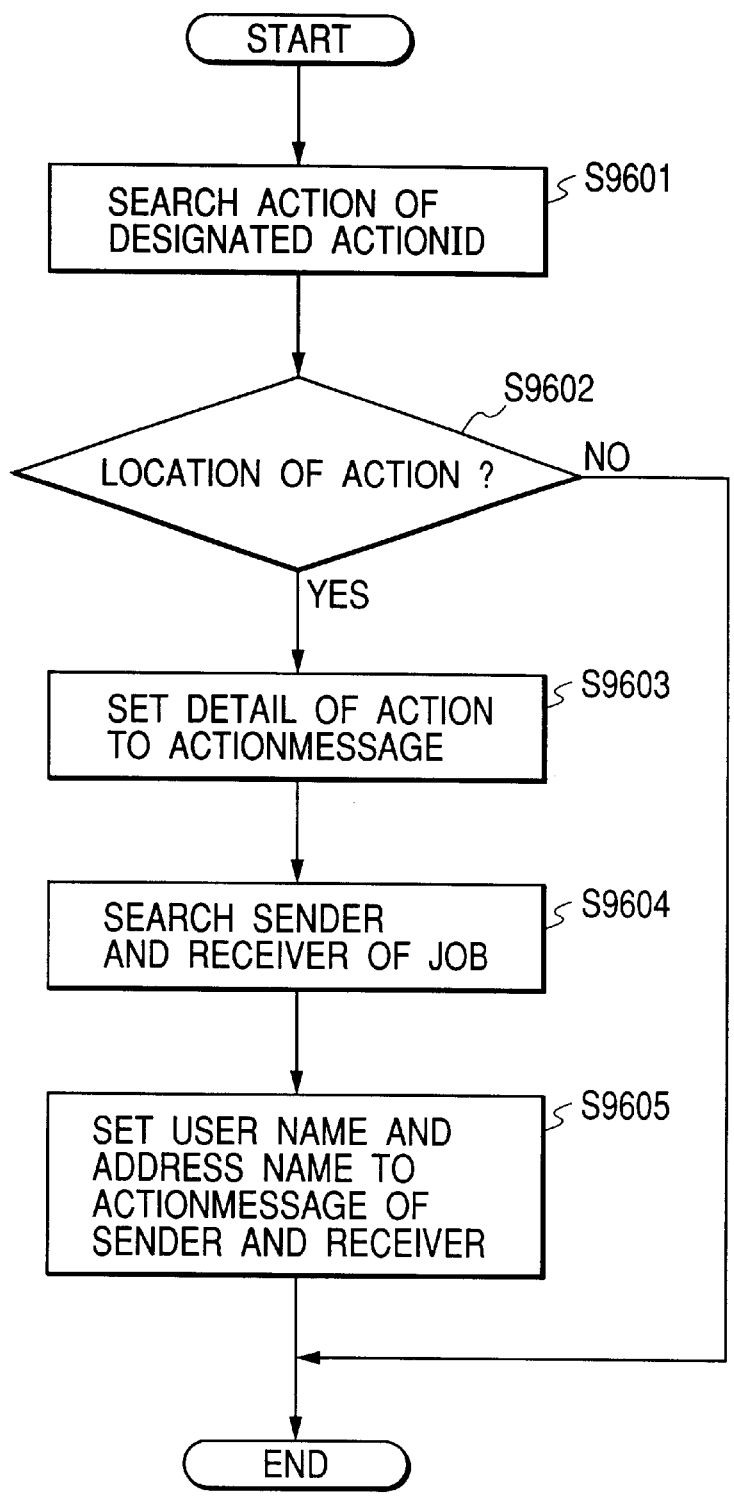
FIG. 96 is a flowchart showing the GetActionAttributes processing.

FIG. 96 is a flowchart showing the GetActionAttributes processing. The prototype is Void GetActionAttributes (dwActinId, poActionMessage).

A search is made for an action having a designated action ID, and the details concerning the obtained action are set in the ActionMessage. Further, the names and addresses of the sender and the receiver of the job are set in the ActionMessages for the sender and the receiver (steps S9601 to S9605).

Figure 97:
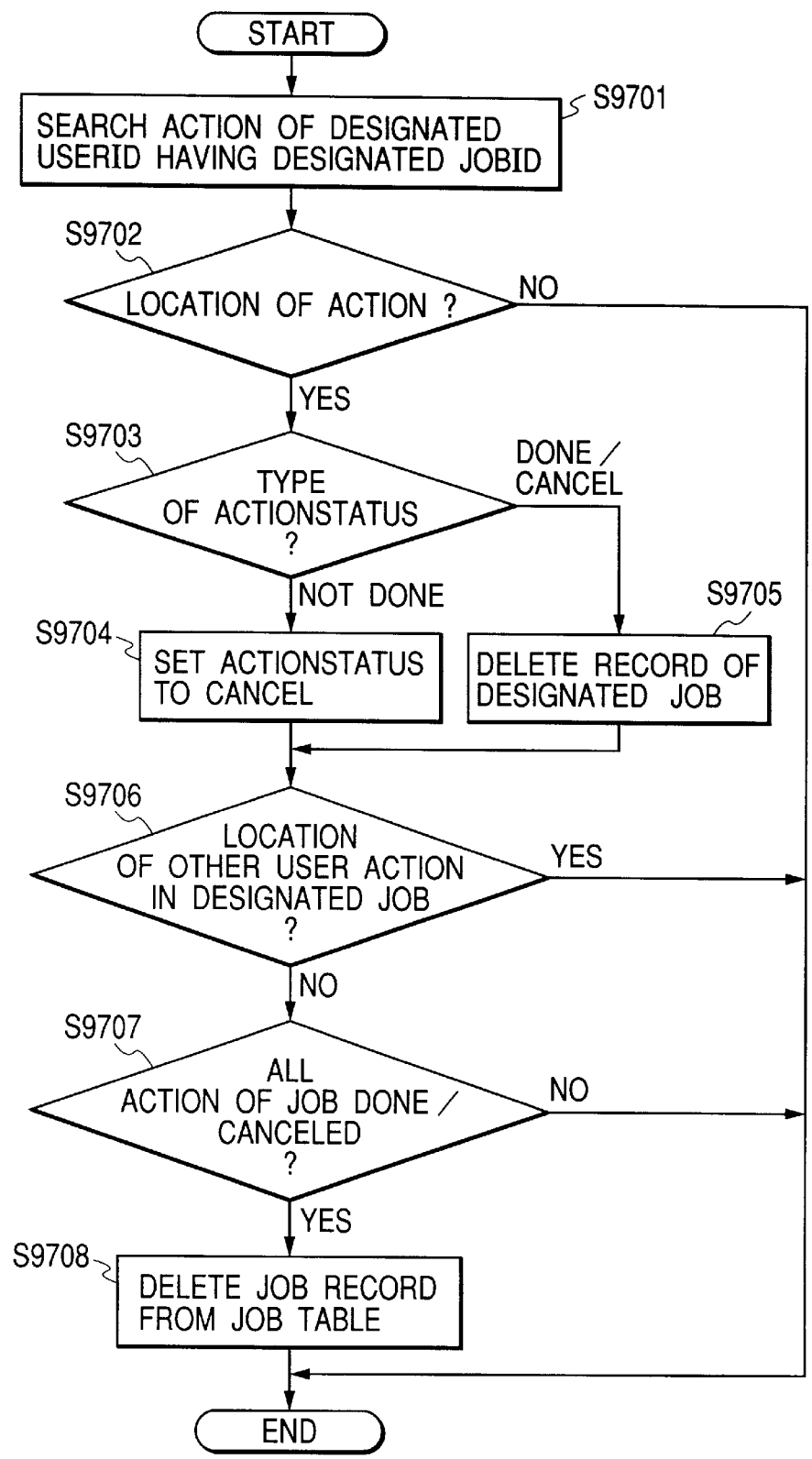
FIG. 97 is a flowchart showing the DeleteJob processing.

FIG. 97 is a flowchart showing the DeleteJob processing. The prototype is Void Deletejob(dwUserId, dwJobId).

At step S9701 a search is made for an action for a designated UserID having a designated JobID. If at step S9702 such an action is found, at step S9703 the type of action status is examined. When the action status is "Done", at step S9704 the action status is changed to "Cancel", and the current time is set as the execution time.

When the action status is already set to "Done" or "Cancel", at step S9705 the action and all the associated notifications are deleted. At step S9706 a check is performed to determine whether there is an action for a UserID other than the designated UserID having the designated JobID. If no such action is found, at step S9707 all the actions for the designated UserID having the designated JobID are considered to have been done or canceled. When there are no actions for other users and all the actions have been done or canceled, at step S9708 the record for this job is deleted from the job table.

Figure 98:
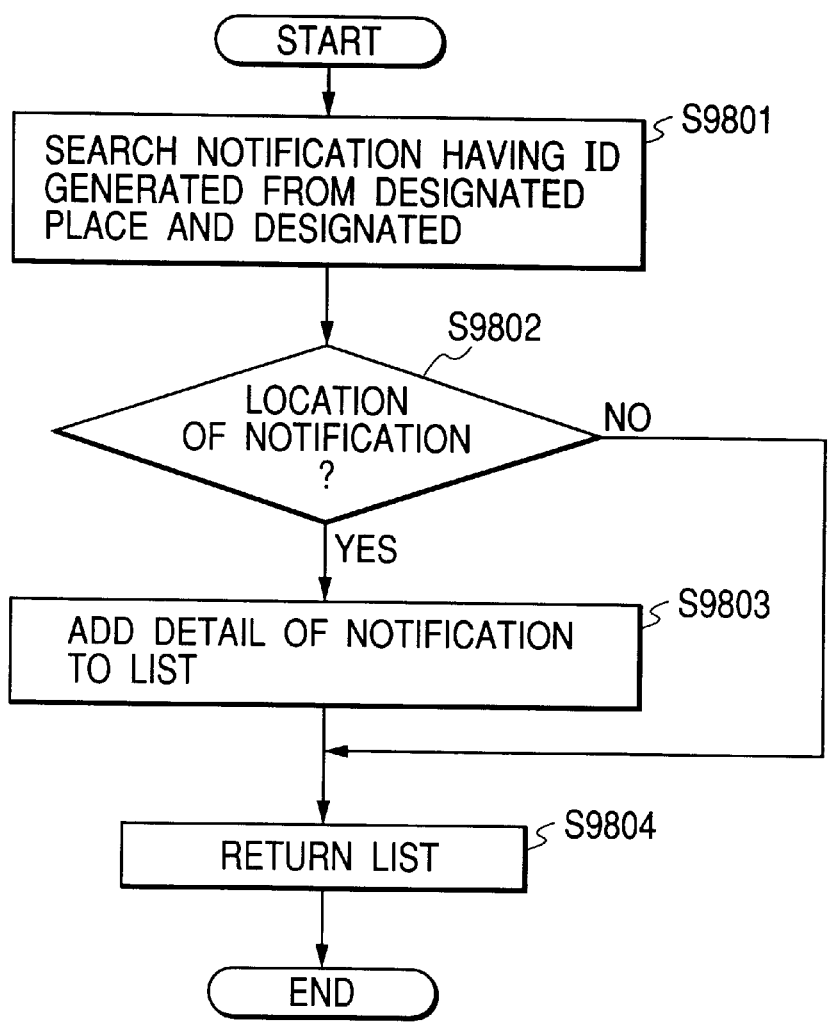
FIG. 98 is a flowchart showing the GetNotificationList processing.

FIG. 98 is a flowchart showing the GetNotificationList processing. The prototype is Void GetNotificationList (nGeneratedFrom, dwId).

A search is made for all the notifications that were generated at designated generation places (either actions or instructions) and that have designated IDs, and the details concerning the obtained notifications are added to the list, which is then returned (steps S9801 to S9804).

Figure 99:
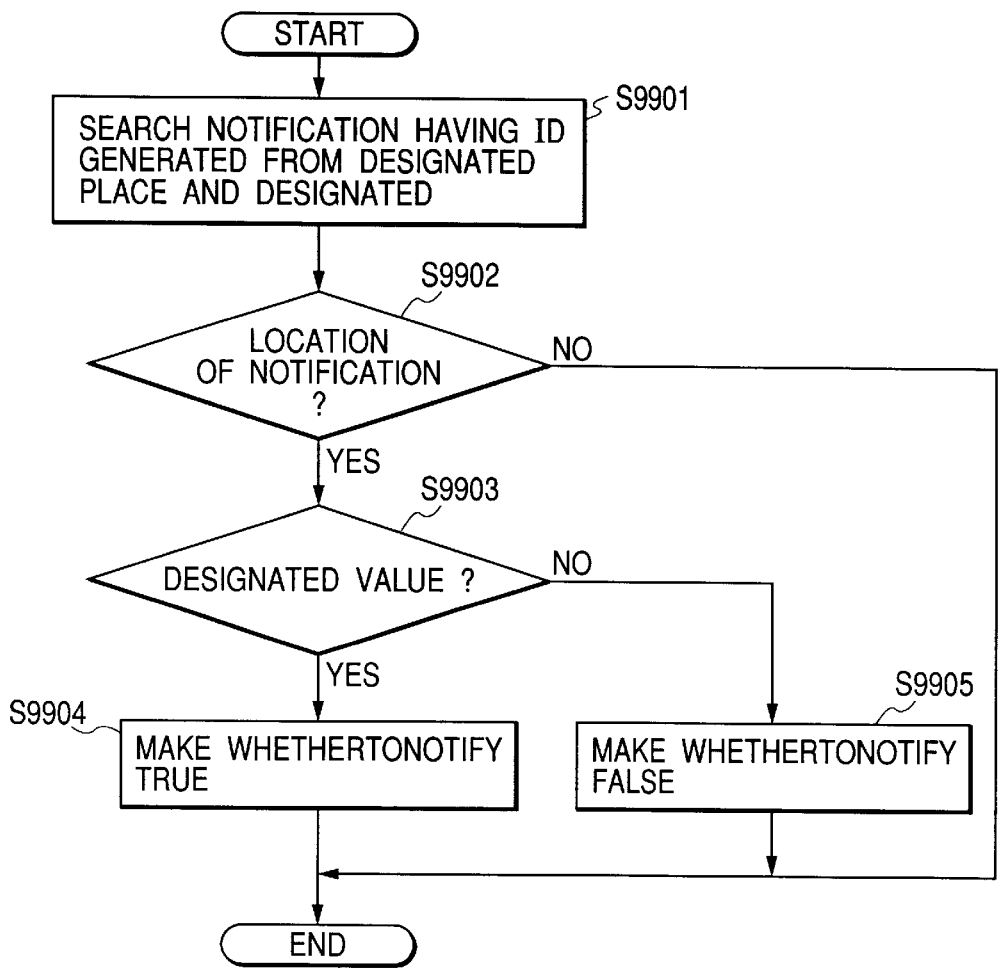
FIG. 99 is a flowchart showing the SetNotificationCondition processing.

FIG. 99 is a flowchart showing the SetNotificationCondition processing. The prototype is Void SetNotificationCondition(nGeneratedFrom, dwId, nResult).

A search is made for a notification that was generated at a designated place (nGeneratedFrom) and that has a designated Id. If the obtained notification consists of a designated value (nResult), the WhetherToNotify is set to TRUE. When the notification does not consist of a designated value, the WhetherToNotify is set to FALSE (steps S9901 to S9905).

Figure 100:
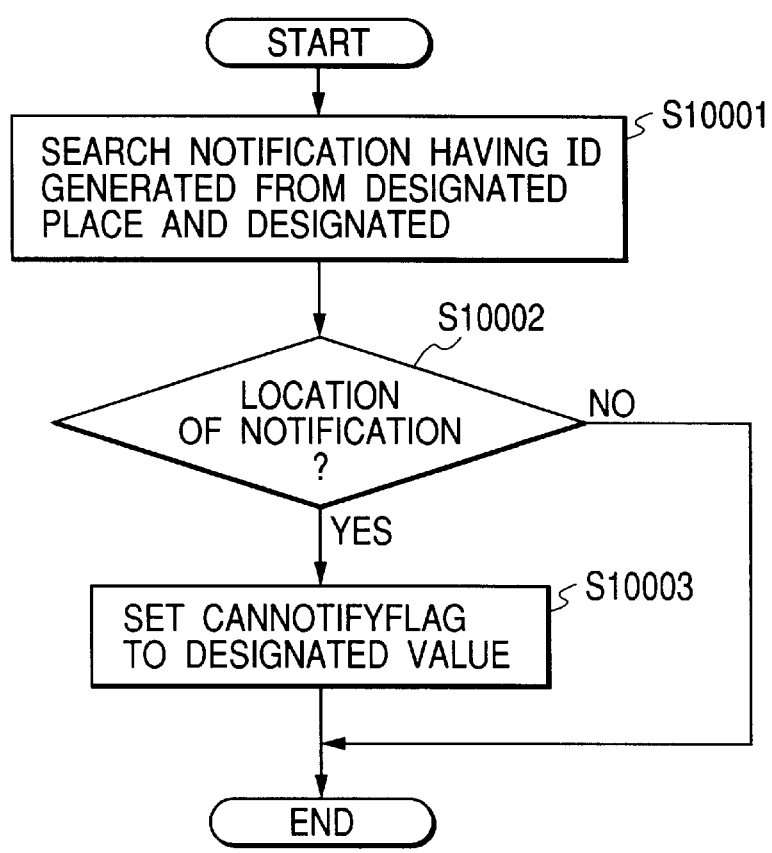
FIG. 100 is a flowchart showing the SetNotificationCondition processing.

FIG. 100 is a flowchart showing the SetNotificationCondition processing. The prototype is Void SetNotificationCondition(nGeneratedFrom, dwId, bCanNotifyFlag, nDummy).

A search is made for a notification that was generated at a designated place and that has a designated notification ID, and CanNotifyFlag is set to a designated value (bCanNotifyFlag) (steps S10001 to S10003).

Figure 101:
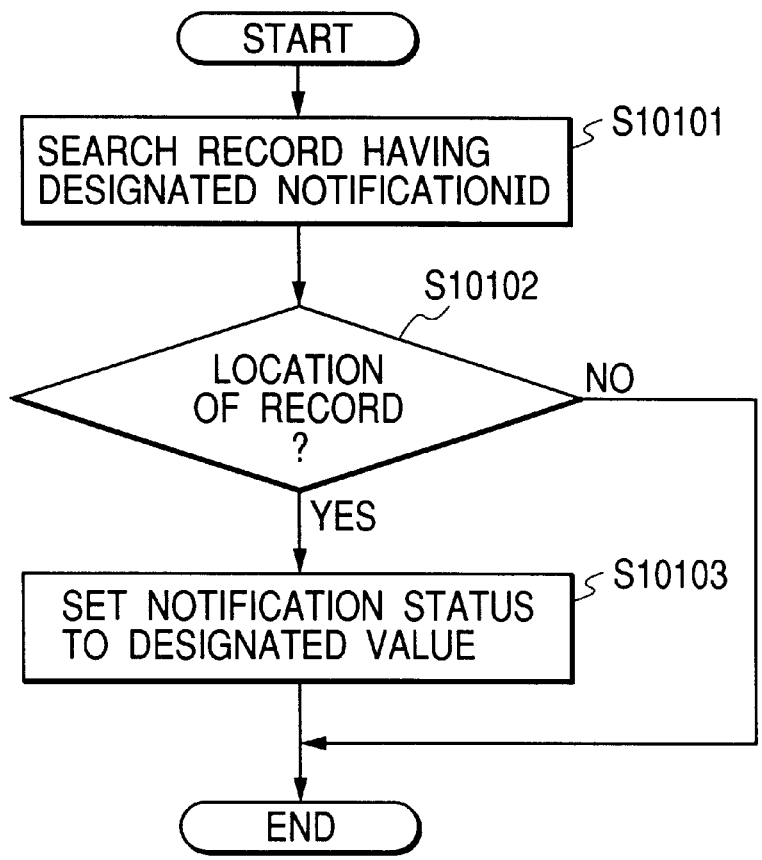
FIG. 101 is a flowchart showing the SetNotificationStatus processing.

FIG. 101 is a flowchart showing the SetNotificationStatus processing. The prototype is Void SetNotificationStatus (dwNotificationId, bNotificationStatus).

A search is made for a notification having a designated notification ID, and the notification status is set to a designated value (steps S10101 to S10103).

Figure 102:
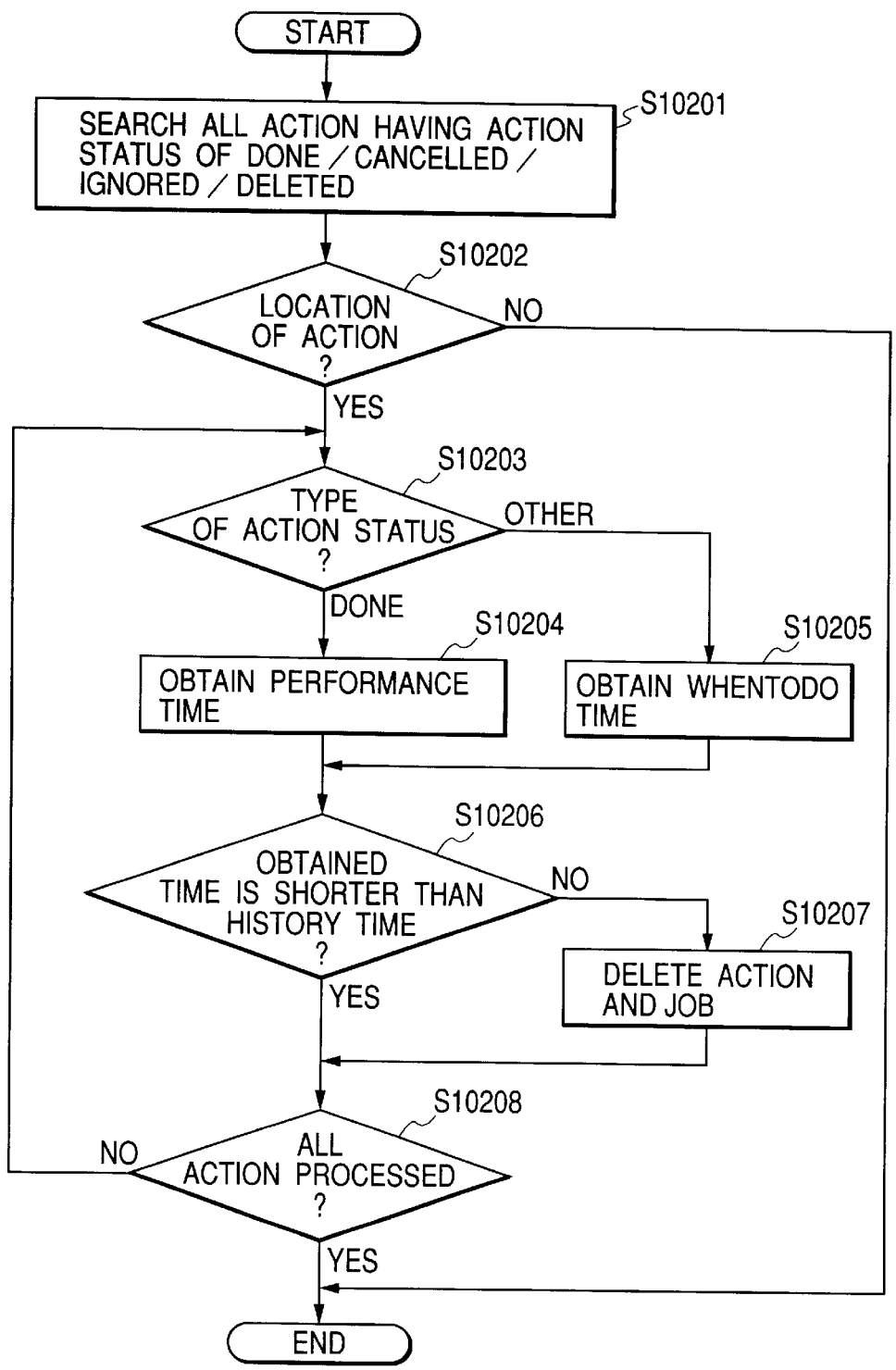
FIG. 102 is a flowchart showing the ClearHistory processing.

FIG. 102 is a flowchart showing the ClearHistory processing. The prototype is Void ClearHistory( ).

First, at step S10201 the action status is examined, and actions having the status "Done", "Canceled", "Ignored" and "Deleted" are obtained. If at step S10203 a job has the action status "Done", at step S10204 the execution time for each of the obtained actions is examined. For the other jobs, at step S10205 the WhenTodo time is examined. At step S10206 the obtained time is compared with the history time limit. Such a limit is set for the job by the manager. FIG. 133 is a diagram showing an example setup screen. On this screen, the history time limit is set to one month (1 Month). When, as a result of the comparison, it is found that a time period equal to or longer than that set for the time limit has elapsed since the execution time or the scheduled execution time, at step S10207 the action and the job are deleted.

Figure 103:
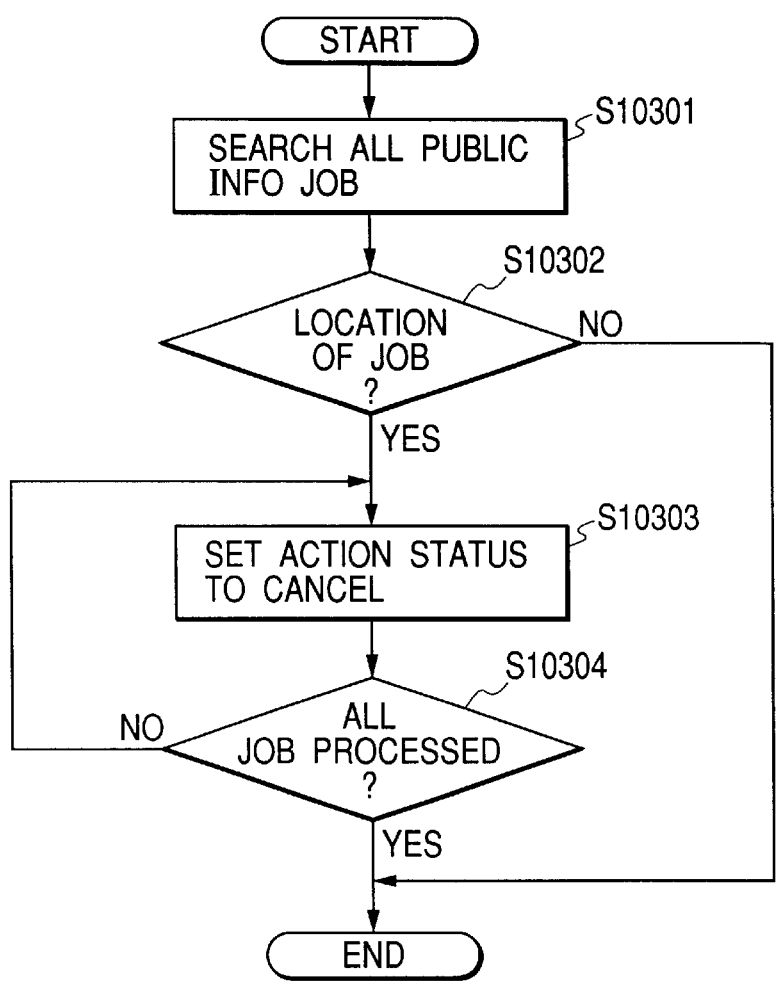
FIG. 103 is a flowchart showing the DeleteAllPublicInfoJobs processing.

FIG. 103 is a flowchart showing the DeleteAllPublicInfoJobs processing. The prototype is Void DeleteAllPublicInfoJobs( ).

A search is made for all the PublicInfojobs, and the action status is set to "Cancel" (steps S10301 to S10304).

Figure 104:
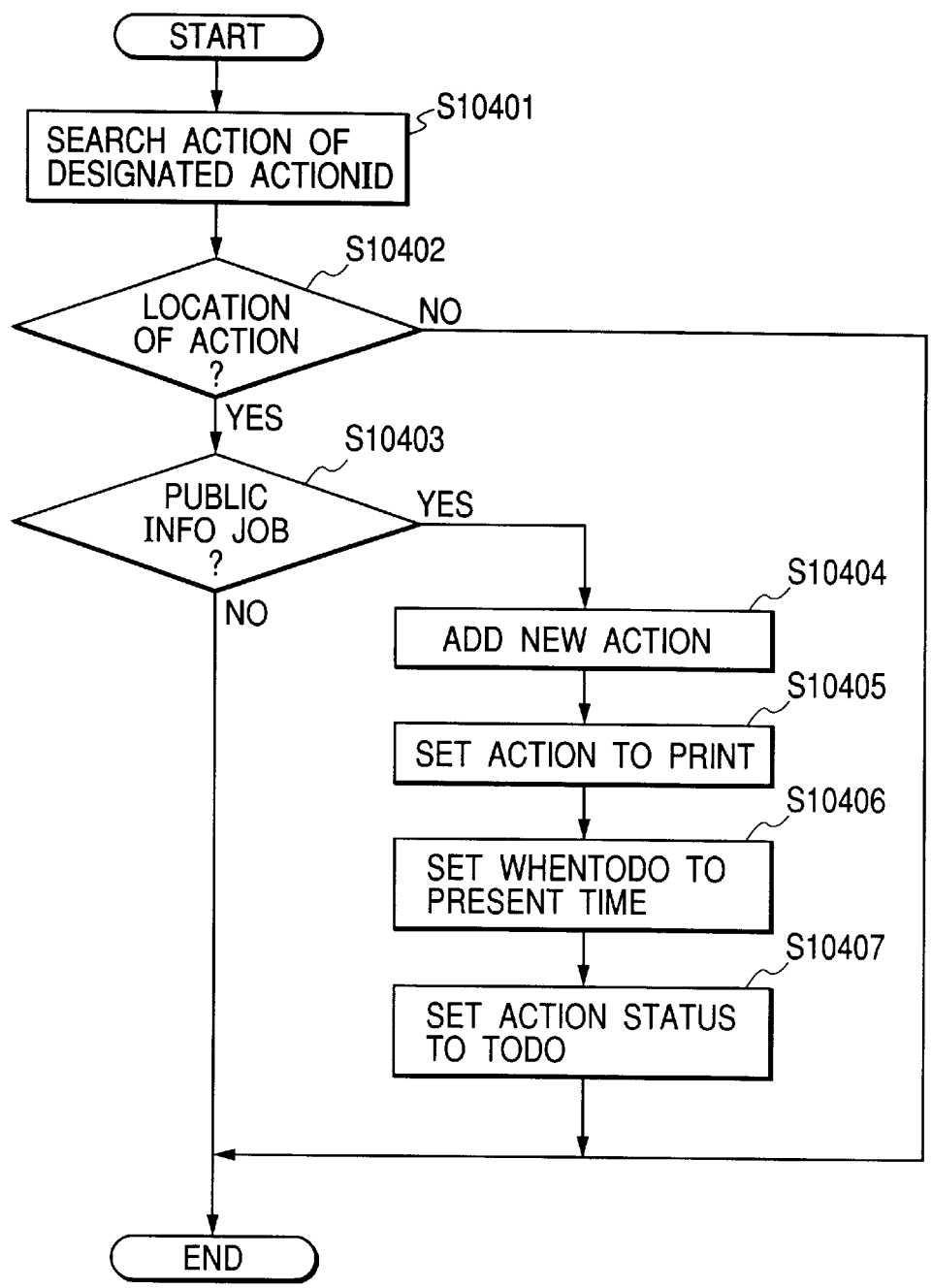
FIG. 104 is a flowchart showing the PrintPublicInfo processing.

FIG. 104 is a flowchart showing the PrintPublicInfo processing. The prototype is Void PrintPublicInfo (dwActionId).

A search is made for an action having a designated action ID to determine whether there is a PublicInfoJob. When a PublicInfoJob is found, a new action is added. The action that is so set using PublicInfo that Print is the action type, WhenTodo is the current time and Todo is the action status (steps S10401 to S10407).

Figure 105:
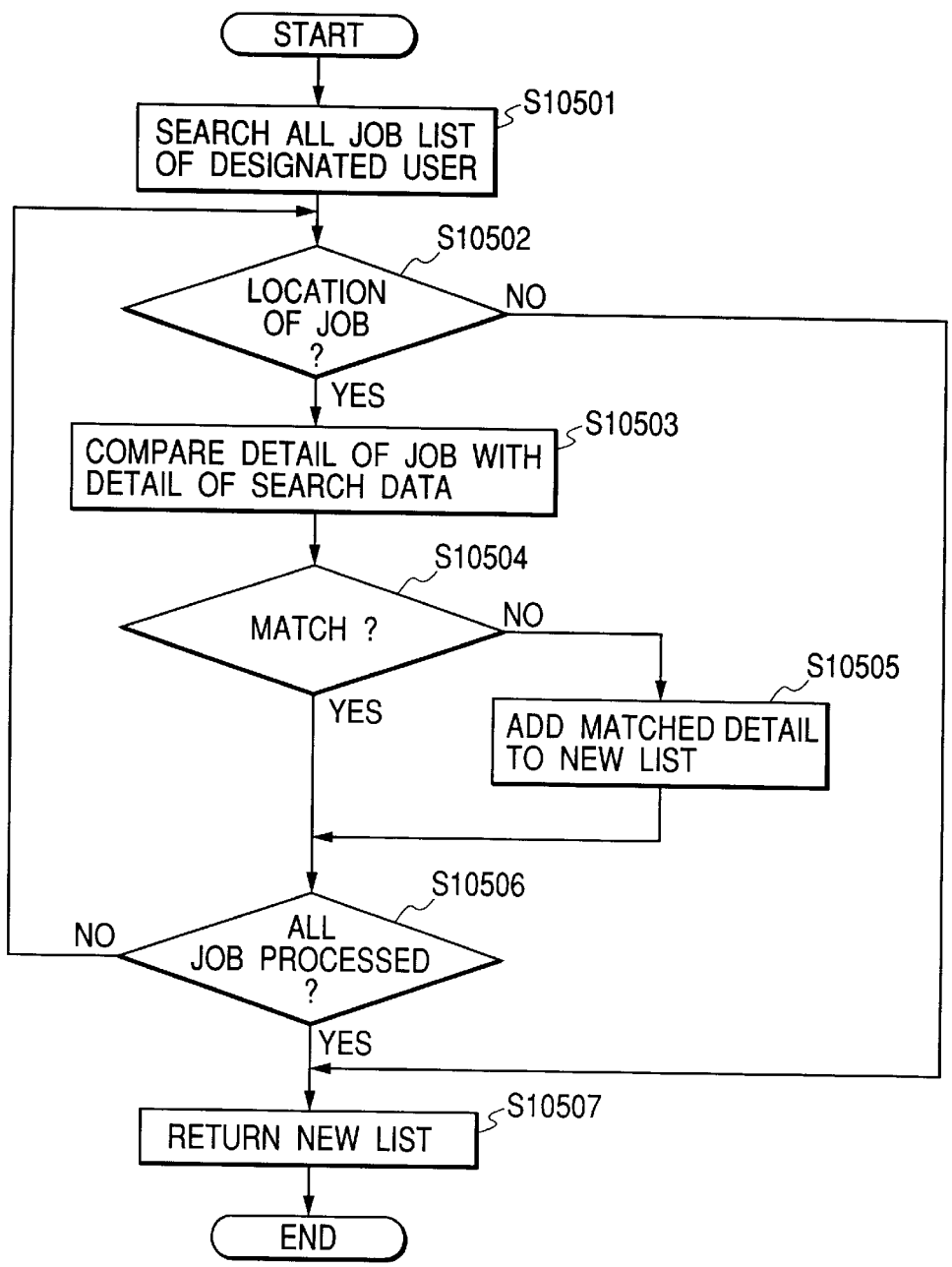
FIG. 105 is a flowchart showing the SearchData processing.

FIG. 105 is a flowchart showing the SearchData processing. The prototype is Void SearchData(dwUserId, poSearchData).

A list is obtained of all the jobs for a designated user, and the details in the list are compared with the details for the Search Data object. When the details match, a node is added to a new list, which is then returned (steps S10501 to S10507).

Figure 48:
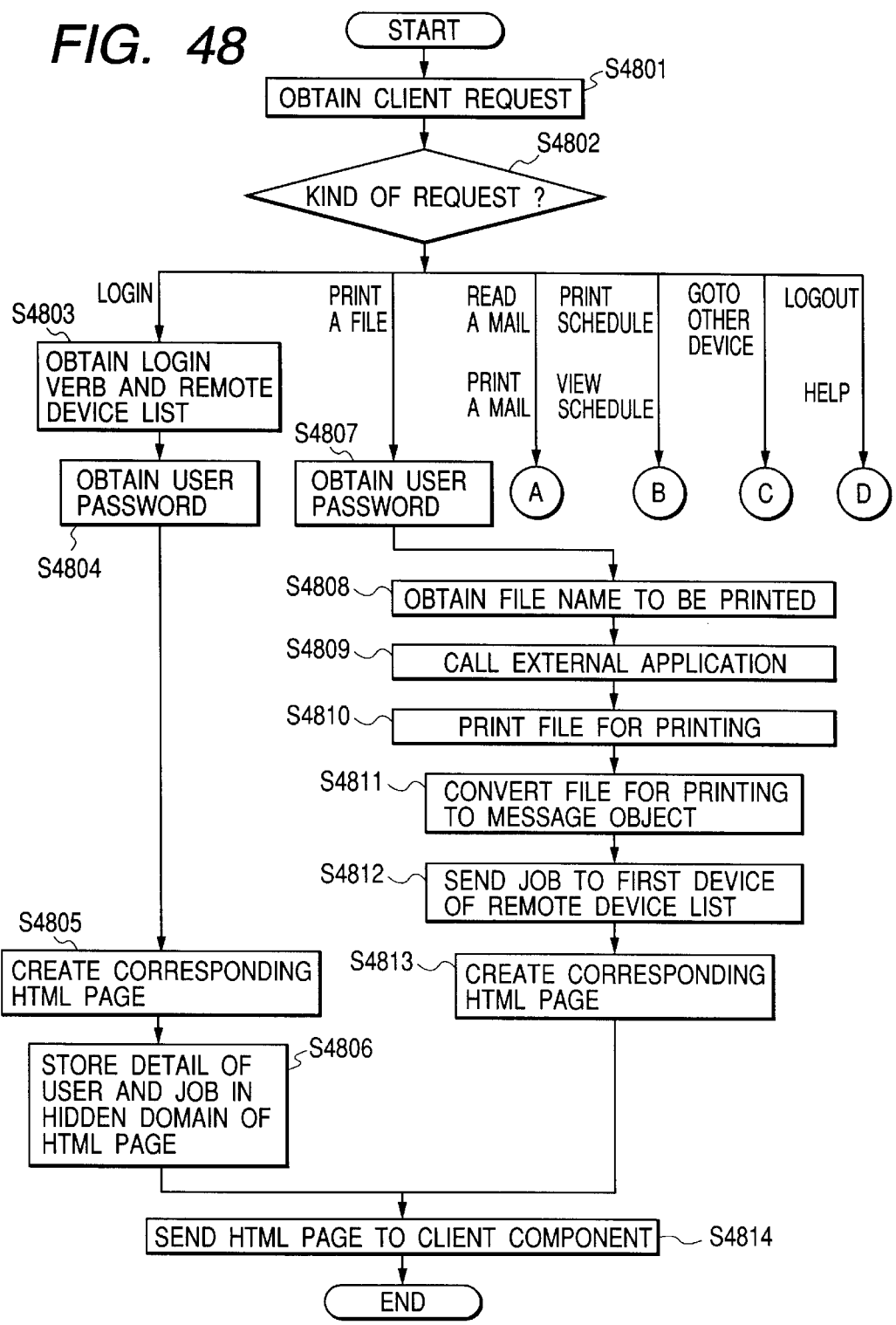
FIG. 48 is a flowchart showing the processing performed by a desktop server component.

FIG. 48 is a flowchart showing the processing performed by the desktop server component 103 in response to a request from the client component 102.

At step S4801 the server component 103 receives a request from the client component 102 and performs a corresponding process. When at step S4802 the request is for "Login", the login verb and the remote device list are acquired, and then a user password is obtained (steps S4803 and S4804). Following this, an HTML page corresponding to the user is created, the user password is stored, and the HTML page is transmitted to the client component 102 (steps S4805, S4806 and S4814). The processing is thereafter terminated.

When the request is for "Print a File", the user password and the name of a file to be printed are obtained. Then an external application is called, and the file having the designated file name is written to a print file employed by the application. The output print file is then converted into a message object, and the job is transmitted to the first device on the remote device list. Finally, a corresponding HTML page is created and is transmitted to the client component 102 (steps S4807 to S4813 and S4814). The processing is thereafter terminated. The processing performed when the request from the client component 102 is "Read Mail" or "Print Mail" will be described later while referring to FIG. 49. The processing performed when the request from the client component 102 is "View Schedule" or "Print Schedule" will be described later while referring to FIG. 50. The processing performed when the request from the client component 102 is "Goto Other Device" will be described later while referring to FIG. 51. And the processing performed when the request from the client component 102 is "Logout" or "Help" will be described later while referring to FIG. 52.

Figure 49:
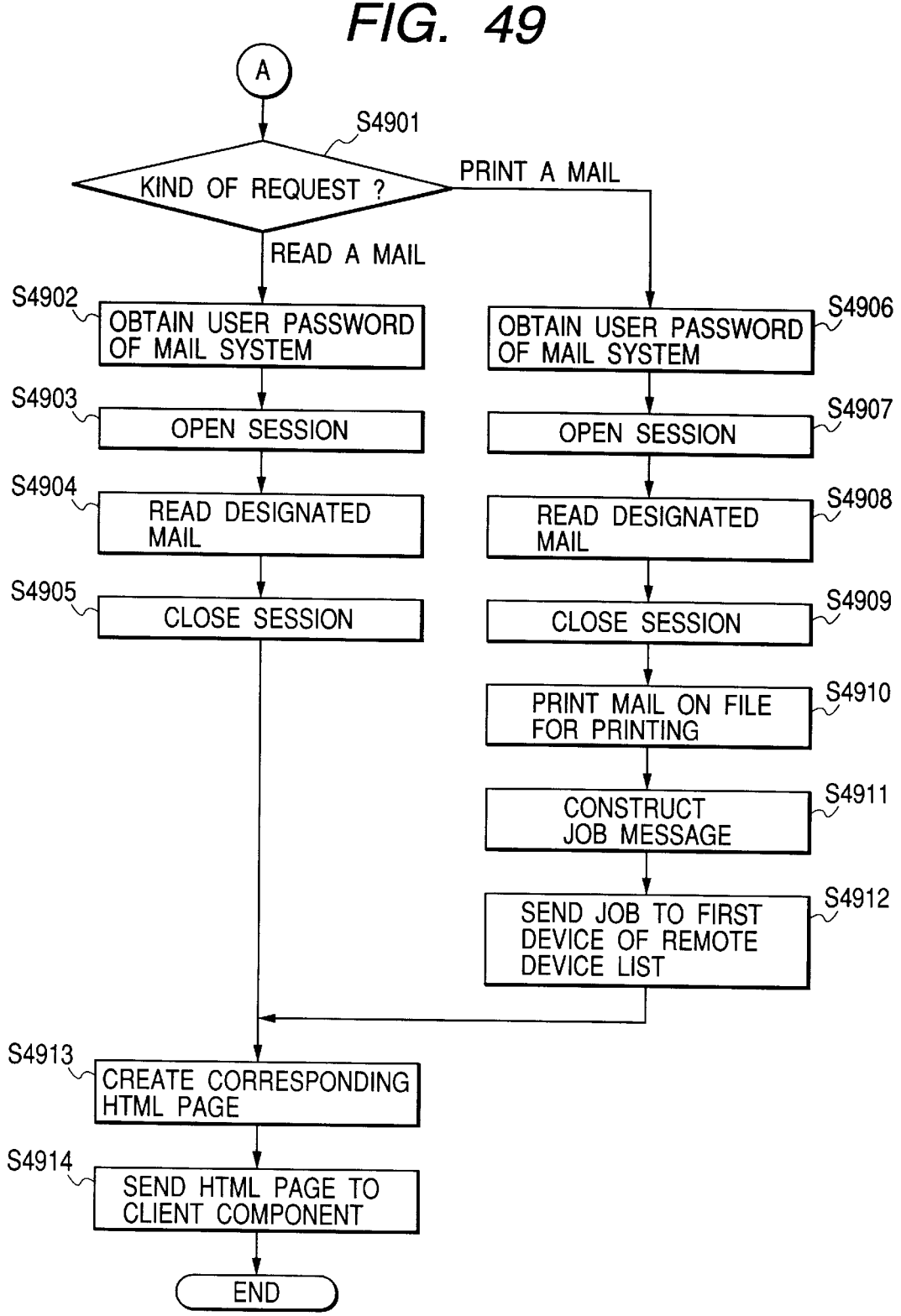
FIG. 49 is a flowchart showing the processing performed for a request concerning mail.

FIG. 49 is a flowchart showing the processing performed for a request related to mail. This processing is employed when the request from the client component 102 is "Read Mail" or "Print Mail".

When the request is "Read Mail", first, the user password for the mail server is obtained, and a session for the reading of mail is opened. When the designated mail has been read, the session is closed (steps S4902 to S4905).

For the request "Print Mail", the same process is performed as for the "Read Mail" request, mail is written to a file, a Job message is generated, and the job is transmitted to the first device on the remote device list (steps S4906 to S4912).

Finally, in either case, a corresponding HTML page is generated and is transmitted to the client component 102 (steps S4913 and S4914). The processing is thereafter terminated.

Figure 50:
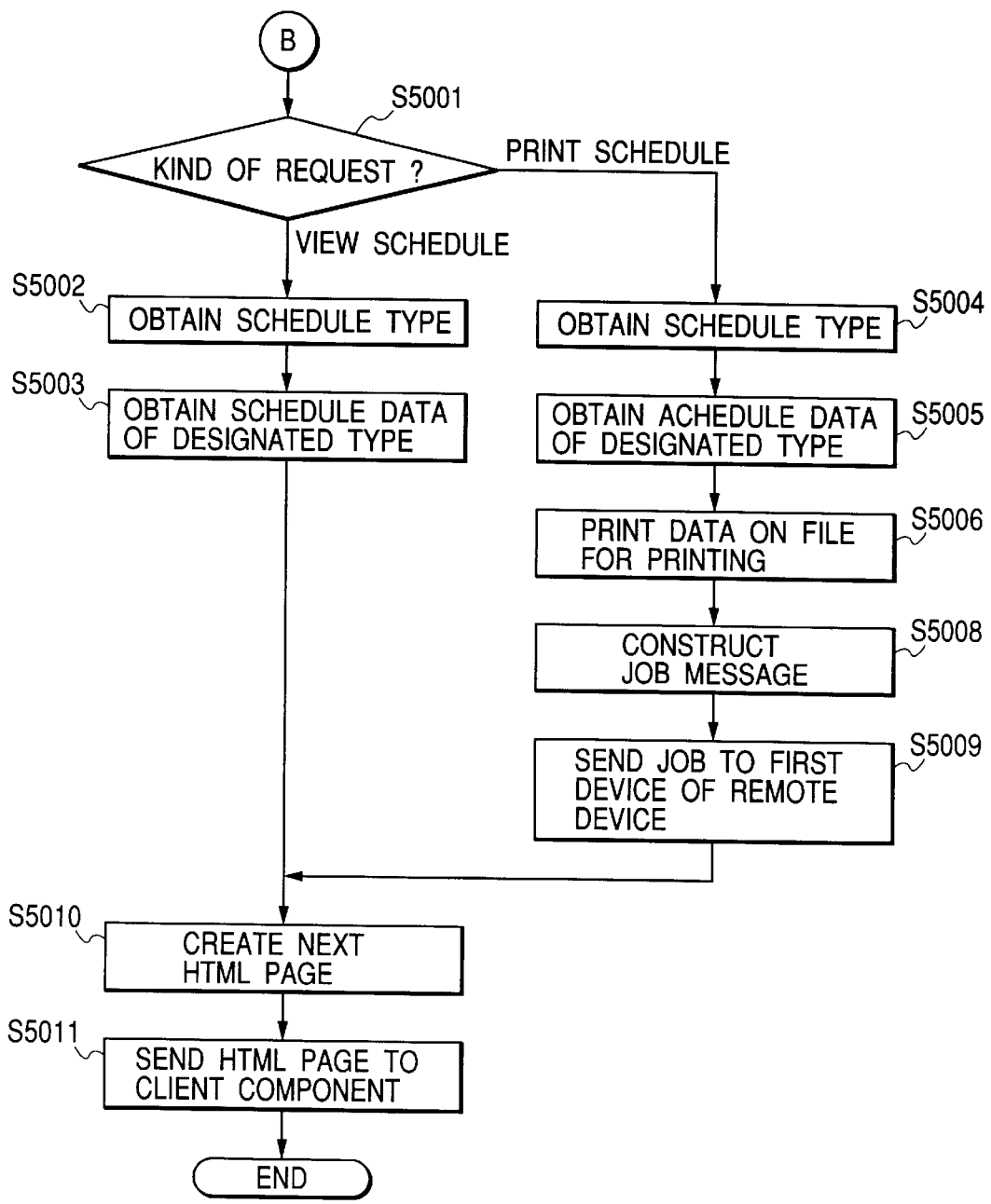
FIG. 50 is a flowchart showing the processing performed for a request concerning a schedule.

FIG. 50 is a flowchart showing the processing performed for a request related to a schedule. This processing is performed by the desk server when the request from the client component 102 is "View Schedule" or "Print Schedule".

When the request is "View Schedule", a check is performed to determine whether the schedule type is "Daily" or "Monthly", and schedule data are obtained (steps S5002 and S5003). When the request is "Print Schedule", the same process is performed as above, the data are written to a print file, a job message is generated, and the job is transmitted to the first device on the remote device list (steps S5004 to S5009).

In either case, a corresponding HTML page is generated, and is transmitted to the client component 102. The processing is thereafter terminated (steps S5010 to S5011).

Figure 51:
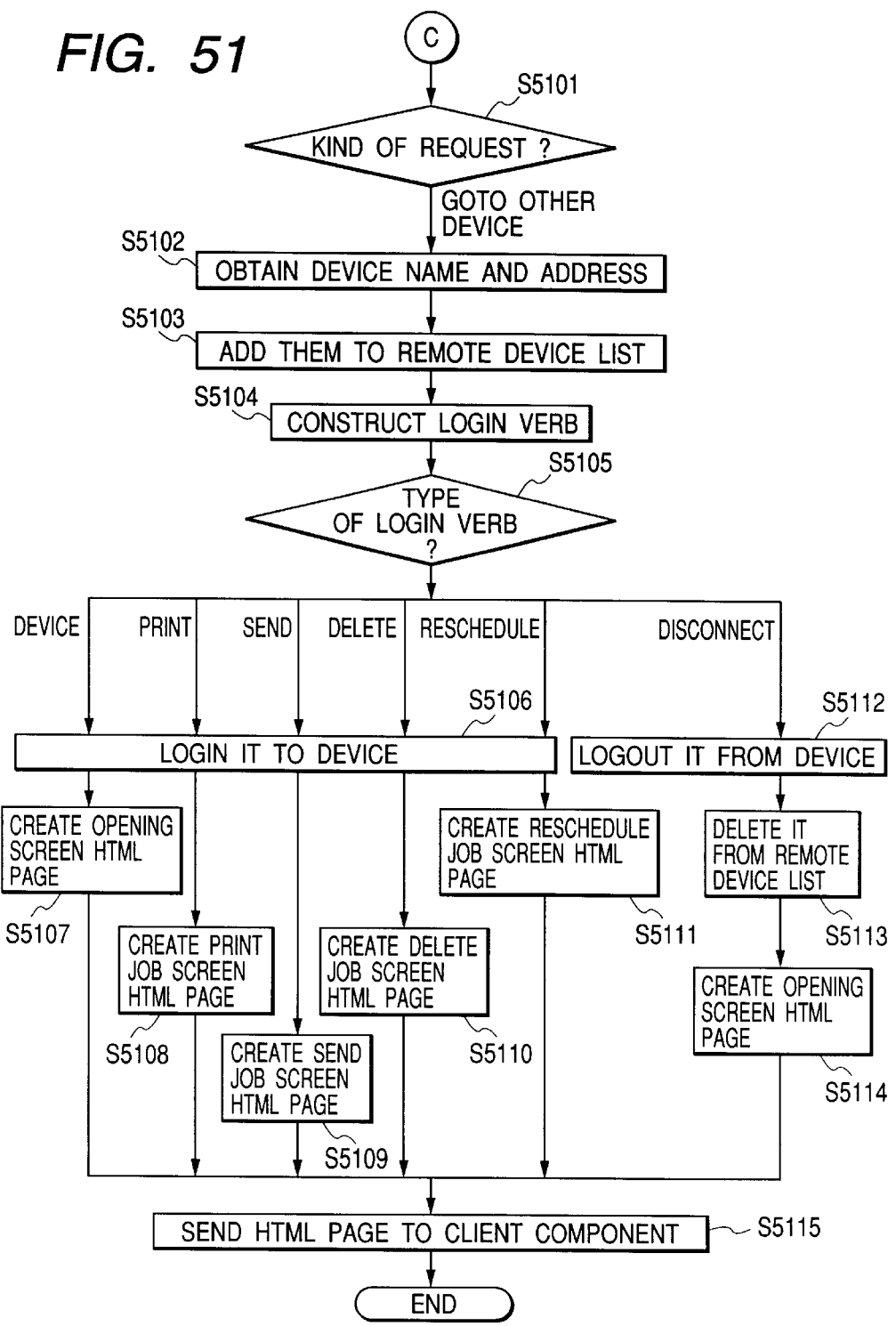
FIG. 51 is a flowchart showing the processing performed for a request concerning another device.

FIG. 51 is a flowchart showing the processing performed for a request related to another device. This processing is performed by the desk server when the request from the client component 102 is "Goto Other Device".

When the request is Goto Other Device, the name and the address of a device are obtained. Then, the device is added to the remote device list and the login verb is generated (steps S5102 to S5104). Using the login verb, the device is logged in, and finally a corresponding HTML page is generated and is transmitted to the client component 102 (S5105 to S5115). The processing is thereafter terminated. This processing is the same as that explained while referring to FIG. 16.

Figure 52:
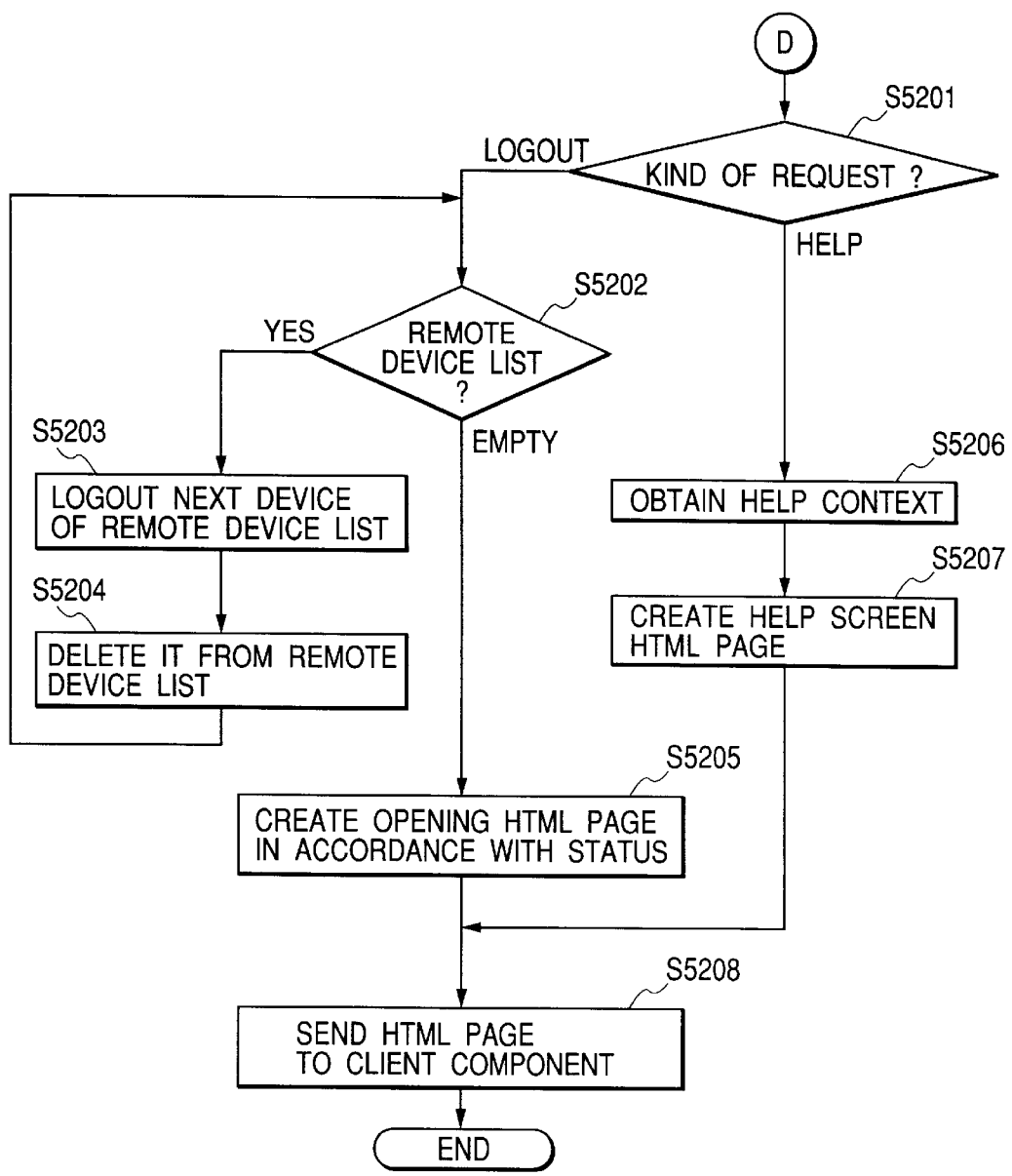
FIG. 52 is a flowchart showing the processing performed for a request concerning logout and help.

FIG. 52 is a flowchart showing the processing performed for a request related to logging-out or to help. This processing is performed by the desk server when the request from the client component 102 is "Logout" or "Help".

When at step S5201 a "Logout" request is received, at step S5202 a check is performed to determine whether the remote device list is empty. When the remote device list is empty, at step S5205, in accordance with the status, an OpeningScreen page is generated. When the remote device list is not empty, however, at step S5203 the next device is logged in using the login verb=Disconnect, and at step S5204 this next device is deleted from the remote device list. These processes are repeated until the remote device list has been emptied. That is, when all the devices on the remote device list have been logged out. When the list has been emptied, at step S5205 the OpeningScreen page is generated.

Upon receipt of a "Help" request, a help context parameter is obtained, and a corresponding help screen HTML page is generated (steps S5206 and S5207).

For both the requests, the generated HTML page is transmitted to the client component 102, and the processing is thereafter terminated.

Figure 53:
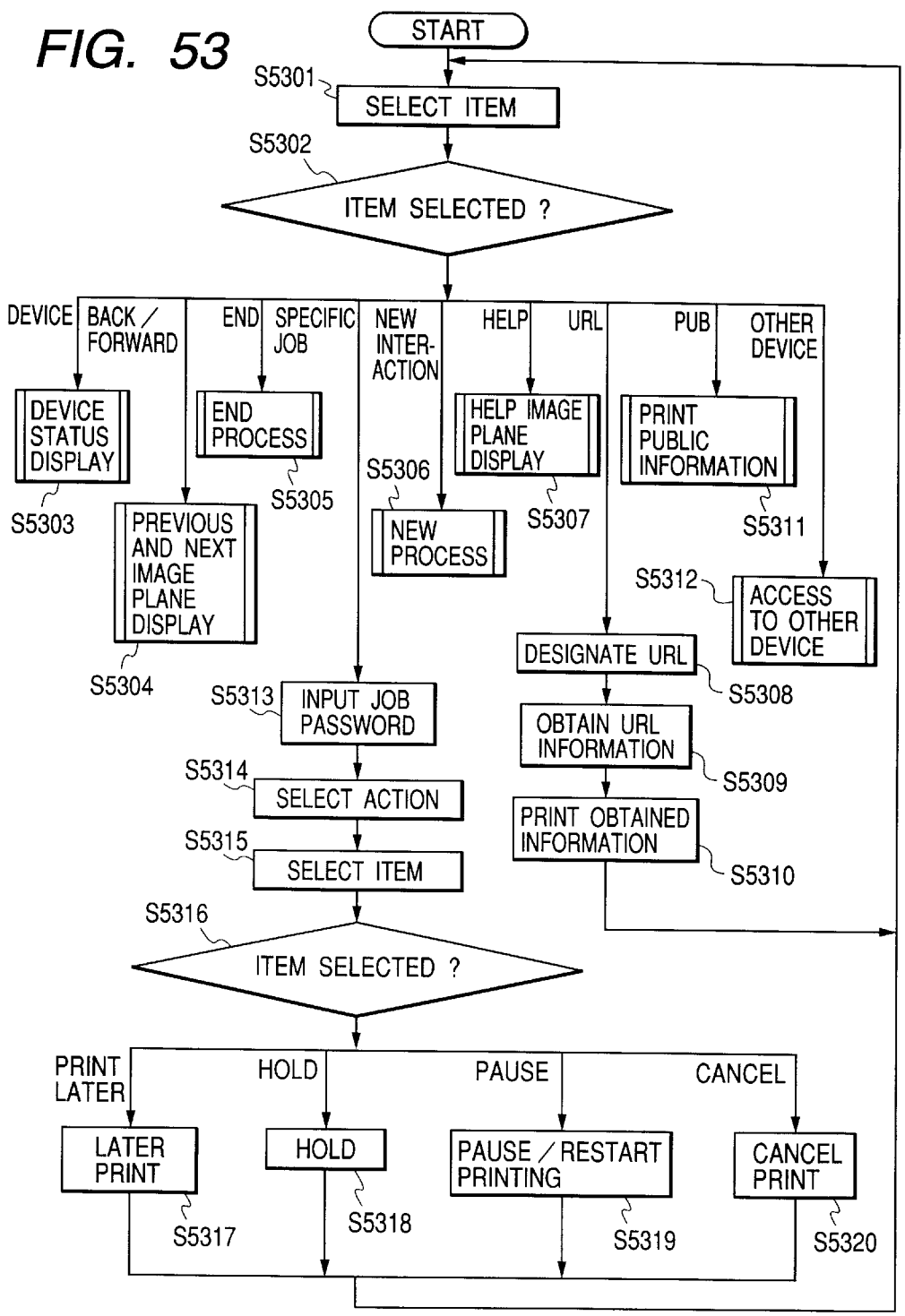
FIG. 53 is a flowchart showing the processing performed on an initial menu screen.
Figure 106:
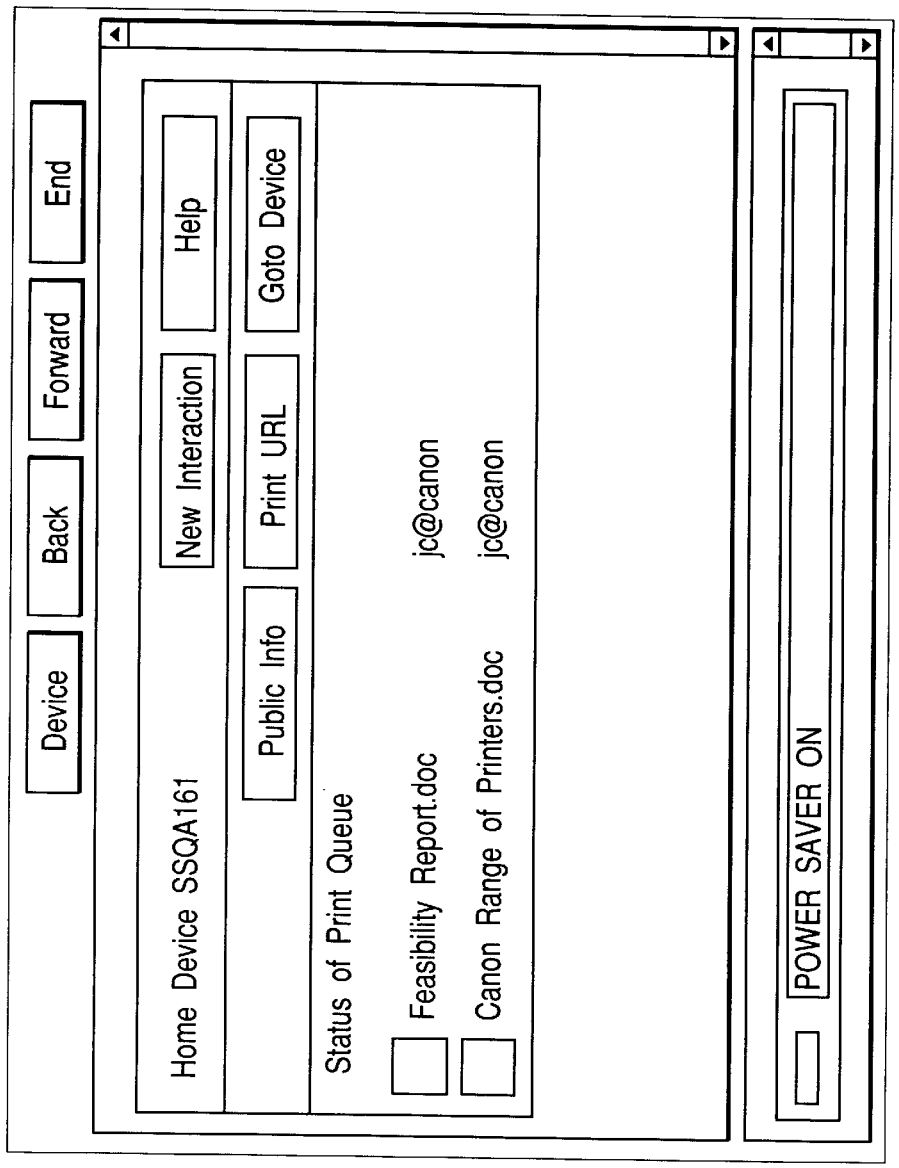
FIG. 106 is a diagram showing an example screen for an initial menu.

FIG. 53 is a flowchart showing the processing performed beginning at the initial menu screen. FIG. 106 is a diagram showing an example initial menu screen. When a job is present in a print queue, it is displayed on the status screen for the initial menu. The name and the sender of the job are displayed as job information.

At step S5301 a user selects a desired item from the initial menu. At step S5302 the selected item is established, and a new screen is displayed in accordance with the item.

First, when "Device" is selected, at step S5303 the state of the device is displayed. When "Back" or "Forward" is selected, at step S5304 the preceding or the succeeding screen is displayed. When "End" is selected, at step S5305 the end process is performed.

Figure 55:
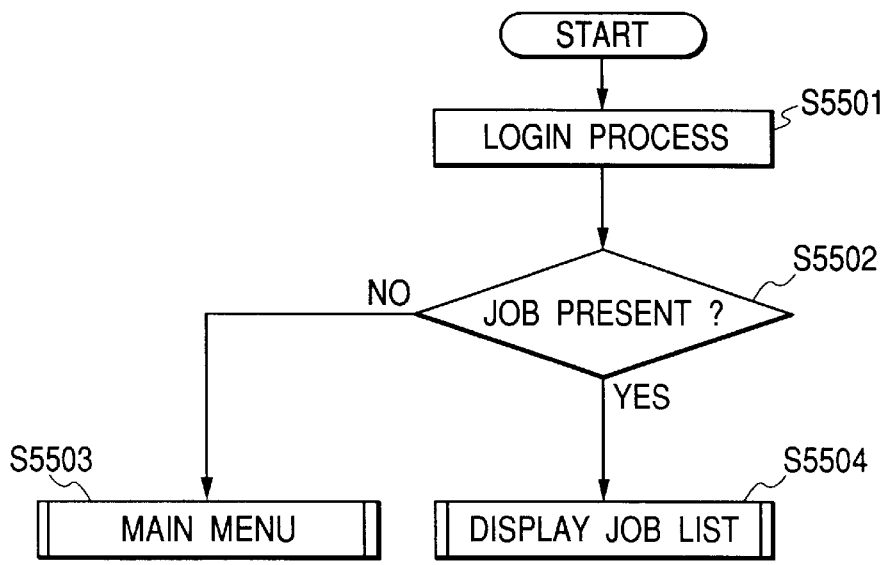
FIG. 55 is a flowchart showing the login processing.
Figure 112:
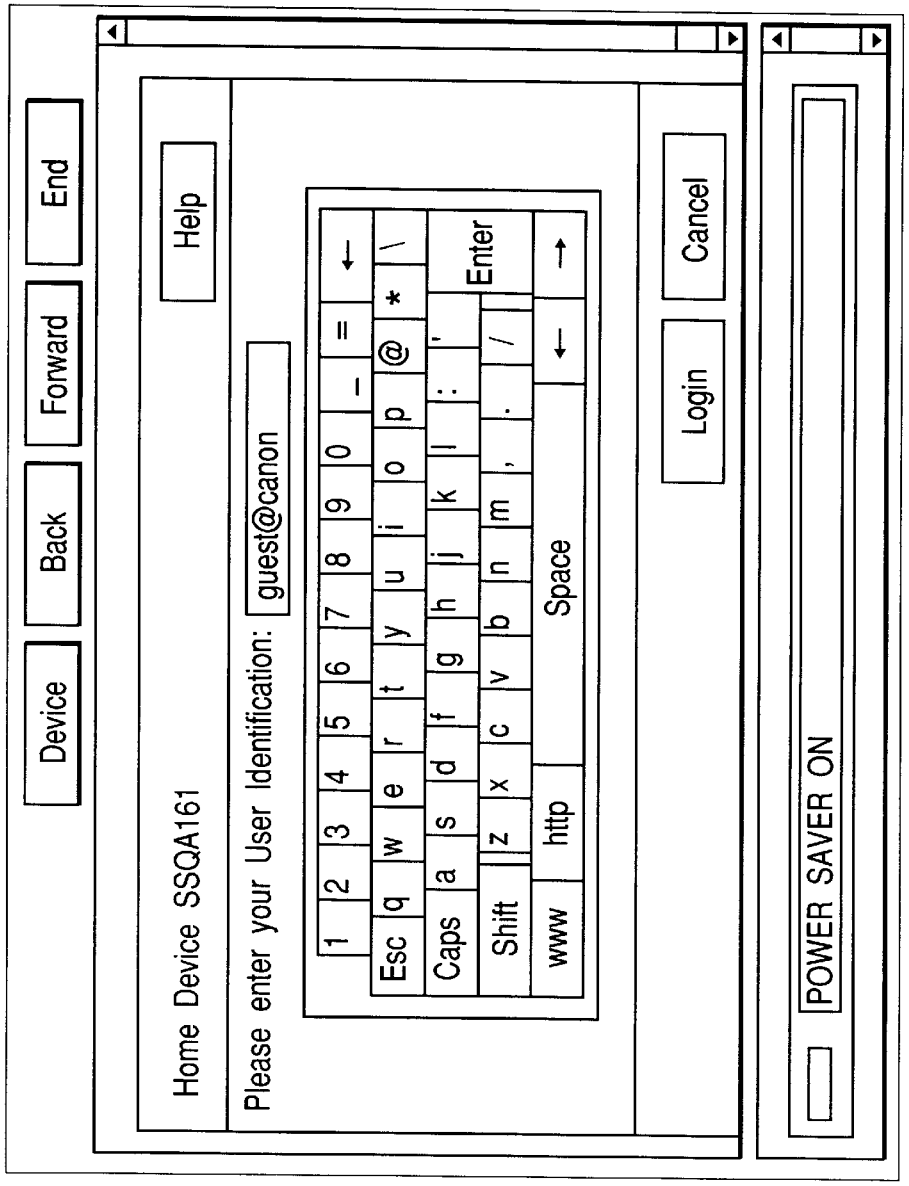
FIG. 112 is a diagram showing a login screen.

Furthermore, when "New Interaction" is selected, at step S5306 a new process (login process), which will be described later while referring to FIG. 55, is initiated, and the screen is changed to a "Login" screen (FIG. 112). When "Help" is selected, at step S5307 the help screen is displayed.

Figure 107:
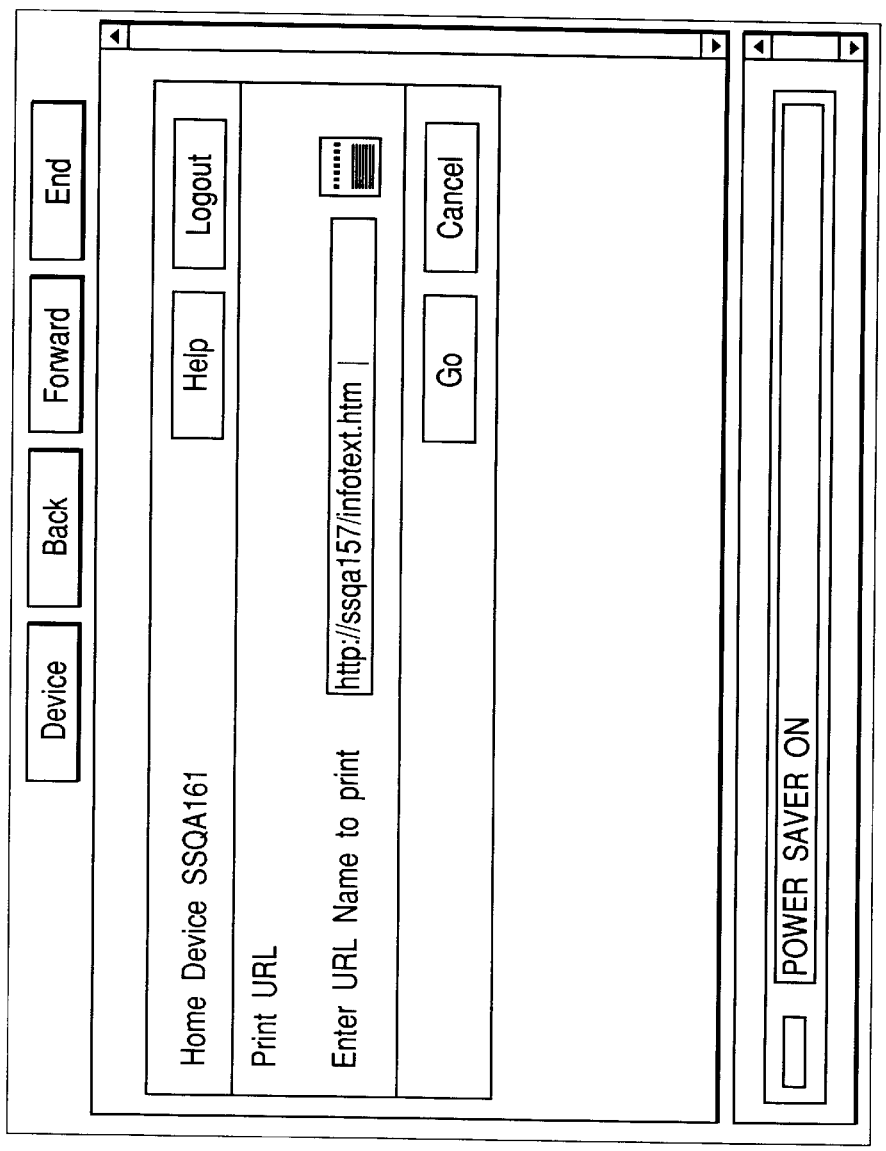
FIG. 107 is a diagram showing a URL print setup screen.

When "Print URL" is selected, the screen is changed to a "URL print" screen (FIG. 107). When at step S5308 the URL is directly input or is designated by a reference and "Go" is selected, at step S5309 information is obtained and previewed. At step S5310 the contents that are confirmed are printed, and then the screen is returned to the initial menu screen.

Figure 110:
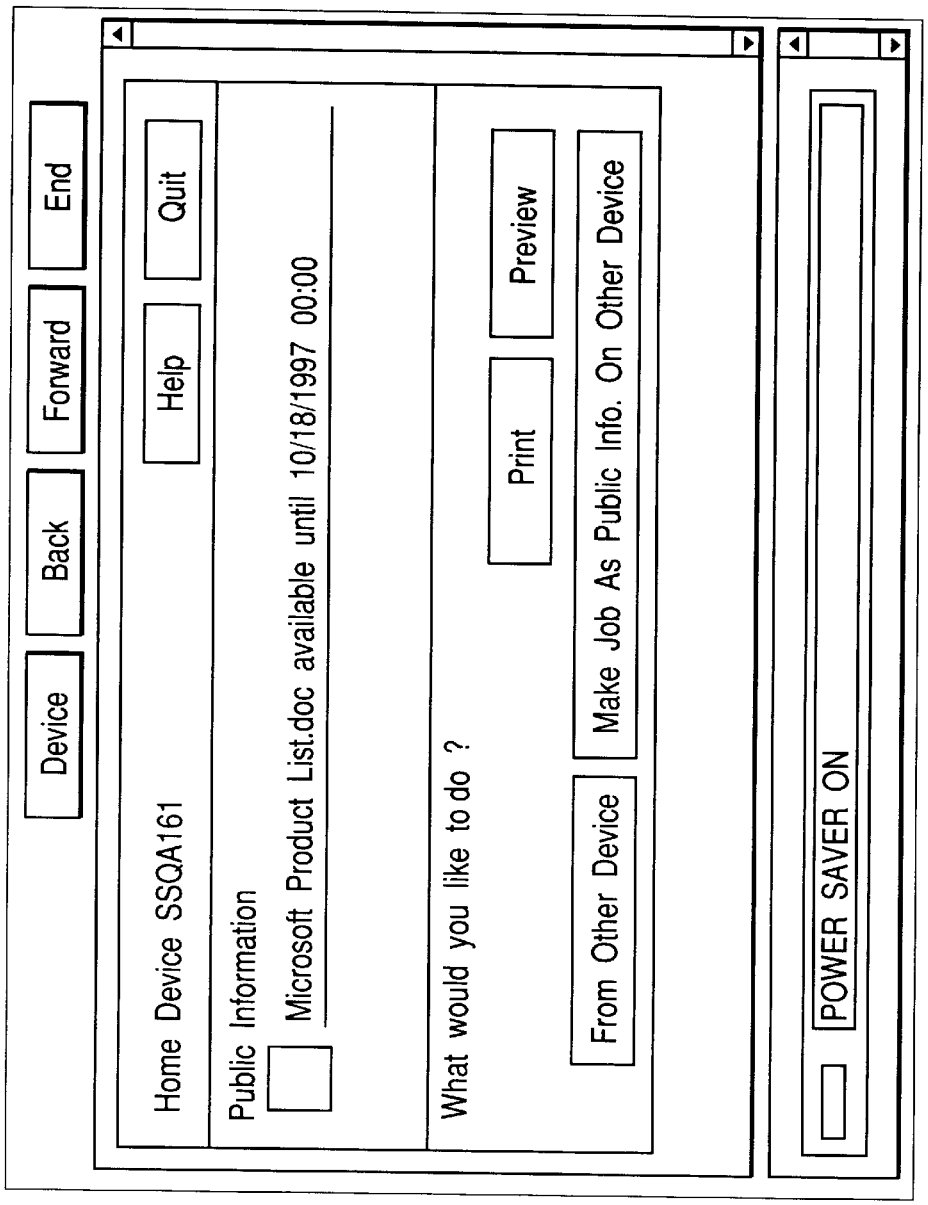
FIG. 110 is a diagram showing a setup screen for processing public information.

When "Public Info" is selected, at step S5311 program control goes to the public information processing, which will be described later while referring to FIG. 54, and the screen is changed to a "public information process" screen (FIG. 110).

When "Goto Device" is selected, at step S5312 a setup screen (FIG. 81) for accessing another device is displayed. Hereinafter performed is the same process as was performed when the login verb was "Device" in the processing for accessing another device that was explained in FIG. 51.

Figure 108:
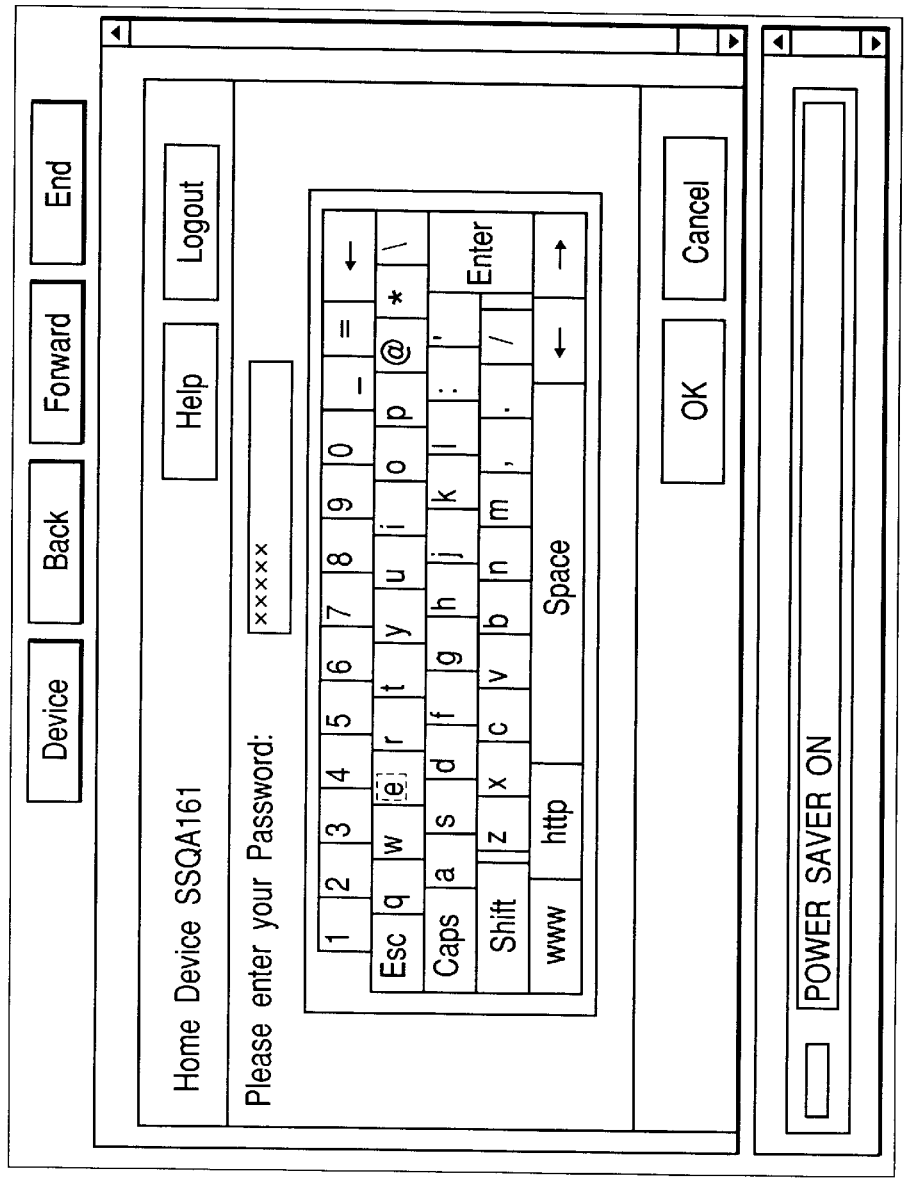
FIG. 108 is a diagram showing a password input screen.
Figure 109:
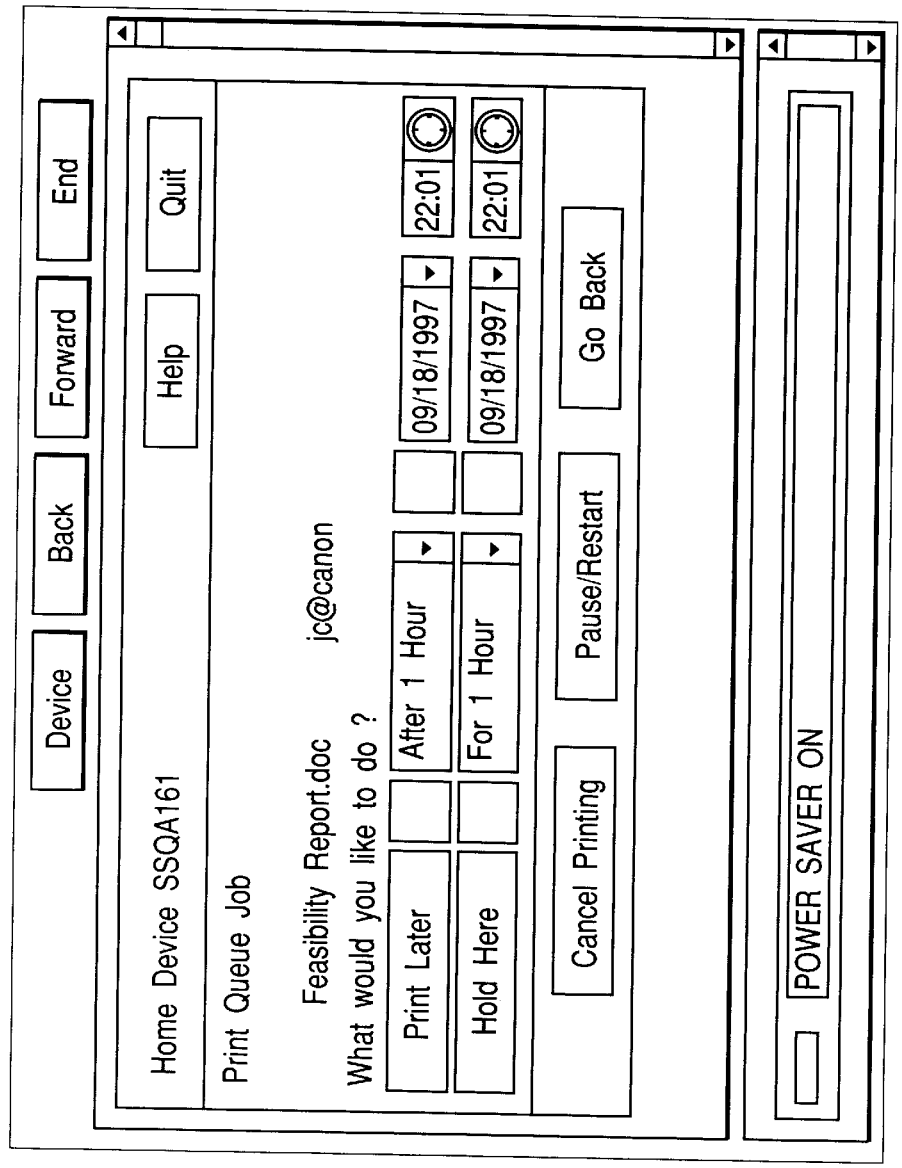
FIG. 109 is a diagram showing a setup screen for the processing performed for a job selected from a print queue.

A job in a print queue can also be selected on the initial screen. To select a job, a user touches a button displayed in front of a desired job name. When a specific job is selected in this manner, at step S5313 a password input screen (FIG. 108) is displayed. A password is input, and when it matches the password assigned for the selected job, a process setup screen (FIG. 109) is displayed for the job in the print queue that was selected.

Following this, at step S5314 an action for the job is selected, and at step S5315 an item concerning the execution of the action is selected. When "Print later" is selected as an action, a print time can be set as the item. A specific date (absolute date) can be set for the print time, or a relative time that must elapse following a setup time, such as "After 1 Hour", can be set. For this setup, items such as "1 hour later", "2 hours later", "6 hours later", "Tomorrow", "Day after tomorrow", "1 week later" or "2 weeks later", are prepared and listed as choices in a menu. When an absolute date is employed, the current date is regarded as a default value. To select and input another date, a pertinent date displayed on a calendar is touched. To select another time, the current time is changed.

When "Hold Here" is selected, the time for the holding period is set. In this case, as well as in the print data later case, the absolute date is designated for the holding limit, or a holding period, such as one hour (For 1 Hour), can be selected and set in the menu. To designate an absolute date or a relative date, a touch keyboard may be displayed with which numerals can be directly entered, or a displayed numeral may be incremented or decremented the number of times a specific button is selected.

The action is set and is performed in accordance with the action-associated item and the date item that are thus selected or established. First, when "Print later" is selected, at step S5317 a print job is deleted from the print queue, and with the print time (absolute time) is entered in the pending job list. The screen is then returned to the initial menu screen, and when the setup time is reached, printing is performed.

When "Hold" is selected, at step S5318 the print job is deleted from the print queue, and with the action "Hold" and the set holding limit is entered in the pending job list. The screen is then returned to the initial menu screen. Thereafter, the job is held the period of time represented by the holding period, but will be canceled if it is not processed before the holding period has expired.

When "Pause/Restart Printing" is selected, at step S5319 printing is temporarily halted, the screen is returned to the initial menu screen, and the selection of "Pause/Restart Printing" (a second depression of the same button) is waited for. When "Cancel Printing" is selected, at step S5320 the print job is deleted from the print queue, and "Cancel" is recorded in the history as the action taken for this job. The screen is then returned to the initial menu screen.

Figure 54:
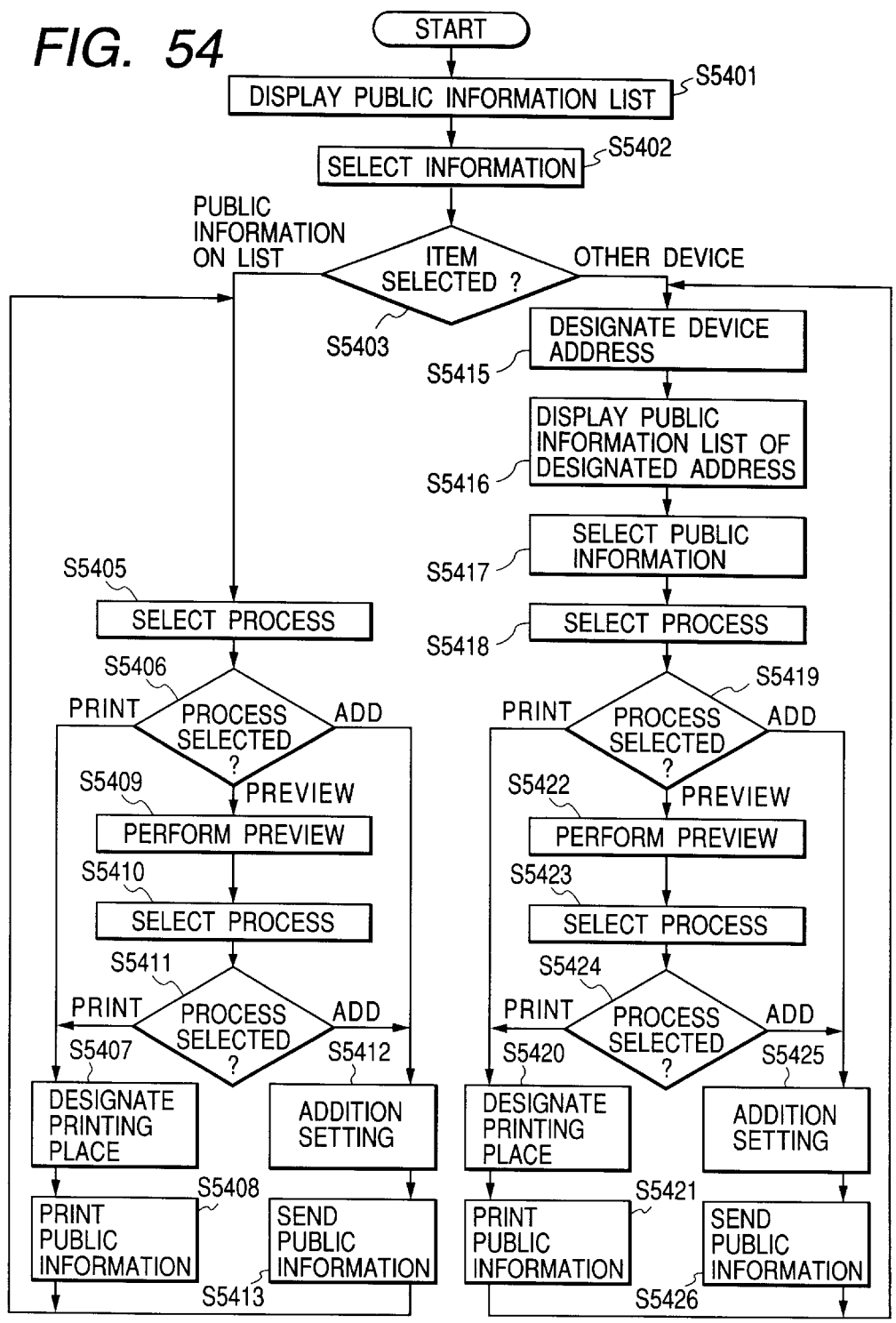
FIG. 54 is a flowchart showing the processing performed for public information.

FIG. 54 is a flowchart showing the processing for public information. The screen shifting and the sequence for the processing are shown when the "Public Info" item in the initial menu screen is selected. First, at step S5401 a public information list for the printer is displayed. FIG. 110 is a diagram showing an example setup screen for a public information list and for public information processing. Information having an attribute called public information (a job having an action called "public") is displayed in the list, and can be printed without any password being required.

When at step S5402 a specific job is selected from the list, program control goes to step S5405. When "From Other Device" is selected, program control goes to step S5415 to process the public information stored in another device.

At step S5405 a process corresponding to the specific job is selected. When "Print" is selected, at step S5407 a printing place, which will be descried later in detail in the printing process for a normal job, and the printing time, as needed, are designated. At step S5408 the selected public information is printed. When "Preview" is selected, at step S5409 the previewing of data is performed, and at step S5410 the next process is selected.

Figure 111:
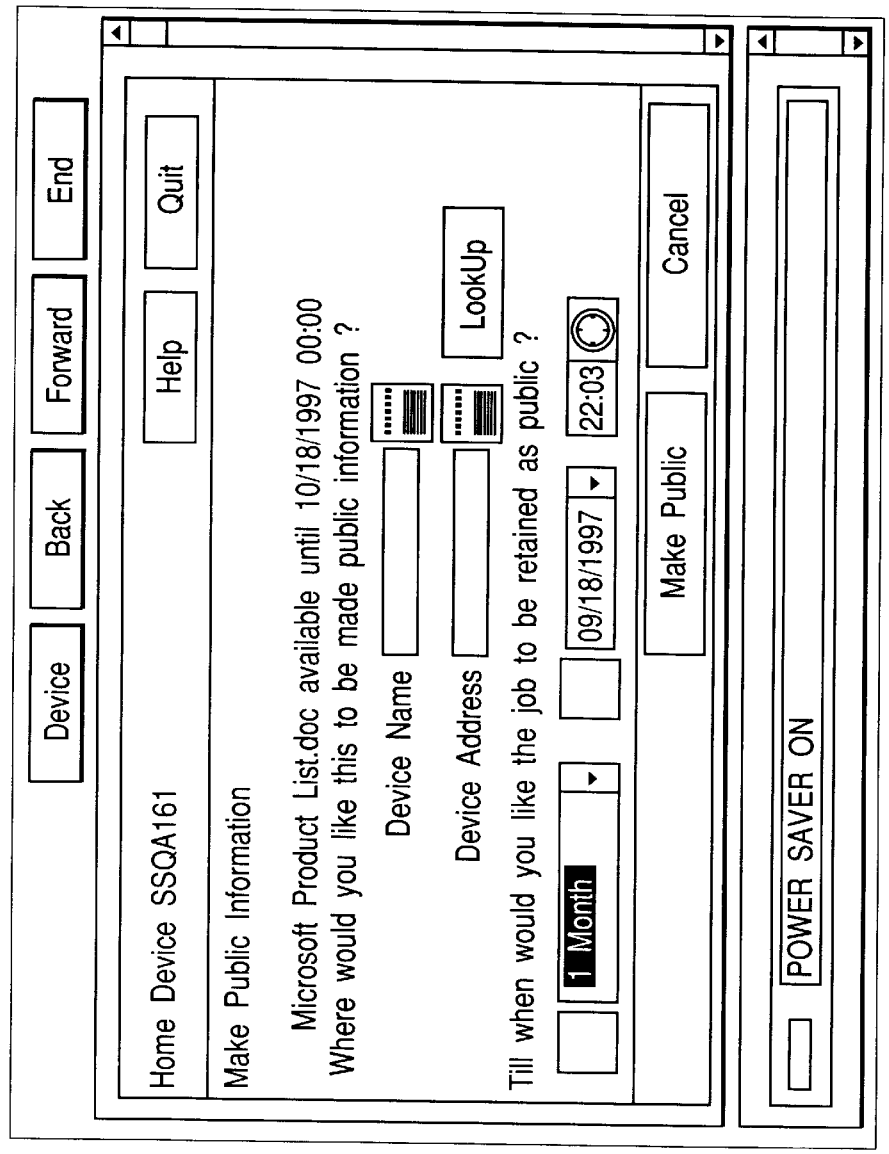
FIG. 111 is a diagram showing an example setup screen for publishing information using another device.

If at step S5406 or S5410 "Add (Make Job Public Info. For Other Device)" is selected, another device is designated for publishing the selected public information, and the selected public information is added to the publication list for the device. FIG. 111 is a diagram showing a setup screen for publishing the information on another device.

At step S5412 the address and the name are given of a device that is designated to serve as an added destination. Also designated is the period of time for the publication of the information. For this, as in the previous Printing/Holding case, an absolute date may be set to constitute the publication period, or instead, a time period may be set that is measured from the current time. If immediate publication of the information is not desired, a beginning date for the publication process may be set. In this case, a relative period, such as "1 week later", can also be employed. In order to limit the publication period, the period designated for the publication of public information is examined before a list of such information is displayed, and information for which the publication period has expired is disregarded. Such a list may be examined periodically, and information for which the publication period has expired can be deleted.

At step S5415 the previously described setup screen (FIG. 81) for accessing another device is displayed, and the address and the name of the designated device that is to be accessed are entered. At step S5416 the public information list is obtained from the accessed device and is displayed. Hereinafter, the same process can be performed as is performed for a local device.

FIG. 55 is a flowchart showing the login processing performed when the performance of a new process on the initial menu is selected. First, at step S5501 a "Login" screen (FIG. 112) is displayed, and the user's identifier that has been input is examined. When the login is permitted, at step S5502 a check is performed to determine whether there are jobs available for the user who has logged in, i.e., pending jobs. If there are such jobs, at step S5504 the list of jobs (FIG. 113) is displayed, and to initiate a process to perform the action, a job is selected which will be described later while referring to FIG. 56. If no jobs are available, at step S5503 the main menu (FIG. 121) is displayed and is used for the initiation of processing, a process which will be described while referring to FIG. 64.

Figure 56:
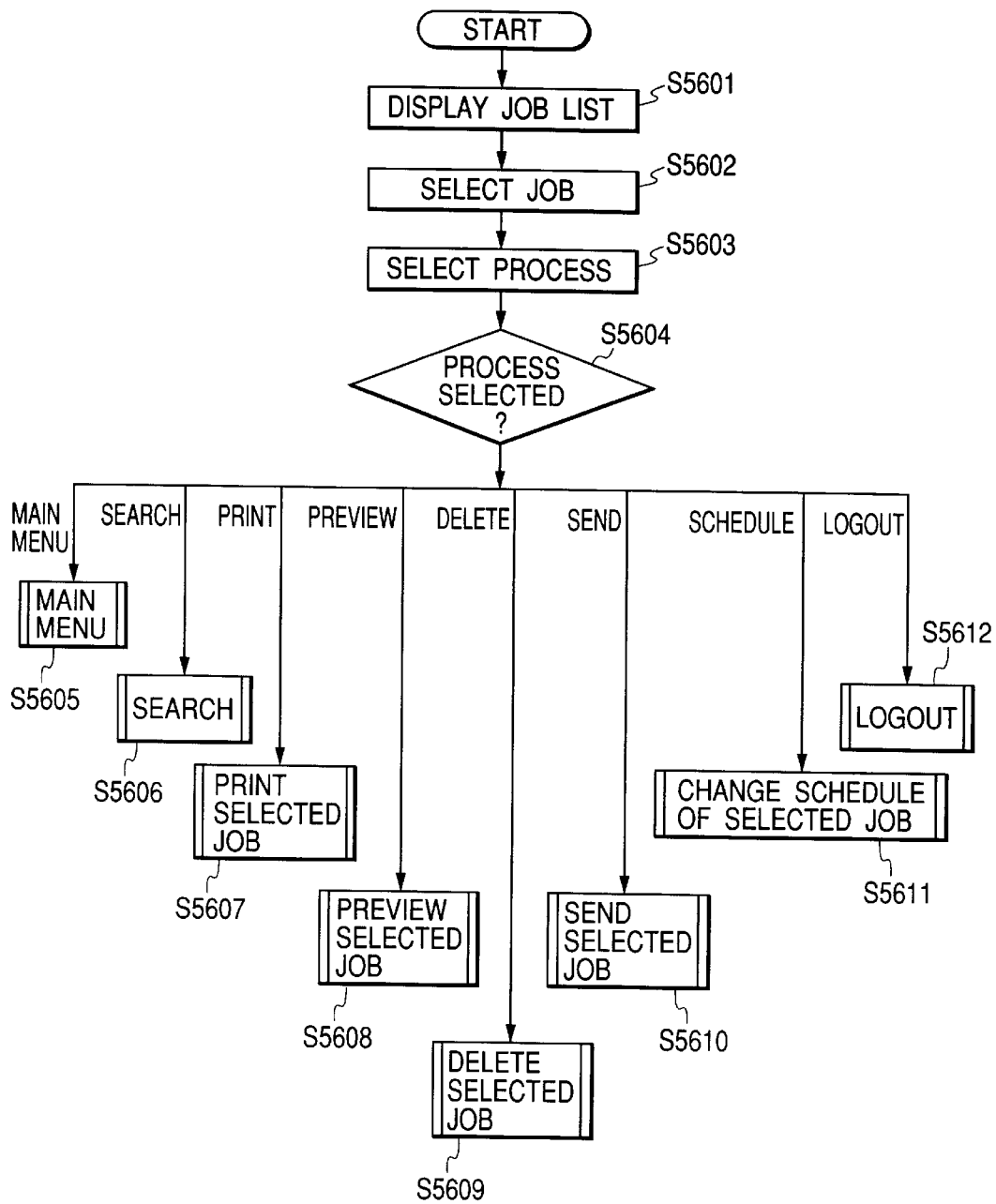
FIG. 56 is a flowchart showing the processing performed to select a job and to perform an action.
Figure 113:
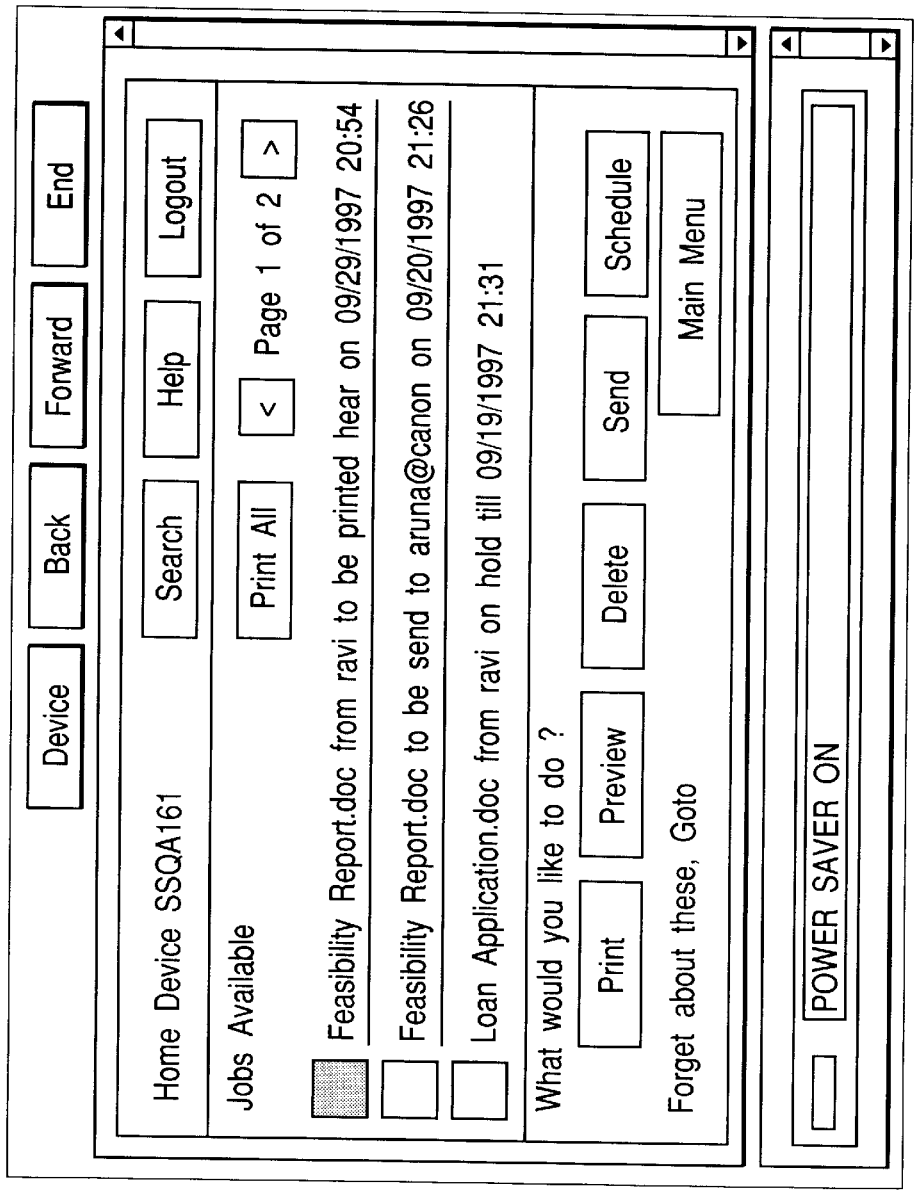
FIG. 113 is a diagram showing an example pending job list.

FIG. 56 is a flowchart showing the processing for selecting a job and for performing an action. This processing is performed when a job is available for a user who has logged in, and at step S5601 a list of pending jobs is displayed. FIG. 113 is a diagram showing an example pending job list.

The pending jobs are a job that is to be printed on a specific date, a job that is to be transmitted on a specific date, and a job that is simply to be held until a specific date has been reached (and which will be deleted if it is not processed before the specified date). Job names, the senders or the recipients, the action types (Print, Send and Hold), and scheduled action dates are entered in the list. A variety of colors or identifying marks that correspond to different action types are employed for the displayed jobs so that their types can be readily identified. By changing their statuses to "Done" or "Canceled", jobs that have already been executed or that have been canceled can continue be maintained in the history and, as needed, can be displayed in the list with the jobs that are to be executed. It should be noted that, in this case, the display forms of these jobs are changed in accordance with their statuses.

Figure 64:
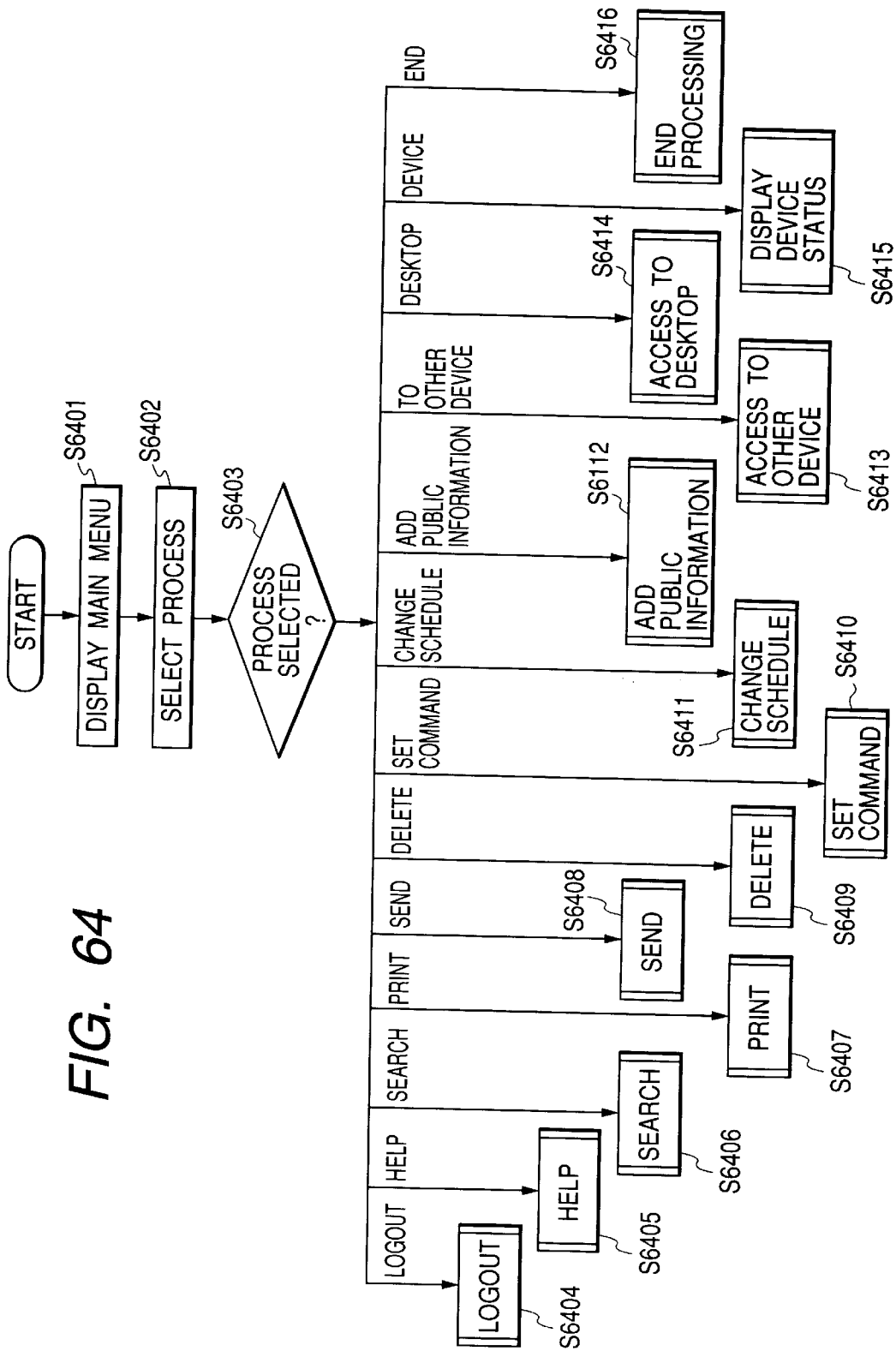
FIG. 64 is a flowchart showing the processing performed beginning at a main menu.

At step S5602 a target job is selected, and at step S5603 a process (action) corresponding to the selected job is selected. When at step S5604 "Main Menu" is selected, at step S5605 processing beginning at the main menu, which will be described later while referring to FIG. 64, is performed. When "Search" is selected, at step S5606 search processing is performed that will be described later while referring to FIG. 65. When "Print" is selected, at step S5607 the selected job is printed, which will be described later while referring to FIG. 60. When "Send" is selected, at step S5610 the selected job is transmitted, which will be described later while referring to FIG. 62. When "Preview" is selected, at step S5608 the selected job is previewed, which will be described later while referring to FIG. 57. When "Delete" is selected, at step S5609 the selected job is deleted, which will be described later while referring to FIG. 58. When "Schedule" is selected, at step S5611 the schedule for the selected job is changed, which will be described later while referring to FIG. 59. And when "Logout" is selected, at step S5612 the logout processing that was explained while referring to FIG. 52 is performed.

Figure 57:
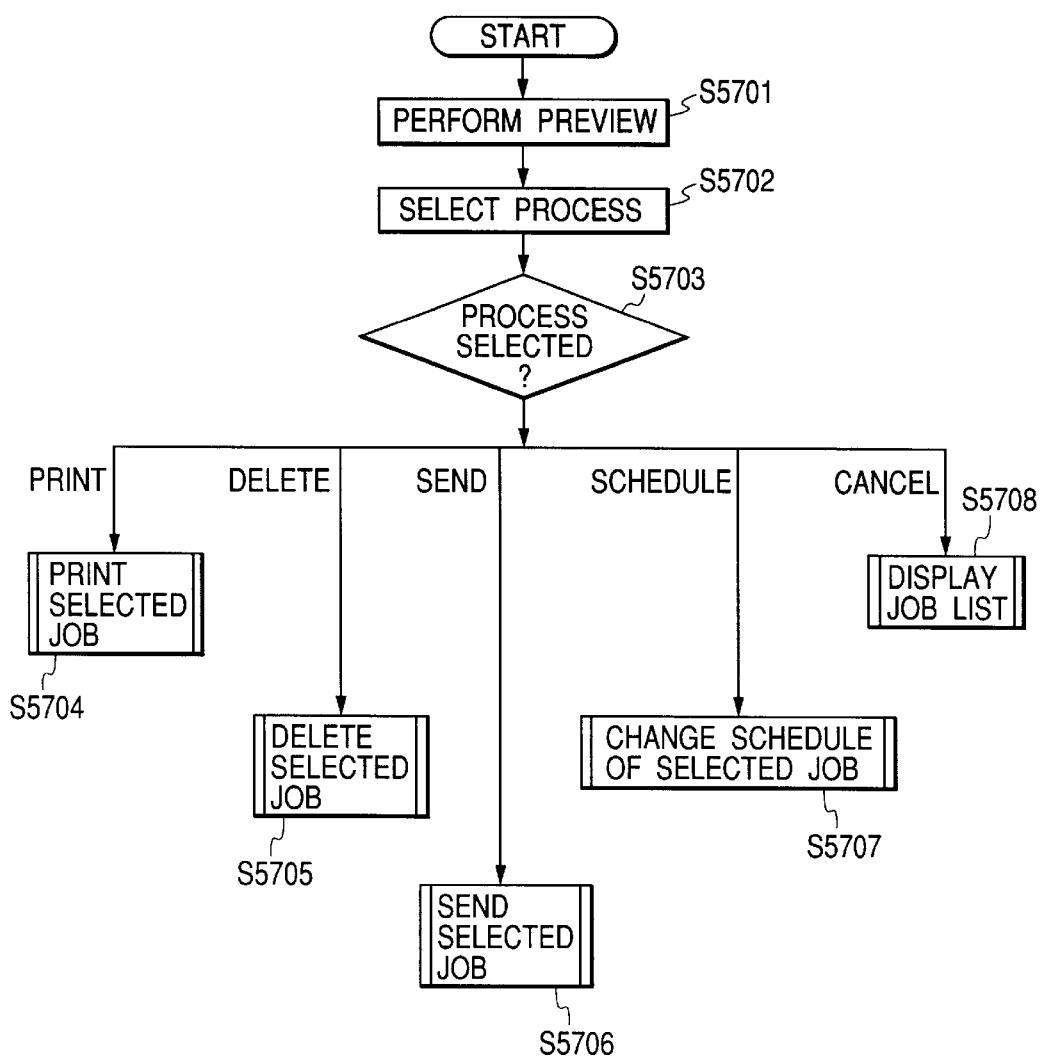
FIG. 57 is a flowchart showing the processing performed to preview a selected Job.
Figure 114:
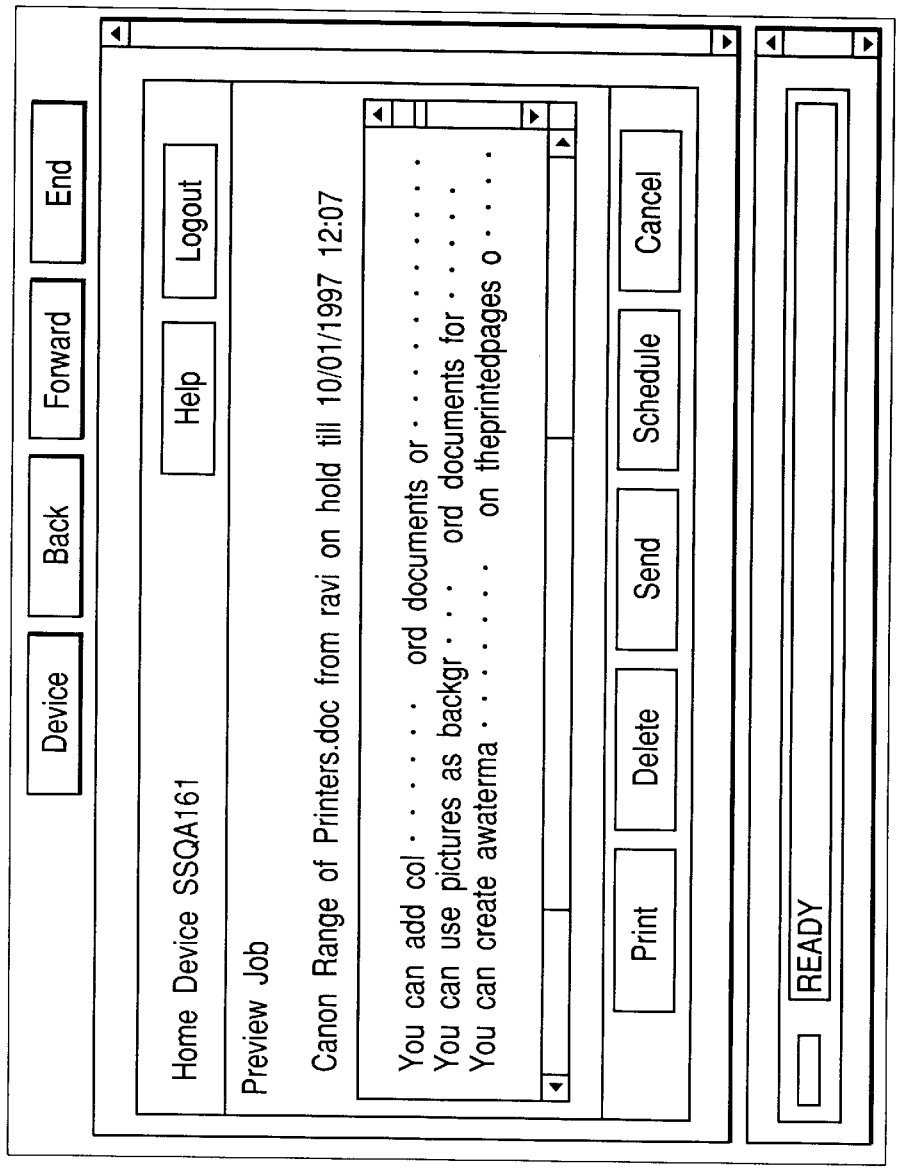
FIG. 114 is a diagram showing a job preview screen example.

FIG. 57 is a flowchart showing the selected job preview processing for previewing a job that is selected from the list of available jobs. At step S5701 a specified job is previewed. FIG. 114 is a diagram showing an example job preview screen. At step S5702 a process for the specified job is selected.

When at step S5703 "Print" is selected, at step S5704 the selected job is printed, which will be described later while referring to FIG. 60. When "Send" is selected, at step S5706 the selected job is transmitted, which will be described later while referring to FIG. 62. When "Delete" is selected, at step S5705 the selected job is deleted, which will be described later while referring to FIG. 58. When "Schedule" is selected, at step S5707 the schedule for the selected job is changed, which will be described later while referring to FIG. 59. And when "Cancel" is selected, at step S5708 the screen display is returned to that for the display of the job list that was explained while referring to FIG. 56.

Figure 58:
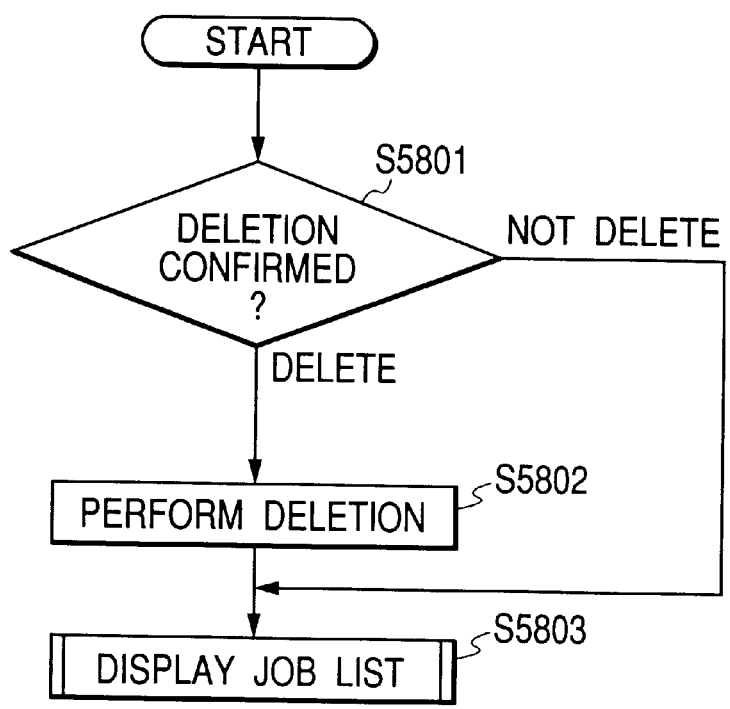
FIG. 58 is a flowchart showing the processing performed to delete a selected Job.
Figure 115:
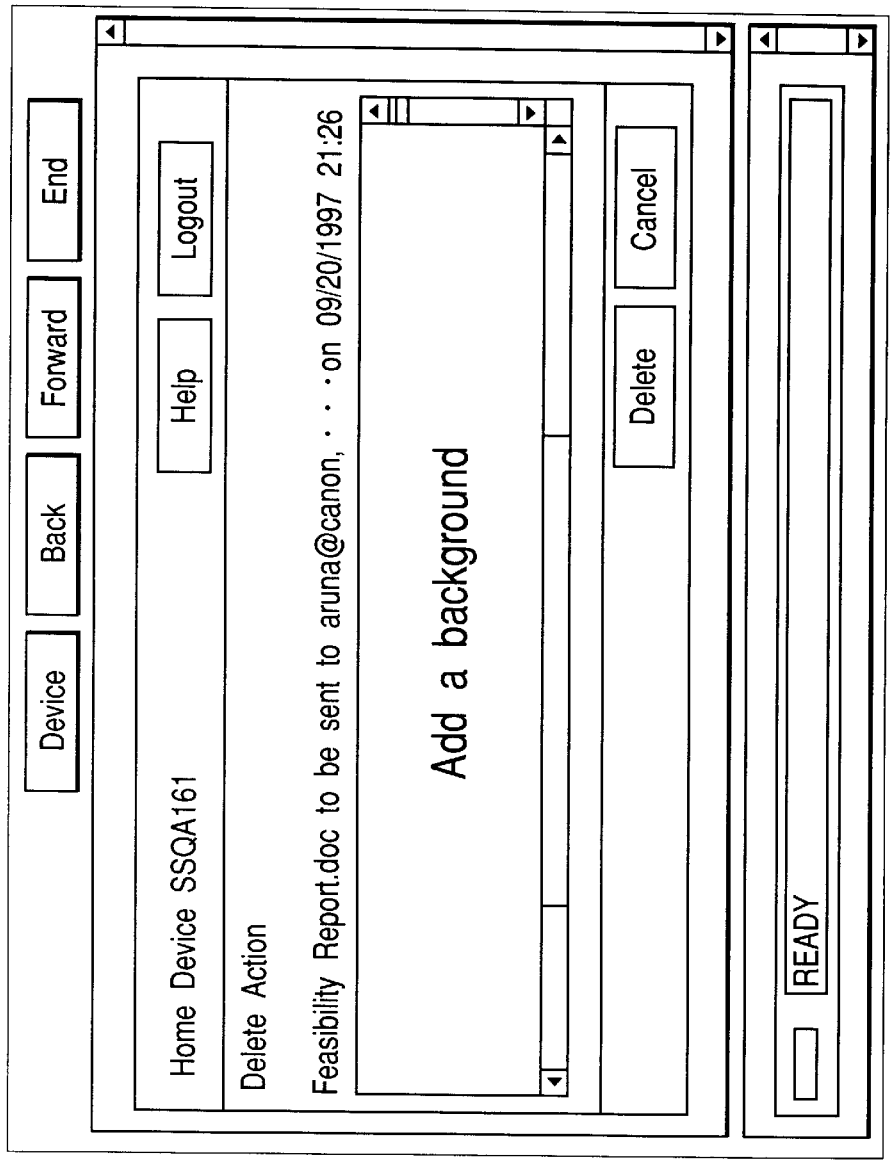
FIG. 115 is a diagram showing a screen for confirmation of deletion.

FIG. 58 is a flowchart showing the selected job deletion processing performed when a job selected from the list of available jobs is to be deleted. First, at step S5801 a job to be deleted is previewed together with the identification information for the job in order to permit the user to confirm the deletion. FIG. 115 is a diagram showing a deletion confirmation screen. When "Delete" is selected, at step S5802 the deletion of the job is initiated. At this time, the processing explained in FIG. 97 is performed. Since a job to be deleted is selected from the pending job list, its action status is "Unexecuted", whereas the status of a deleted job is "Canceled", which is recorded in the history for the user. At step S5803 the screen is returned to the display of the job list explained in FIG. 56.

Figure 59:
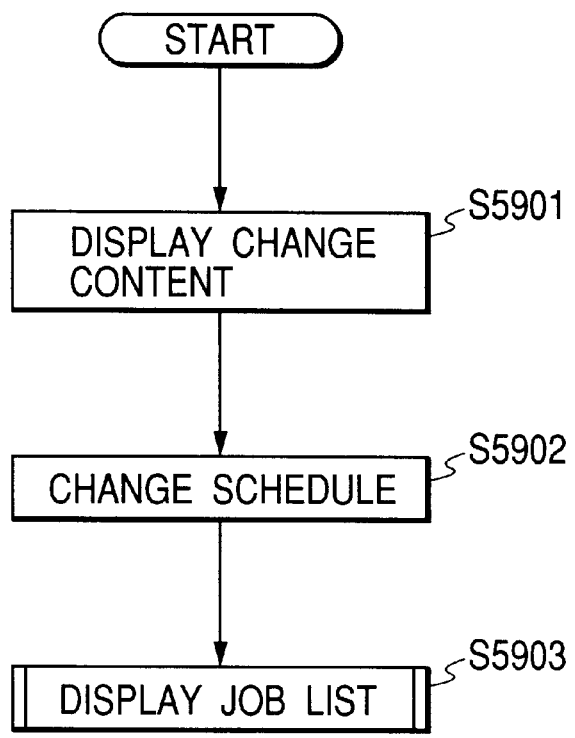
FIG. 59 is a flowchart showing the processing performed to change a schedule for a selected Job.
Figure 116:
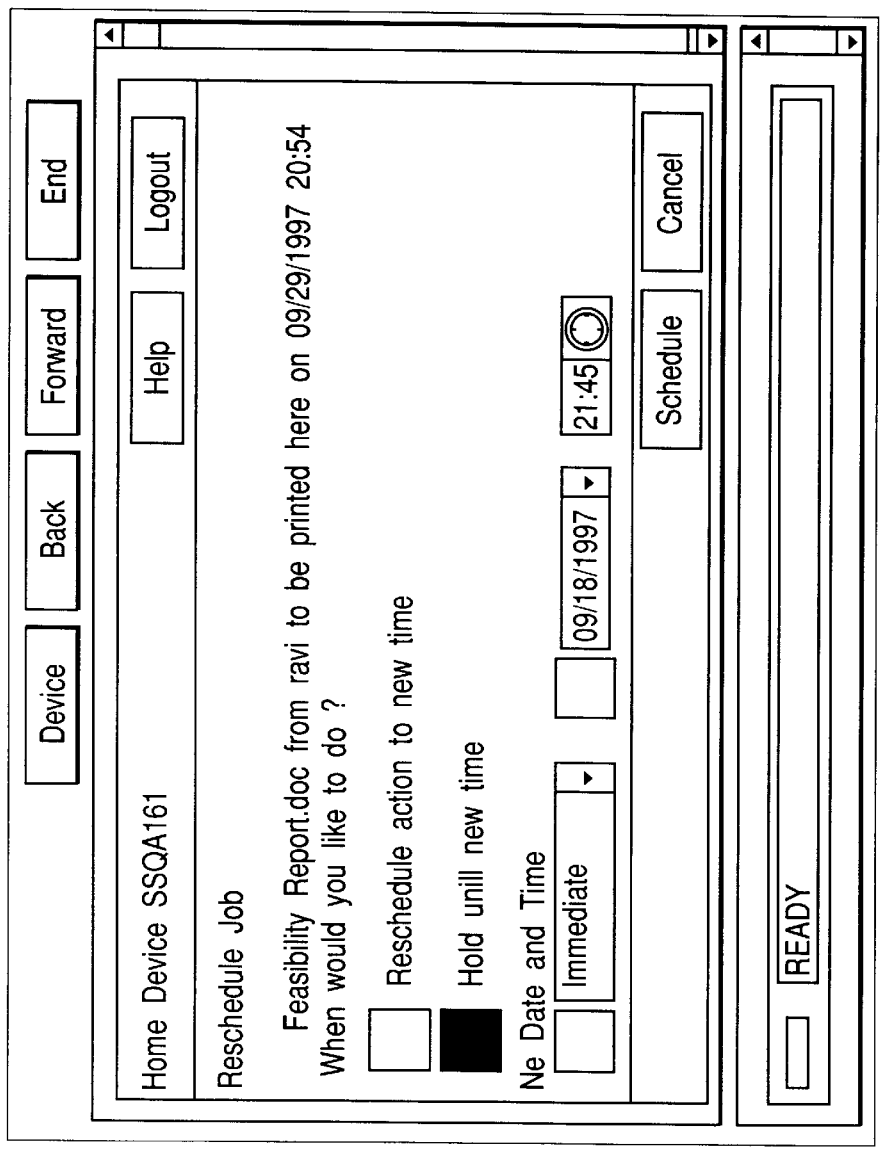
FIG. 116 is a diagram showing a setup screen for changing a schedule.

FIG. 59 is a flowchart showing the processing for changing the schedule of a selected job. This processing is performed to change the schedule for a job selected from an available job list. At step S5901 the current schedule, which is to be changed, is displayed. FIG. 116 is a diagram showing a setup screen for changing the schedule. At step S5902 the schedule is changed. At step S5903 the screen is returned to the display of the job list explained in FIG. 56.

Figure 60:
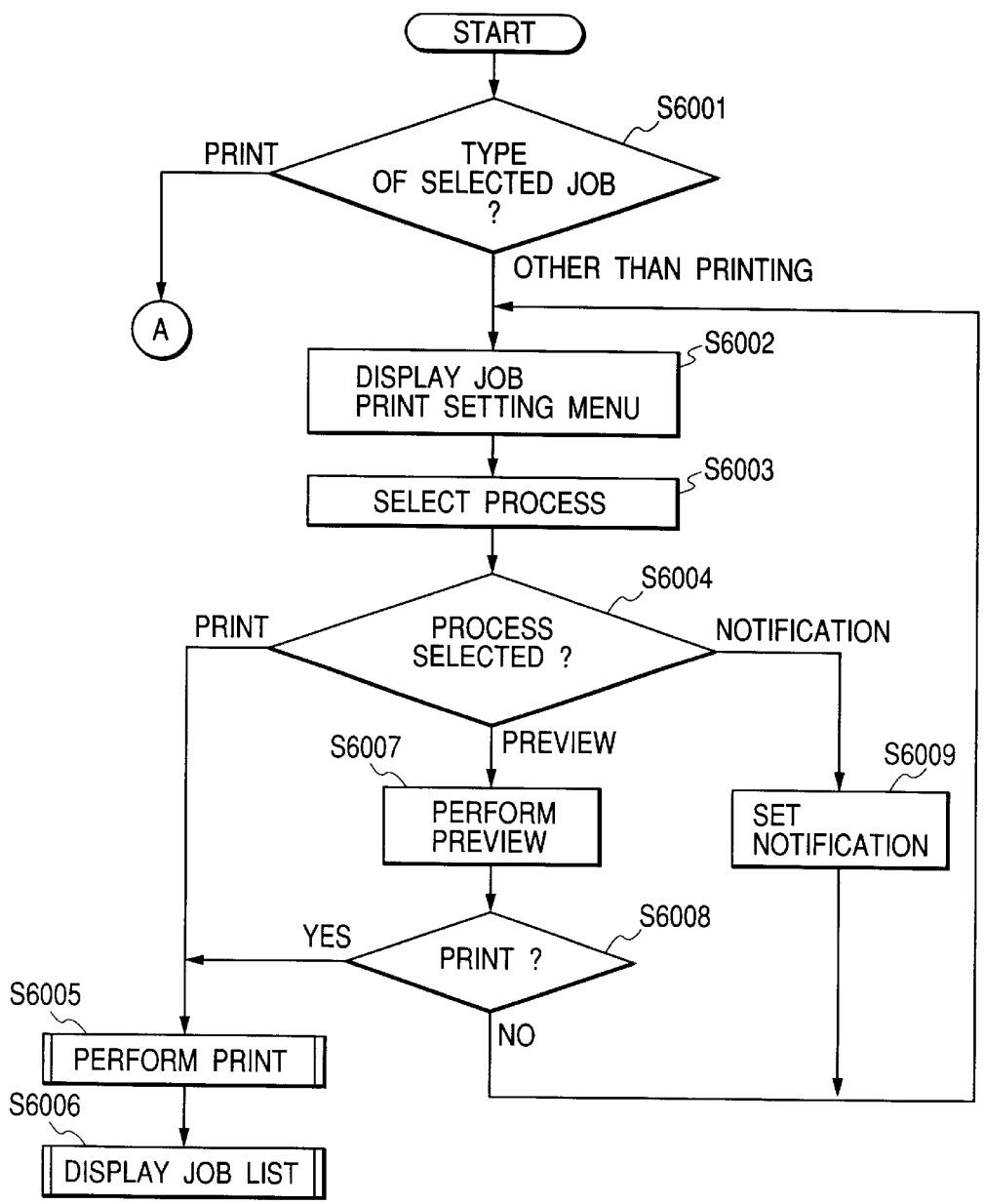
FIG. 60 is a flowchart showing the processing performed to print a selected Job.
Figure 117:
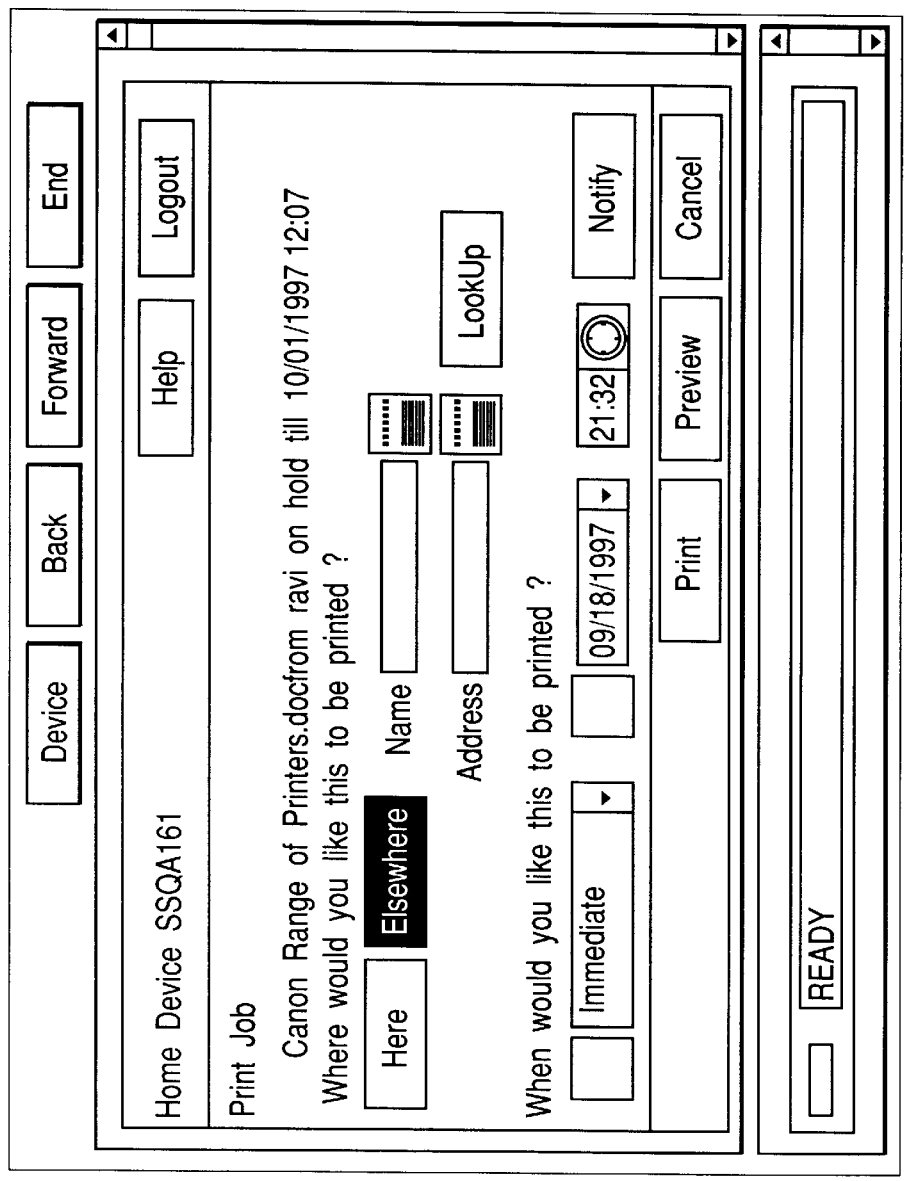
FIG. 117 is a diagram showing an example print setup menu.

FIG. 60 is a flowchart showing the processing for printing a selected job. This processing is performed to print a job that is selected from the available job list. At step S6001 the original action type of a selected job is determined. When the original action type is not "Print", at step S6002 a print setup menu is displayed. FIG. 117 is a diagram showing an example print setup menu. The setup items are the place at which printing is to be performed (a local device or another device), a device name and, if a different device is selected for employment, its address, and the printing time.

To print using a different device, "Send" is recorded as the action type in the history for the job. When printing is initiated by a different device, a Send method, which will be described later, or a Transfer method may be employed for the transmission of data.

Figure 118:
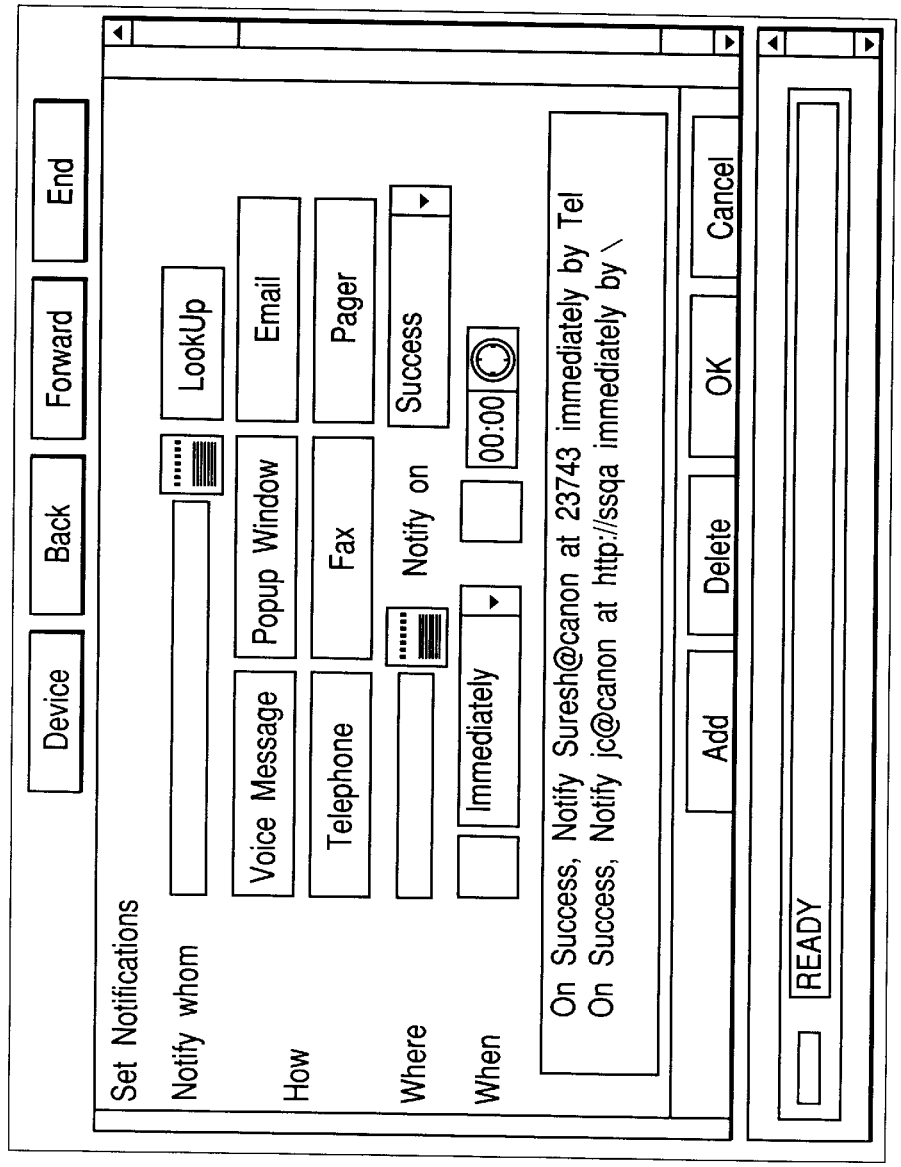
FIG. 118 is a diagram showing a notification setup screen.

At step S6003 a process is selected. When at step S6004 "Print" is selected, at step S6005 the contents entered by the user are set for the device, and if immediate printing is instructed, the printing is initiated. At step S6006 the screen is returned to the display of the job list that was explained in FIG. 56. When "Preview" is selected, at step S6007 the data are previewed, and if printing is required, program control moves to step S6005. When "Notify" is selected, at step S6009 a notification is set and the screen is returned to the print setup menu. FIG. 118 is a diagram showing an example notification setup screen. The notification setup items are the name of a notification recipient, a notification medium (a voice message, a popup window, e-mail, a telephone, a facsimile machine, or a pager), a notification destination (an address, a telephone number, etc.), a notification trigger (at the time of a success, at the time of a failure, at the time of accessing, etc.), and a time extending from the triggering of the notification until the actual issuance of a notification. In addition, on this screen can be displayed a list of notifications, for each of which are included the setup contents.

Figure 61:
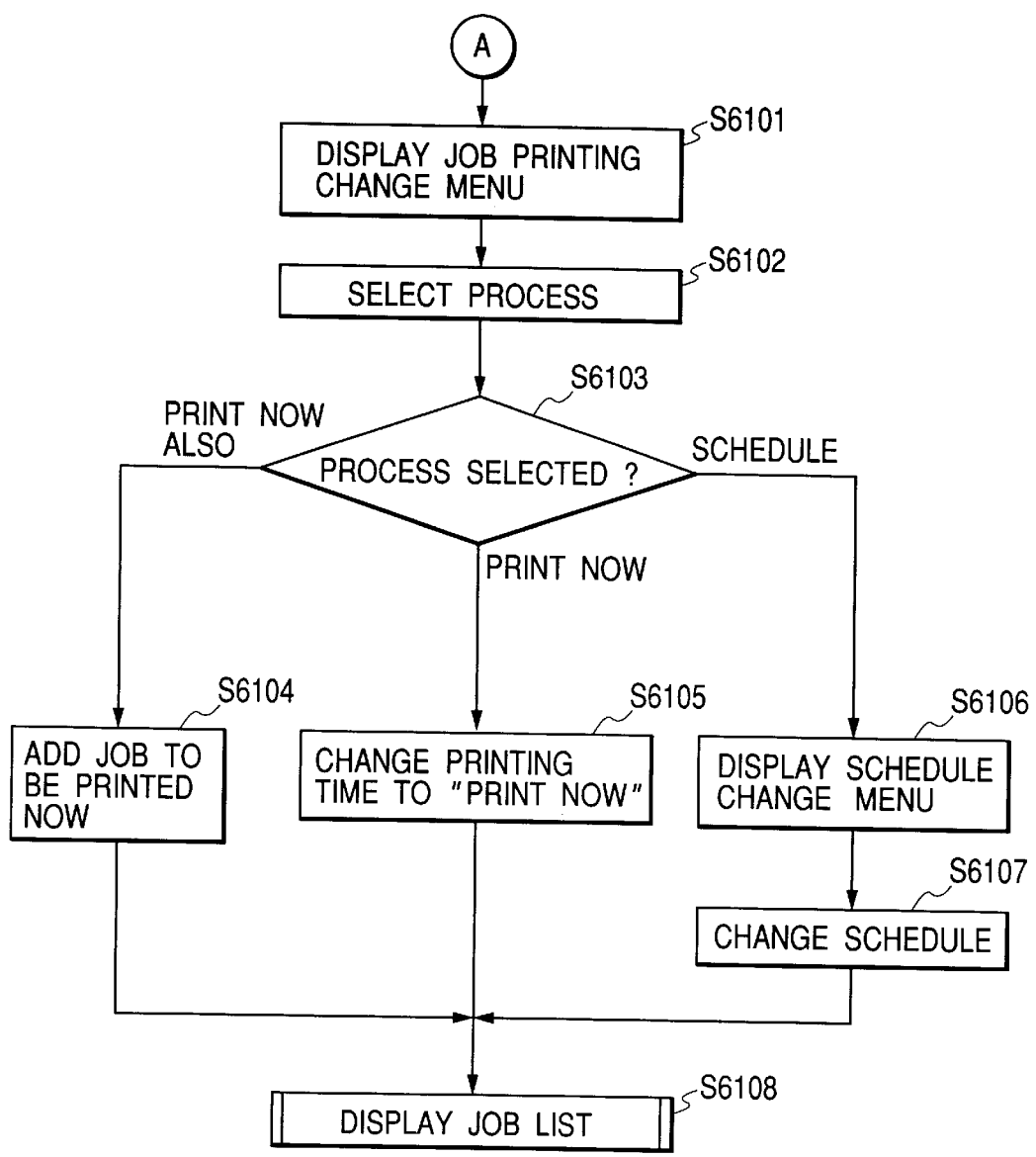
FIG. 61 is a flowchart showing the processing performed to change a print setup for a selected Job.

FIG. 61 is a flowchart showing the processing for changing the print setup for a selected job. In FIG. 61 the state shifting and the processing sequence are shown when the original action type of a selected job is "Print".

Figure 119:
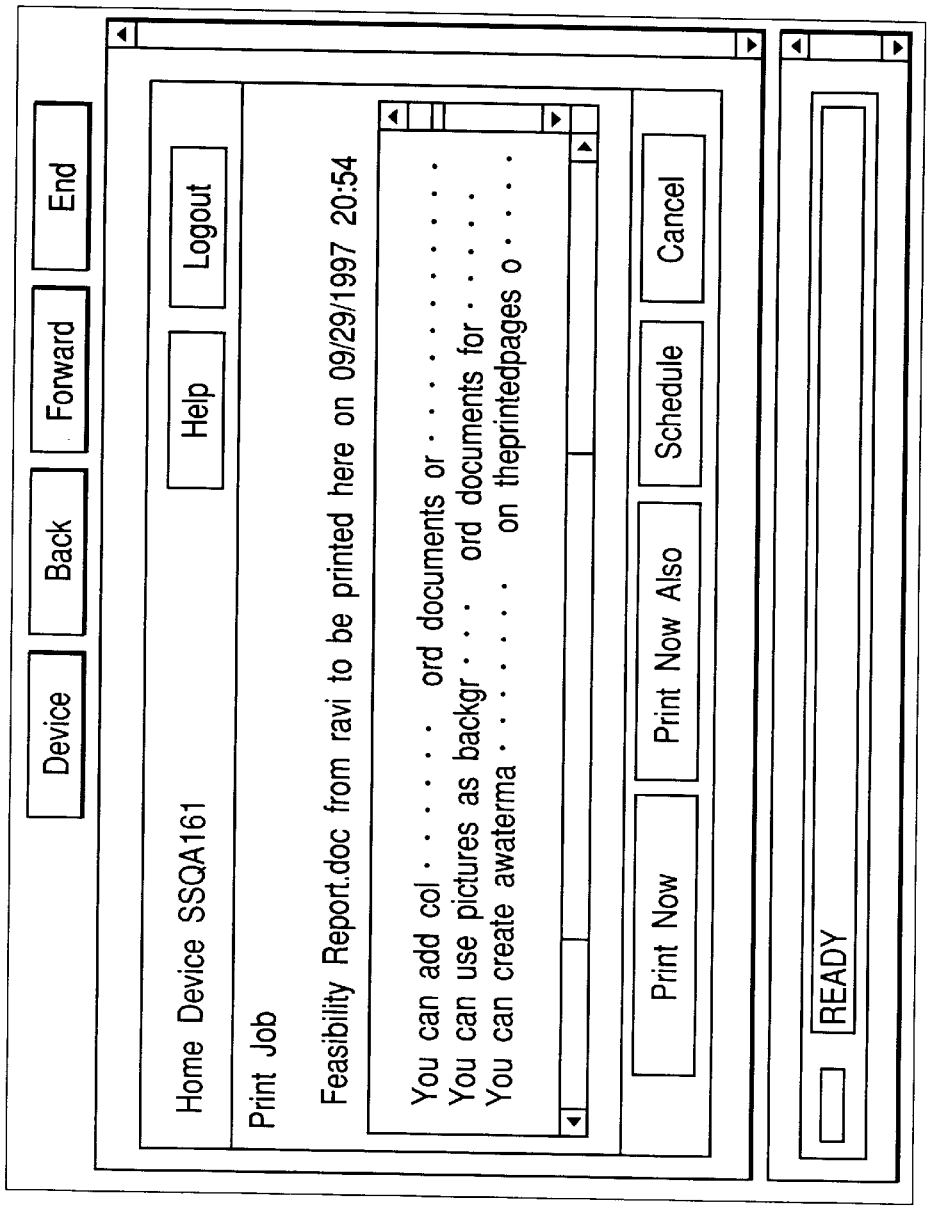
FIG. 119 is a diagram showing an example print setup change menu.

At step S6101 a print setup change menu is displayed. FIG. 119 is a diagram showing an example print setup change menu. At step S6102 a process corresponding to a selected job is designated. When "Print Now Also" is selected, at step S6104, in addition to the selected job, a job is added for which the print time for the selected job is used as the current time. When "Print Now" is selected, the print time for the selected job is changed to the current time. Therefore, in these cases, the printing is performed at the current time. When "Schedule" is selected, at step S6106 the schedule change menu in FIG. 116 is displayed. At step S6107 the print schedule is changed by using the menu. In either case, at step S6108 the screen is returned to the display for the job list that was explained in FIG. 56.

Figure 62:
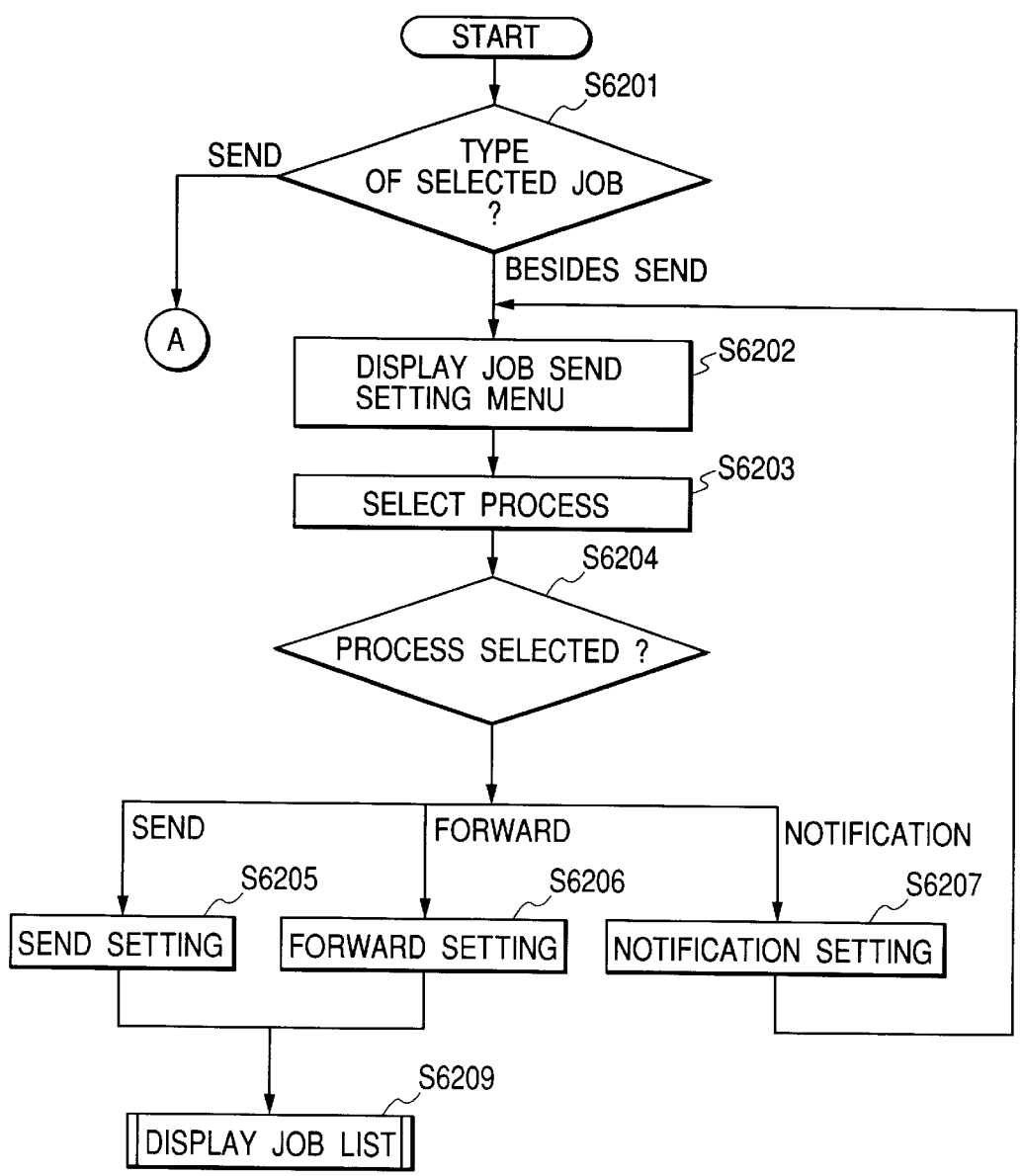
FIG. 62 is a flowchart showing the processing performed to transmit a selected Job.
Figure 63:
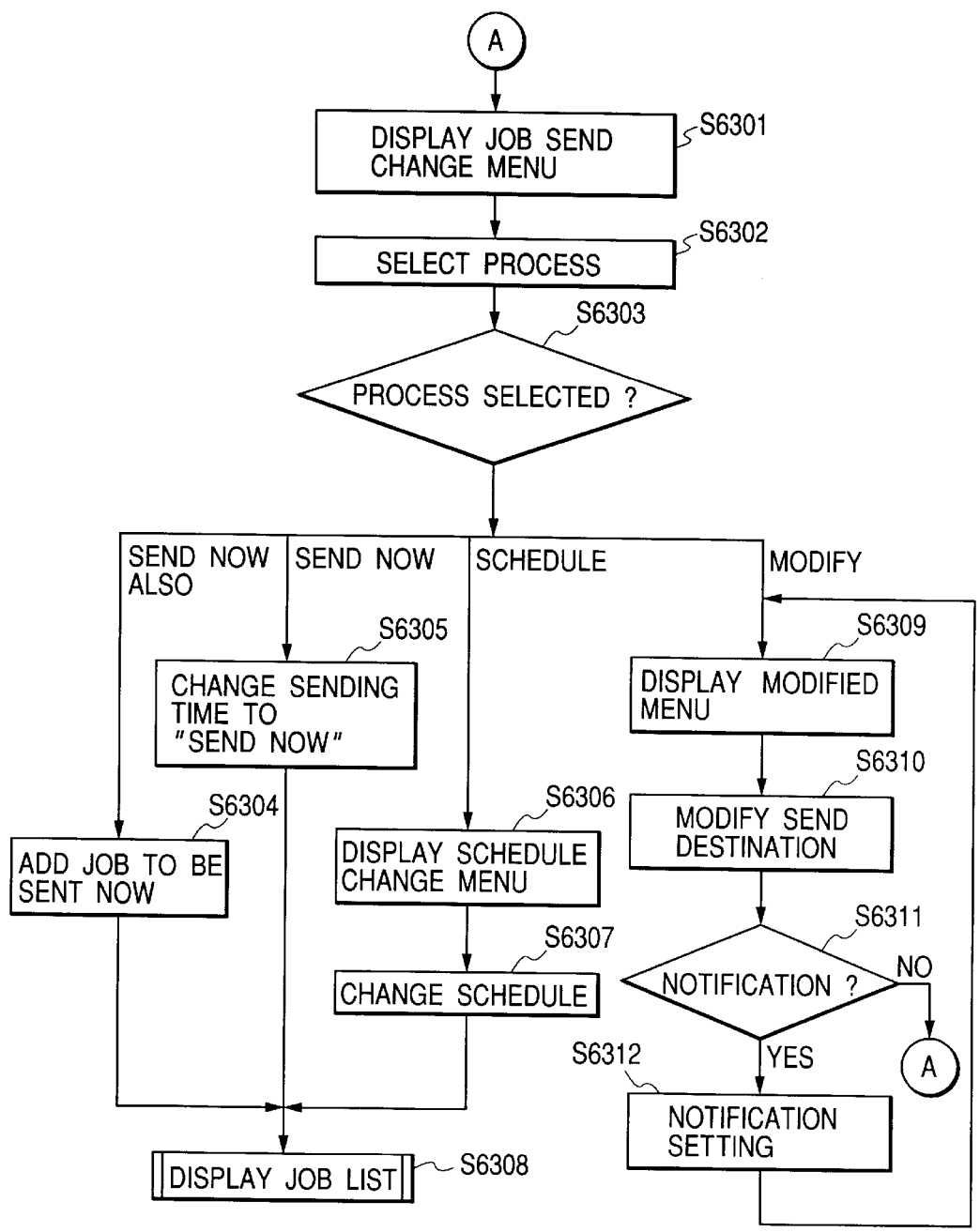
FIG. 63 is a flowchart showing the processing performed to change a transmission setup for a selected Job.
Figure 70:
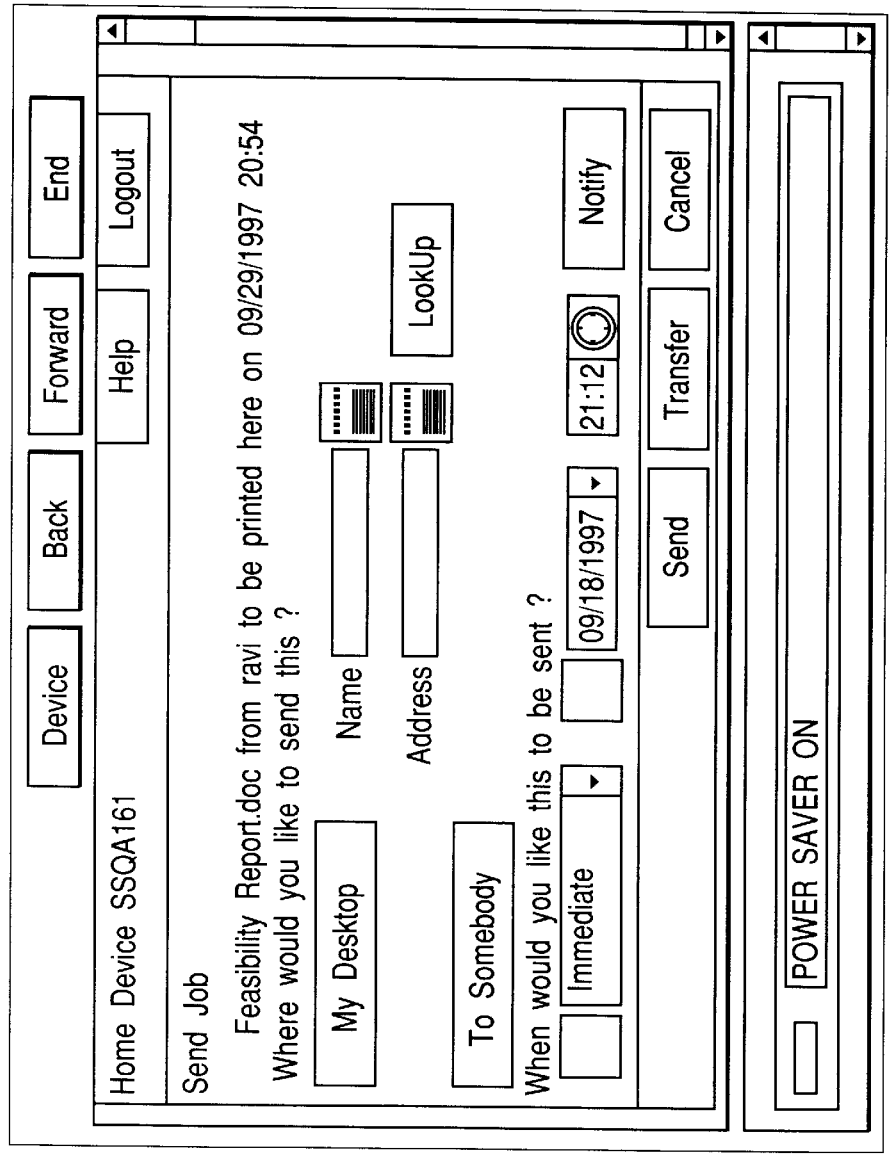
FIG. 70 is a diagram showing an example transmission setup menu.

FIG. 62 is a flowchart showing the selected job transmission processing. In FIG. 62, the state shifting and the sequence of processing are shown for the transmission of a job that is selected from the list of available jobs. At step S6201 the original action type of the selected job is determined. When the original action type is "Send", the transmission setup change processing, which will be described later while referring to FIG. 63, is performed. When the original action type is not "Send", at step S6202 a transmission setup menu is displayed. FIG. 70 is a diagram showing an example transmission setup menu.

At step S6203 a destination and a transmission time are set and a process is selected. These setups are performed in the same manner as in the printing. When at step S6204 "Send" is selected, at step S6205 a selected job is copied and the copy is transmitted. In this case, the selected job remains in the job list. When "Transfer" is selected, at step S6206 the selected job is transferred and is deleted from the job list. For either the transmission or the transferring of a job, at step S6209 the screen is returned to the display of the job list that was explained in FIG. 56. When "Notification" is selected, at step S6207 the notification setup screen is displayed. After the setup for the notification has been completed, the screen is returned to the transmission setup menu for selecting transmission or transfer.

FIG. 63 is a flowchart showing the processing for changing the transmission setup for a selected job. In FIG. 63, are shown the state shifting and the sequence of processing when the original action type of a selected job is "Send".

Figure 71:
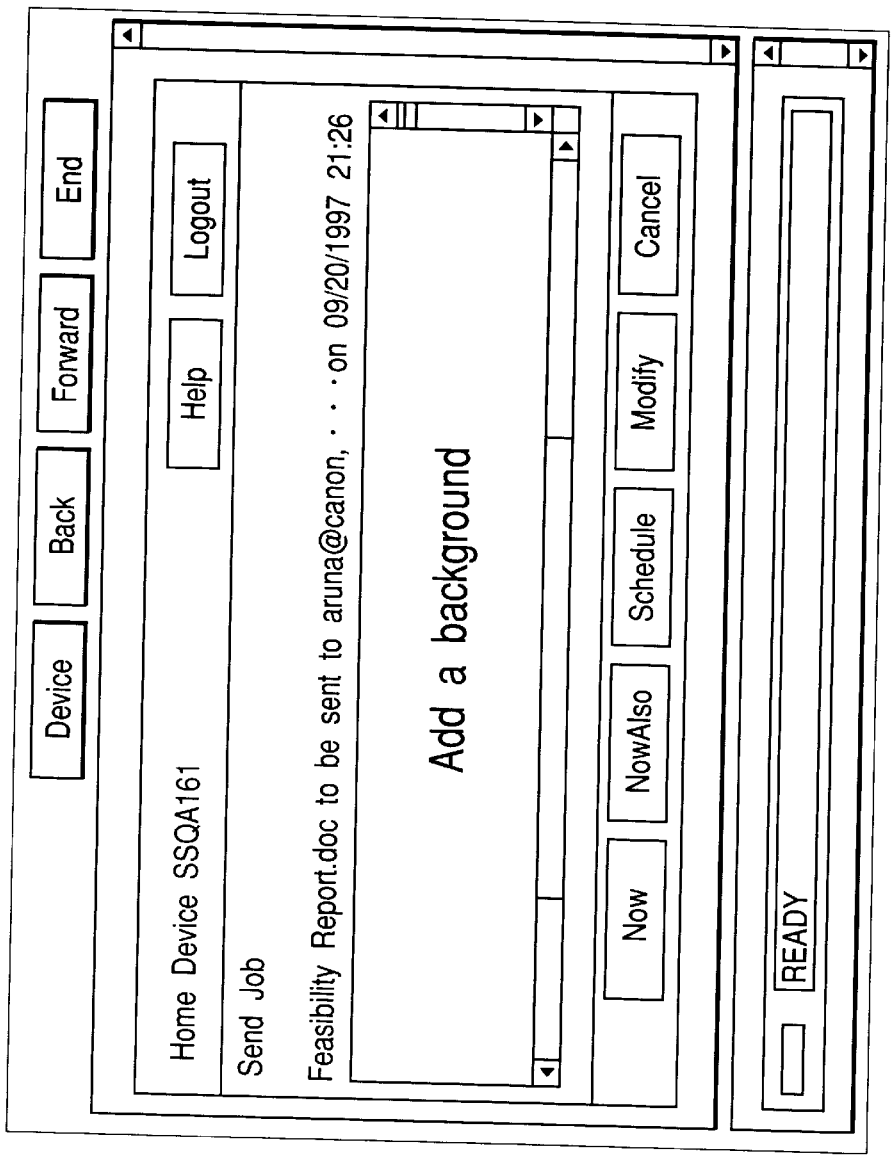
FIG. 71 is a diagram showing an example transmission setup change menu.

At step S6301 the transmission setup change menu is displayed. FIG. 71 is a diagram showing an example transmission setup change menu. At step S6302 a process for the selected job is selected. When "Send Now Also" is selected, at step S6304, in addition to the selected job, a job is added for which the transmission time for the selected job is used as the current time. When "Send Now" is selected, the transmission time for the selected job is changed to the current time. Therefore, in these cases, the transmission of a job is performed at the current time. When "Schedule" is selected, at step S6306 the schedule change menu in FIG. 116 is displayed, and at step S6307 the transmission schedule is changed by using the menu. In either case, at step S6308 the screen is returned to the display for the job list that was explained in FIG. 56. When "Notify" is selected, at step S6309 a correction menu is displayed.

Figure 120:
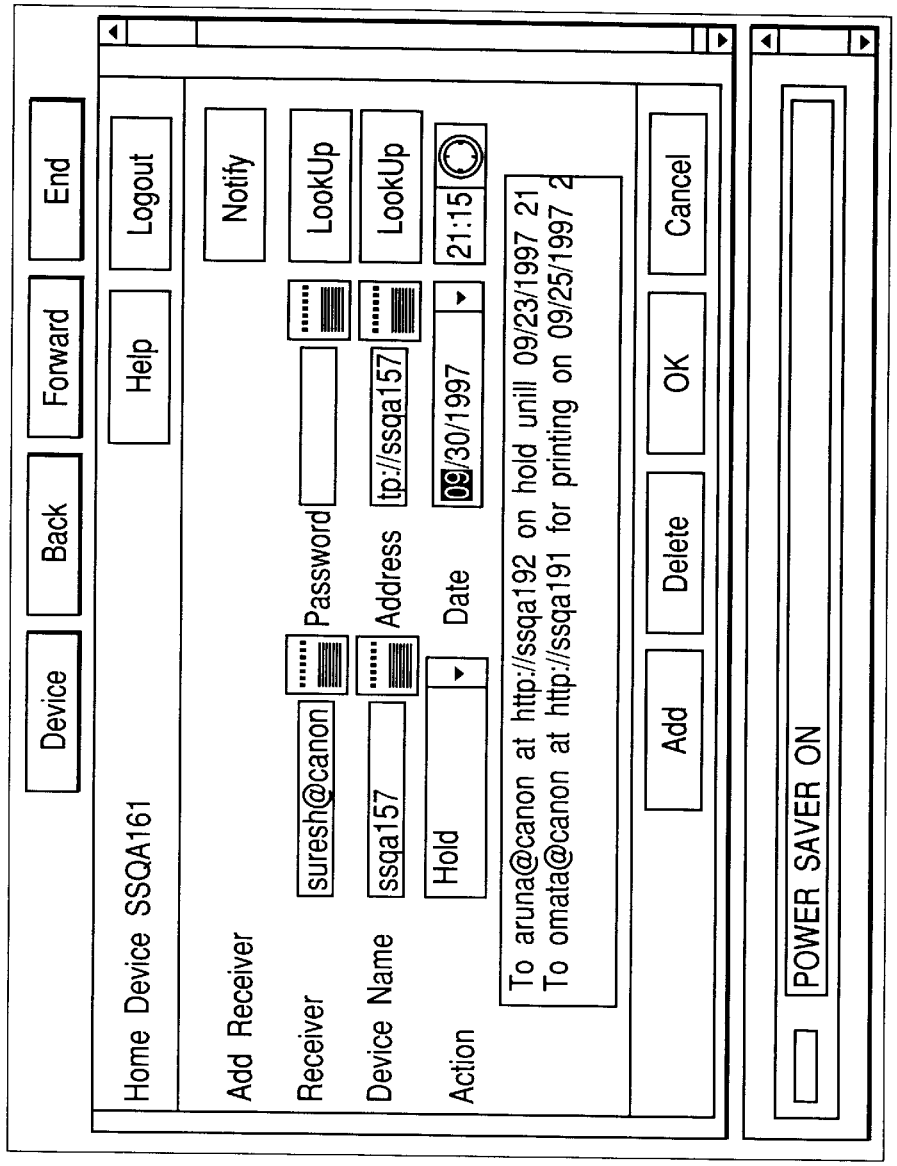

FIG. 120 is a diagram showing an example correction menu. At this time, the list of transmission destinations is displayed. At step S6310 a new transmission destination is added/designated, a transmission destination selected from the list is corrected (deleted or changed), a process to be performed by the transmission destination is changed, a password is changed, and a transmission time is changed. For the setup of the notification, at step S6312 the notification setup menu is displayed, and is then returned to the correction menu. When the notification setup is not required, the screen is returned to the transmission setup change menu.

Figure 121:
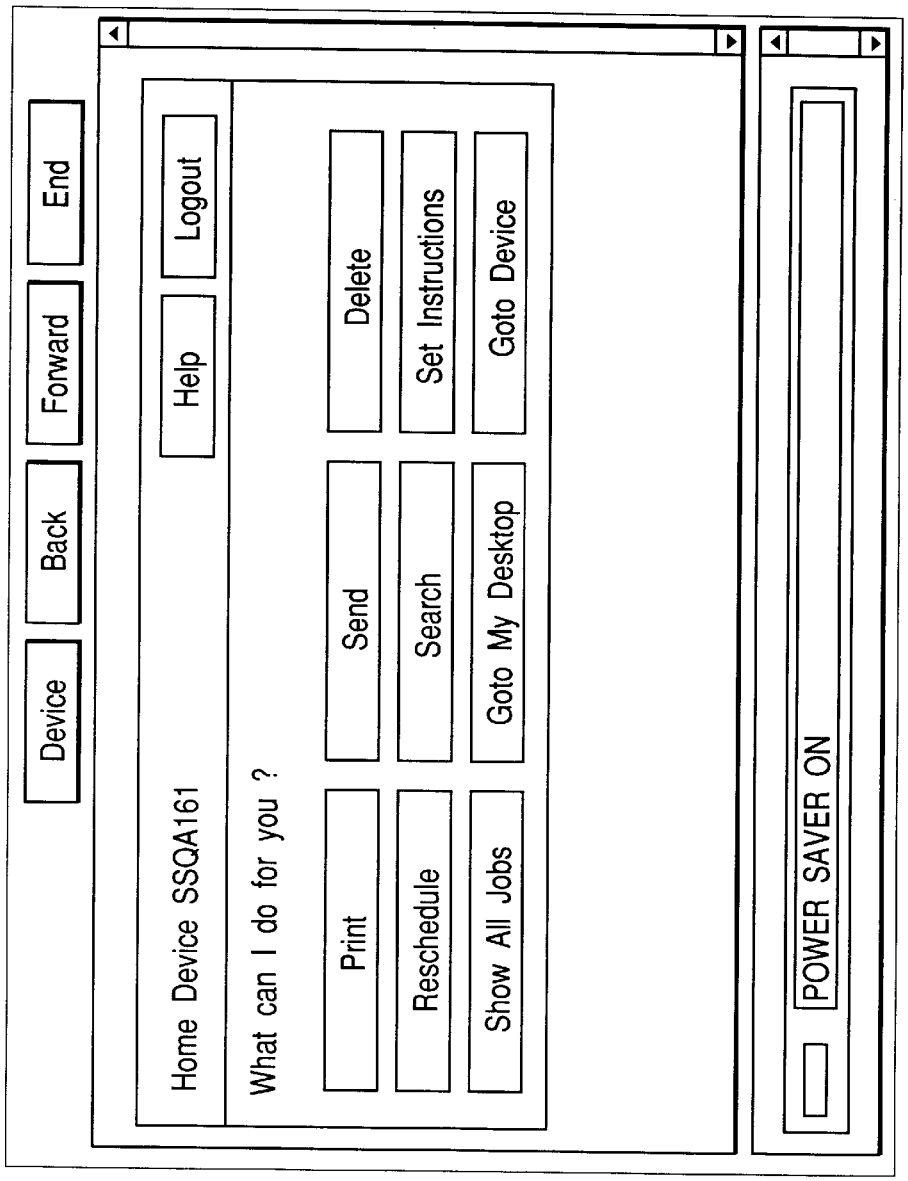

FIG. 64 is a flowchart showing the processing performed beginning at the main menu. In FIG. 64 is shown the screen shifting on the main menu and the processing sequence. At step S6401 the main menu is displayed. FIG. 121 is a diagram showing an example main menu. At step S6402 a process (action) is selected.

Figure 65:
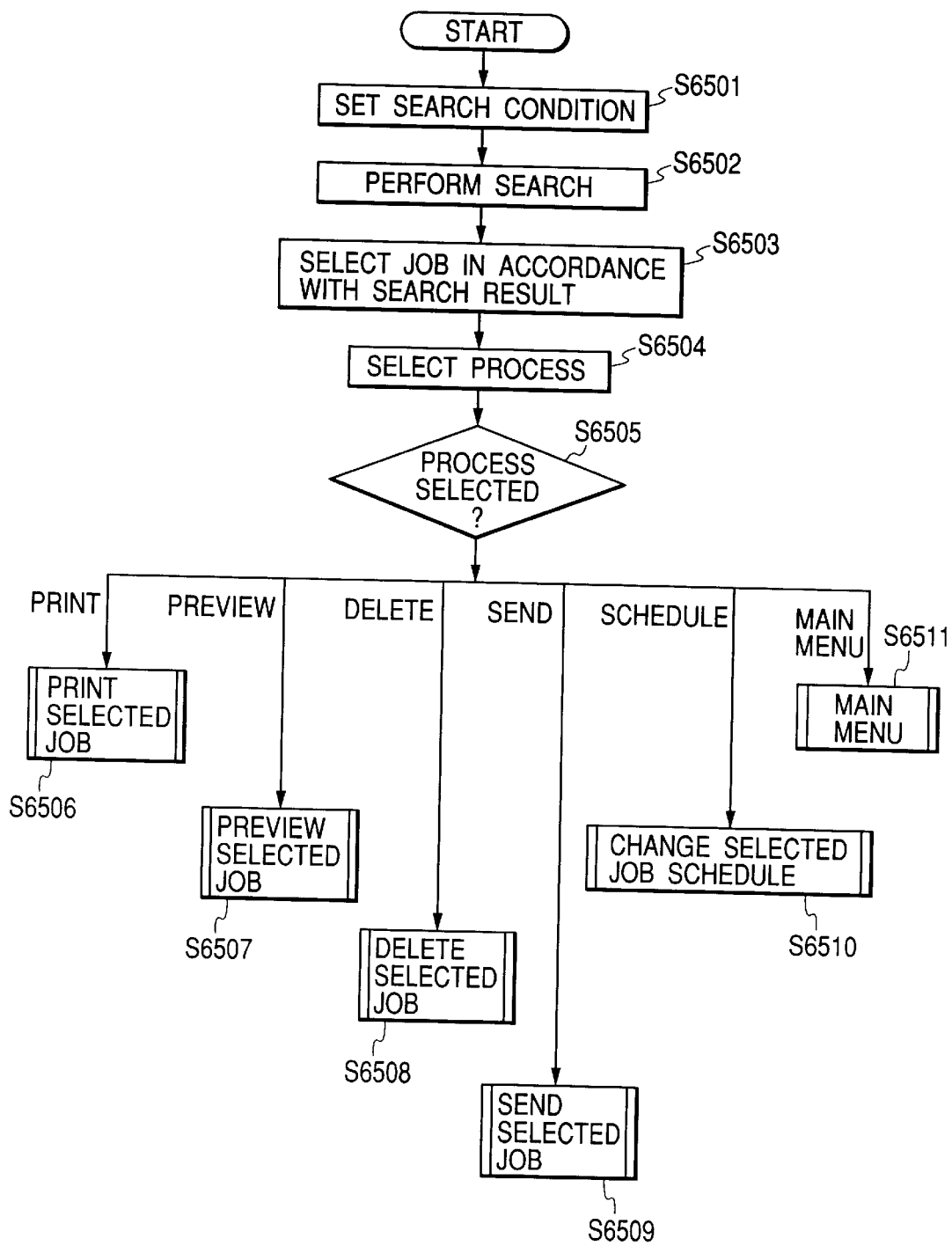
FIG. 65 is a flowchart showing the search processing.
Figure 66:
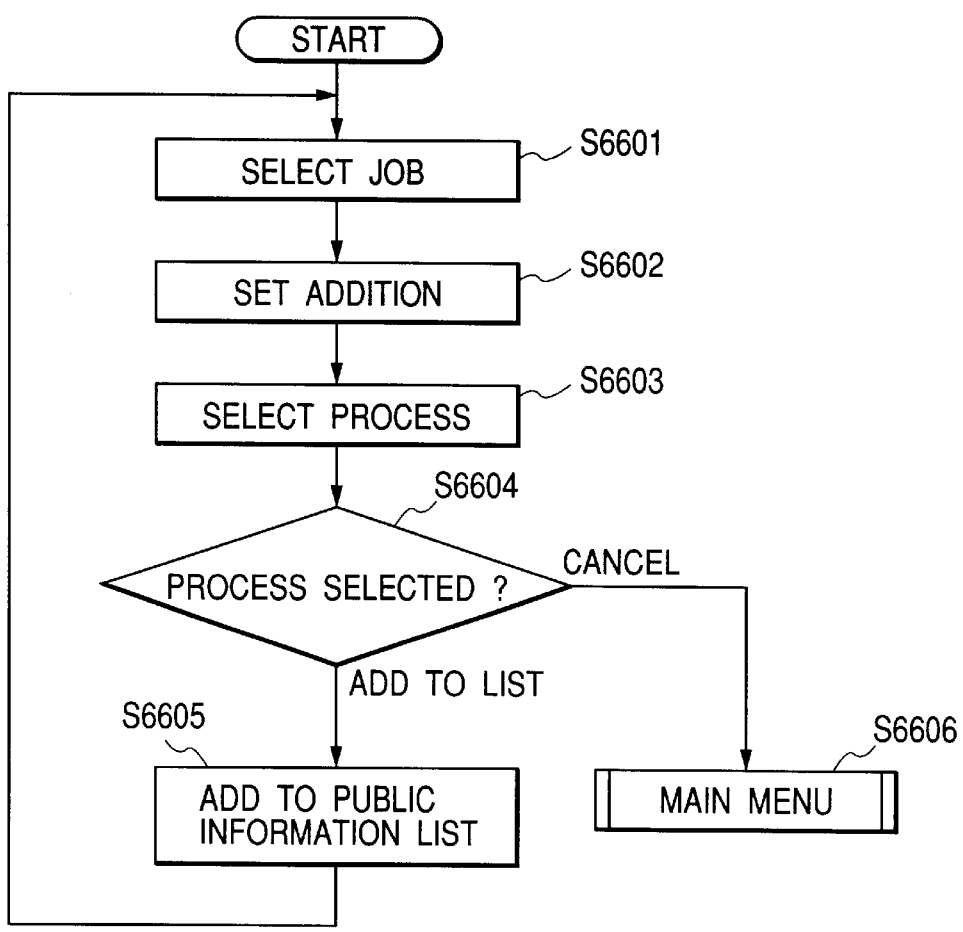
FIG. 66 is a flowchart showing the processing performed to add information to public information.
Figure 67:
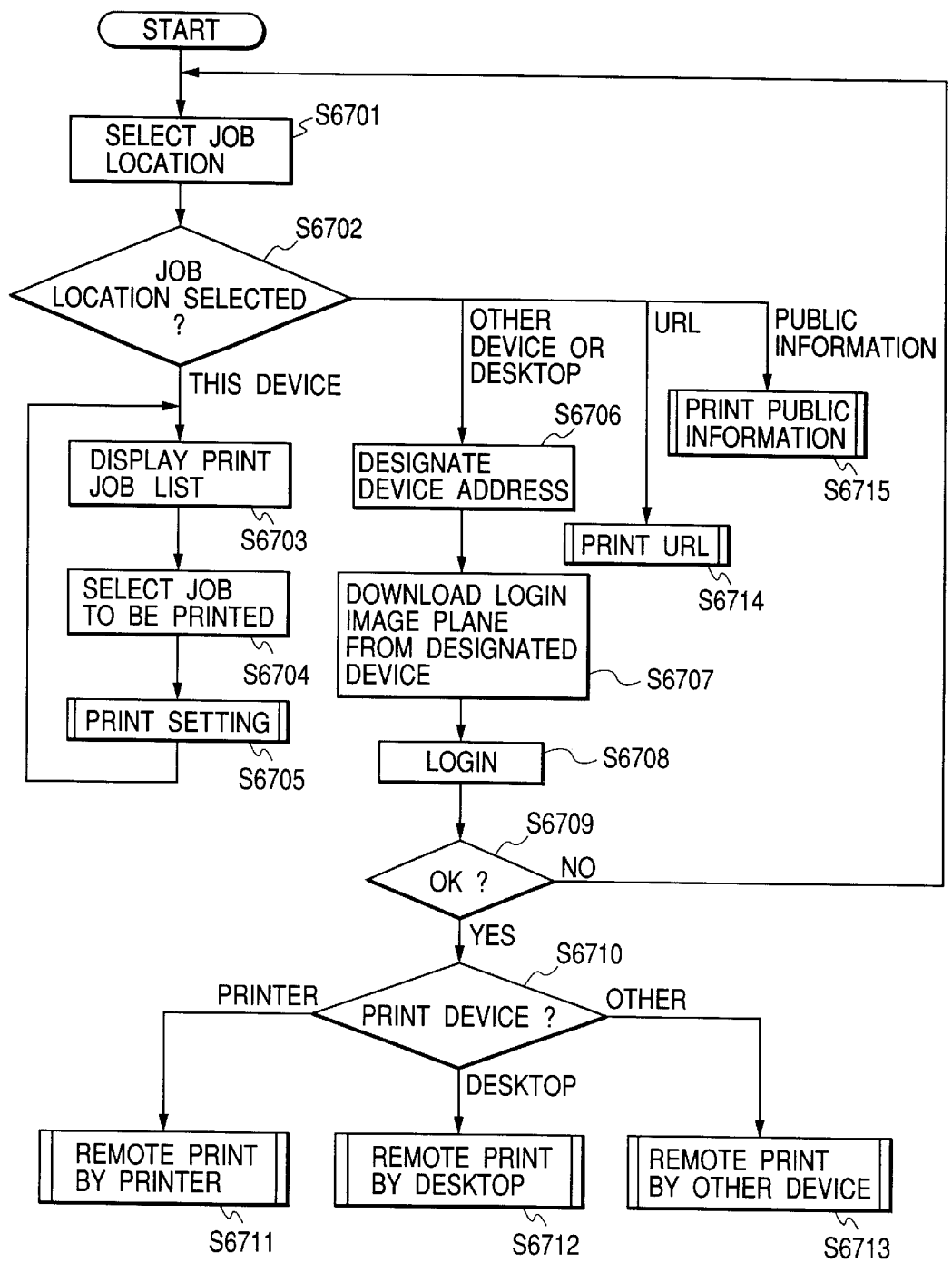
FIG. 67 is a flowchart showing the printing processing.
Figure 69:
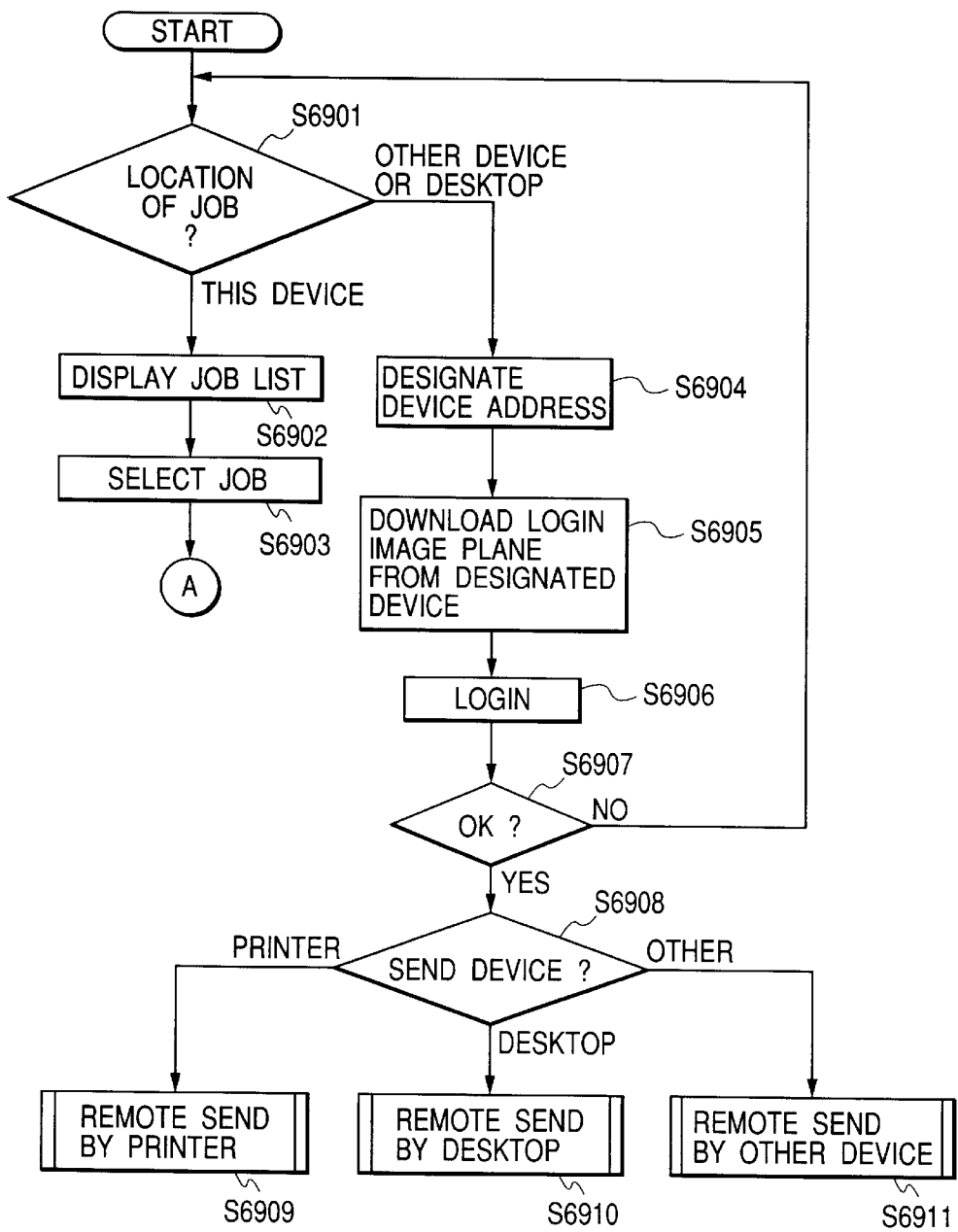
FIG. 69 is a flowchart showing the transmission processing.
Figure 75:
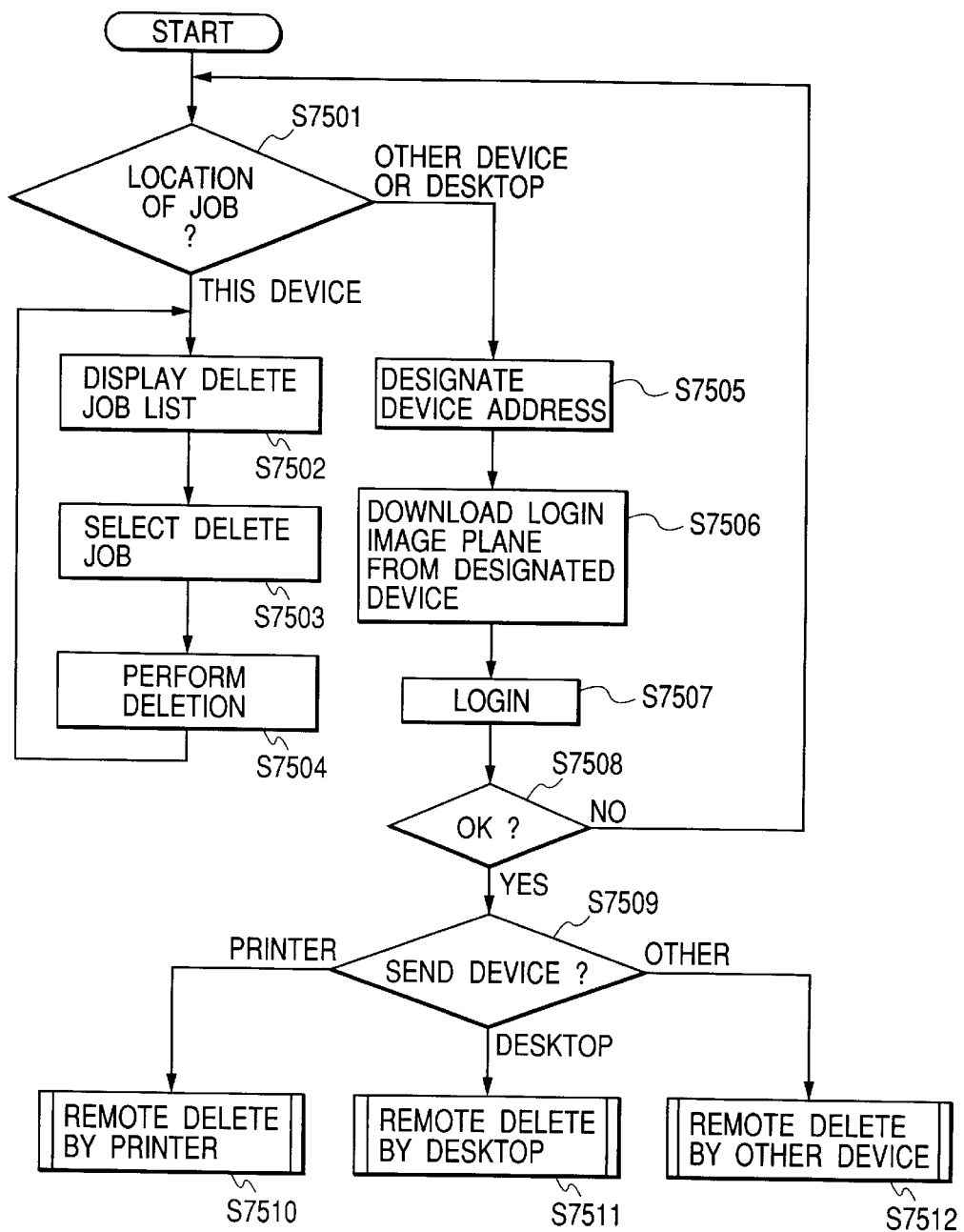
FIG. 75 is a flowchart showing the deletion processing.
Figure 77:
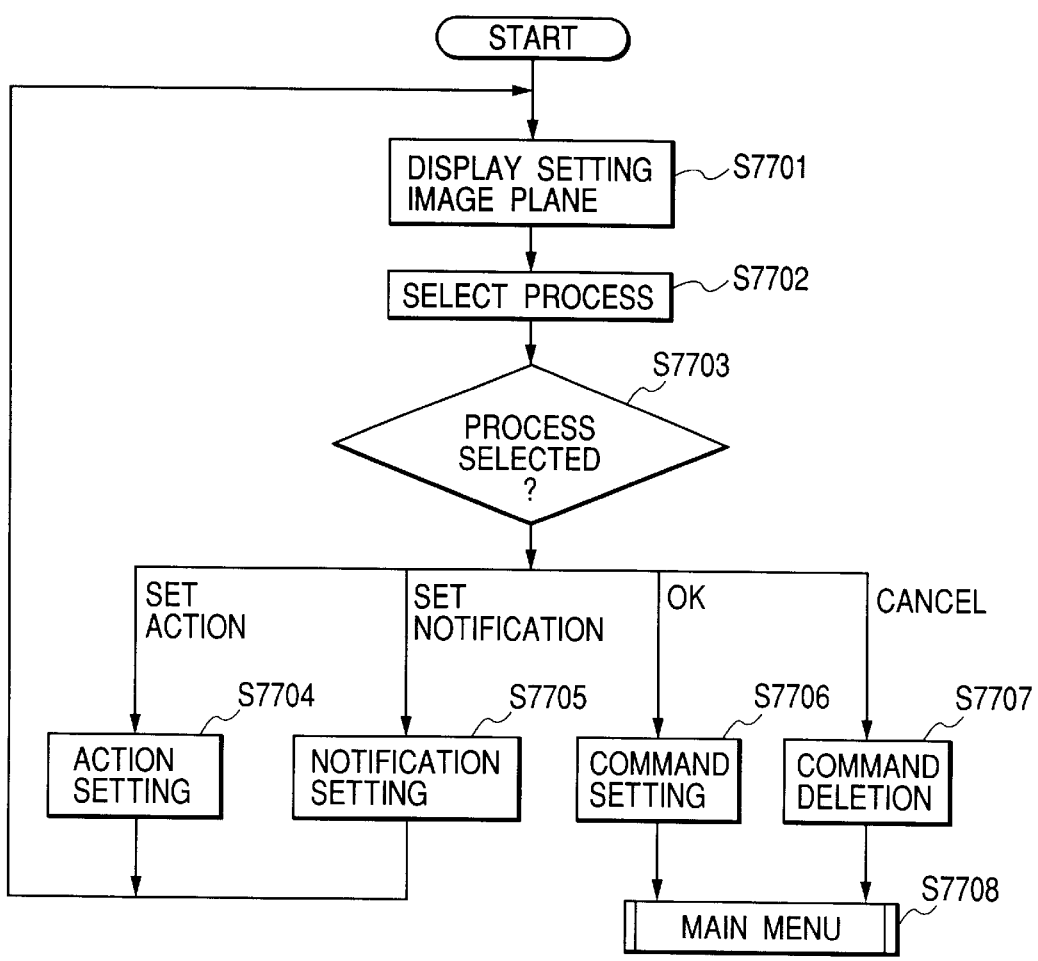
FIG. 77 is a flowchart showing the command setup processing.
Figure 80:
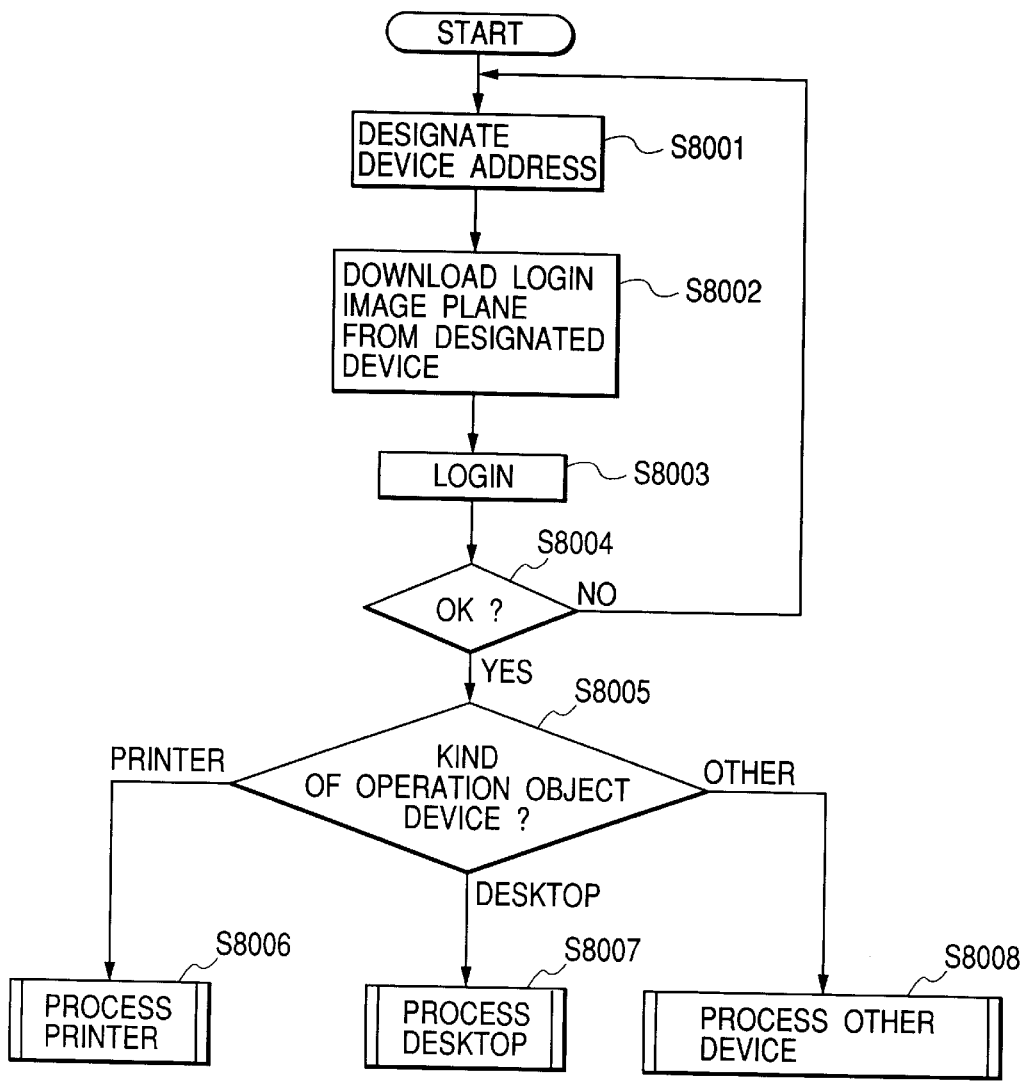
FIG. 80 is a flowchart showing the processing performed to access another device.
Figure 82:
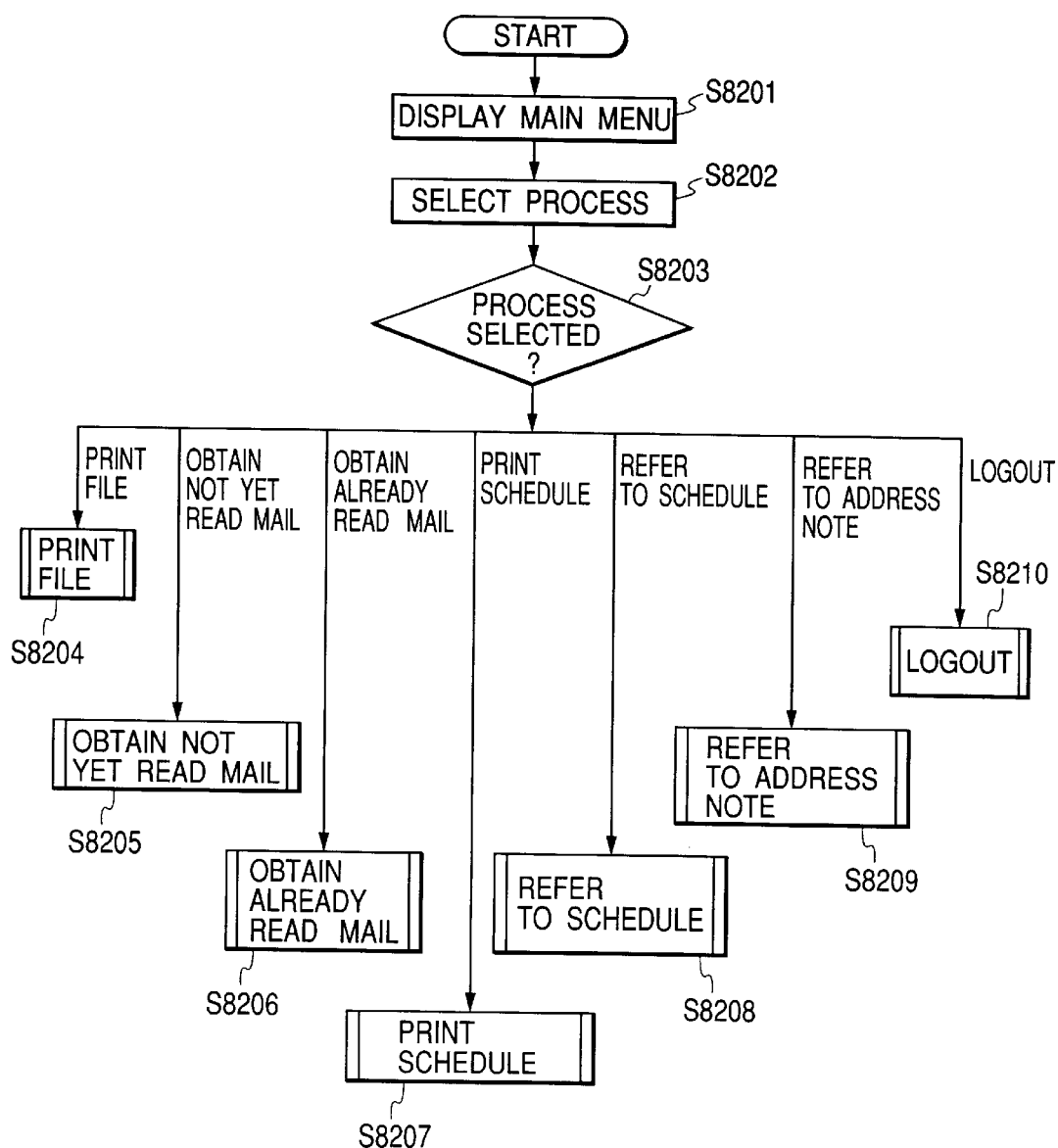
FIG. 82 is a flowchart showing the desktop processing.

When at step S6402 "Logout" is selected, at step S6404 the logout processing that was explained in FIG. 52 is performed. When "Help" is selected, at step S6405 the help processing that was explained in FIG. 52 is performed. When "Search" is selected, at step S6406 the search processing, which will be described later while referring to FIG. 65, is performed. When "Print" is selected, at step S6407 the print processing, which will be described later while referring to FIGS. 67, is performed. When "Send" is selected, at step S6408 the transmission processing, which will be described later while referring to FIG. 69, is performed. When "Delete" is selected, at step S6409 the deletion processing, which will be described later while referring to FIG. 75, is performed. When "Set Instructions" is selected, at step S6410 the instruction setup processing, which will be described later while referring to FIG. 77, is performed. When "Reschedule" is selected, at step S6411 the rescheduling processing, which will be described later while referring to FIG. 78. When "ADD Public Information" is selected, at step S6412 the processing for adding public information, which will be described later while referring to FIG. 66, is performed. When "Goto Device" is selected, at step S6413 the processing for accessing another device, which will be described later while referring to FIG. 80, is performed. When "Goto My Desktop" is selected, at step S6414 the processing for accessing a desktop, which will be described later while referring to FIG. 82, is performed.

FIG. 65 is a flowchart showing the search processing performed when "Search" is selected on the main menu.

At step S6501 a search condition for searching for a job is set. A job setup time, an execution time, an execution state and a sender can be employed as the search condition. Not only pending jobs but also jobs that were executed and stored in the history are searched for. Especially when the condition where the execution state "Done" (also "Canceled", if needed) is employed for the search, the history can be displayed. At step S6502 the search is initiated and a list of the jobs that are found is displayed. At step S6503 a job is selected from the job list, and at step S6504 a process corresponding to the selected job is designated.

When at step S6504 "Print" is selected, at step S6506 the selected job is printed, which was explained in FIG. 60. When "Preview" is selected, at step S6508 the selected job is deleted, which was explained in FIG. 58. When "Reschedule" is selected, at step S6510 the schedule of the selected job is changed, which was explained in FIG. 59. When "Main Menu" is selected, at step S6511 the processing beginning at the main menu is performed, which was explained in FIG. 64.

FIG. 66 is a flowchart showing the public information addition processing performed when "Add Public Information" is selected. At step S6601 a job used as public information is selected from a job list. At step S6602 a public information addition menu (FIG. 111) is displayed, and an added destination and a publication period are designated. The details are the same as was explained for the public information processing. It should be noted that a job in the user's job list is to be published. After the designation of the details, at step S6603 the addition of the job to the public information list is instructed, and at step S6605 a selected job is added to the public information list. When "Cancel" is selected after the processing has been completed, at step S6606 the screen is returned to the main menu.

FIG. 67 is a flowchart showing the printing processing performed when "Print" is selected from the main menu.

Figure 122:
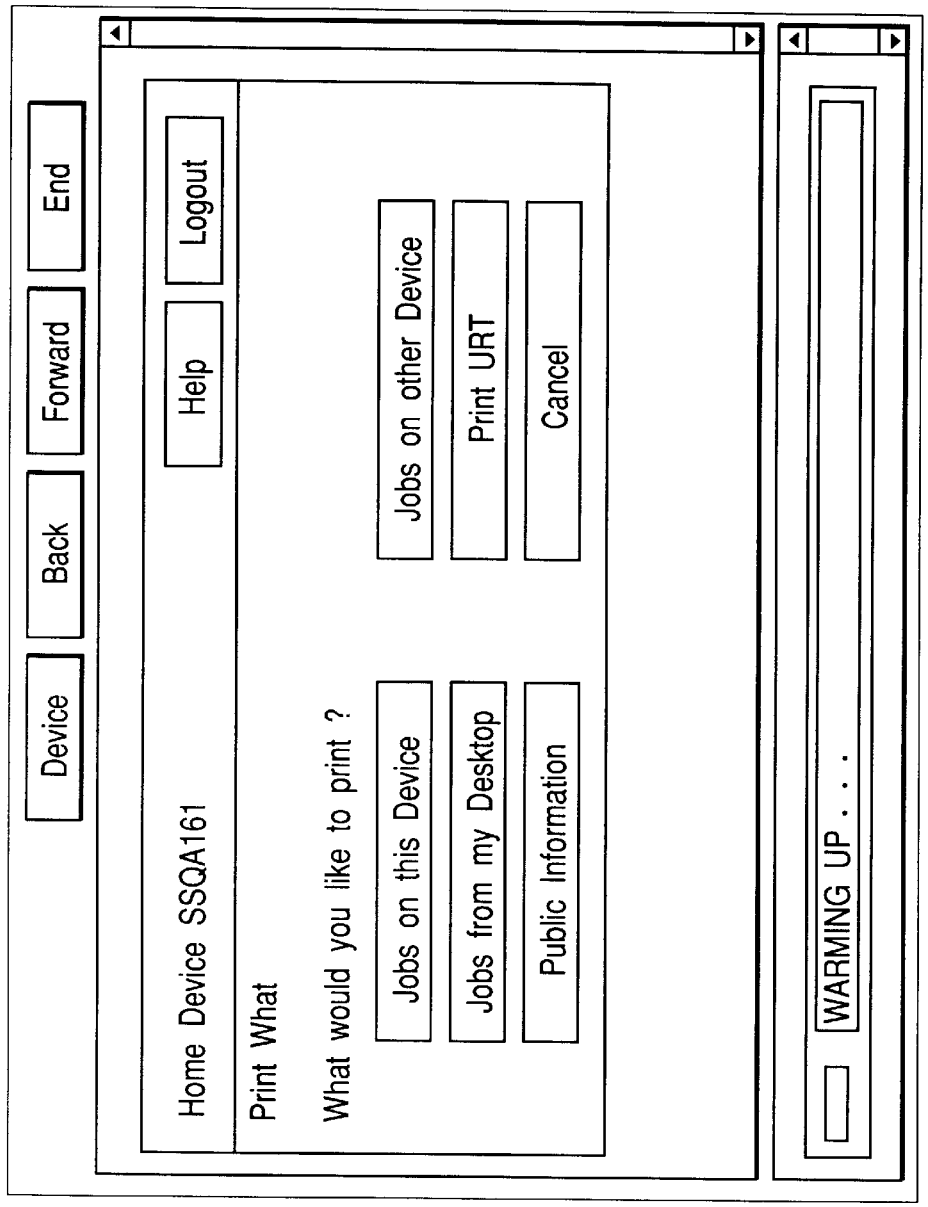
Figure 123:
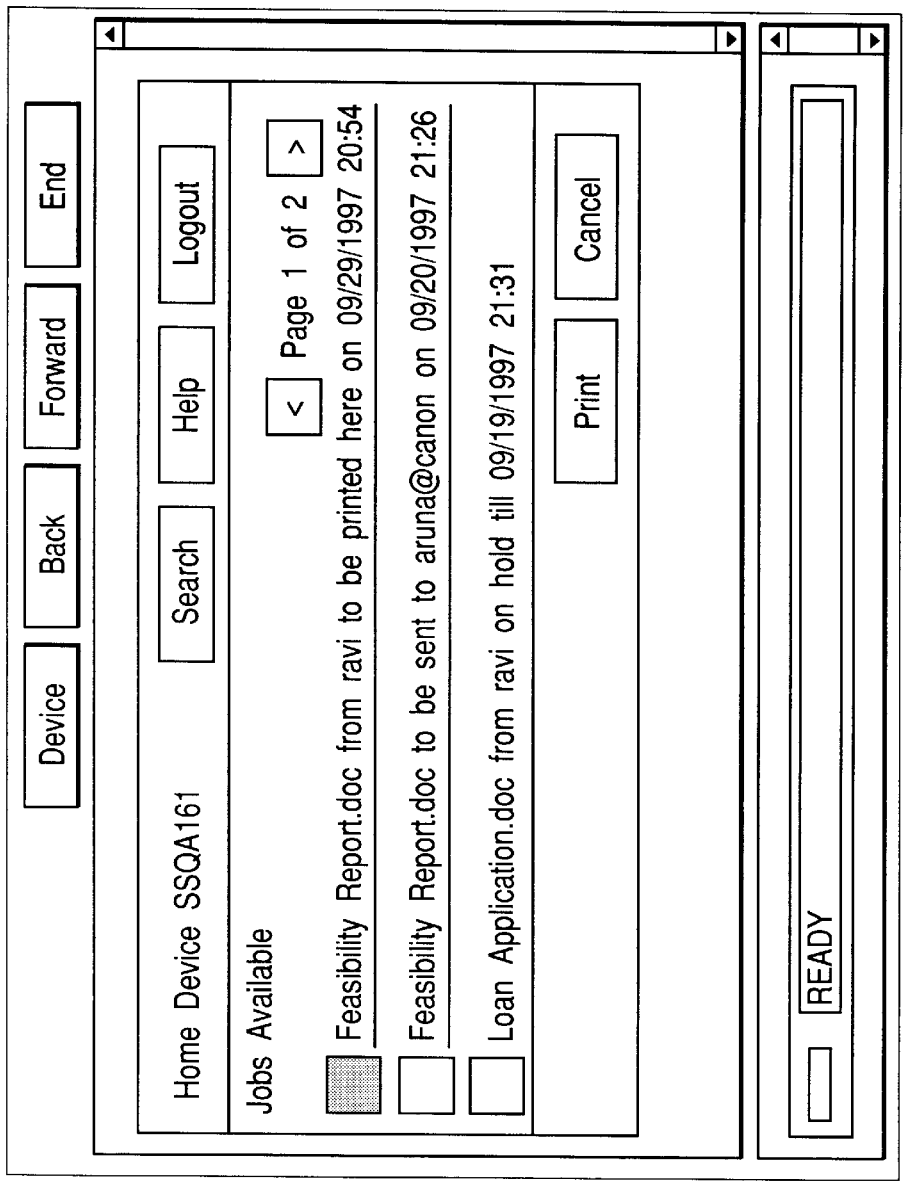

At step S6701 a place whereat a job to be printed is present is selected. FIG. 122 is a diagram showing an example menu screen for selecting a place whereat a job to be printed is present. When "Jobs on this Device" is selected, at step S6703 the list of print jobs in the current device is displayed. FIG. 123 is a diagram showing an example menu for selecting a job to be printed. At step S6704 a job to be printed is selected, and at step S6705 the printing setup is performed for a selected job. This process is performed in the same manner as explained in FIG. 60.

Figure 68:
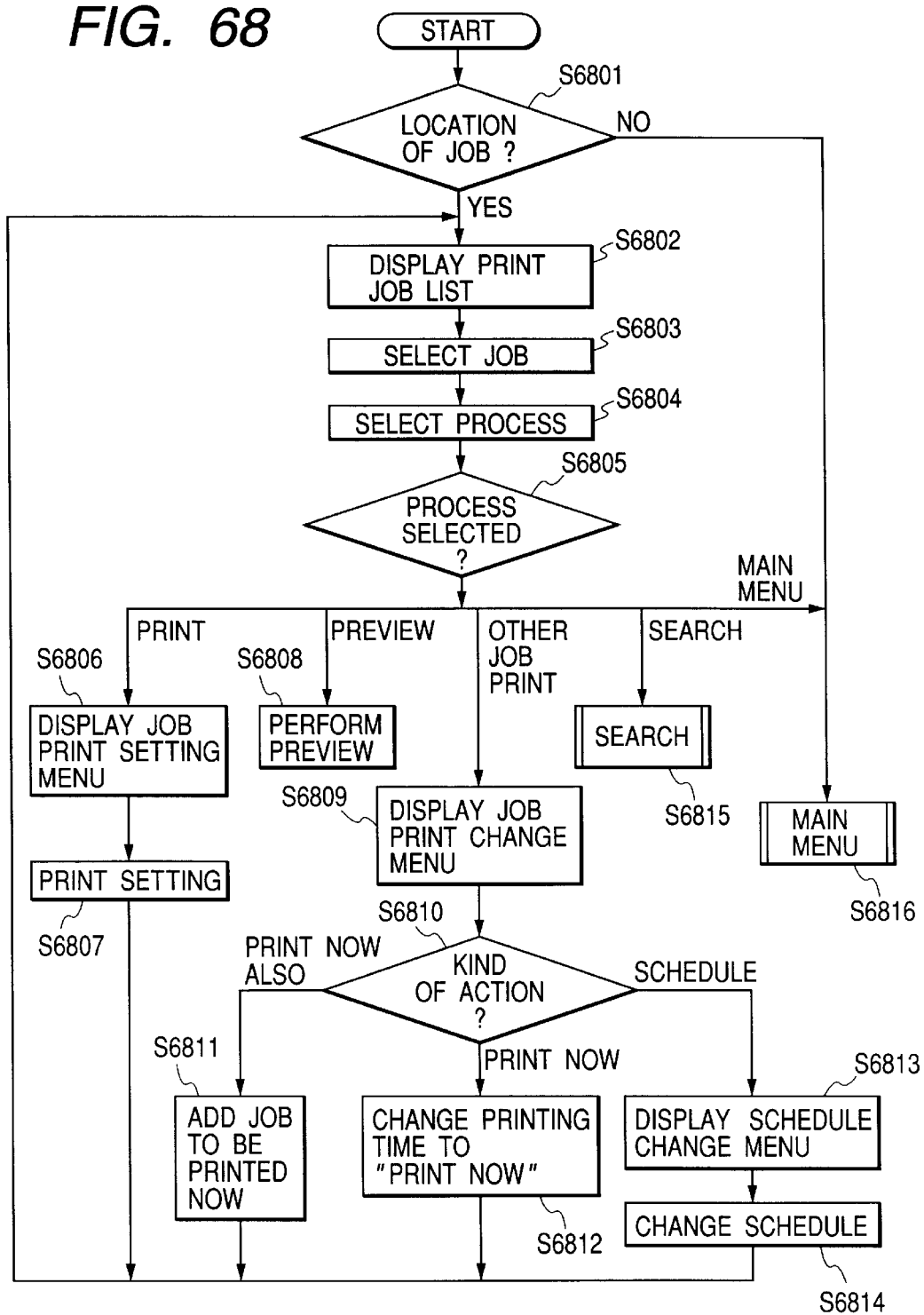
FIG. 68 is a flowchart showing the remote printing processing performed by a printer.

When "Jobs on other Device" or "Jobs from my Desktop" is selected, at step S6706 the address of the device is designated, and at step S6707 the login screen is downloaded from the device at that address. At step S6708 the login process is performed in accordance with the downloaded screen. When the login is completed, since the login verb is "Print", at step S6710 the menu screen in FIG. 122, for selecting a job to be printed, is downloaded to select a printing device, as is explained in FIG. 51. When a current printer is employed, at step S6711 the remote printing process, which will be described while referring to FIG. 68, is performed by the printer. When the desktop is employed, at step S6712 the remote printing process is performed by the desktop. When another device is employed, at step S6713 the remote printing process is performed by that device.

FIG. 68 is a flowchart showing the remote printing processing performed by the printer. In FIG. 68 is shown the sequence of post-login processing performed when printing using another device is designated on the main menu and the designated device is the same type of printer. The processing is the same as that for the printing of a job stored in the current device. It should be noted that the menu and the list are downloaded from a device that is accessed.

FIG. 69 is a flowchart showing the transmission processing. In FIG. 69 are shown the screen shifting and the sequence of processing performed when "Send" is selected from the main menu.

Figure 124:
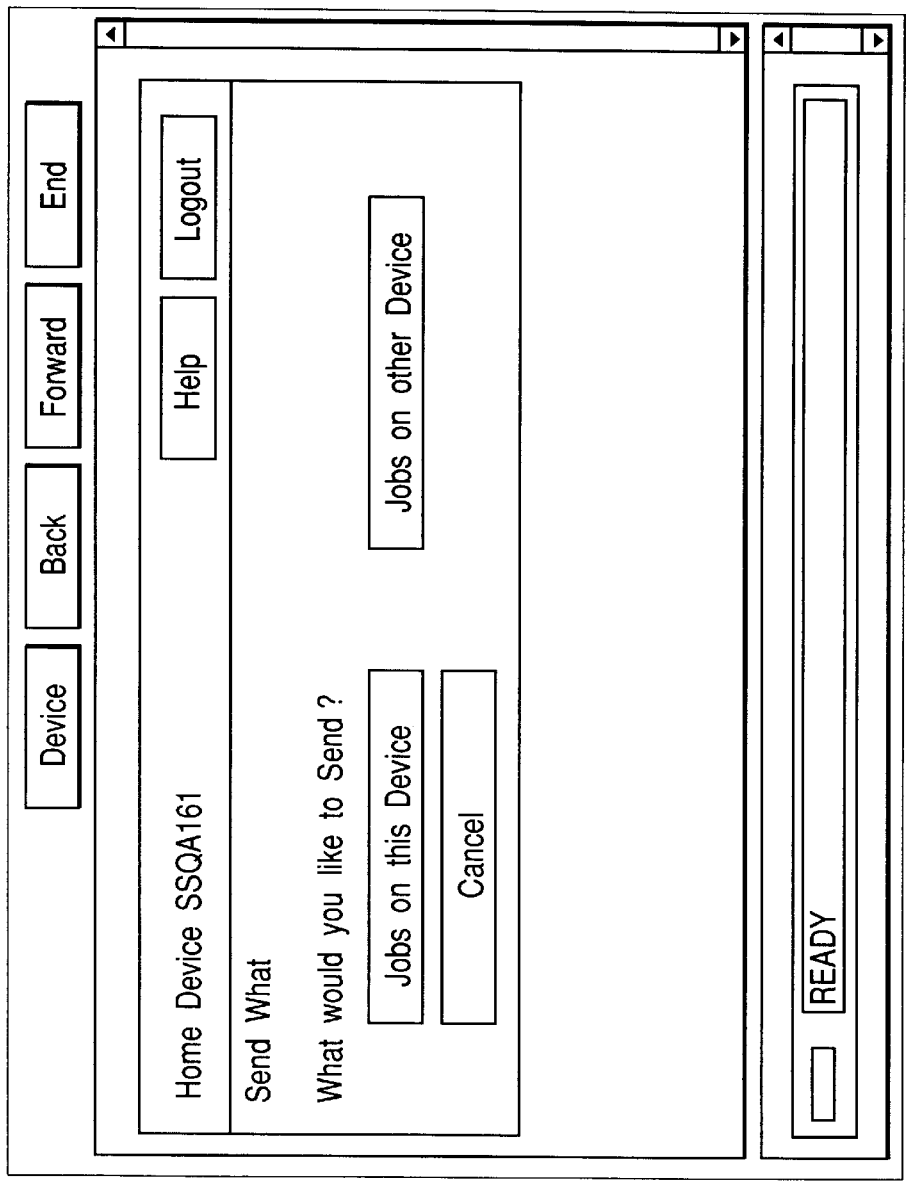
Figure 125:
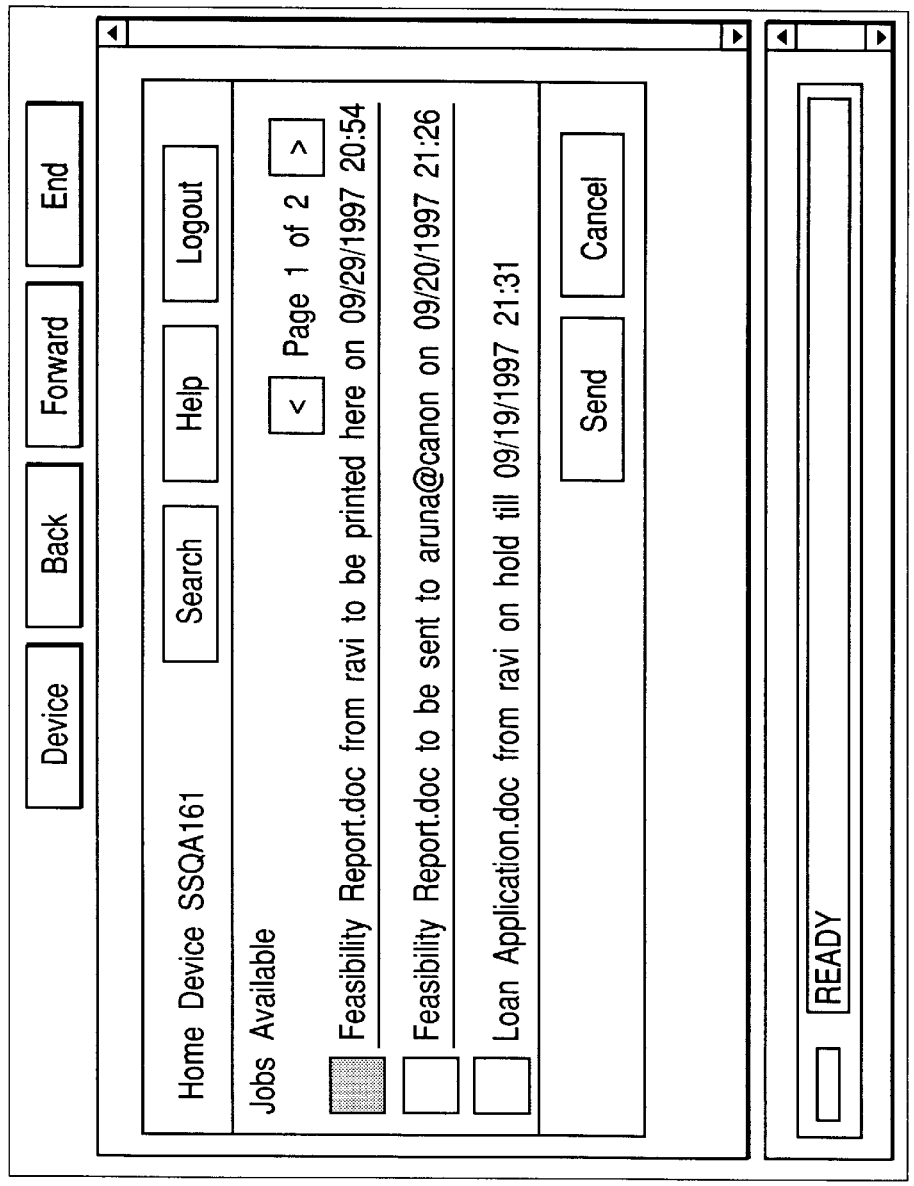

At step S6901 a place, either a current device, another device or a desktop, is selected whereat a job to be transmitted is present. FIG. 124 is a diagram showing an example menu screen for selecting a place whereat a job to be transmitted is present. When "jobs on this Device" is selected, at step S6902 the job list for this device is displayed. FIG. 125 is a diagram showing an example menu for selecting a job to be transmitted. At step S6903 a job to be transmitted is selected. Hereinafter the selected job transmission processing that was explained in FIG. 62 is performed.

Figure 72:
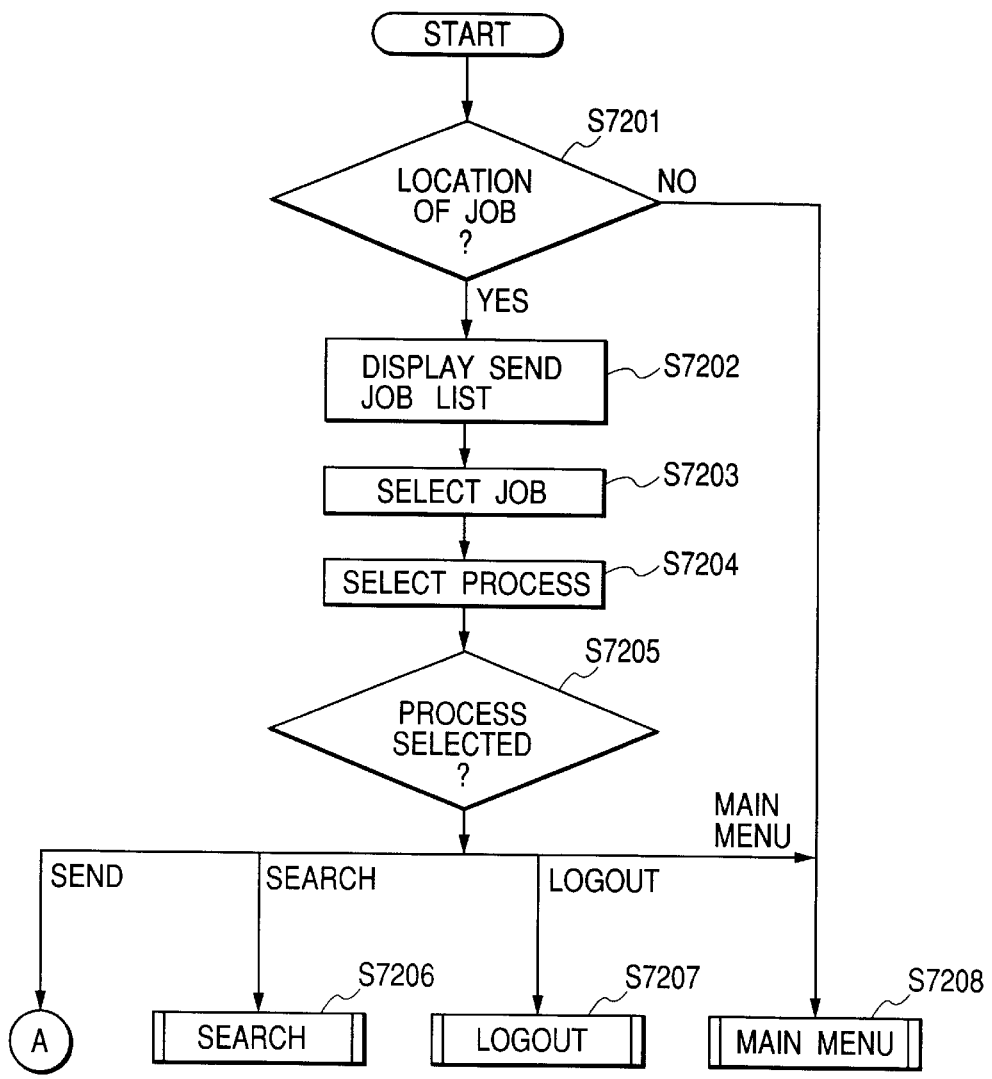
FIG. 72 is a flowchart showing the remote sending processing performed by a printer.

When another device or a desktop is selected as a place whereat a job to be transmitted is present, at step S6904 the address of the device is designated, and at step S6905 the login screen is downloaded from the device at that address. At step S6906 the login process is performed in accordance with the screen. When the login is completed, since the login verb is "Send", at step S6908 the menu screen in FIG. 124, for selecting a job to be transmitted, is downloaded to select a transmission source device, as is explained in FIG. 51. When the printer is employed for the transmission, at step S6909 the remote sending processing using the printer, which will be described while referring to FIG. 72, is performed. When the desktop is employed for the transmission, at step S6910 the remote sending processing using the desktop is performed. When another device is employed for the transmission, at step S6911 the remote sending processing using another device is performed.

FIG. 72 is a flowchart showing the remote sending processing performed by the printer. In FIG. 72 is shown the sequence of post-login processing performed when transmission by another device is designated on the main menu, and the designated device is the same type of printer.

When there is a job in the designated device, at step S7202 the list of jobs to be transmitted is displayed. At step S7203 a job is selected from the job list, and at step S7204 a process is selected. When "Send" is selected, the selected job is transmitted. This processing is the same as the transmission of a selected job by the current device, which was explained while referring to FIG. 69. It should be noted that the menu and the list are downloaded from the device that is accessed.

When at step S7204 "Search" is selected, at step S7206 a new job to be transmitted is searched for. When "Logout" is selected, at step S7207 the logout processing that was explained in FIG. 52 is performed. When "Main Menu" is selected, at step S7208 the screen is returned to the display of the main menu.

FIG. 75 is a flowchart showing the deletion processing performed when "Delete" is selected from the main menu.

Figure 73:
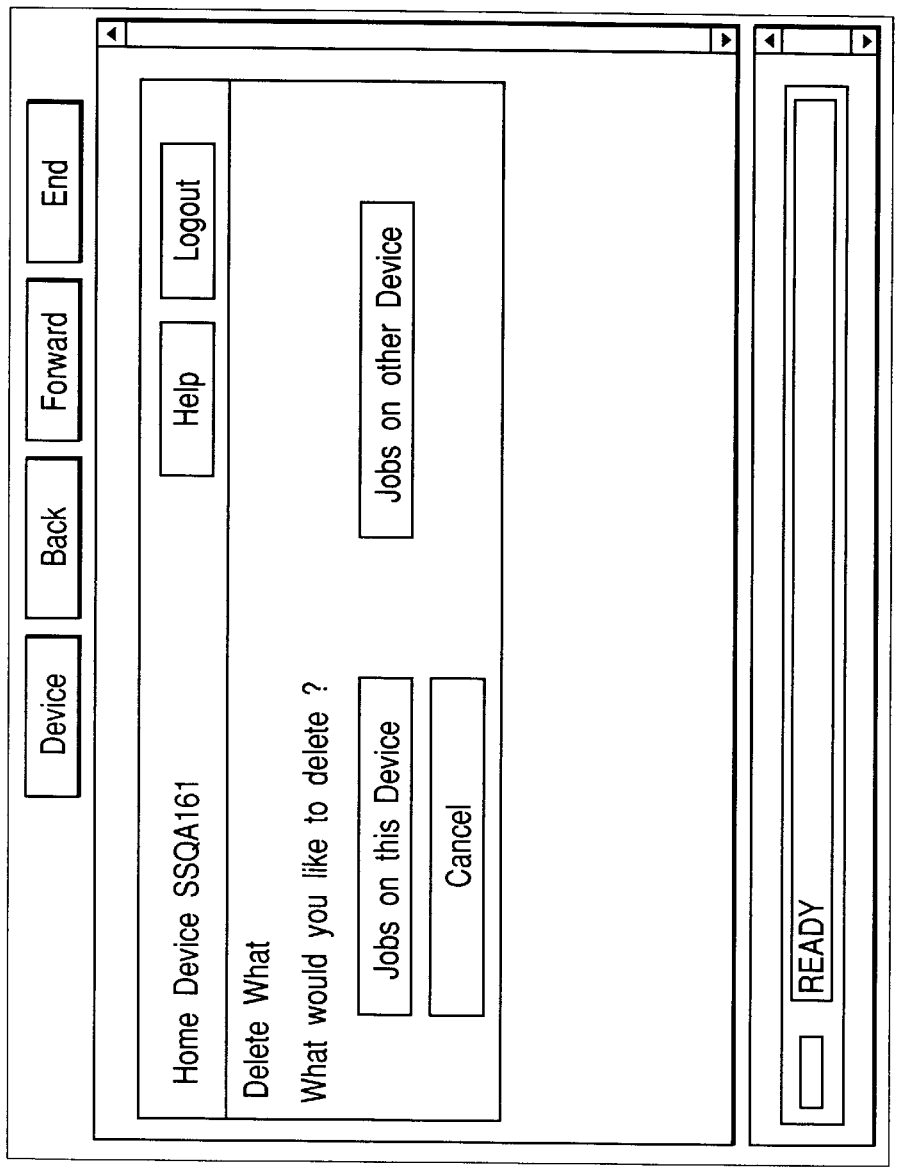
FIG. 73 is a diagram showing an example menu for selecting a device wherein a Job to be deleted is located.
Figure 74:
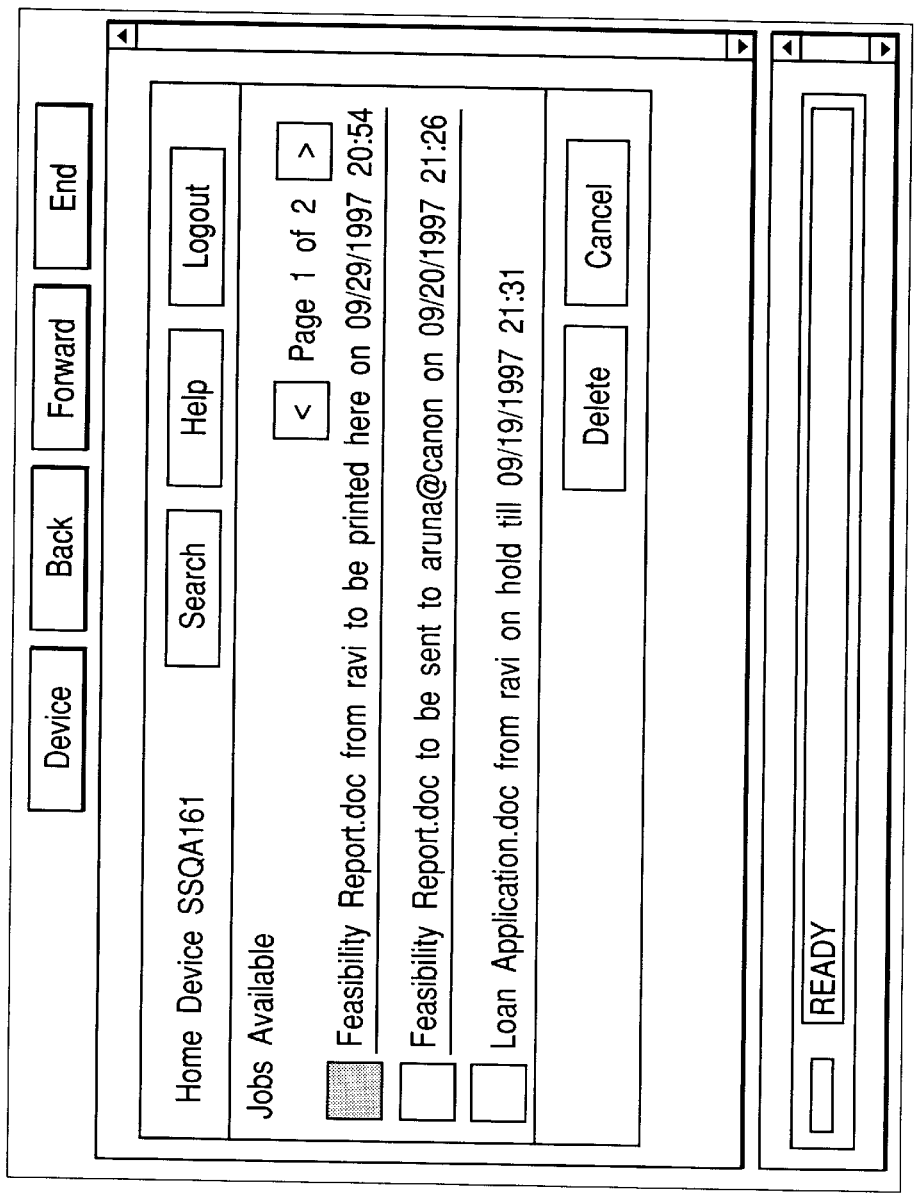
FIG. 74 is a diagram illustrating an example list for Jobs to be deleted.

At step S7501 a place, either a current device, another device or a desktop, whereat a job to be deleted is present is selected. FIG. 73 is a diagram showing an example menu for selecting a device whereat a job to be deleted is present. When the current device is selected, at step S7502 the job list for this device is displayed. FIG. 74 is a diagram showing an example list for jobs to be deleted. At step S7503 a job to be deleted is selected. Then, the selected job is deleted in the manner as is explained in FIG. 58.

Figure 76:
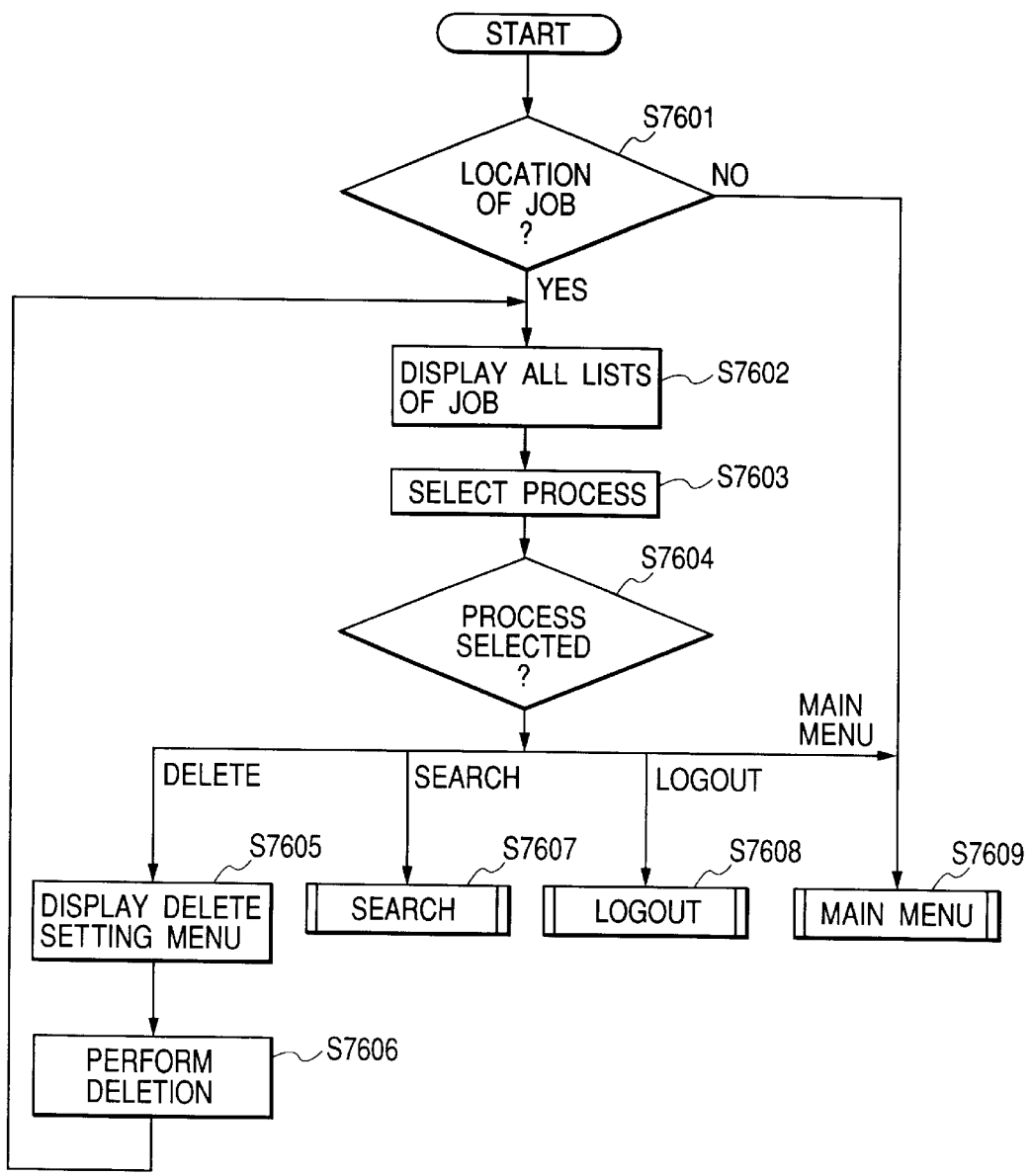
FIG. 76 is a flowchart showing the remote deletion processing performed by a printer.

When another device or a desktop is selected as a place whereat a job to be deleted is present, at step S7505 the address of the device is designated, and at step S7506 the login screen is downloaded from the device at that address. At step S7507 the login process is performed in accordance with the downloaded screen. When the login is completed, since the login verb is "Delete", the menu screen in FIG. 74 for selecting a job to be deleted is downloaded to select a job, as explained in FIG. 51. When a job is to be deleted from the printer, at step S7510 the remote deletion processing, which will be described while referring to FIG. 76, is performed by the printer. When a job is to be deleted from the desktop, at step S7511 the remote deletion process is performed by the desktop. When a job is to be deleted from another device, at step S7512 the remote deletion process is performed by that device.

FIG. 76 is a flowchart showing the remote deletion processing performed by the printer. In FIG. 76 is shown the sequence of post-login processing when the transmission from another device is designated on the main menu and the designated device is the same type of printer.

When a job is present in the designated device, at step S7601 the job list is displayed, at step S7602 a job to be deleted from the list is selected, and at step S7603 a process is selected. When "Delete" is selected, at step S7605 the deletion confirmation menu in FIG. 115 is displayed, and at step S7606 the selected job is deleted. This processing is performed in the same manner as is the deletion of the selected job in the current device, which was explained in FIG. 58. It should be noted that the list and the menu are downloaded from the device that is accessed.

When at step S7604 "Search" is selected, at step S7607 a new job to be deleted is searched for. When "Logout" is selected, at step S7608 the logout process explained in FIG. 52 is performed. When "Main Menu" is selected, at step S7609 the screen is returned to the main menu.

Figure 126:
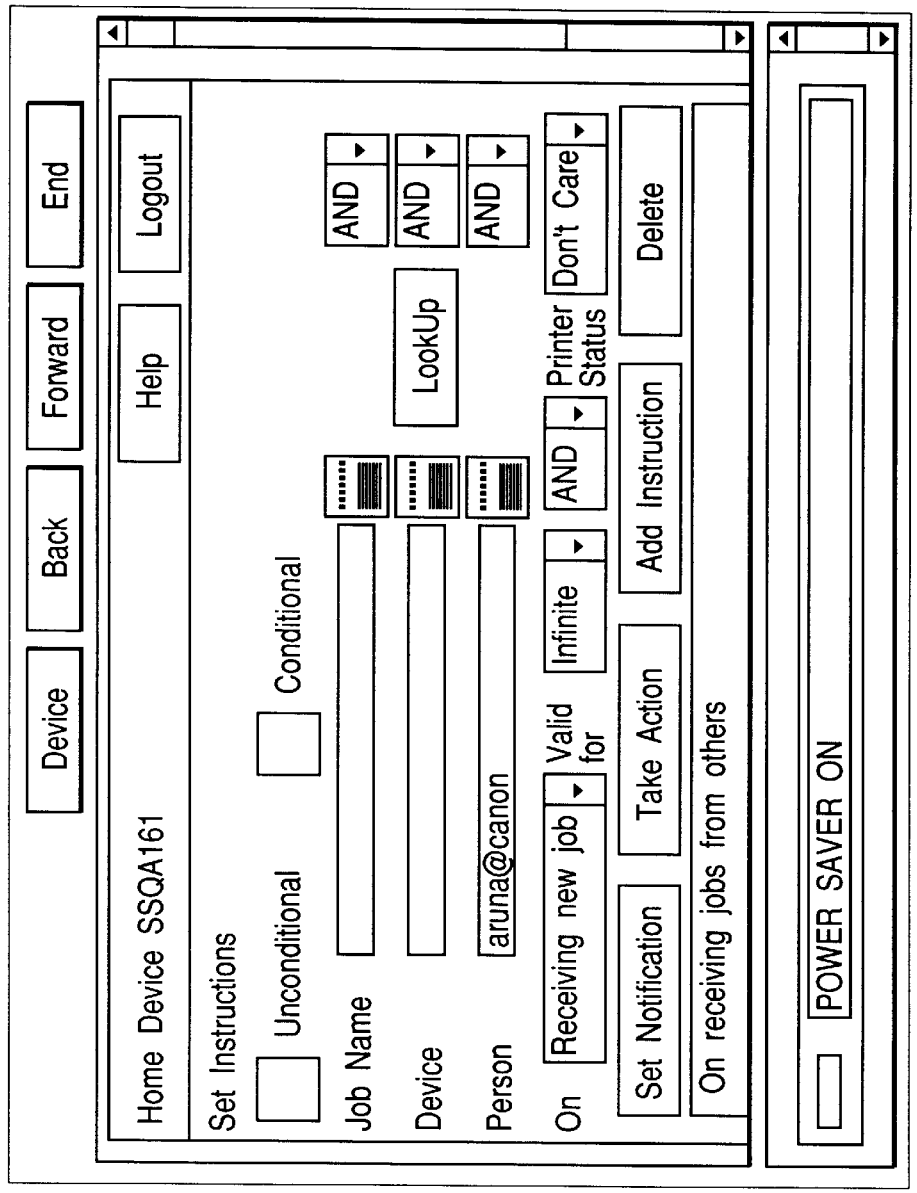

FIG. 77 is a flowchart showing the processing for setting instructions. In FIG. 77 are shown the screen shifting and the sequence of processing when "Set Instructions" is selected on the main menu. At step S7701 an instruction setup screen is displayed. FIG. 126 is a diagram showing an example instruction setup screen. On this screen, an instruction execution condition is designated. The conditions are a job name, a device name, a user's name, a state as a trigger for executing an instruction (upon receipt of a job, during transmission, at the time of printing, upon a change in a status, etc.), an instruction effective time limit or period (including an infinite time), and a printer status. Furthermore, "AND" or "OR" can be also set for these conditions. The current setup is displayed as is "On receiving jobs from others", which is shown in FIG. 126.

When at step S7702 a process is selected, if "Take Action" is selected, at step S7704 an action is selected that is to be performed when the setup condition is established. The printing or the holding of a job can be selected. In addition, transmission (transfer) of a job or cancellation of a job may be selected. When "Set Notification" is selected, at step S7705 a notification is set. When "Add Instruction" is selected, at step S7706 the instruction set on the screen is validated. When "Delete" is selected, at step S7707 the instruction that is set on the screen is deleted. Then, at step S7708 the screen is returned to the main menu. An instruction whose effective period has expired remains in the history in addition to the jobs that have been executed. When a specific period of time has elapsed since the expiration of the time limit, the instruction is deleted in accordance with the management process for the history.

Figure 78:
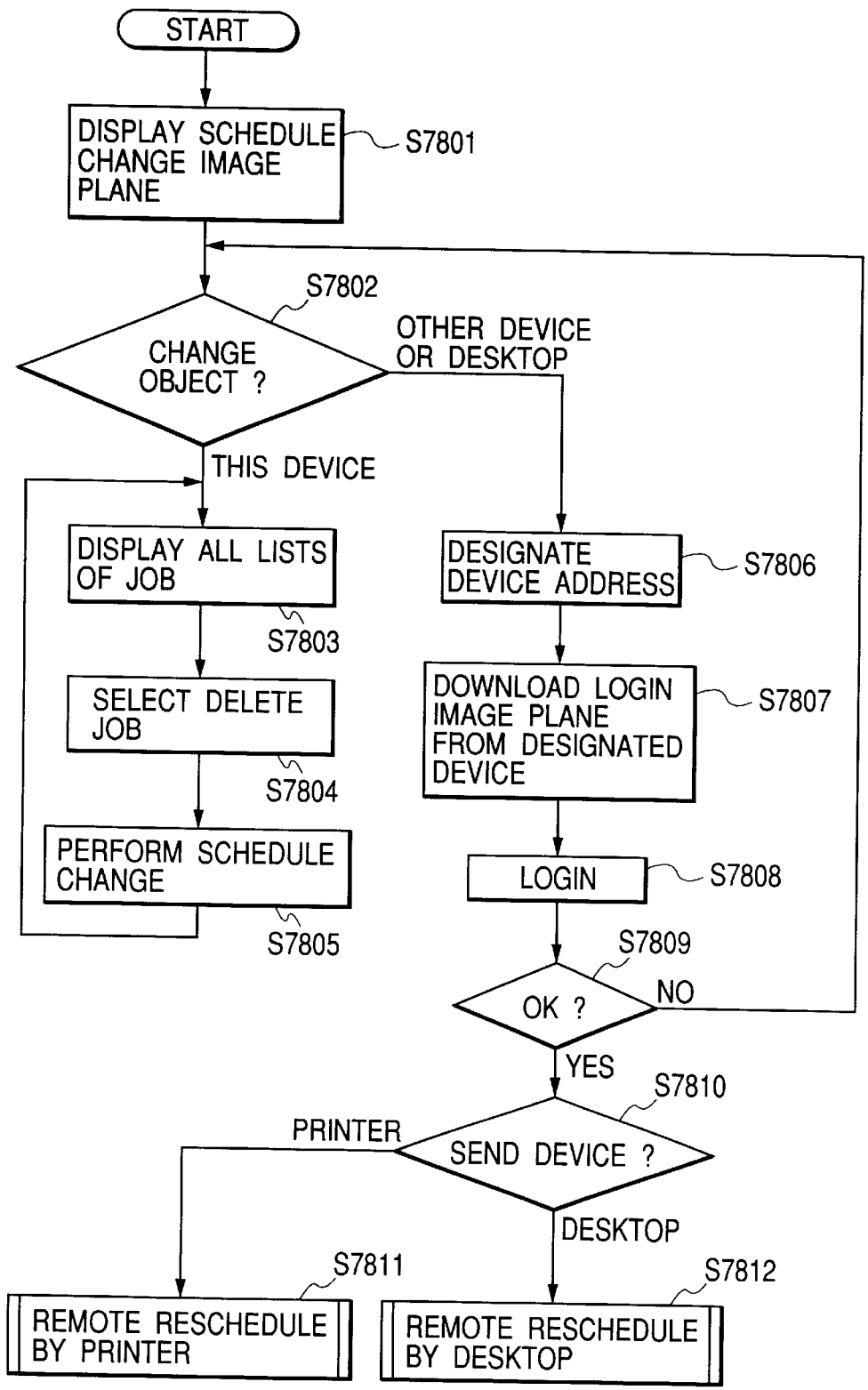
FIG. 78 is a flowchart showing the schedule change processing.

FIG. 78 is a flowchart showing the schedule change processing performed when "Reschedule" is selected on the main menu.

Figure 127:
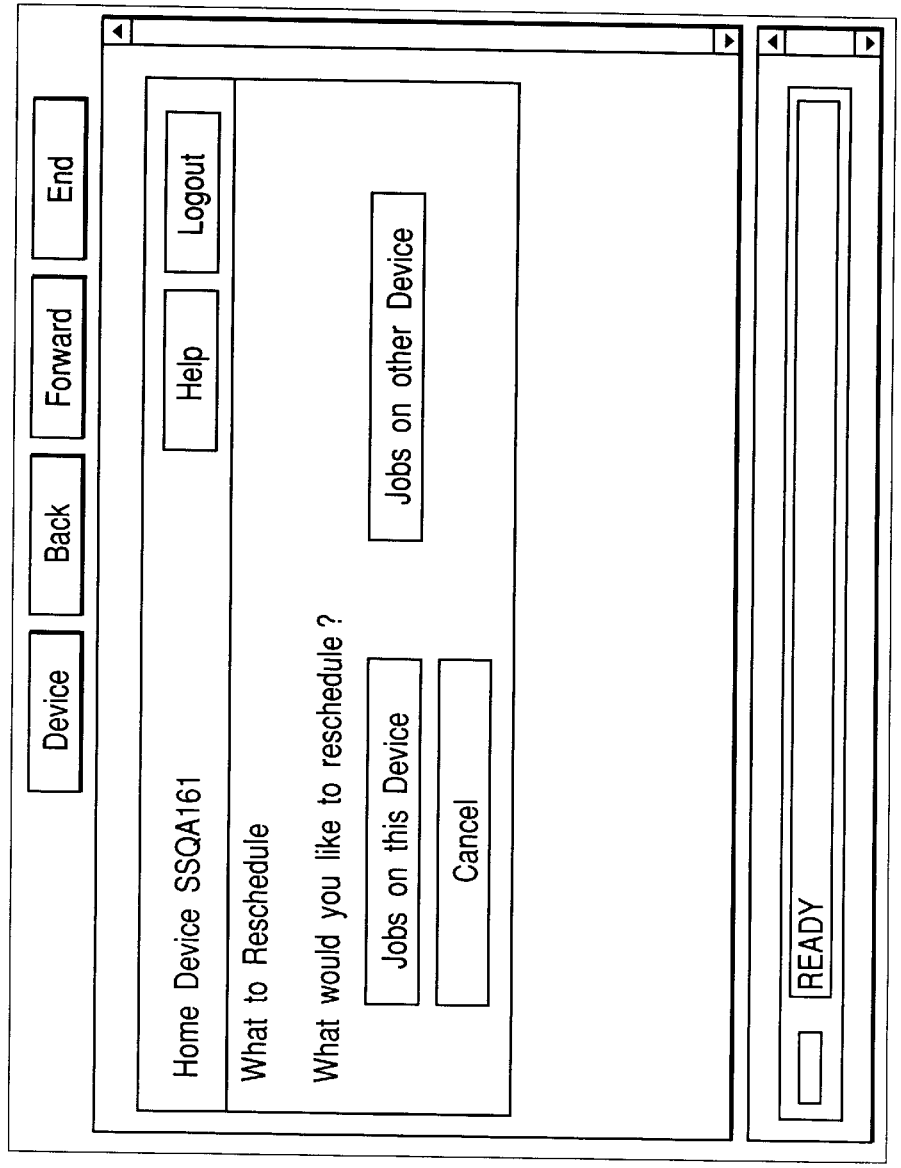
Figure 128:
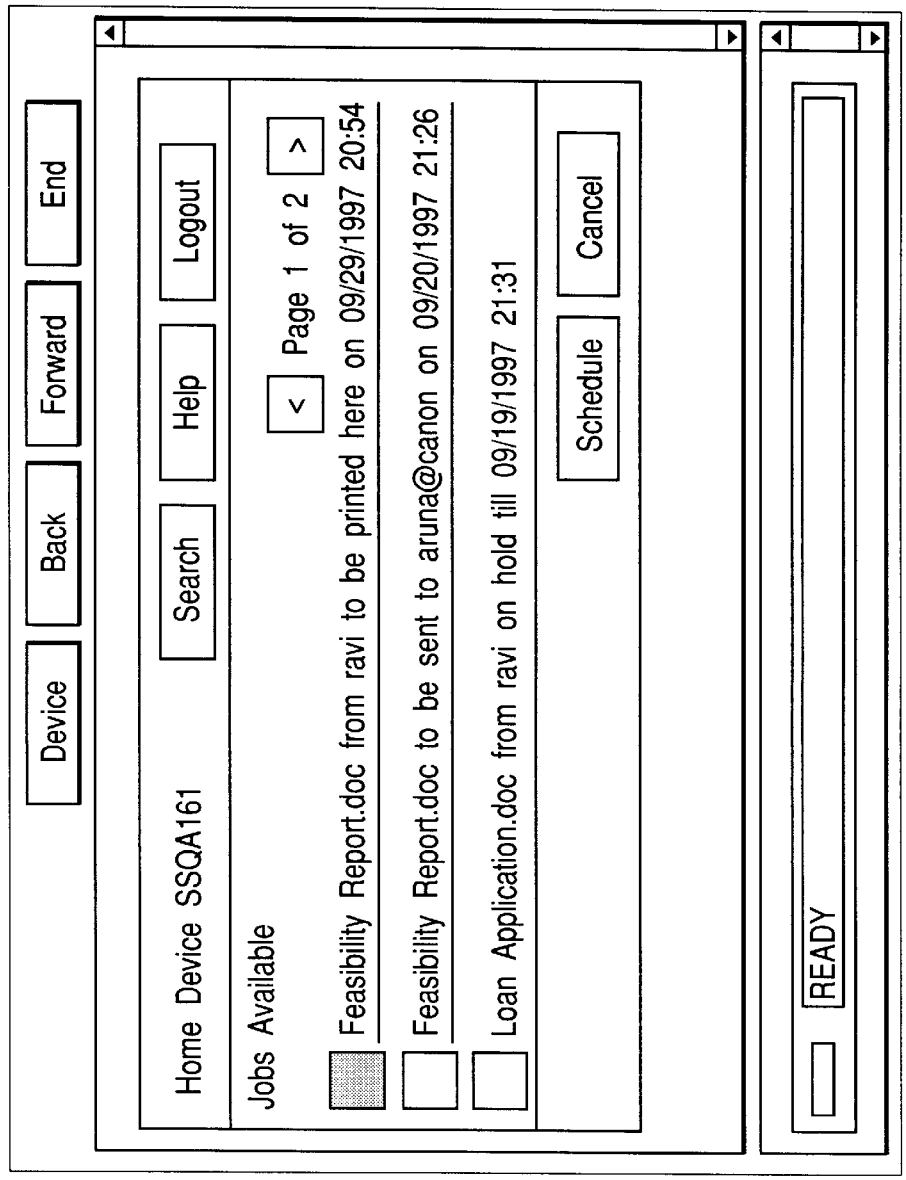

At step S7801 a schedule change screen is displayed to select a place, either a current device, another device or a desktop, whereat a job to be changed is present. FIG. 127 is a diagram showing an example menu for selecting a device whereat a job to be changed is present. When at step S7802 the current device ia selected, at step S7803 the list of jobs in the current device is displayed. FIG. 128 is a diagram showing an example screen for selecting a job that is to be rescheduled. At step S7804 a job to be changed is selected, and at step S7805 the schedule of the selected job is changed, as was explained in FIG. 59.

Figure 79:
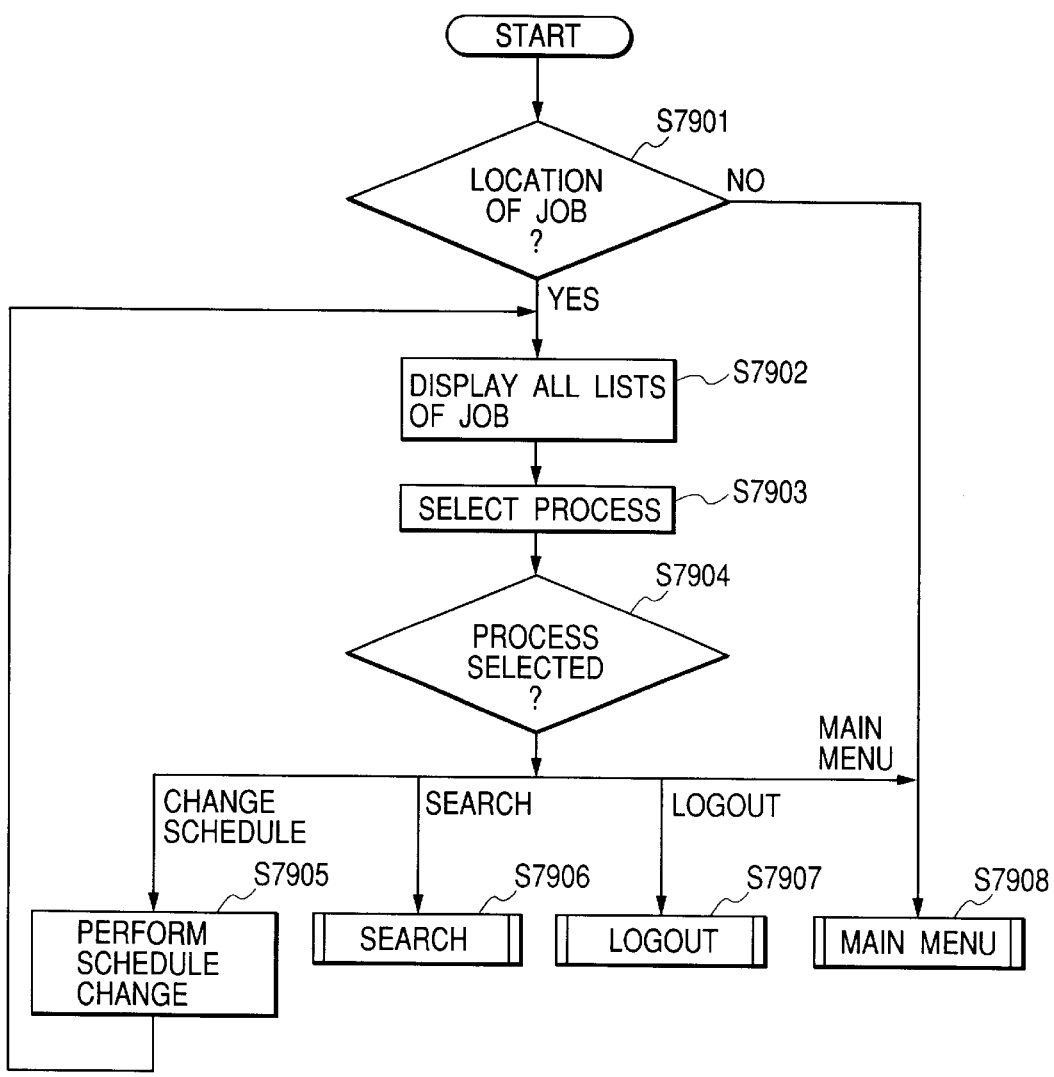
FIG. 79 is a flowchart showing the remote rescheduling processing.

When another device or a desktop is selected as a place whereat a job to be changed is present, at step S7806 the address of the device is designated, at step S7807 the login screen is downloaded from the device at the address, and at step S7808 the login process is performed in accordance with the screen. When at step S7809 the login process is completed, since the login verb is "Reschedule", at step S7810 a menu screen in FIG. 128 for selecting a job to be rescheduled is downloaded to select a job, as explained in FIG. 51. To change the schedule of the printer, at step S7811 the remote rescheduling process, which will be described while referring to FIG. 79, is performed by the printer. To change the schedule for the desktop, at step S7812 the remote rescheduling process is performed by the desktop.

FIG. 79 is a flowchart showing the remote rescheduling processing performed when rescheduling of a job for another device (same type of printer) is selected on the main menu.

When there is a job in the device, at step S7902 the list of all the jobs is displayed, and at step S7903 a process is selected. When a job is selected and the rescheduling process is selected, at step S7905 a job rescheduling screen in FIG. 116 is displayed, and the selected job is rescheduled. This processing is performed in the same manner as is the rescheduling of the selected job for the current device, which was explained in FIG. 59. It should be noted that the list and the menu are downloaded from the device that is accessed.

When at step S7904 "Search" is selected, at step S7906 a search is made for a new job to be rescheduled. When "Logout" is selected, at step S7907 the logout processing explained in FIG. 52 is performed. When "Main Menu" is selected, at step S7908 the screen is returned to the display of the main menu.

Figure 81:
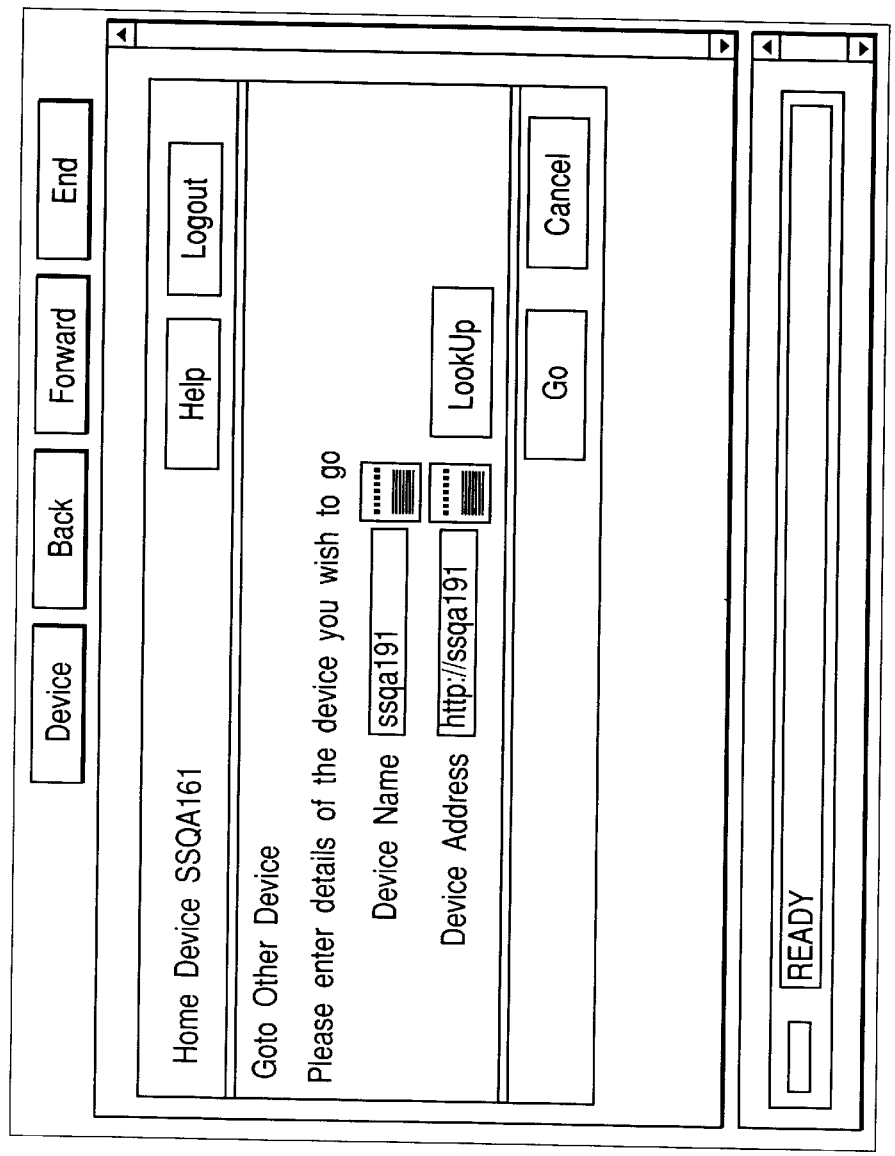
FIG. 81 is a diagram showing a setup screen for accessing another device.

FIG. 80 is a flowchart showing the processing for accessing another device. In FIG. 80 is shown the sequence of the processing performed when an access of another device or an access of a desktop is selected on the main menu. FIG. 81 is a diagram showing an example setup screen for accessing another device. At step S8001 the address of the device is designated, and at step S8002 the login screen is downloaded from the device at that address. At step S8003 the login process is performed in accordance with the downloaded screen. When at step S8004 the login process is completed, since the login verb is "Device", at step S8005 the initial menu screen in FIG. 106 is downloaded to determine a device to be operated, as explained in FIG. 51. When a printer is to be operated, at step S8006 the same process as is performed for the local printer is performed for the other printer. When a desktop is to be operated, at step S8007 the desktop processing is performed, which will be described later while referring to FIG. 82. When another device is to be operated, at step S8008 the process for that device is performed.

Figure 129:
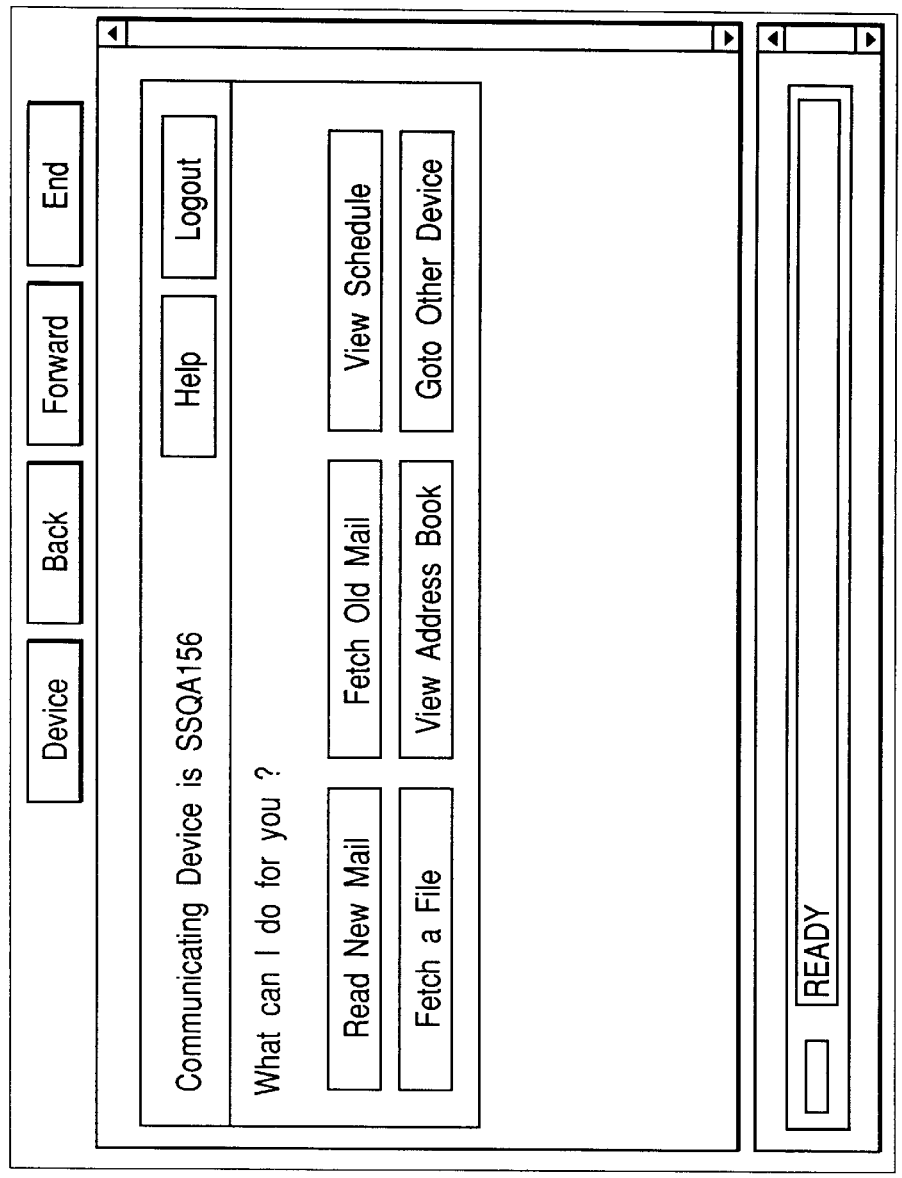

FIG. 82 is a flowchart showing the desktop processing. In FIG. 82 are shown a shift from the initial screen and the sequence of the processing performed when "Goto My Desktop" is selected on the main menu. First, at step S8201 the main menu is displayed. FIG. 129 is a diagram showing an example desktop main menu. At step S8202 a process (action) is selected.

Figure 83:
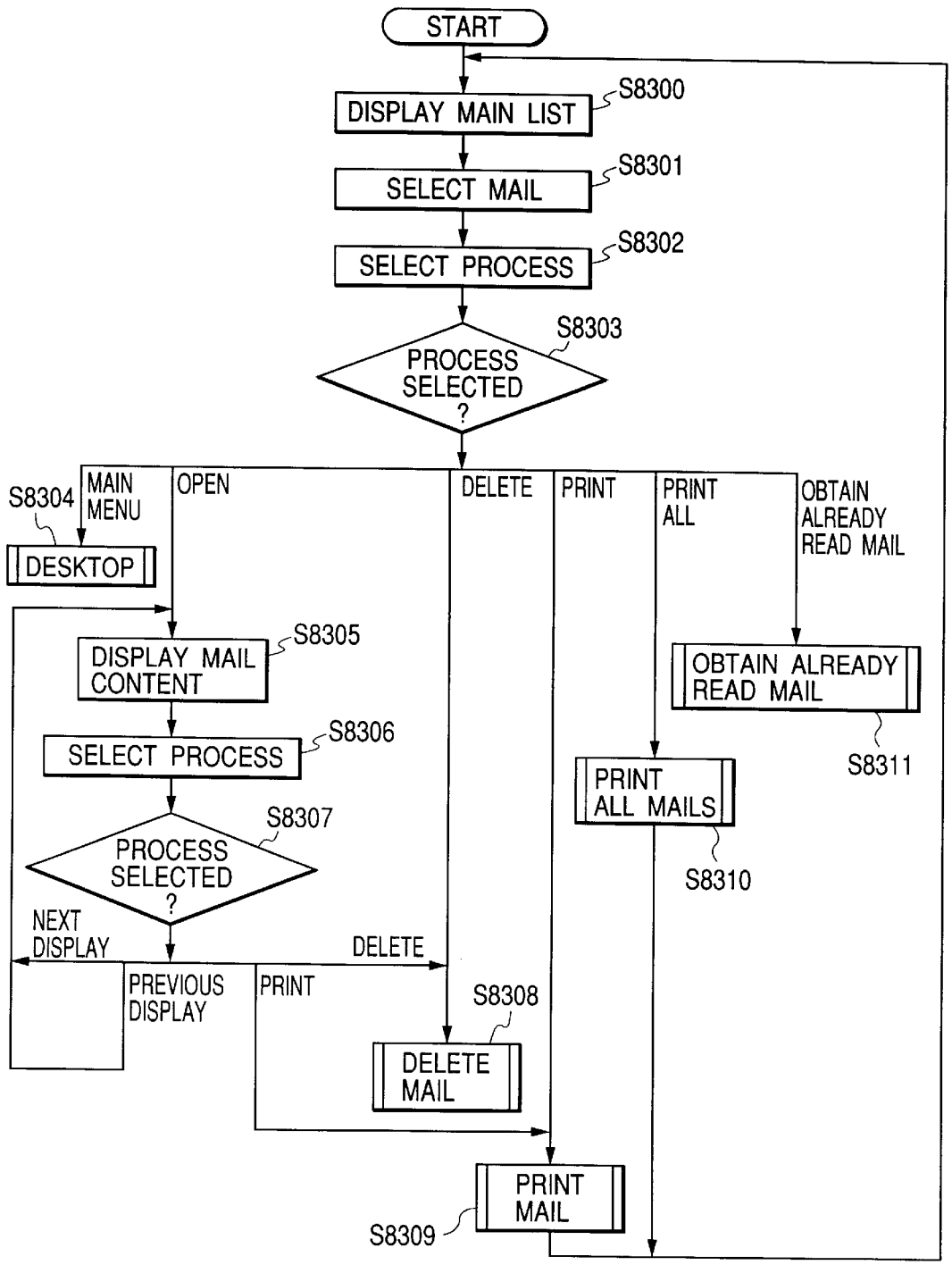
FIG. 83 is a flowchart showing the processing performed for unread mail.
Figure 84:
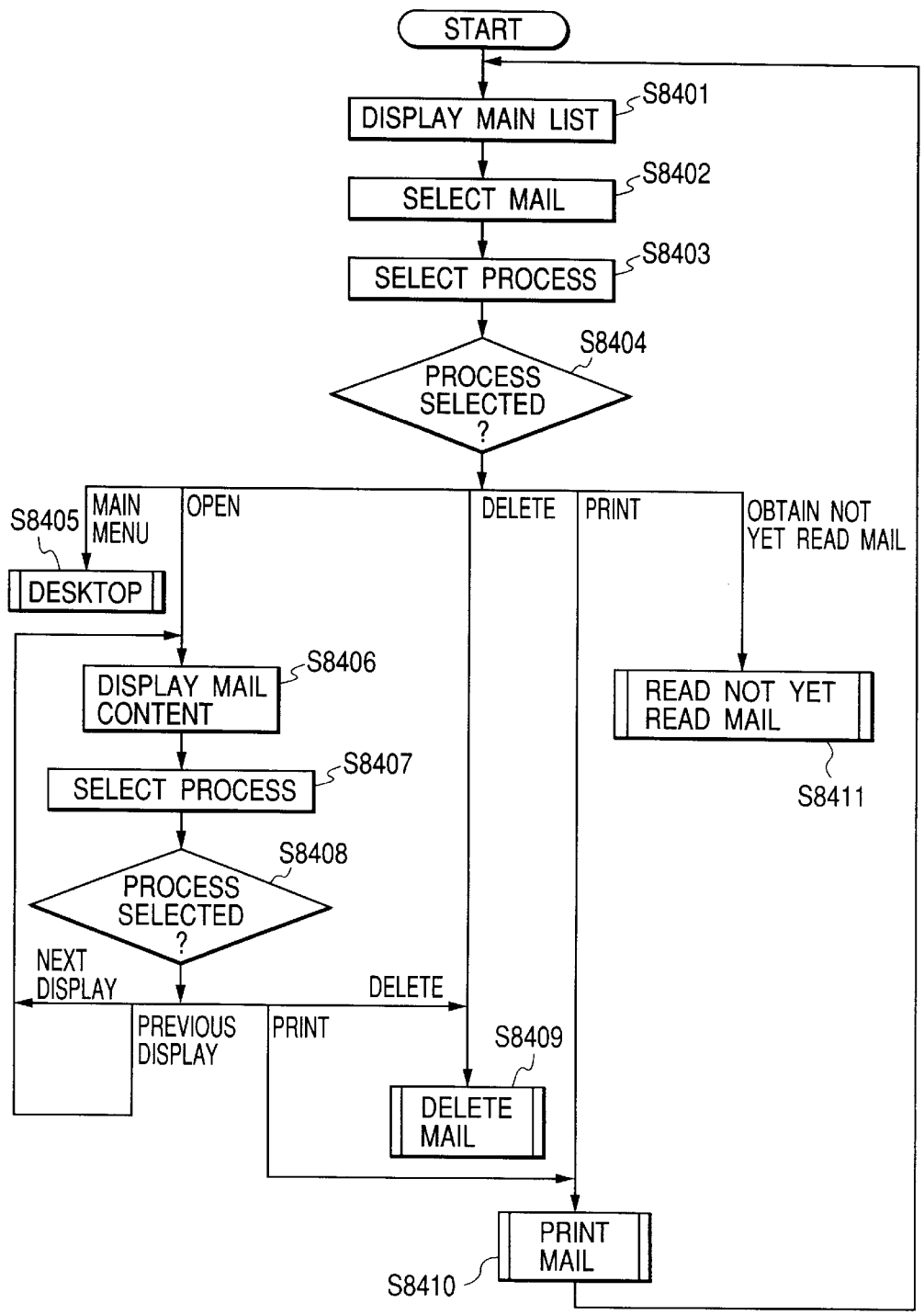
FIG. 84 is a flowchart showing the processing performed for read mail.
Figure 88:
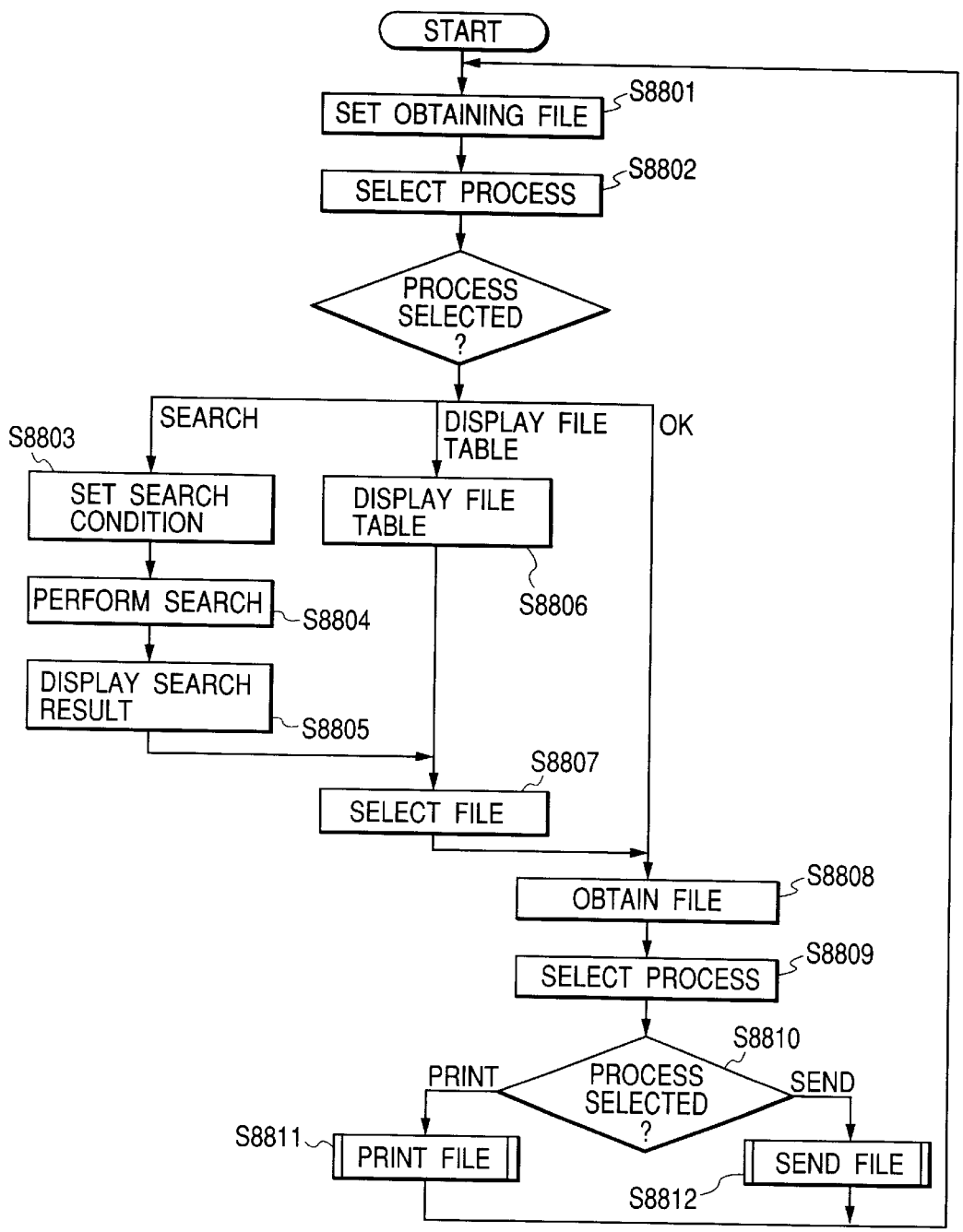
FIG. 88 is a flowchart showing the file processing.

When at step S8202 "Fetch a File" is selected, at step S8204 the file printing process, which will be described later while referring to FIG. 88, is performed. When the acquisition of new mail is selected, at step S8205 the new mail reading processing, which will be described while referring to FIG. 83, is performed. When the acquisition of old mail is selected, at step S8206 the old mail acquisition processing, which will be described later while referring to FIG. 84, is performed. When the printing of a schedule is selected, at step S8207 the schedule is printed. When a reference to a schedule is selected, at step S8208 the schedule reference processing is performed. When a reference to an address book is selected, at step S8209 the address book reference processing is performed. When "Logout" is selected, at step S8210 the logout processing explained in FIG. 52 is performed.

Figure 85:
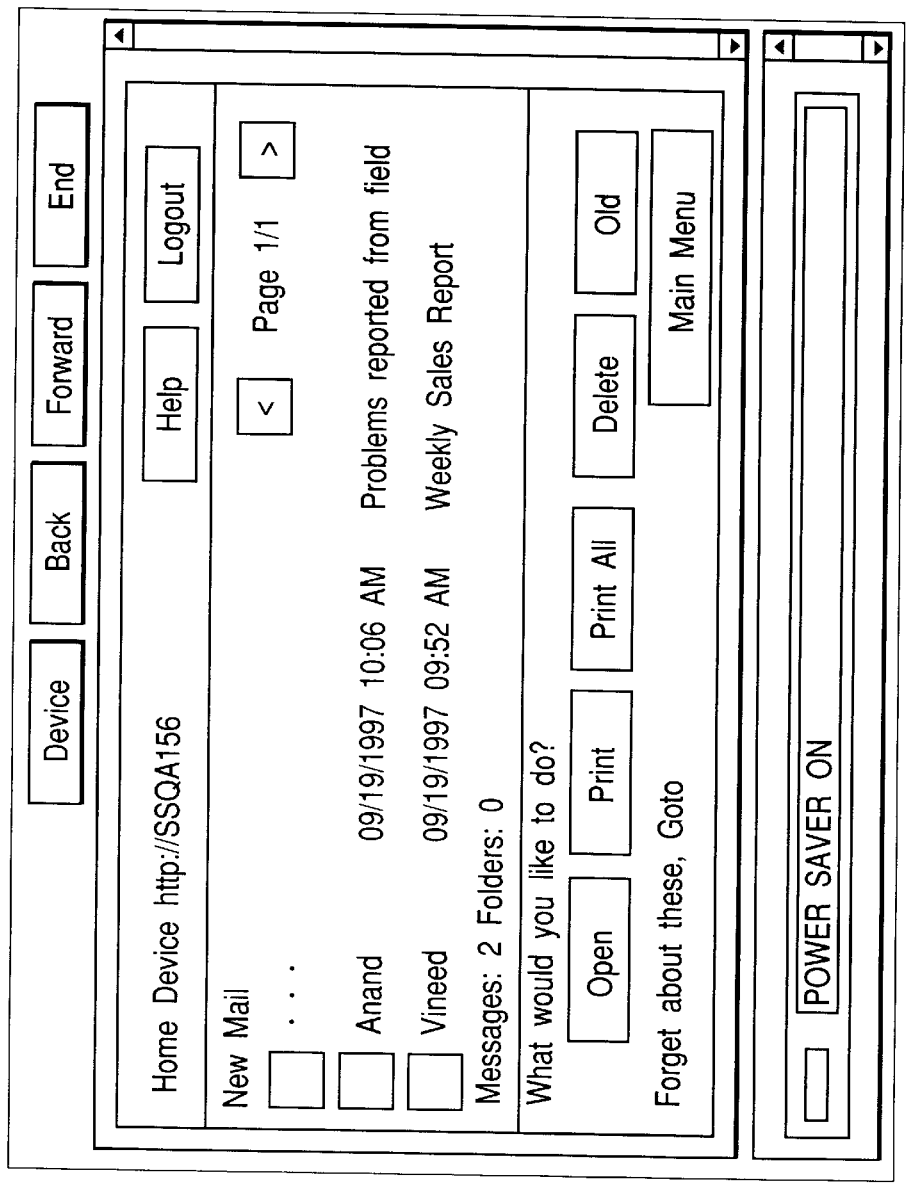
FIG. 85 is a diagram showing an example unread mail list.

FIG. 83 is a flowchart showing the new mail reading processing performed when a user accesses his or her desktop to read new mail. At step S8300 a list of new mail is displayed. FIG. 85 is a diagram showing an example new mail list. At step S8301 mail to be read is selected, and at step S8302 a process for the selected mail is selected.

Figure 86:
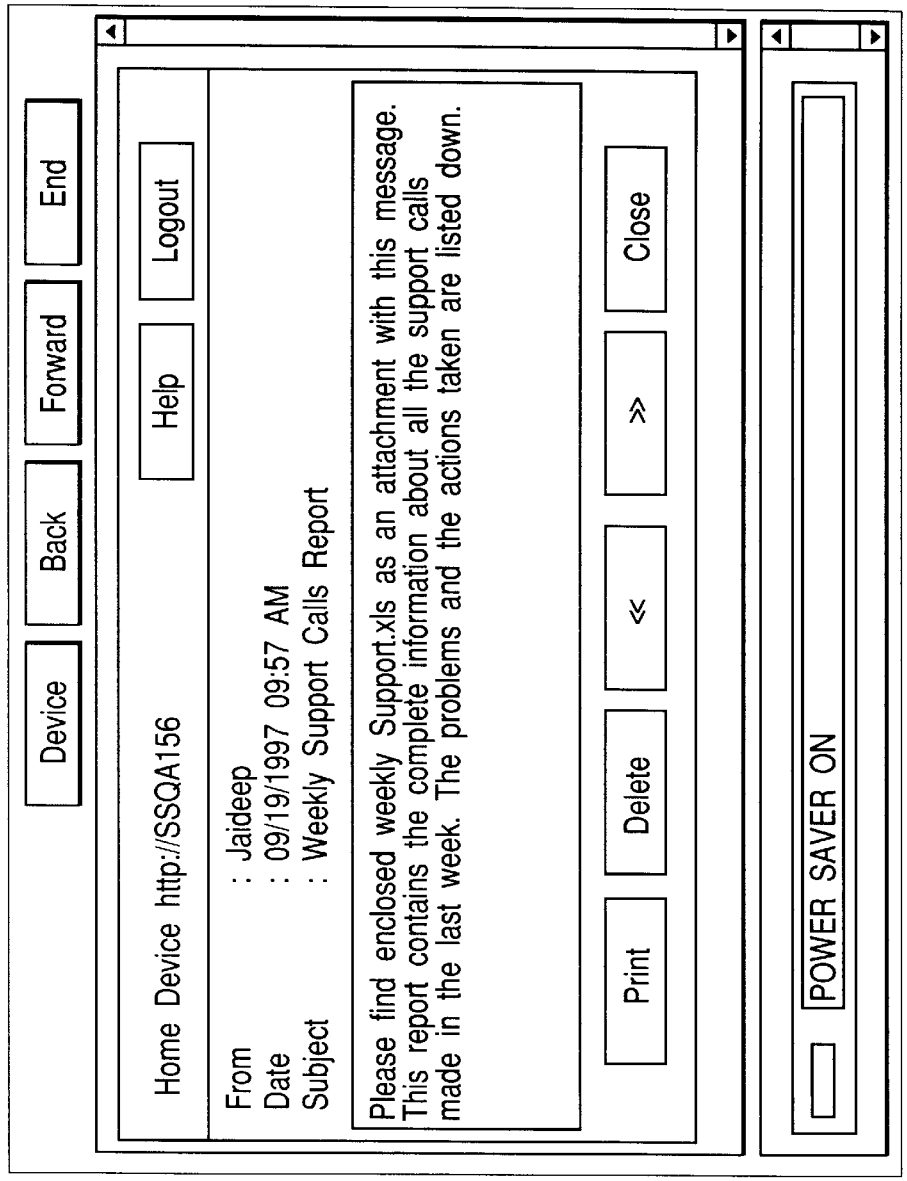
FIG. 86 is a diagram showing an example display for the content of mail.

When at step S8302 "Main Menu" is selected, at step S8304 the screen is returned to the main menu of the desktop. When "Open" is selected, at step S8305 the selected mail is opened and the contents of the mail are displayed. FIG. 86 is a diagram showing an example display for the contents of mail. When at step S8306 the preceding display or the succeeding display is selected, program control returns to step S8305 whereat the contents of corresponding mail are displayed. When "Print" or "Delete" is selected, mail is deleted at step S8308 or mail is printed at step S8309. Similarly, when at step S8302 "Print" or "Delete" is selected, mail is deleted at step S8308 or mail is printed at step S8309. When "Print All" is selected, at step S8310 all mail is printed. When "Old" (mail that has been read) is selected, the read mail acquisition processing, which will be described later while referring to FIG. 84, is performed.

During mail printing, a user accesses his or her desktop and obtains and prints mail. The printing destination can be designated as in the previous job printing. For the printing of all the mail, a user accesses his or her desktop to obtain and print all the mail. For the deletion of mail, a user accesses his or her desktop to delete mail. At this time, as well as the deletion of a job, the confirmation of the deletion may be performed.

Figure 87:
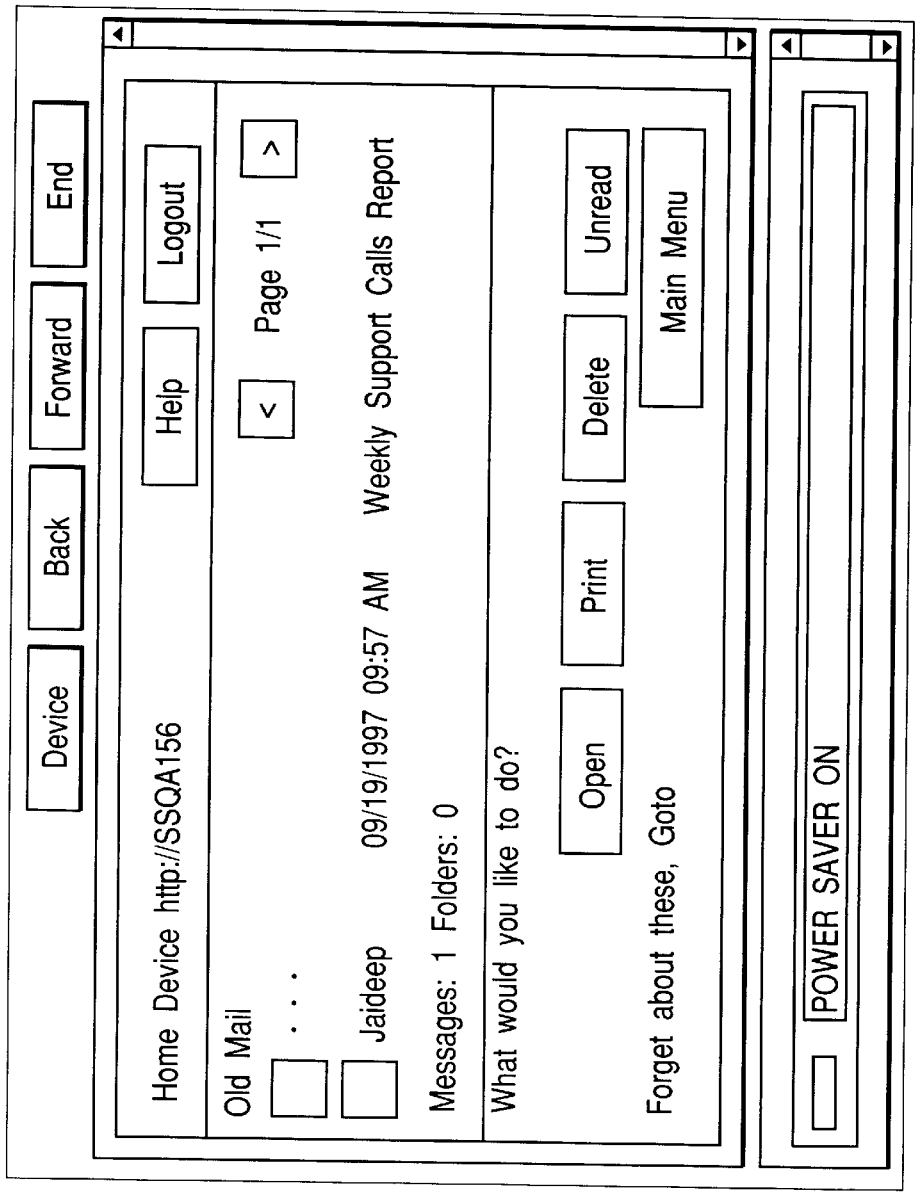
FIG. 87 is a diagram showing an example read mail list.

FIG. 84 is a flowchart showing the old mail acquisition processing performed when a user accesses his or her desktop to read old mail. At step S8401 a list for old mail is displayed. FIG. 87 is a diagram showing an example list of old mail. At step S8402 mail to be read is selected, and at step S8403 a process for the selected mail is selected.

When at step S8404 "Main Menu" is selected, at step S8405 the screen is returned to the main menu of the desktop. When "Open" is selected, at step S8406 the selected mail is opened and the contents are displayed. FIG. 86 is a diagram showing an example display of the contents of mail. When at step S8407 the preceding display or the succeeding display is selected, program control returns to step S8406 whereat the contents of corresponding mail are displayed. When "Print" or "Delete" is selected, mail is deleted at step S8409 or mail is printed at step S8410. Similarly, when at step S8404 "Print" or "Delete" is selected, mail is deleted at step S8409 or mail is printed at step S8410. When "Unread" is selected, the new mail reading processing explained in FIG. 83 is performed.

Figure 130:
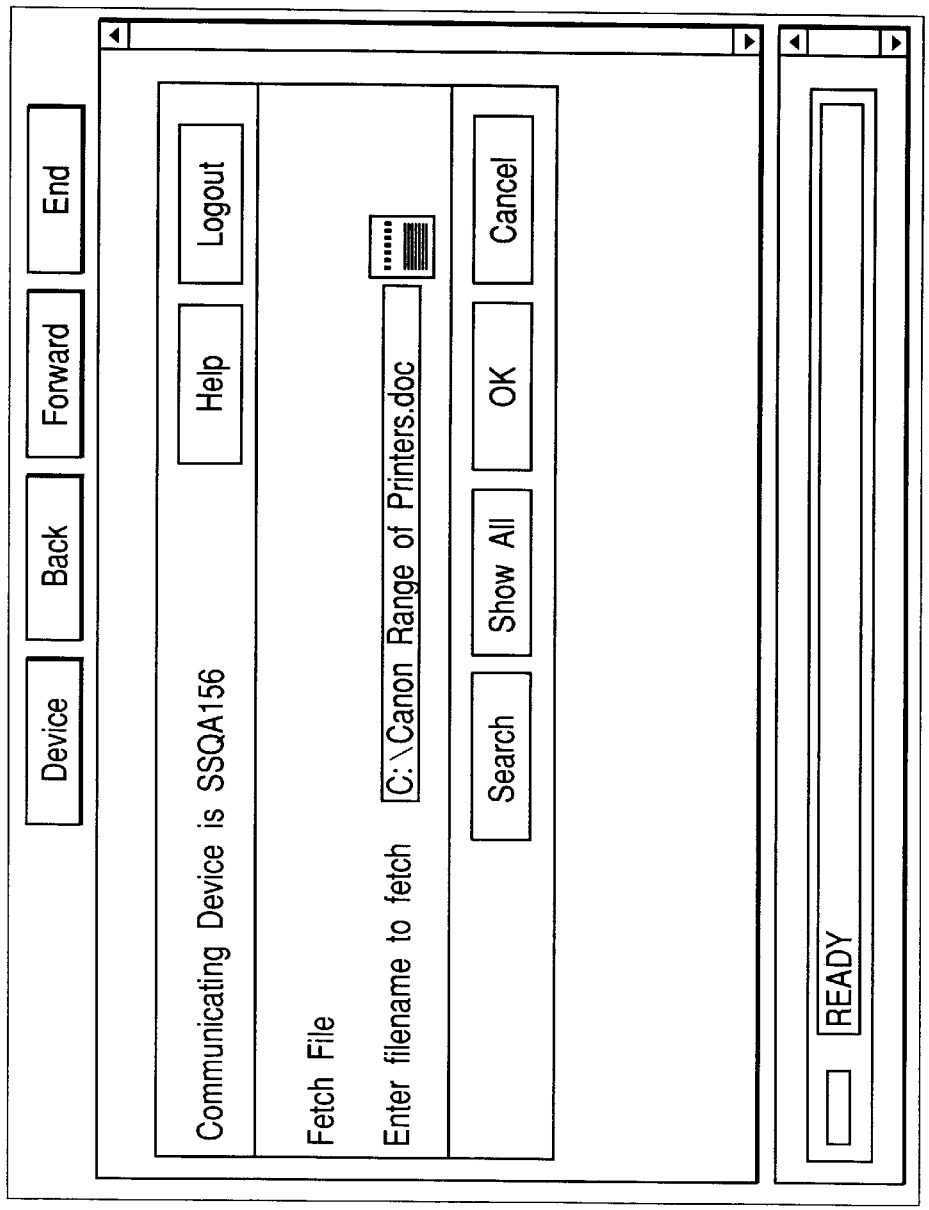

FIG. 88 is a flowchart showing the file processing performed when a user accesses his or her desktop to operate a file on the desktop. At step S8801 setup is performed to obtain a file. FIG. 130 is a diagram showing an example setup screen for obtaining a file. On this screen the file name can be designated. At step S8802 a process to be performed to obtain a file is selected.

Figure 131:
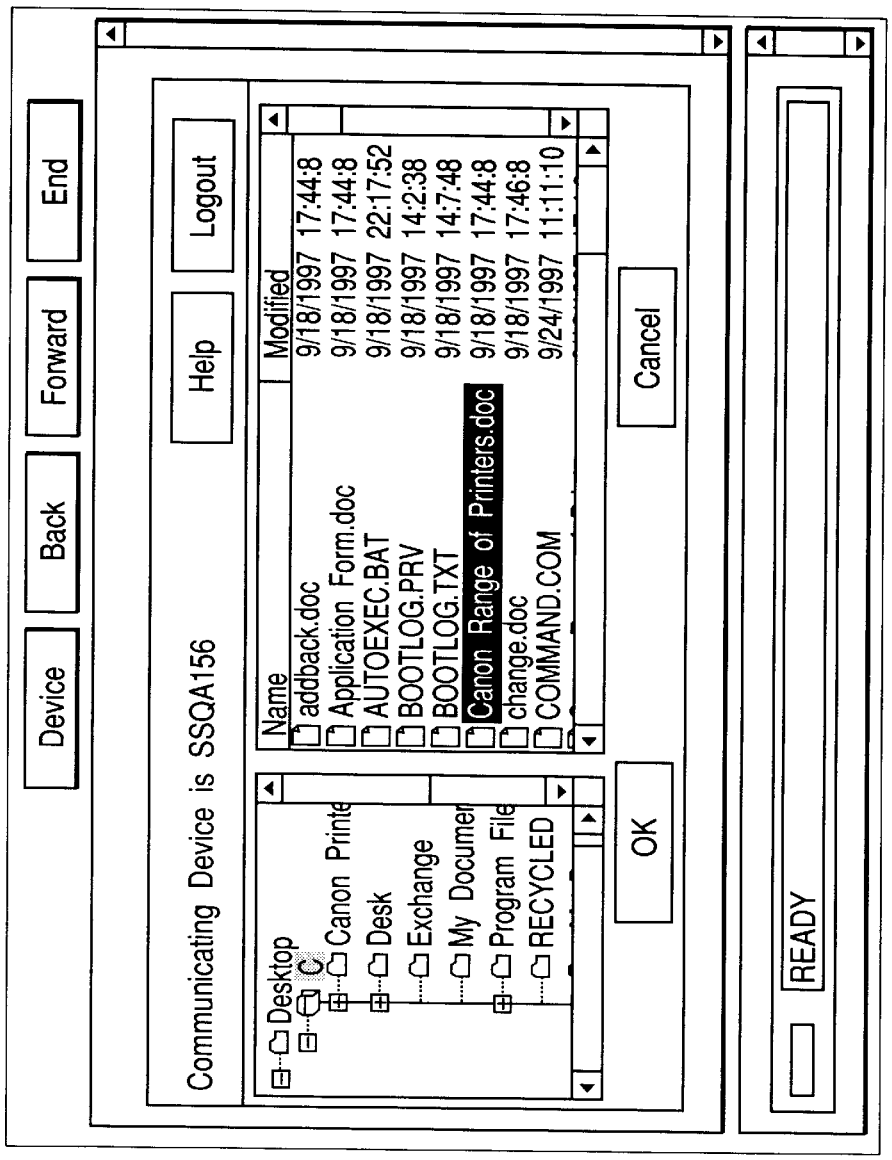

When at step S8802 "Search" is selected, at step S8803 a search condition is designated, at step S8804 a search is made for a file on the desktop, and at step S8805 a list for files that correspond to the setup condition is displayed. When at step S8802 "Show All" is selected, the list of the files in the desktop is displayed. FIG. 131 is a diagram showing an example display for the file list for the desktop. At step S8807 a file is selected from the search results or from the list. When the file is thus selected, or when at step S8802 the file name is entered to instruct the acquisition of the file, at step S8808 the pertinent file is obtained from the desktop. At step S8809 a process for this file is selected. FIG. 132 is a diagram showing an example screen for selecting a process corresponding to the obtained file. When "Print" is selected, at step S8811 the obtained file is printed. When "Send" is selected, at step S8812 the obtained file is transmitted.

FIG. 137 is a flowchart showing the Logout screen creation processing performed when Logout is the function that is commonly selected on a series of screens following Login.

When the Logout screen creation processing is initiated, at step S13701 a check is performed to determine whether a job that has not yet been processed is available for a Login user. When an unprocessed job is available, at step S13702 a Logout screen HTML page on which is included a job list is created and the processing is thereafter terminated. When no unprocessed job is available, at step S13703 a Logout screen HTML page on which no job list is included is created and the processing is thereafter terminated.

FIG. 138 is a flowchart showing the Logout screen processing that corresponds to the operation performed on the Logout screen.

FIGS. 139 and 140 are diagrams showing example Logout screens, and the screen in FIG. 140 is obtained by scrolling the center portion in FIG. 139.

When an operator enters a specific instruction on the Logout screen displayed by the client component, a request corresponding to the instruction is transmitted by the client component to the server, which then initiates the Logout screen processing in FIG. 138 that corresponds to the screen currently displayed by the client.

When the Logout screen processing is initiated, at step S13801 a request is obtained, at step S13802 the request is analyzed, and at step S13803 program control branches to a process corresponding to the request.

When Print is requested, at step S13804 a job list is printed and the processing is terminated. When Yes is requested, at step S13805 the Logout processing is performed, at step S13806 a screen HTML page for a processing menu is created, and at step S13807 the HTML page is transmitted to the client. The processing is thereafter terminated. For another request, at step S13809 the post-Login, general request process, which corresponds to the request that is commonly selected on a series of screens following Login, is performed. The processing is thereafter terminated.

As is shown in FIG. 139, job IDs are assigned to the individual jobs on the job list, and as is shown in FIG. 140 a user ID and a contact telephone number are described.

FIG. 141 is a flowchart showing the call response processing that is initiated in response to the reception of a call. When an operator dials the contact telephone number that is described on the job list to contact the device described in this embodiment, the call response processing in FIG. 141 is initiated.

When the call response processing is started, at step S14101, a response message is reproduced, such as "This is the device ABC call response system. Please select '1' for the state of the device, '2' for an operation for which authentication is required, and '#' for termination". At step S14102, an operation selection entered by the user is obtained, and at step S14103 program control branches in accordance with the type of operation requested.

For a request for the state of the device, at step S14104 the state of the device is obtained and at step S14105 the obtained information is reproduced. Then, program control is returned to step S14102, whereat an instruction from the operator is received. When termination is requested, the processing is terminated.

For processing that is related to a user's job, authentication is required. In this case, at step S14106, a user authentication request message is reproduced, such as "Please enter user ID and depress '#'". At step S14107 the operator's entry is obtained, and at step S14108 program control branches in accordance with What?/an instruction received from the operator if the authentication is successful.

When the authentication fails, at step S14109 an authentication failure message is reproduced, and program control returns to step S14102 to await an instruction from the operator.

When the authentication is successful, at step S14110 a job selection request message is reproduced, such as "Please enter the job ID of a desired job and depress #". At step S14111 a job is identified in accordance with the job ID entered by the user. At step S14112 an operation selection request message is reproduced, such as "Please select '1' for the job state, '2' for job deletion and '#' for termination". At step S14113 the selection entered by the operator is obtained, and at step S14114 program control branches in accordance with the operation type.

For a request for the job state, at step S14115 the state of the job is obtained, and at step S14116 the obtained information is reproduced. Then, program control returns to step S14110 to acquire an instruction entered by the user.

For the deletion of a job, at step S14117 the job is deleted and at step S14118 the deletion results are reproduced.

Program control then returns to step S14110 to acquire an instruction entered by the operator.

For the execution of a job, at step S14119 the job is executed and at step S14120 the execution results are reproduced. Program control then returns to step S14110 to acquire an instruction entered by the operator.

For the other operation type, program control returns to step S14110 and acquires an instruction entered by the operator.

According to the embodiment described above, when a user performs a designated process at a predetermined timing, the user can ascertain whether there is an unprocessed job.

In addition, by querying the apparatus, the user can ascertain the state of the device or the process, and can control the performance of the processing.

When New Interaction is selected on the initial menu, login is performed using Admin (manager) and if a correct password is entered, the manager main screen is displayed. FIGS. 142A and 142B are flowcharts showing the manager main screen processing that corresponds to the operation on the manager main screen. FIG. 143 is a diagram showing an example manager main screen.

When the operator enters a specific instruction on the manager main screen in FIG. 143 displayed by the client component, a request corresponding to the operation is transmitted from the client to the server, and the manager main screen processing in FIGS. 142A and 142B, which corresponds to the screen currently displayed by the client, is initiated by the server.

When the manager main screen processing is initiated, at step S14201 a request is obtained, at step S14202 it is analyzed, and at step S14203 program control branches to a corresponding process.

When one of Network Settings, Resource Settings, etc., is requested, at step S14204 a screen HTML page that corresponds to the request is created, and at step S14205 it is transmitted to the client. The processing is thereafter terminated.

When Purge Print Queue is requested, at step S14206 all the jobs in a print queue are deleted, and at step S14207 the owner of each of the deleted jobs is notified the job was deleted. At step S14208 the execution results are employed to create a screen HTML page, and at step S14205 this page is transmitted to the client component. The processing is thereafter terminated.

When a request other than those above is entered, at step S14209 the post-Login, general request process, which corresponds to the request that is commonly selected on a series of screens following Login, is performed. The processing is thereafter terminated.

When Network Settings is selected on the manager main screen, a network setup screen is displayed. FIG. 144 is a flowchart showing the network setup screen processing that corresponds to the operation on the network setup screen. FIG. 145 is a diagram showing an example network setup screen.

When the operator enters an instruction on the network setup screen displayed by the client component, a request corresponding to that instruction is transmitted from the client to the server, which then initiates the network setup screen processing in FIG. 144 that corresponds to the operation screen currently displayed by the client.

It should be noted, however, that the input operation for setting up the Host Name, IP Address, Net Mask, Default Gateway, DNS Domain Name, DNS Server and WINS Server is completed only through the client processing, without the server processing in FIG. 144 being started. Since Set & Reboot, Cancel, or other operations require the server processing, the network setup screen processing in FIG. 144 is started.

When the network setup screen is initiated, at step S14401 a request is obtained, at step S14402 it is analyzed and at step S14403 program control branches to a corresponding process.

When Set & Reboot is requested, at step S14404 network parameters are set for the Host Name, IP Address, Net Mask, Default Gateway, DNS Domain Name, DNS Server and WINS Server that have been set by the client, and at step S14405 the system is re-activated to validate the setup of the network parameters. The processing is thereafter terminated.

When Cancel is requested, at step S14406 the preceding screen HTML page is created, and at step S14407 it is transmitted to the client. The processing is thereafter terminated.

For another request, at step 514408 the post-Login, general request process, which corresponds to the request that is commonly selected on a series of screens following Login, is performed, and the processing is thereafter terminated.

FIG. 146 is a flowchart showing the job setup screen processing that corresponds to the operation on the job setup screen, which is displayed when Job Settings is selected on the manager main screen. FIG. 147 is a diagram showing an example job setup screen.

When the operator enters an instruction on the job setup screen in FIG. 147 that is displayed by the client, a request that corresponds to the operation is transmitted from the client to the server, which then begins the job setup screen processing in FIG. 146 that corresponds to the operation screen currently displayed by the client.

In this processing, the following can be set: Default Hold Time (the initial value of a time period during which a designated job is held), History Time Limit (the time limit for holding a job that was executed and is stored as history), Maximum Time For Rescheduling Jobs (a time period during which a designated execution time for a job can be changed), Job Size Limit (the maximum size of a job) and Default Protocol (the initial protocol value).

It should be noted, however, that the input operation for the setup of Default Hold Time, History Time Limit, Maximum Time For Rescheduling Jobs, Job Size Limit, Deny Jobs From Person and Deny Jobs From Devices is completed only through client processing, without the server processing in FIG. 146 being required. Since the OK, Cancel and other operations require the server processing, the job setup screen processing in FIG. 146 is performed.

When the job setup screen processing is begun, at step S14601 a request is obtained, at step S14602 it is analyzed and at step S14603 program control branches to a corresponding process.

When OK is requested, at step S14604 the job setup parameters are set for Default Hold Time, History Time Limit, Maximum Time For Rescheduling Jobs, Job Size Limit, Deny Jobs From Person and Deny Jobs From Devices that are set by the client. At step S14605 the preceding screen HTML page is created and at step S14606 it is transmitted to the client. The processing is thereafter terminated.

When Cancel is requested, at step S14605 the preceding screen HTML page is created and at step S14606 it is transmitted to the client. The processing is thereafter terminated.

For the other request, at step S14607 the post-Login, general request process, which corresponds to the request that is commonly selected on a series of screens following Login, is performed, and the processing is thereafter terminated.

FIG. 148 is a flowchart showing the resource setup screen processing that corresponds to the operation on a resource setup screen, which is displayed when Resource Settings is selected on the manager main screen. FIG. 149 is a diagram showing an example resource setup screen.

When the operator enters an instruction on the resource setup screen in FIG. 149 that is displayed by the-client, a request corresponding to the instruction is transmitted from the client to the server, which then initiates the resource setup screen processing that corresponds to the operation screen currently displayed by the client.

When a voice modem is installed, its telephone number is input. When a voice modem is not installed, Use Proxy is selected to use another device that includes a voice modem. The processing performed when Use Proxy is selected will be described later while referring to FIG. 150.

It should be noted, however, that the input operation for the setting of Voice Modem Installed is completed only through client processing, without the server processing in FIG. 148 being required. Since the operations for Set, Cancel, Use Proxy, E-mail Configure, Fax Configure and the other operation require server processing, the resource setup screen processing in FIG. 148 is performed.

When the resource setup screen processing is initiated, at step S14801 a request is obtained, at step S14802 it is analyzed and at step S14803 program control branches to a corresponding process.

When Set is requested, at step S14804 the resource setup parameters are set for the Voice Modem Installed, E-mail Capabilities and Fax Capabilities that are set by the client. At step S14805 the preceding screen HTML page is created and at step S14806 it is transmitted to the client. The processing is thereafter terminated.

When Cancel is requested, at step S14805 the processing screen HTML page is created and at step S14806 it is transmitted to the client. The processing is thereafter terminated.

When Use Proxy, E-mail Configure or Fax Configure is requested, at step S14807 a screen HTML page corresponding to the request is created and at step S14806 it is transmitted to the client. The processing is thereafter terminated.

For a request other than those, at step S14808 the post-Login, general processing, which corresponds to the request that is commonly selected on a series of screens following Login, is performed. The processing is thereafter terminated.

When Use Proxy is selected on the resource setup screen, a modem proxy setup screen is displayed. FIG. 150 is a flowchart showing the modem proxy setup screen processing that corresponds to a modem proxy setup screen. FIG. 151 is a diagram showing an example modem proxy setup screen.

When the operator enters an instruction on the modem proxy setup screen displayed by the client component, a request corresponding to the instruction is transmitted from the client to the server, which then begins the modem proxy setup screen processing that corresponds to the operation screen currently displayed by the client.

In this embodiment, a maximum of three devices, Proxy devices 1 to 3, can be designated using the device name and the address. It should be noted, however, that the input operation for the setting of Proxy devices 1 to 3 is completed only through client processing without the server processing in FIG. 142 being required. Since the OK, Cancel and other operations require the server processing, the modem proxy setup screen processing in FIG. 150 is performed.

When the modem proxy setup screen processing is initiated, at step S15001 a request is obtained, at step S15002 it is analyzed, and at step S15003 program control branches to a corresponding process.

When OK is requested, at step S15004 the modem proxy setup parameters are set for the Proxy devices 1 to 3 that are set by the client. At step S15505 the preceding screen HTML page is created and at step S15006 it is transmitted to the client. The processing is thereafter terminated.

When Cancel is requested, at step S15505 the preceding screen HTML page is created and at step S15006 it is transmitted to the client. The processing is thereafter terminated.

For another request, at step S15007 the post-Login; general request processing, which corresponds to the request that is commonly selected on a series of screens following Login, is performed. The processing is thereafter terminated.

FIG. 152 is a flowchart showing the other setup screen processing that corresponds to the other setup screen displayed when Miscellaneous is selected on the manager main screen. FIG. 153 is a diagram showing an example of the other setup screen.

When the operator enters an instruction on the other setup screen that is displayed by the client, a request corresponding to the instruction is transmitted from the client to the server, which then begins the other setup screen processing in FIG. 152 that corresponds to the operation screen currently displayed by the client.

It should be noted, however, that the input operation for the setting of Time Out Duration and Voice Prompt is completed only through client processing without the server processing in FIG. 10 being required. Since the Set, Cancel and other operations require the server processing, the other setup screen processing in FIG. 152 is begun.

When the other setup screen processing is initiated, at step S15201 a request is obtained, at step S15202 it is analyzed and at step S15203 program control branches to a corresponding process.

When Set is requested, at step S15204 the other setup parameters are set for the Time Out Duration and Voice Prompt that have been set by the client. At step S15205 the processing screen HTML page is created and at step S15206 it is transmitted to the client. The processing is thereafter terminated.

When Cancel is requested, at step S15205 the preceding screen HTML page is created and at step S15206 it is transmitted to the client. The processing is thereafter terminated.

For the other request, at step. S15207 the post-Login, general process, which corresponds to the request that is commonly selected on a series of screens following Login, is performed and the processing is thereafter terminated.

FIG. 154 is a flowchart showing the password setup screen processing that corresponds to a password setup screen displayed when Change Password is selected on the manager main screen. FIG. 155 is a diagram showing an example password setup screen.

When the operator enters an instruction on the password setup screen displayed by the client, a request corresponding to the operation is transmitted from the client to the server, which then begins the password setup screen processing in FIG. 154 that corresponds to the operation screen currently displayed by the client.

It should be noted, however, that the input operations for the setting of New Admin Password, Reconfirm Admin Password, New Shutdown Password and Reconfirm Password are completed only through client processing, without the server processing in FIG. 19 being required. Since the OK, Cancel and the other operations require the server processing, the password setup screen processing in FIG. 154 is performed.

When the password setup screen, processing is initiated, at step S15401 a request is obtained, at step S15402 it is analyzed, and at step S15403 program control branches to a corresponding process.

When OK is requested, at step S15404 the password setup parameters are set for the New Admin Password, Reconfirm Admin Password, New Shutdown Password and Reconfirm Shutdown Password that were set by the client. At step S15405 the preceding screen HTML, page is created and at step S15406 it is transmitted to the client. The processing is thereafter terminated.

When Cancel is requested, at step S15405 the preceding screen HTML page is created and at step S15406 it is transmitted to the client. The processing is thereafter terminated.

For the other request, at step S15407 the post-Login, general processing, which corresponds to the request that is commonly selected on a series of screens following Login, is performed. The processing is thereafter terminated.

FIG. 156 is a flowchart showing the public information deletion screen processing that corresponds to the operation on the public information deletion screen displayed when Delete Public Info. is selected on the manager main screen. FIG. 157 is a diagram showing an example public information deletion screen.

When the operator enters an instruction on the public information deletion screen in FIG. 157 that is displayed by the client, a request corresponding to the instruction is transmitted from the client to the server, which then begins the public information deletion processing that corresponds to the operation screen currently displayed by the client.

It should be noted, however, that the input operation for designating target public information is completed only through client processing, without the server processing in FIG. 156 being required. Since the Delete, Delete All, Cancel and other operations require the server processing, the public information deletion screen processing in FIG. 156 is performed.

When the public information deletion screen processing is initiated, at step S15601 a request is obtained, at step S15602 it is analyzed and at step S15603 program control branches to a corresponding process.

When Delete is requested, at step S15604 the public information designated by the client is deleted. At step S15605 the screen HTML page of the updated public information list is created, and at step S15608 it is transmitted to the client. The processing is thereafter terminated.

When Delete All is requested, at step S15606 all the public information is deleted. At step S15607 the preceding screen HTML page is created and at step S15608 it is transmitted to the client. The processing is thereafter terminated.

When Cancel is requested, at step S15607 the preceding screen HTML page is created and at step S15608 it is transmitted to the client. The processing is thereafter terminated.

For the other request, at step S15609 the post-Login, general request process, which corresponds to the request that is commonly selected on a series of screens following Login, is performed. The processing is thereafter terminated.

FIG. 158 is a flowchart showing the job database management screen processing that corresponds to the operation on a job database management screen displayed when Job Administration is selected on the manager main screen. FIG. 159 is a diagram showing an example database management screen.

When the operator enters an instruction on the job database management screen displayed by the client, a request corresponding to the instruction is transmitted from the client to the server, which then initiates the job database management screen processing that corresponds to the operation screen currently displayed by the client.

It should be noted, however, that the input operations for designating Initialize Database, Repair Database and Compact Database are completed only through client processing, without the server processing in FIG. 158 being required. Since the Proceed, Cancel and other operations require the server processing, the job database management screen processing in FIG. 158 is performed.

When the job database management screen processing is initiated, at step S15801 a request is obtained, at step S15802 it is analyzed, and at step S15803 program control branches to a corresponding process.

When Proceed is requested, at step S15804 a process designated by the client is performed, and the processing is terminated.

When Cancel is requested, at step S15805 the preceding screen HTML page is created, and at step S15806 it is transmitted to the client. The processing is thereafter terminated.

For the other request, at step S15807 the post-Login, general process, which corresponds to the request that is commonly selected on a series of screens following Login, is performed. The processing is thereafter terminated.

FIG. 160 is a flowchart showing the shutdown screen processing that corresponds to the operation on a shutdown screen displayed when Shut Down is selected on the manager main screen. FIG. 161 is a diagram showing an example shutdown screen.

When the operator enters an instruction on the shutdown screen displayed by the client, a request corresponding to the instruction is transmitted from the client to the server, which then begins the shutdown screen processing in FIG. 160 that corresponds to the operation screen currently displayed by the client.

When the shutdown screen processing is begun, at step S16001 a request is obtained, at step S16002 it is analyzed, and at step S16003 program control branches to a corresponding process.

When Yes is requested, at step S16004 the shutdown process is performed, and the processing is terminated.

When Cancel is requested, at step S16005 the preceding screen HTML page is created and at step S16006 it is transmitted to the client. The processing is thereafter terminated.

When Help is requested, at step S16007 a Logout Help screen HTML page is created and at step S16006 it is transmitted to the client. The processing is thereafter terminated.

For the other request, at step S16008 the post-Login, general request process, which corresponds to the request that is commonly selected on a series of screens following Login, is performed. The processing is thereafter terminated.

According to the above described embodiment, since the manager can perform a process that a common user can not, the apparatus can be controlled by the manager.

The present invention may be applied for an apparatus constituted by a single device, or for a system constituted by a plurality of apparatuses. For implementing the present invention, a memory medium on which is stored software program code for implementing the functions in the above embodiment may be supplied to an apparatus or to a system, and the computer in the apparatus or in the system may read the program code from the memory medium.

In addition, the scope of the present invention includes not only a case where the functions in the embodiment can be performed when program code is read and executed by the computer, but also a case where, in accordance with an instruction in the program code, an OS running on the computer, etc., can perform the processing required to accomplish the functions included in the above embodiment.

The memory medium on which such program code is recorded constitutes the present invention.

Although the present invention has been described in its preferred form with a certain degree of particularity, many apparently widely different embodiments of the invention can be made without departing from the spirit and the scope thereof. It is to be understood that the invention is not limited to the specific embodiments described herein, except as defined in the appended claims.

What is claimed is:

1. An information processing apparatus comprising:
   transmission means for transmitting object information that is to be processed;
   object information storage means for storing said object information that is to be processed;
   display means for displaying, as a list, said object information that is stored in said object information storage means;
   object information selection means for selecting object information from said list of object information;
   destination designation means for designating a transmission destination for said object information that is to be processed;
   transmission method selection means for selecting a first transmission method or a second transmission method; and
   control means for, when said first transmission method is selected by said transmission method selection means, permitting said transmission means to copy from said object information storage means said object information selected by said object information selection means, and, when said second transmission method is selected by said transmission method selection means, for permitting said transmission means to extract, from said object information storage means, said object information that is selected by said object information selection means, and to transmit said object information to said transmission destination that is designated by said transmission designation destination means.

2. An information processing apparatus according to claim 1, wherein said object information storage means stores object information before execution of said object information has been performed.

3. An information processing apparatus according to claim 2, wherein said object information storage means stores a type of process in conjunction with object information.

4. An information processing apparatus according to claim 3, wherein said object information storage means stores, as different process types, transmission processes that respectively use said first transmission method and said second transmission method.

5. An information processing apparatus according to claim 1, further comprising:
   password setup means for setting a password for object information.

6. An information processing apparatus according to claim 5, wherein
   said destination designation means designates a plurality of recipients, and
   said password setup means establishes a unique password for each of said plurality of recipients.

7. An information processing apparatus according to claim 1, further comprising:
   process setup means for setting up a process that said transmission destination is to perform for said object information.

8. An information processing apparatus according to claim 7 wherein said process setup means sets a time at which said transmission destination will perform a process.

9. An information processing method comprising:
   a display step of displaying, as a list, object information that is to be processed, which is stored in an object information storage unit for storing said object information that is to be processed;
   an object information selection step of selecting object information from said list of object information;
   a destination designation step of designating a transmission destination for said object information that is to be processed;
   a transmission method selection step of selecting a first transmission method or a second transmission method; and
   a transmission step of, when said first transmission method is selected at said transmission method selection step, copying from said object information storage unit said object information selected at said object information selection step, and of, when said second transmission method is selected at said transmission method selection step, extracting from said object information storage unit said object information that is selected at said object information selection step, and transmitting said object information to said transmission destination that is designated at said transmission designation destination step.

10. An information processing method according to claim 9, wherein said object information storage unit stores object information before execution of said object information has been performed.

11. An information processing method according to claim 10, wherein said object information storage unit stores a type of process in conjunction with object information.

12. An information processing method according to claim 11, wherein said object information storage unit stores, as different process types, transmission processes that respectively use said first transmission method and said second transmission method.

13. An information processing method according to claim 9, further comprising:
   a password setup step of setting a password for object information.

14. An information processing method according to claim 13, wherein a plurality of recipients are designated at said destination designation step, and a unique password for each of said plurality of recipients is established at said password setup step.

15. An information processing method according to claim 13, wherein a time at which said transmission destination will perform a process is set at said process setup step.

16. An information processing method according to claim 9, further comprising:

a process setup step of setting up a process that said transmission destination is to perform for said object information.

17. A storage medium on which is stored a program for implementing an image processing method, said method comprising:

a display step of displaying, as a list, object information that is to be processed, which is stored in an object information storage unit for storing said object information that is to be processed;

an object information selection step of selecting object information from said list of object information;

a destination designation step of designating a transmission destination for said object information that is to be processed;

a transmission method selection step of selecting a first transmission method or a second transmission method; and a transmission step of, when said first transmission method is selected at said transmission method selection step, copying from said object information storage unit said object information selected at said object information selection step, and when said second transmission method is selected at said transmission method selection step, extracting from said object information storage unit said object information that is selected at said object information selection step, and transmitting said object information to said transmission destination that is designated at said transmission designation destination step.

18. An information processing apparatus comprising:

transmission means for transmitting object information that is to be processed;

object information storage means for storing said object information in conjunction with a corresponding execution time and a corresponding transmission destination;

display means for displaying as a list object information that is stored in said object information storage means;

object information selection means for selecting object information from said list of object information;

change means for changing a setup that is stored in said object information storage means in conjunction with said object information selected by said object information selection means; and control means for permitting said transmission means to transmit said object information, which is stored in said object information storage means with said corresponding execution time and said corresponding transmission destination, to said transmission destination and at said execution time.

19. An information processing apparatus according to claim 18, wherein said change means changes said execution time to an execution time for immediate execution for said selected object information.

20. An information processing apparatus according to claim 18, further comprising:

time designation means for designating a time, wherein said change means changes said execution time to said time that is designated by said time designation means for said selected object information.

21. An information processing apparatus according to claim 18, further comprising:

addition means for, instead of changing said execution time for said selected object information, adding to said object information storage means a process to be carried out for said selected object information at a time different from said execution time.

22. An information processing apparatus according to claim 21, wherein said addition means adds a process for immediately executing said selected object information.

23. An information processing apparatus according to claim 21, further comprising:

time designation means for designating a time, wherein said addition means adds a process for executing said selected object information at the time designated by said time designation means.

24. An information processing apparatus according to claim 18, whereby said change means cancels processing for said selected object information.

25. An information processing apparatus according to claim 24, further comprising:

history storage means for storing a history of execution of object information, wherein, when execution of said selected object information is canceled by said change means, a cancellation history is stored in said history storage means.

26. An information processing apparatus according to claim 18, wherein said change means changes said transmission destination for said selected object information.

27. An information processing apparatus comprising:

object information storage means for storing object information to be processed;

object information list display means for displaying as a list object information stored in said object information storage means;

object information selection means for selecting object information that is to be published;

setup means for setting a publication time limit; and published information registration means for registering as published information, in conjunction with said publication time limit that is set by said setup means, said object information in said published information storage means that is selected by said selection means.

28. An information processing apparatus according to claim 27, further comprising:

determination means for determining whether an allocated publication time has expired for a corresponding object information stored in said published information storage means;

publication list display means for displaying as a list published information for which said determination means has determined that said allocated publication time has not expired;

published information selection means for selecting published information from said list displayed by said publication list display means; and output means for outputting contents of said published information selected by said published information selection means.

29. An information processing apparatus according to claim 28, wherein said published information storage means is provided for a different device, further comprising:

device selection means for selecting said different device; and communication means for communicating with said device that has been selected by said device selection means.

30. An information processing apparatus according to claim 29, wherein, to select said different device, said device selection means employs an address and a name of said different device.

31. An information processing apparatus according to claim 27, wherein said setup means designates a print time using an absolute date.

32. An information processing apparatus according to claim 31, wherein said setup means includes:

calendar display means for displaying a calendar; and date selection means for selecting a date included on said calendar displayed by said calendar display means, and wherein said setup means designates, as said print time, said date selected by said date selection means.

33. An information processing apparatus according to claim 27, wherein said setup means designates a print time using a relative date.

34. An information processing apparatus according to claim 33, wherein said setup means includes:

menu display means for displaying a menu; and item selection means for selecting an item from said menu displayed by said menu display means, and wherein said setup means designates, as an end date for said allocated publication time, a date that corresponds to said item selected by said item selection means.

* * * * *

UNITED STATES PATENT AND TRADEMARK OFFICE
CERTIFICATE OF CORRECTION

PATENT NO. : 6,667,810 B1
DATED : December 23, 2003
INVENTOR(S) : Suresh Jeyachandran et al.

It is certified that error appears in the above-identified patent and that said Letters Patent is hereby corrected as shown below:

Drawings,
Fig. 50, "ACHEDULE" should read -- SCHEDULE --.
Fig. 116, "unill" should read -- until --; and "Ne" should read -- New --.

Column 1,
Line 49, "the issues" should read -- the user issues --.

Column 8,
Line 6, "of," should read -- of --.

Column 13,
Line 12, "showing." should read -- showing --.
Line 51, "processing;" should read -- processing; --.

Column 15,
Line 31, "showing." should read -- showing --.

Column 22,
Line 24, "reregister" should read -- re-register --.

Column 25,
Line 21, "CancelAllPrinterjobs" should read -- CancelAllPrinterJobs --.
Line 23, "CancelAllPrinterjobs( )." should read -- CancelAllPrinterJobs( ). --.
Line 32, "GetAllprinterjobs(pInfo)." should read -- GetAllPrinterJobs(pInfo). --.
Line 35, "EnumPrintero" should read -- EnumPrinter( ) --.

Column 30,
Line 4, "82701" should read -- S2701 --.

Column 31,
Line 3, "TheShowNotify.Exe" should read -- The ShowNotify.Exe --.
Line 57, "up" should read -- up of --.

Column 34,
Line 35, "that" should read -- that are --.

UNITED STATES PATENT AND TRADEMARK OFFICE
CERTIFICATE OF CORRECTION

PATENT NO. : 6,667,810 B1
DATED : December 23, 2003
INVENTOR(S) : Suresh Jeyachandran et al.

It is certified that error appears in the above-identified patent and that said Letters Patent is hereby corrected as shown below:

<u>Column 39,</u>
Line 62, "descried" should read -- described --.

<u>Column 40,</u>
Line 60, "be" should read -- to be --.

<u>Column 43,</u>
Line 54, "FIGS." should read -- FIG. --.

<u>Column 45,</u>
Line 20, "jobs" should read -- Jobs --.

<u>Column 46,</u>
Line 56, "be also" should read -- also be --.

<u>Column 53,</u>
Line 12, "the-client," should read -- the client, --.

<u>Column 54,</u>
Line 20, "post-Login;" should read -- post-Login, --.

<u>Column 55,</u>
Line 12, "screen," should read -- screen --.
Line 20, "HTML," should read -- HTML --.

Signed and Sealed this

Twenty-eighth Day of September, 2004

JON W. DUDAS
*Director of the United States Patent and Trademark Office*